US012522489B2

(12) United States Patent
Archer et al.

(10) Patent No.: US 12,522,489 B2
(45) Date of Patent: Jan. 13, 2026

(54) PLATFORM FOR A LADDER ASSEMBLY OF A FIRE APPARATUS

(71) Applicant: Oshkosh Corporation, Oshkosh, WI (US)

(72) Inventors: David W. Archer, Hortonville, WI (US); Eric D. Betz, Clintonville, WI (US); Eric R. Linsmeier, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1059 days.

(21) Appl. No.: 17/555,827

(22) Filed: Dec. 20, 2021

(65) Prior Publication Data

US 2022/0112061 A1 Apr. 14, 2022

Related U.S. Application Data

(63) Continuation of application No. 17/482,202, filed on Sep. 22, 2021, now Pat. No. 12,234,135, which is a (Continued)

(51) Int. Cl.
*B66F 11/04* (2006.01)
*A62C 27/00* (2006.01)

(Continued)

(52) U.S. Cl.
CPC .............. *B66F 11/04* (2013.01); *A62C 27/00* (2013.01); *B66F 11/044* (2013.01); *E06C 5/04* (2013.01); *E06C 7/16* (2013.01); *B60Y 2200/49* (2013.01)

(58) Field of Classification Search
CPC ....... E04G 1/22; E04G 1/18; E04G 2001/302; E04G 2001/305; E04G 2001/307; B66F 11/04; B66F 11/044; E06C 7/16
See application file for complete search history.

(56) References Cited

U.S. PATENT DOCUMENTS 379,424 A 3/1888 Steck
1,711,358 A 4/1929 Lundahl (Continued)

FOREIGN PATENT DOCUMENTS

CA 2121181 3/1999
CA 2313669 A1 1/2002

(Continued)

OTHER PUBLICATIONS

U.S. Appl. No. 08/046,623, filed Apr. 14, 1993, Schmitz et al.

(Continued)

*Primary Examiner* — Jessica L Laux
(74) *Attorney, Agent, or Firm* — Foley & Lardner LLP

(57) ABSTRACT

A ladder assembly includes a ladder and a basket. The ladder has a first end and an opposing second end configured to couple to the fire apparatus. The basket is coupled to the first end of the ladder. The basket includes a subfloor frame assembly, a floor panel coupled to the subfloor frame assembly, and an upper frame assembly extending upward from and around a periphery of the floor panel. The upper frame assembly includes a front portion, a rear portion, opposing side portions coupled to the rear portion; and a pair of doors extending between the front portion and the opposing side portions. The pair of doors are positioned proximate front corners of the basket and oriented at an angle relative to the front portion and the opposing side portions.

20 Claims, 89 Drawing Sheets

Related U.S. Application Data continuation-in-part of application No. 16/539,239, filed on Aug. 13, 2019, now Pat. No. 11,130,663, which is a continuation of application No. 15/881,412, filed on Jan. 26, 2018, now Pat. No. 10,479,664, said application No. 17/482,202 is a continuation-in-part of application No. 17/029,706, filed on Sep. 23, 2020, now Pat. No. 11,813,488, which is a continuation of application No. 16/779,897, filed on Feb. 3, 2020, now abandoned, which is a continuation of application No. 15/811,241, filed on Nov. 13, 2017, now abandoned, which is a continuation of application No. 15/460,901, filed on Mar. 16, 2017, now Pat. No. 9,814,915, which is a continuation of application No. 15/351,417, filed on Nov. 14, 2016, now Pat. No. 9,597,536, which is a continuation of application No. 14/552,252, filed on Nov. 24, 2014, now Pat. No. 9,504,863.

(60) Provisional application No. 62/451,600, filed on Jan. 27, 2017.

(51) Int. Cl.
*E06C 5/04* (2006.01)
*E06C 7/16* (2006.01)

(56) References Cited

U.S. PATENT DOCUMENTS 1,760,883 A 6/1930 Moss
1,880,480 A 10/1932 Earl
1,901,800 A 3/1933 Bushey
1,924,880 A 8/1933 Earl
1,924,881 A 8/1933 Earl
2,169,253 A 8/1939 Kotrbaty
2,441,890 A 5/1948 Larkin
2,500,815 A * 3/1950 Gerli .................. E02F 9/121 52/114
2,614,743 A 10/1952 Arps
2,720,291 A 10/1955 Larkin
2,860,743 A 11/1958 William
3,010,533 A * 11/1961 Ross .................. E06C 5/04 182/47
3,221,467 A 12/1965 Henkels
3,253,677 A 5/1966 Krynytzky et al.
3,295,633 A * 1/1967 Milner, Jr. ............ B66F 11/044 182/2.4
3,346,052 A 10/1967 Moore et al.
3,396,814 A 8/1968 Garnett
3,534,868 A 10/1970 Eitel
3,550,146 A 12/1970 Eberle
3,675,721 A 7/1972 Davidson et al.
3,710,893 A 1/1973 Hippach
3,770,062 A 11/1973 Riggs
3,789,869 A 2/1974 Morris
4,094,381 A 6/1978 Wilkerson
4,102,108 A 7/1978 Cody
4,185,716 A * 1/1980 Rinehart ............... B66F 11/044 182/2.5
4,253,210 A 3/1981 Racicot
4,317,504 A 3/1982 Artaud et al.
4,410,045 A 10/1983 Whitman
4,453,672 A 6/1984 Garnett
4,540,095 A 9/1985 Wormser et al.
4,556,200 A 12/1985 Shoemaker
4,570,973 A 2/1986 Ewers et al.
4,705,140 A 11/1987 Dudley et al.
4,852,690 A 8/1989 Salmi
4,929,143 A * 5/1990 Dohnalik .............. B66F 9/0655 414/723
4,941,546 A 7/1990 Nist et al.
4,998,982 A 3/1991 Arnold et al.
5,129,480 A 7/1992 Garrett et al.
5,137,115 A 8/1992 Arnold
5,203,425 A * 4/1993 Wehmeyer .............. B66F 11/04 182/148
5,368,317 A 11/1994 Mccombs et al.
5,389,031 A 2/1995 Sharpe et al.
5,538,274 A 7/1996 Schmitz et al.
5,722,505 A 3/1998 Grabner et al.
5,788,158 A 8/1998 Relyea
5,820,150 A 10/1998 Archer et al.
5,839,664 A 11/1998 Relyea
5,897,123 A 4/1999 Cherney et al.
5,924,523 A 7/1999 Krause
5,944,138 A * 8/1999 Vollmer ................ B66F 11/044 182/2.1
6,006,841 A 12/1999 Hunke
6,105,984 A 8/2000 Schmitz et al.
6,145,619 A * 11/2000 Risser .................. B66F 11/044 182/2.1
6,193,007 B1 2/2001 Lie
6,405,831 B1 6/2002 Daniel, III
6,421,593 B1 7/2002 Kempen et al.
6,516,914 B1 2/2003 Andersen et al.
6,520,494 B1 2/2003 Andersen et al.
6,553,290 B1 4/2003 Pillar
6,561,718 B1 5/2003 Archer et al.
6,571,527 B1 6/2003 Rattini
6,598,702 B1 7/2003 Mcgillewie et al.
6,634,153 B1 10/2003 Peterson
6,755,258 B1 6/2004 Hunke et al.
6,757,597 B2 6/2004 Yakes et al.
6,764,085 B1 7/2004 Anderson
6,811,161 B1 11/2004 Anderson
6,860,332 B1 3/2005 Archer et al.
6,882,917 B2 4/2005 Pillar et al.
6,883,815 B2 4/2005 Archer
6,885,920 B2 4/2005 Yakes et al.
6,909,944 B2 6/2005 Pillar et al.
6,922,615 B2 7/2005 Pillar et al.
6,973,768 B2 12/2005 Samejima et al.
6,976,688 B2 12/2005 Archer et al.
6,993,421 B2 1/2006 Pillar et al.
7,006,902 B2 2/2006 Archer et al.
7,024,296 B2 4/2006 Squires et al.
7,055,880 B2 6/2006 Archer
7,072,745 B2 7/2006 Pillar et al.
7,100,741 B2 9/2006 Wissler et al.
7,107,129 B2 9/2006 Rowe et al.
7,127,331 B2 10/2006 Pillar et al.
7,162,332 B2 1/2007 Pillar et al.
7,164,977 B2 1/2007 Yakes et al.
7,178,631 B2 2/2007 Salmi et al.
7,184,862 B2 2/2007 Pillar et al.
7,184,866 B2 2/2007 Squires et al.
7,201,255 B1 4/2007 Kreikemeier
7,234,534 B2 6/2007 Froland et al.
7,254,468 B2 8/2007 Pillar et al.
7,274,976 B2 9/2007 Rowe et al.
7,277,782 B2 10/2007 Yakes et al.
7,302,320 B2 11/2007 Nasr et al.
7,308,968 B2 12/2007 Denison
7,331,586 B2 2/2008 Trinkner et al.
7,379,797 B2 5/2008 Nasr et al.
7,387,348 B2 6/2008 Archer et al.
7,389,826 B2 6/2008 Linsmeier et al.
7,392,122 B2 6/2008 Pillar et al.
7,412,307 B2 8/2008 Pillar et al.
7,439,711 B2 10/2008 Bolton
7,451,028 B2 11/2008 Pillar et al.
7,522,979 B2 4/2009 Pillar
7,555,369 B2 6/2009 Pillar et al.
7,631,700 B1 12/2009 Gil
7,689,332 B2 3/2010 Yakes et al.
7,711,460 B2 5/2010 Yakes et al.
7,715,962 B2 5/2010 Rowe et al.
7,725,225 B2 5/2010 Pillar et al.
7,729,831 B2 6/2010 Pillar et al.
7,756,621 B2 7/2010 Pillar et al.
7,784,554 B2 8/2010 Grady et al.

(56) References Cited

U.S. PATENT DOCUMENTS 7,792,618 B2 9/2010 Quigley et al.
7,792,949 B2 9/2010 Tewari et al.
7,828,116 B2 11/2010 Vetesnik
7,835,838 B2 11/2010 Pillar et al.
7,848,857 B2 12/2010 Nasr et al.
7,874,373 B2 1/2011 Morrow et al.
8,000,850 B2 8/2011 Nasr et al.
8,074,767 B1 12/2011 Denison
8,095,247 B2 1/2012 Pillar et al.
8,201,656 B2 6/2012 Archer et al.
8,215,241 B2 7/2012 Garneau et al.
8,333,390 B2 12/2012 Linsmeier et al.
8,376,719 B2 2/2013 Grady et al.
8,413,764 B1 4/2013 Cohen et al.
8,739,492 B2 6/2014 Hawkins et al.
8,739,892 B2 6/2014 Moore et al.
8,839,902 B1 9/2014 Archer et al.
9,061,169 B2 6/2015 Linsmeier
9,089,728 B2 7/2015 Halley
9,302,129 B1 4/2016 Betz et al.
9,440,823 B2 9/2016 Johnston et al.
9,492,695 B2 11/2016 Betz et al.
9,580,960 B2 2/2017 Aiken et al.
9,580,962 B2 2/2017 Betz et al.
9,597,536 B1 3/2017 Moore
9,677,334 B2 6/2017 Aiken et al.
10,160,629 B2 * 12/2018 Wenjing .................. B66F 11/04
10,392,803 B2 8/2019 Charest et al.
10,442,668 B1 10/2019 Betz et al.
10,723,607 B2 * 7/2020 Wenjing .................. B66F 13/00
11,813,488 B2 11/2023 Moore
2002/0100637 A1 8/2002 Stringer et al.
2002/0116892 A1 8/2002 Baranian
2002/0117345 A1 8/2002 Sztykiel et al.
2003/0158635 A1 8/2003 Pillar et al.
2003/0195680 A1 10/2003 Pillar
2004/0133319 A1 7/2004 Pillar et al.
2004/0155426 A1 8/2004 Wen et al.
2005/0234622 A1 10/2005 Pillar et al.
2005/0236226 A1 10/2005 Salmi et al.
2005/0236824 A1 10/2005 Wissler et al.
2005/0247524 A1 11/2005 Wissler et al.
2005/0253344 A1 11/2005 Trinkner et al.
2006/0021764 A1 2/2006 Archer et al.
2006/0022001 A1 2/2006 Linsmeier et al.
2006/0032701 A1 2/2006 Linsmeier et al.
2006/0032702 A1 2/2006 Linsmeier et al.
2006/0065411 A1 3/2006 Linsmeier et al.
2006/0070845 A1 4/2006 Crookston
2006/0080931 A1 4/2006 Ollman et al.
2006/0086566 A1 4/2006 Linsmeier et al.
2006/0213672 A1 9/2006 Mohr
2007/0034389 A1 2/2007 Relyea et al.
2007/0187434 A1 8/2007 Schrafel
2007/0205053 A1 9/2007 Isham et al.
2007/0256842 A1 11/2007 Mohr
2007/0284156 A1 12/2007 Grady et al.
2007/0286736 A1 12/2007 Grady et al.
2008/0059030 A1 3/2008 Quigley et al.
2008/0063498 A1 3/2008 Lambert et al.
2008/0099212 A1 5/2008 Do
2008/0099213 A1 5/2008 Morrow et al.
2008/0103651 A1 5/2008 Pillar et al.
2008/0215700 A1 9/2008 Pillar et al.
2008/0271901 A1 11/2008 Decker
2009/0096231 A1 4/2009 Burlingame
2009/0101436 A1 4/2009 Burman et al.
2009/0218108 A1 9/2009 Cano
2010/0200328 A1 8/2010 Savard et al.
2011/0203872 A1 8/2011 Hoersch et al.
2011/0209947 A1 9/2011 Allred et al.
2012/0193109 A1 8/2012 Moore et al.
2012/0234464 A1 9/2012 Allred et al.
2014/0048353 A1 2/2014 Ellis
2014/0238704 A1 8/2014 Moore et al.
2014/0262355 A1 9/2014 Linsmeier
2014/0311830 A1 10/2014 Allred et al.
2014/0334169 A1 11/2014 Ewert
2015/0096835 A1 4/2015 Hong et al.
2015/0120152 A1 4/2015 Lauterjung et al.
2015/0273252 A1 10/2015 Lenz et al.
2015/0273253 A1 10/2015 Lenz et al.
2015/0273255 A1 10/2015 Lenz et al.
2016/0032649 A1 2/2016 Moreau
2016/0102456 A1 4/2016 Dietzen et al.
2016/0123079 A1 5/2016 Ballard et al.
2016/0144209 A1 5/2016 Moore
2016/0144210 A1 5/2016 Betz et al.
2016/0145940 A1 5/2016 Aiken et al.
2016/0304051 A1 10/2016 Archer et al.
2017/0050063 A1 2/2017 Shively et al.
2017/0056695 A1 3/2017 Moore
2017/0101297 A1 4/2017 Claypool
2017/0182340 A1 6/2017 Moore
2017/0252583 A1 * 9/2017 Goeltz .................. B66F 11/044
2018/0064973 A1 3/2018 Moore
2018/0072550 A1 3/2018 Clark et al.
2018/0221694 A1 8/2018 Shively et al.
2019/0015692 A1 1/2019 Fieber et al.
2019/0040638 A1 2/2019 Rupp
2019/0136511 A1 5/2019 Liingaard et al.
2019/0175971 A1 6/2019 Moore et al.
2019/0209881 A1 7/2019 Wroblewski et al.
2019/0211558 A1 7/2019 Dietzen et al.
2019/0224516 A1 7/2019 Moore et al.
2019/0232926 A1 8/2019 Lackore
2019/0262643 A1 8/2019 Shively et al.
2020/0039804 A1 2/2020 Betz et al.
2021/0197770 A1 7/2021 Lackore
2024/0123949 A1 4/2024 Lackore

FOREIGN PATENT DOCUMENTS

CN 203050481 7/2013
CN 107106883 8/2017
CN 107206262 9/2017
CN 111894441 A 11/2020
DE 36 40 944 A1 6/1988
EP 0 244 668 11/1987
EP 0 706 904 4/1996
EP 1 781 383 5/2007
EP 1 371 391 B1 12/2009
EP 1 371 392 9/2010
EP 2 374 749 A1 10/2011
EP 2 441 890 A1 4/2012
GB 2 277 304 2/1997
GB D 300 9436 3/2003
GB 2 365 829 9/2004
GB 2 400 588 A 1/2005
GB 2 400 589 A 2/2005
GB 2 400 590 A 3/2005
JP H11-239625 9/1999
JP 2008-297701 12/2008
KR 20110040306 4/2011
KR 101297477 8/2013
KR 101521027 B1 5/2015
KR 102056572 B1 1/2020
WO WO-2006/015242 2/2006
WO WO-2006/015272 2/2006
WO WO-2006/037100 4/2006
WO WO-2006/096202 9/2006
WO WO-2006/101865 9/2006
WO WO-2009/046246 4/2009
WO WO-2016/085652 6/2016
WO WO-2016/085653 6/2016
WO WO-2006/086614 8/2016
WO WO-2016/171965 10/2016
WO WO-2016157245 A1 * 10/2016 ............ A62C 27/00
WO WO-2023/028636 A1 3/2023

OTHER PUBLICATIONS

U.S. Appl. No. 09/123,804, filed Jul. 28, 1998, Archer et al.

(56) References Cited

OTHER PUBLICATIONS

U.S. Appl. No. 09/364,690, filed Jul. 30, 1999, Kempen et al.
U.S. Appl. No. 10/171,075, filed Jun. 13, 2002, Archer et al.
U.S. Appl. No. 29/162,282, filed Jun. 13, 2002, Archer et al.
U.S. Appl. No. 29/162,344, filed Jun. 13, 2002, Archer et al.
Anonymous, "New truck for Lincolnshire-Riverwoods," Chicago Area Fire Departments, Dec. 6, 2010, Retrieved from the Internet at http://chicagoareafire.com/blog/2010/12/06/, 5 pages as printed.
Anonymous, "Problems with single axle aerial trucks," Firehouse, Dec. 2, 2009, Retrieved from the Internet at http://www.firehouse.com/forums/t111822/, 15 pages as printed.
Anonymous, "Raptor Aerials," Rosenbauer, Oct. 2, 2014, Retrieved from the Internet at https://web.archive.org/web/20101224225128/http://rosenbaueramerica.com/media/documents/pdf/raptor_eng.pdf, 6 pages as printed.
Anonymous, "Viper Aerials," Rosenbauer, Oct. 2, 2014, Retrieved from the Internet at https://web.archive.org/web/20141002023939/http://rosenbaueramerica.com/media/documents/pdf/viper_eng.pdf, 8 pages as printed.
International Search Report and Written Opinion on PCT/US2015/059984, dated Feb. 10, 2016, 11 pages.
International Search Report and Written Opinion on Application No. PCT/US2018/015504, mail date May 29, 2018, 18 pages.
International Search Report and Written Opinion on PCT PCT/US2015/060034, dated Feb. 4, 2016, 12 pages.
International Search Report and Written Opinion on PCT/US2015/060035, dated Feb. 10, 2016, 16 pages.
International Search Report and Written Opinion on PCT/US2015/060036, dated Feb. 9, 2016, 14 pages.
International Search Report and Written Opinion on PCT/US2015/060038, dated Feb. 22, 2016, 16 pages.
International Search Report and Written Opinion on PCT/US2015/060040, dated Feb. 9, 2016, 15 pages.
Rosenbauer, "Raptor Aerials", Oct. 2, 2014, 6 pages.
Aerial ladders brochure published by Pierce Manufacturing Inc. prior to the effective filing date of the present application.
Defendants' amended invalidity contentions regarding the claims of parent patents U.S. Pat. No. 9,597,536 and U.S. Pat. No. 9,814,915.
Defendants' claim construction brief regarding the claims of parent patents U.S. Pat. No. 9,597,536 and U.S. Pat. No. 9,814,915.
Defendants' invalidity contentions regarding the claims of parent patents U.S. Pat. No. 9,597,536 and U.S. Pat. No. 9,814,915.
Defendants' motion to dissolve the preliminary injunction based on parent patents U.S. Pat. No. 9,597,536 and U.S. Pat. No. 9,814,915.
Defendants' objections to the report and recommendation in favor of plaintiffs' motion for a preliminary injunction based on parent patents U.S. Pat. No. 9,597,536 and U.S. Pat. No. 9,814,915.
Defendants' opposition to plaintiffs' motion for a preliminary injunction based on parent patents U.S. Pat. No. 9,597,536 and U.S. Pat. No. 9,814,915.
Defendants' opposition to plaintiffs' renewed motion for judgment as a matter of law regarding the validity of claim 20 of parent patent U.S. Pat. No. 9,597,536.
Defendants' supplemental invalidity contentions regarding the claims of parent patents U.S. Pat. No. 9,597,536 and U.S. Pat. No. 9,814,915.
Documentation regarding a Pierce Manufacturing Inc. fire apparatus including a medium duty ladder delivered to Falcon Heights, MN Fire Department prior to the effective filing date of the present application.
Documentation regarding a Rosenbauer fire apparatus purportedly delivered to Hinsdale, IL Fire Department prior to the effective filing date of the present application, including photographs purportedly taken in 2019 and purportedly showing 750 pounds of weight hanging from the distal end of the ladder of the fire apparatus.
Documentation regarding a Seagrave fire apparatus purportedly delivered to Essex, MA Fire Department prior to the effective filing date of the present application.
Documentation regarding a Seagrave fire apparatus purportedly delivered to Mt. Washington, KY Fire Department prior to the effective filing date of the present application.
Documentation regarding Inter Partes Review and Denial to Institute Inter Partes Review of U.S. Pat. No. 9,597,536 (IPR2019-00161).
Documentation regarding Inter Partes Review and Denial to Institute Inter Partes Review of U.S. Pat. No. 9,814,915 (IPR2019-00162).
Documentation regarding Rosenbauer Raptor 102' aerial ladder purportedly available prior to the effective filing date of the present application.
Documents regarding the appeal and affirmation of the preliminary injunction based on parent patents U.S. Pat. No. 9,597,536 and U.S. Pat. No. 9,814,915.
Emergency Vehicle Size and Weight Regulation Guide available as early as Nov. 2011.
Excerpt from Larry Shapiro, Aerial Fire Trucks, 2002, MBI Publishing Company, St. Paul, MN.
Expert Report of Dr. Joseph Rakow regarding invalidity of parent patents U.S. Pat. No. 9,597,536 and U.S. Pat. No. 9,814,915.
KME 109' Aerialcat tandem rear axle fire apparatus brochure purportedly published by KME prior to the effective filing date of the present application.
Medium duty ladder information sheet published by Pierce Manufacturing Inc. and available as early as of May 2006.
Metz aerial ladder instruction manual purportedly published prior to the effective filing date of the present application—2.
Metz aerial ladder instruction manual purportedly published prior to the effective filing date of the present application.
Mexican Office Action issued in connection with MX Appl. Ser. No. MX/a/2017/006759 dated Jun. 28, 2022 (8 pages).
Order denying plaintiffs' renewed motion for judgement of a matter of law regarding the validity of claim 20 of parent patent U.S. Pat. No. 9,597,536.
Order granting plaintiffs' motion for a preliminary injunction based on parent patents U.S. Pat. No. 9,597,536 and U.S. Pat. No. 9,814,915.
Order regarding the construction of the claims of parent patents U.S. Pat. No. 9,597,536 and U.S. Pat. No. 9,814,915.
Plaintiffs' claim construction brief regarding the claims of parent patents U.S. Pat. No. 9,597,536 and U.S. Pat. No. 9,814,915.
Plaintiffs' motion for a preliminary injunction based on parent patents U.S. Pat. No. 9,597,536 and U.S. Pat. No. 9,814,915.
Plaintiffs' opposition to defendants' motion to dissolve the preliminary injunction based on parent patents U.S. Pat. No. 9,597,536 and U.S. Pat. No. 9,814,915.
Plaintiffs' renewed motion for judgment as a matter of law regarding the validity of claim 20 of parent patent U.S. Pat. No. 9,597,536.
Plaintiffs' reply in support of plaintiffs' motion for a preliminary injunction based on parent patents U.S. Pat. No. 9,597,536 and U.S. Pat. No. 9,814,915.
Plaintiffs' response to defendants' objections to the report and recommendation in favor of plaintiffs' motion for a preliminary injunction based on parent patents U.S. Pat. No. 9,597,536 and U.S. Pat. No. 9,814,915.
Report and recommendation in favor of plaintiffs' motion for a preliminary injunction based on parent patents U.S. Pat. No. 9,597,536 and U.S. Pat. No. 9,814,915.
Rosenbauer Raptor aerial ladder brochure purportedly published by Rosenbauer prior to the effective filing date of the present application.
Transcript of trial proceedings (Case No. 8:18-CV-617) on Jun. 11, 2021 relating to parent patents U.S. Pat. No. 9,597,536 and U.S. Pat. No. 9,814,915.
Transcript of trial proceedings (Case No. 8:18-CV-617) on Jun. 14, 2021 relating to parent patents U.S. Pat. No. 9,597,536 and U.S. Pat. No. 9,814,915.

* cited by examiner

PLATFORM FOR A LADDER ASSEMBLY OF A FIRE APPARATUS

CROSS-REFERENCE TO RELATED PATENT APPLICATIONS

This application is a continuation of U.S. patent application Ser. No. 17/482,202, filed Sep. 22, 2021, which is a continuation-in-part of (1) U.S. patent application Ser. No. 17/029,706, filed Sep. 23, 2020, which (a) is a continuation of U.S. patent application Ser. No. 16/779,897, filed Feb. 3, 2020, which is a continuation of U.S. patent application Ser. No. 15/811,241, filed Nov. 13, 2017, which is a continuation of U.S. patent application Ser. No. 15/460,901, filed Mar. 16, 2017, now U.S. Pat. No. 9,814,915, which is a continuation of U.S. patent application Ser. No. 15/351,417, filed Nov. 14, 2016, now U.S. Pat. No. 9,597,536, which is a continuation of U.S. patent application Ser. No. 14/552,252, filed Nov. 24, 2014, now U.S. Pat. No. 9,504,863, and (b) is related to (i) U.S. patent application Ser. No. 15/089,137, filed Apr. 1, 2016, now U.S. Pat. No. 9,580,960, which is a continuation of U.S. patent application Ser. No. 14/552,240, filed Nov. 24, 2014, now U.S. Pat. No. 9,677,334, (ii) U.S. patent application Ser. No. 14/552,293, filed Nov. 24, 2014, now U.S. Pat. No. 9,580,962, (iii) U.S. patent application Ser. No. 14/552,283, filed Nov. 24, 2014, now U.S. Pat. No. 9,492,695, (iv) U.S. patent application Ser. No. 14/552,260, filed Nov. 24, 2014, now U.S. Pat. No. 9,302,129, and (v) U.S. patent application Ser. No. 14/552,275, filed Nov. 24, 2014, now U.S. Pat. No. 9,579,530, and (2) U.S. patent application Ser. No. 16/539,239, filed Aug. 13, 2019, now U.S. Pat. No. 11,130,663, which is a continuation of U.S. patent application Ser. No. 15/881,412, filed on Jan. 26, 2018, now U.S. Pat. No. 10,479,664, which claims the benefit of U.S. Provisional Patent Application No. 62/451,600, filed Jan. 27, 2017, all of which are incorporated herein by reference in their entireties.

BACKGROUND

A quint configuration fire apparatus (e.g., a fire truck, etc.) includes an aerial ladder, a water tank, ground ladders, a water pump, and hose storage. Aerial ladders may be classified according to their horizontal reach and vertical extension height. Traditionally, weight is added to the fire apparatus (e.g., by making the various components heavier or larger, etc.) in order to increase the horizontal reach or vertical extension height of the aerial ladder. Traditional quint configuration fire trucks have included a second rear axle to carry the weight required to provide the desired aerial ladder horizontal reach and vertical extension height. Such vehicles can therefore be more heavy, difficult to maneuver, and expensive to manufacture.

SUMMARY

One embodiment relates to a ladder assembly for a fire apparatus. The ladder assembly includes a ladder and a basket. The ladder has a first end and an opposing second end configured to couple to the fire apparatus. The basket is coupled to the first end of the ladder. The basket includes a subfloor frame assembly, a floor panel coupled to the subfloor frame assembly, and an upper frame assembly extending upward from and around a periphery of the floor panel. The upper frame assembly includes a front portion, a rear portion, opposing side portions coupled to the rear portion; and a pair of doors extending between the front portion and the opposing side portions. The pair of doors are positioned proximate front corners of the basket and oriented at an angle relative to the front portion and the opposing side portions.

Another embodiment relates to a ladder assembly for a fire apparatus. The ladder assembly includes a ladder, a basket, a first actuator, and a second actuator. The ladder has a basket mount positioned at an end thereof. The basket mount includes a first arm and a second arm. The basket is coupled to the basket mount. The basket includes a floor, an upper frame assembly extending upward from and around a periphery of the floor, a subfloor frame assembly positioned beneath the floor, and a platform extension extending forward of the floor in front of the upper frame assembly. The upper frame assembly includes a front portion, a rear portion, a first side portion coupled to a first end of the rear portion, a second side portion coupled to an opposing second end of the rear portion, a first door extending between the front portion and the first side portion, and a second door extending between the second side portion and the front portion. The first door and the second door are positioned proximate front corners of the basket and oriented at first angles relative to the front portion, the first side portion, and the second side portion. The subfloor frame assembly includes a first mount support and a second mount support. The first arm of the basket mount engages with the first mount support and the second arm of the basket mount engages with the second mount support. Side portions of the platform extension that are positioned in front of the first door and the second door are oriented at second angles that correspond with the first angles of the first door and the second door. The first actuator extends between the first arm of the basket mount and the basket. The second actuator extends between the second arm of the basket mount and the basket. Extension and retraction of the first actuator and the second actuator causes the basket to pivot relative to the basket mount about a pivot axis positioned beneath the floor.

Another embodiment relates to a basket for a ladder of a fire apparatus. The basket includes a floor, an upper frame assembly extending upward from and around a periphery of the floor, a subfloor frame assembly positioned beneath the floor, a platform extension, side platform supports, and a rear door. The upper frame assembly includes a front portion, a rear portion defining a rear opening, a first side portion coupled to a first end of the rear portion, a second side portion coupled to an opposing second end of the rear portion, a first door extending between the front portion and the first side portion, and a second door extending between the second side portion and the front portion. The first door and the second door are positioned proximate front corners of the basket and oriented at first angles relative to the front portion, the first side portion, and the second side portion. The subfloor frame assembly includes a first mount support and a second mount support. The first mount support and the second mount support are configured to pivotably couple to an end of the ladder such that the basket is pivotable relative to the end of the ladder about a pivot axis positioned beneath the floor. The platform extension extends forward of the floor in front of the upper frame assembly. Side portions of the platform extension positioned in front of the first door and the second door are oriented at second angles that correspond with the first angles of the first door and the second door. The side platform supports extend longitudinally forward from each lateral side of the basket. The side platform supports are positioned to support the platform extension along opposing lateral sides thereof. The rear door extends across the rear opening. The rear door includes a first interface, a second interface, a first lateral member, a second lateral member, and a handle. The first interface is coupled to a first portion of the rear portion positioned at a first side of the rear opening. The second interface is coupled to the first portion of the rear portion positioned at a first side of the rear opening. The first lateral member extends across the rear opening. The first lateral member has a first lateral end selectively received by the first interface and an opposing second lateral end pivotably coupled to a second portion of the rear portion positioned at an opposing second side of the rear opening. The second lateral member extends across the rear opening and is vertically offset from the first lateral member. The second lateral member has a third lateral end selectively received by the second interface and an opposing fourth lateral end pivotably coupled to the second portion of the rear portion positioned at the opposing second side of the rear opening. The handle is pivotably coupled to the first lateral member and the second lateral member to form a four bar mechanism that includes the handle, the first lateral member, the second lateral member, and the second portion of the rear portion at the opposing second side of the rear opening.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
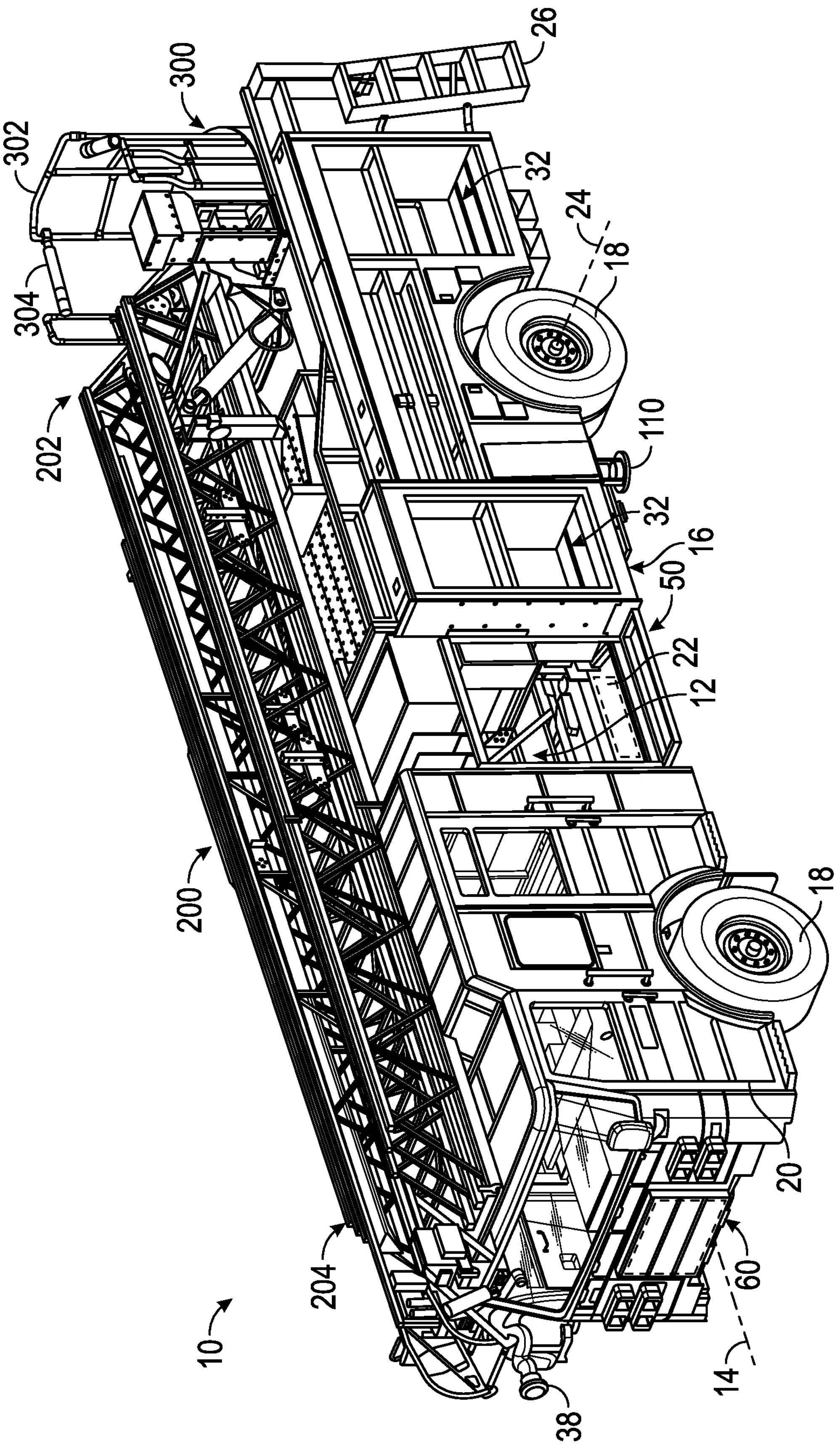
FIG. 1 is a front perspective view of a fire apparatus, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a quint configuration fire apparatus includes a water tank, an aerial ladder, hose storage, ground ladders, a water pump, and a single rear axle. While some traditional quint configuration fire trucks have a ladder assembly mounted on a single rear axle chassis, the ladder assembly of such fire trucks traditionally has a vertical extension height of 75-80 feet and 67-72 feet of horizontal reach. Vertical extension height may include the distance from the upper-most rung of the ladder assembly to the ground when the ladder assembly is fully extended. Reach may include the horizontal distance from the point of rotation (e.g., point of connection of a ladder assembly to a fire apparatus, etc.) to the furthest rung when the ladder assembly is extended. Increasing vertical extension height or horizontal reach is traditionally achieved by increasing the weight of various components (e.g., the aerial ladder assembly, the turntable, etc.). The increased weight, in turn, is traditionally carried by a requisite tandem rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. According to an exemplary embodiment, the aerial ladder assembly of the quint configuration fire apparatus is operable at a vertical extension height of at least 95 feet (e.g., 105 feet, 107 feet, etc.) and at least 90 feet (e.g., at least 100 feet, etc.) of horizontal reach with a tip capacity of at least 750 pounds. The weight of the chassis and other components is supported by a single rear axle chassis, thereby reducing cost and increasing maneuverability relative to traditional vehicles.

Overall Vehicle Configuration

According to the exemplary embodiment shown in FIGS. 1-12, a vehicle, shown as a fire apparatus 10, includes a chassis, shown as a frame 12, that defines a longitudinal axis 14. A body assembly, shown as rear section 16, axles 18, and a cab assembly, shown as front cabin 20, are coupled to the frame 12. In one embodiment, the longitudinal axis 14 extends along a direction defined by at least one of a first frame rail 11 and a second frame rail 13 of the frame 12 (e.g., front-to-back, etc.).

Referring to the exemplary embodiment shown in FIG. 1, the front cabin 20 is positioned forward of the rear section 16 (e.g., with respect to a forward direction of travel for the vehicle along the longitudinal axis 14, etc.). According to an alternative embodiment, the cab assembly may be positioned behind the rear section 16 (e.g., with respect to a forward direction of travel for the vehicle along the longitudinal axis 14, etc.). The cab assembly may be positioned behind the rear section 16 on, by way of example, a rear tiller fire apparatus. In some embodiments, the fire apparatus 10 is a ladder truck with a front portion that includes the front cabin 20 pivotally coupled to a rear portion that includes the rear section 16.

Figure 2:
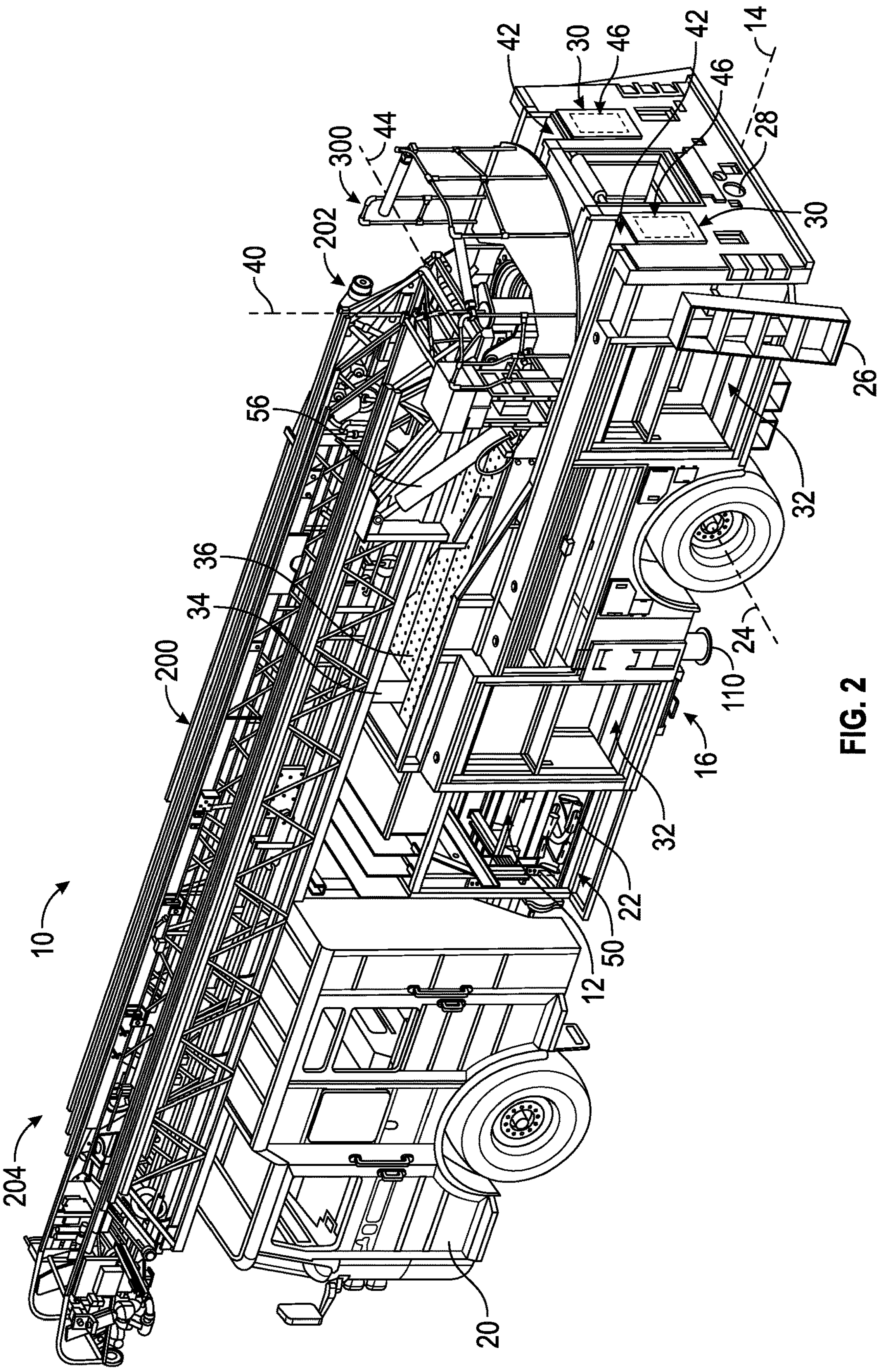
FIG. 2 is a rear perspective view of the fire apparatus of FIG. 1, according to an exemplary embodiment.
Figure 8:
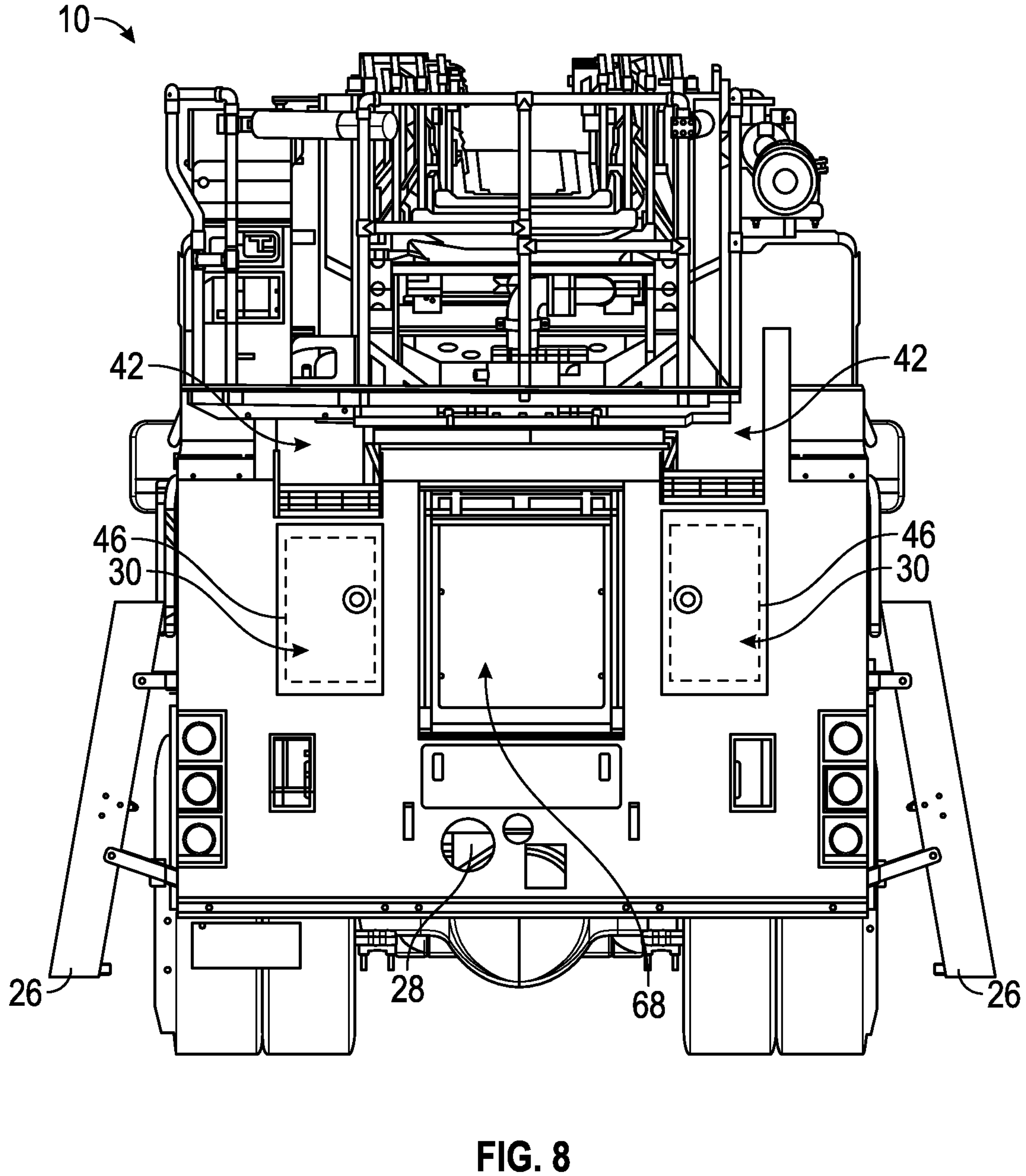
FIG. 8 is a rear view of the fire apparatus of FIG. 1, according to an exemplary embodiment.

As shown in FIGS. 2 and 8, the fire apparatus 10 also includes ground ladders 46. The ground ladders 46 are stored within compartments that are closed with doors 30. As shown in FIGS. 2 and 8, the fire apparatus 10 includes two storage compartments and doors 30, each to store one or more individual ground ladders 46. In other embodiments, only one storage compartment and door 30 is included to store one or more ground ladders 46. In still other embodiments, three or more storage compartments and doors 30 are included to store three or more ground ladders 46. As shown in FIGS. 2 and 8, a hose chute 42 is provided on each lateral side at the rear of the fire apparatus 10. The hose chutes 42 define a passageway where one or more hoses may be disposed once pulled from a hose storage location, shown as hose storage platform 36. The fire apparatus 10 includes additional storage, shown as storage compartments 32 and 68, to store miscellaneous items and gear used by emergency response personnel (e.g., helmets, axes, oxygen tanks, medical kits, etc.).

Figure 7:
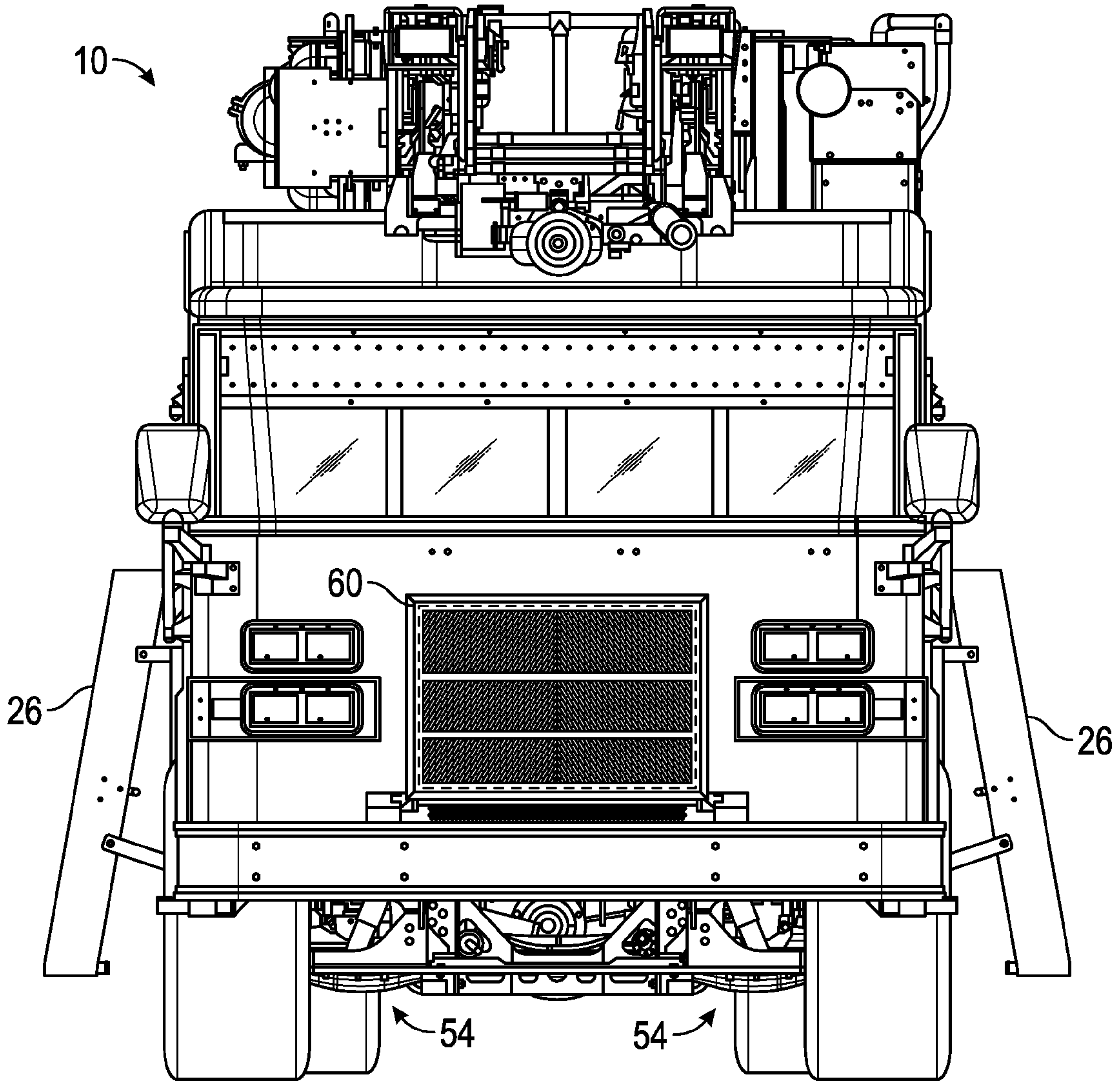
FIG. 7 is a front view of the fire apparatus of FIG. 1, according to an exemplary embodiment.

As shown in FIGS. 1 and 7, the fire apparatus 10 includes an engine 60. In one embodiment, the engine 60 is coupled to the frame 12. According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., wheels, etc.). The final drive then propels or moves the fire apparatus 10. According to an exemplary embodiment, the engine 60 is a compression-ignition internal combustion engine that utilizes diesel fuel. In alternative embodiments, the engine 60 is another type of device (e.g., spark-ignition engine, fuel cell, electric motor, etc.) that is otherwise powered (e.g., with gasoline, compressed natural gas, hydrogen, electricity, etc.).

As shown in FIGS. 1-2, the fire apparatus 10 is a quint configuration fire truck that includes a ladder assembly, shown as aerial ladder assembly 200, and a turntable assembly, shown as turntable 300. The aerial ladder assembly 200 includes a first end 202 (e.g., base end, proximal end, pivot end, etc.) and a second end 204 (e.g., free end, distal end, platform end, implement end, etc.). As shown in FIGS. 1-2, the aerial ladder assembly 200 includes a plurality of ladder sections. In some embodiments, the plurality of sections of the aerial ladder assembly 200 is extendable. An actuator may selectively reconfigure the aerial ladder assembly 200 between an extended configuration and a retracted configuration. By way of example, aerial ladder assembly 200 may include a plurality of nesting sections that telescope with respect to one another. In the extended configuration (e.g., deployed position, use position, etc.), the aerial ladder assembly 200 is lengthened, and the second end 204 is extended away from the first end 202. In the retracted configuration (e.g., storage position, transport position, etc.), the aerial ladder assembly 200 is shortened, and the second end 204 is withdrawn towards the first end 202.

According to an exemplary embodiment, the first end 202 of the aerial ladder assembly 200 is coupled to the frame 12. By way of example, aerial ladder assembly 200 may be directly coupled to frame 12 or indirectly coupled to frame 12 (e.g., with an intermediate superstructure, etc.). As shown in FIGS. 1-2, the first end 202 of the aerial ladder assembly 200 is coupled to the turntable 300. The turntable 300 may be directly or indirectly coupled to the frame 12 (e.g., with an intermediate superstructure, via rear section 16, etc.). As shown in FIG. 1, the turntable 300 includes a railing assembly, shown as hand rails 302, and guard rails, shown as guard rails 304. The hand rails 302 provide support for operators aboard the turntable 300. The guard rails 304 are coupled to the hand rails 302 and provide two entrances to the turntable 300. An operator may provide a force to rotate the guard rails 304 open and gain access to the turntable 300. In the embodiment shown in FIG. 2, the turntable 300 rotates relative to the frame 12 about a generally vertical axis 40. According to an exemplary embodiment, the turntable 300 is rotatable a full 360 degrees relative to the frame 12. In other embodiments, the rotation of the turntable 300 relative to the frame 12 is limited to a range of less than 360 degrees, or the turntable 300 is fixed relative to the frame 12. As shown in FIGS. 1-4, the rear section 16 includes a pair of ladders 26 positioned on opposing lateral sides of the fire apparatus 10. As shown in FIGS. 1-2, the ladders 26 are coupled to the rear section 16 with hinges. An operator (e.g., a fire fighter, etc.) may access the turntable 300 by climbing either one of the ladders 26 and entering through the guard rails 304. According to the exemplary embodiment shown in FIGS. 1-2, the turntable 300 is positioned at the rear end of the rear section 16 (e.g., rear mount, etc.). In other embodiments, the turntable 300 is positioned at the front end of the rear section 16, proximate the front cabin 20 (e.g., mid mount, etc.). In still other embodiments, the turntable 300 is disposed along front cabin 20 (e.g., front mount, etc.).

According to the exemplary embodiment shown in FIGS. 1-2, the first end 202 of the aerial ladder assembly 200 is pivotally coupled to the turntable 300. An actuator, shown as cylinder 56, is positioned to rotate the aerial ladder assembly 200 about a horizontal axis 44. The actuator may be a linear actuator, a rotary actuator, or still another type of device and may be powered hydraulically, electrically, or still otherwise powered. In one embodiment, aerial ladder assembly 200 is rotatable between a lowered position (e.g., the position shown in FIG. 1, etc.) and a raised position. The aerial ladder assembly 200 may be generally horizontal or an angle (e.g., 10 degrees, etc.) below the horizontal when disposed in the lowered position (e.g., a stored position, etc.). In one embodiment, extension and retraction of cylinders 56 rotates aerial ladder assembly 200 about the horizontal axis 44 and raises or lowers, respectively, the second end 204 of aerial ladder assembly 200. In the raised position, the aerial ladder assembly 200 allows access between the ground and an elevated height for a fire fighter or a person being aided by the fire fighter.

Figure 5:
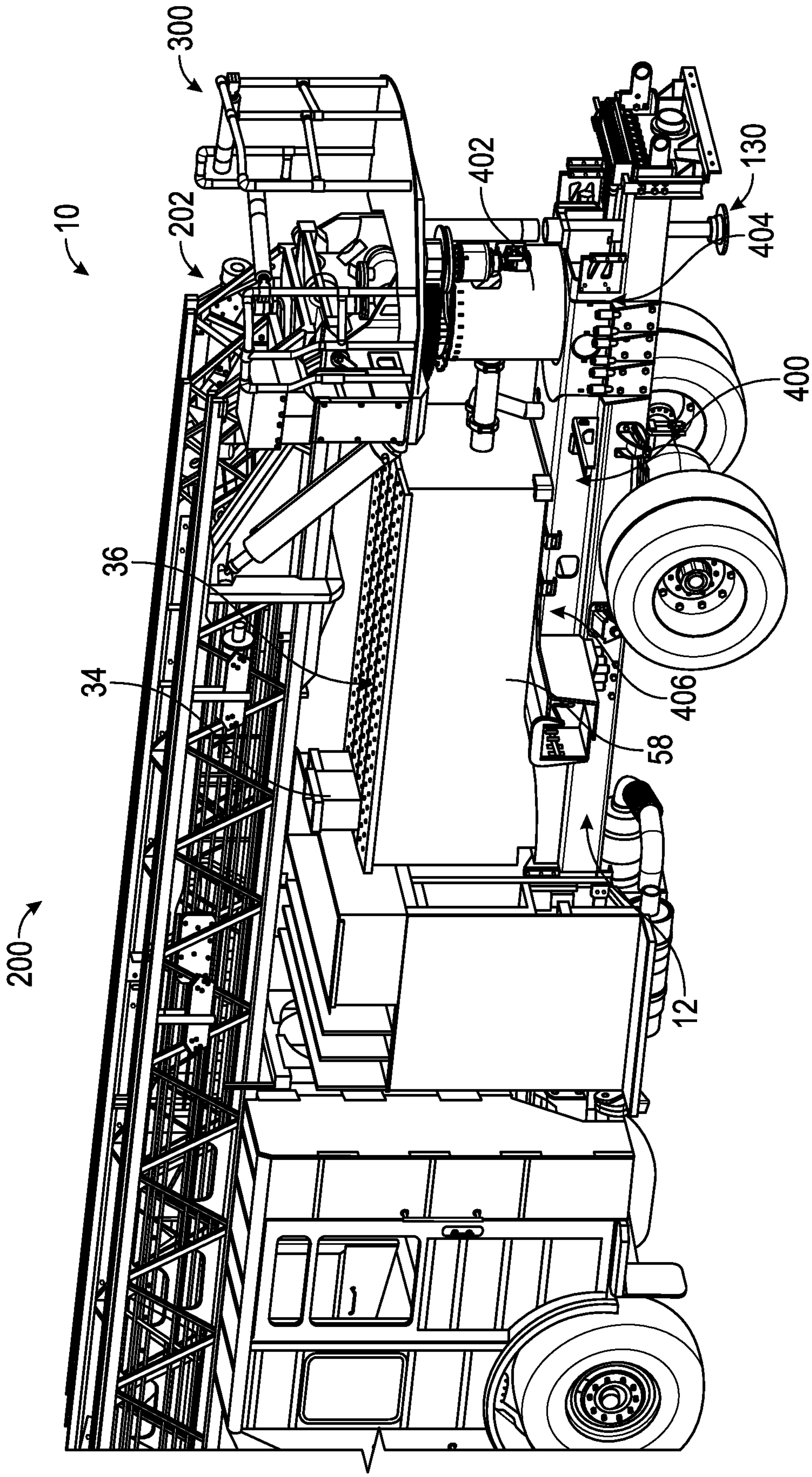
FIG. 5 is a rear perspective view of a water tank of the fire apparatus of FIG. 1, according to an exemplary embodiment.

According to the exemplary embodiment shown in FIG. 5, a reservoir, shown as water tank 58, is coupled to the frame 12 with a superstructure. In one embodiment, the water tank 58 is located within the rear section 16 and below the hose storage platform 36. As shown in FIG. 5, the water tank 58 is coupled to the frame 12 with a tubular component, shown as torque box 400. In one embodiment, the water tank 58 stores at least 500 gallons of water. In other embodiments, the reservoir stores another firefighting agent (e.g., foam, etc.). According to the exemplary embodiment shown in FIGS. 2 and 5, the water tank 58 is filled with a fill dome, shown as fill dome 34.

As shown in FIGS. 1-2, the fire apparatus 10 includes a pump house, shown as pump house 50. A pump 22 may be disposed within the pump house 50. By way of example, the pump house 50 may include a pump panel having an inlet for the entrance of water from an external source (e.g., a fire hydrant, etc.). As shown in FIG. 2, an auxiliary inlet, shown as inlet 28, is provided at the rear of the fire apparatus 10. The pump house 50 may include an outlet configured to engage a hose. The pump 22 may pump fluid through the hose to extinguish a fire (e.g., water from the inlet of the pump house 50, water from the inlet 28, water stored in the water tank 58, etc.).

Referring still to the exemplary embodiment shown in FIGS. 1-2, an implement, shown as nozzle 38 (e.g., deluge gun, water cannon, deck gun, etc.), is disposed at the second end 204 of the aerial ladder assembly 200. The nozzle 38 is connected to a water source (e.g., the water tank 58, an external source, etc.) via an intermediate conduit extending along the aerial ladder assembly 200 (e.g., along the side of the aerial ladder assembly 200, beneath the aerial ladder assembly 200, in a channel provided in the aerial ladder assembly 200, etc.). By pivoting the aerial ladder assembly 200 into the raised position, the nozzle 38 may be elevated to expel water from a higher elevation to facilitate suppressing a fire. In some embodiments, the second end 204 of the aerial ladder assembly 200 includes a basket. The basket may be configured to hold at least one of fire fighters and persons being aided by the fire fighters. The basket provides a platform from which a fire fighter may complete various tasks (e.g., operate the nozzle 38, create ventilation, overhaul a burned area, perform a rescue operation, etc.).

Figure 3:
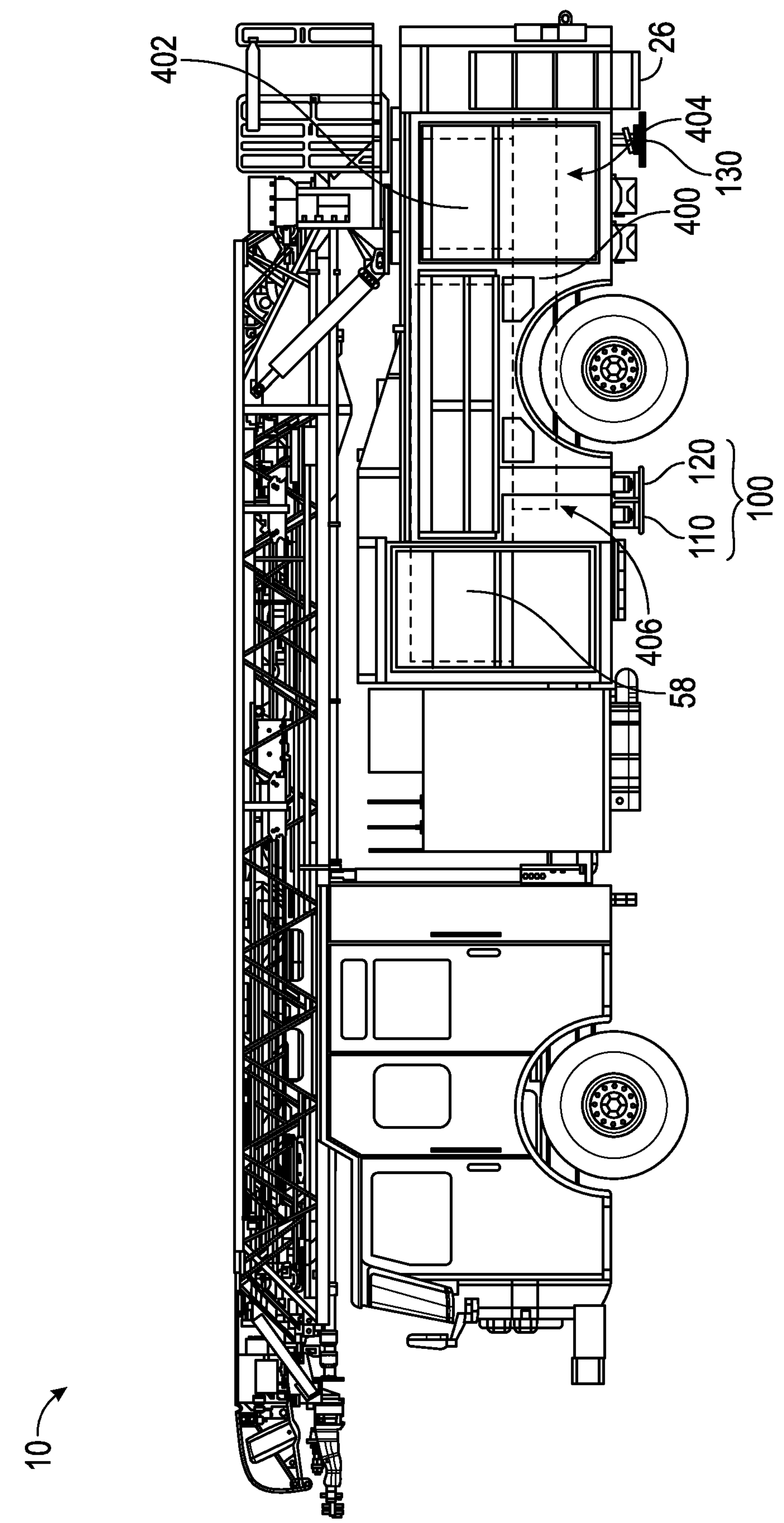
FIG. 3 is a left side view of the fire apparatus of FIG. 1, according to an exemplary embodiment.
Figure 4:
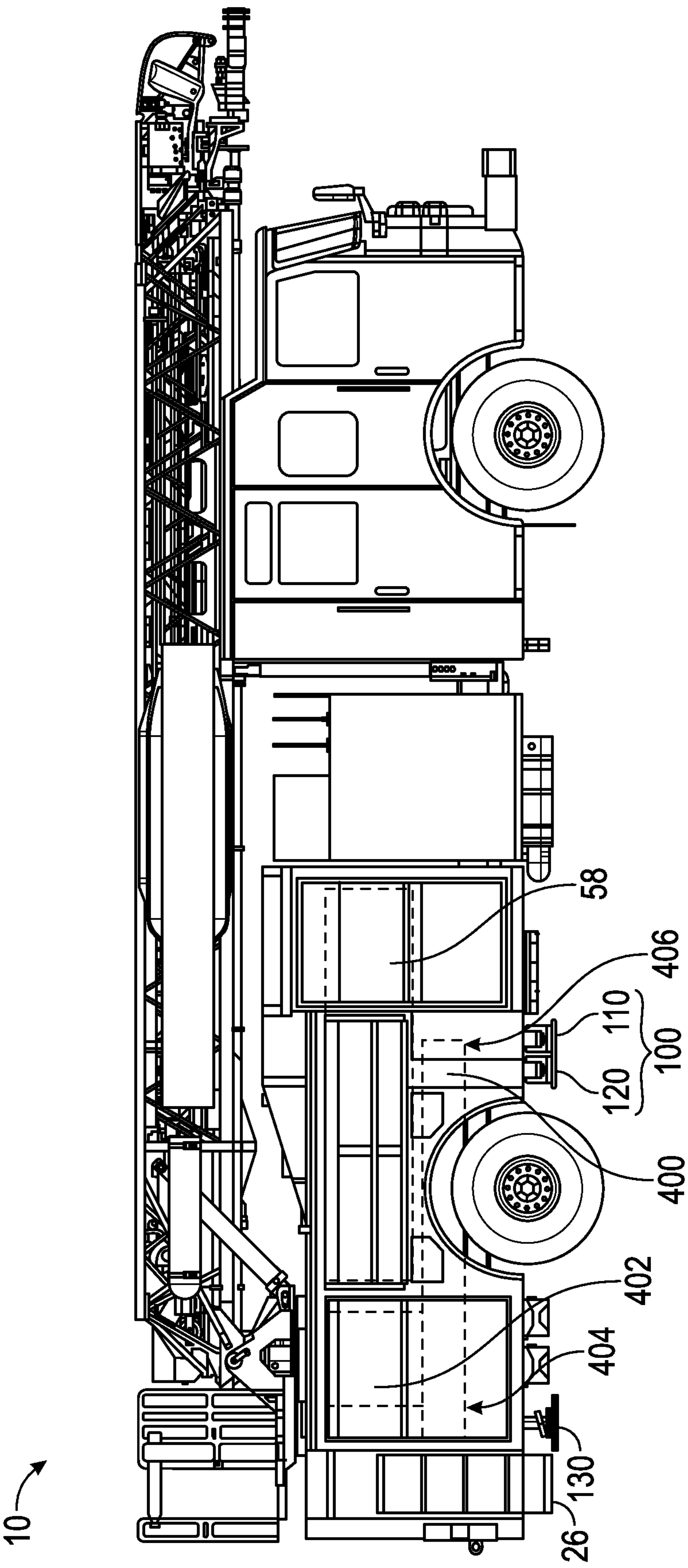
FIG. 4 is a right side view of the fire apparatus of FIG. 1, according to an exemplary embodiment.
Figure 6:
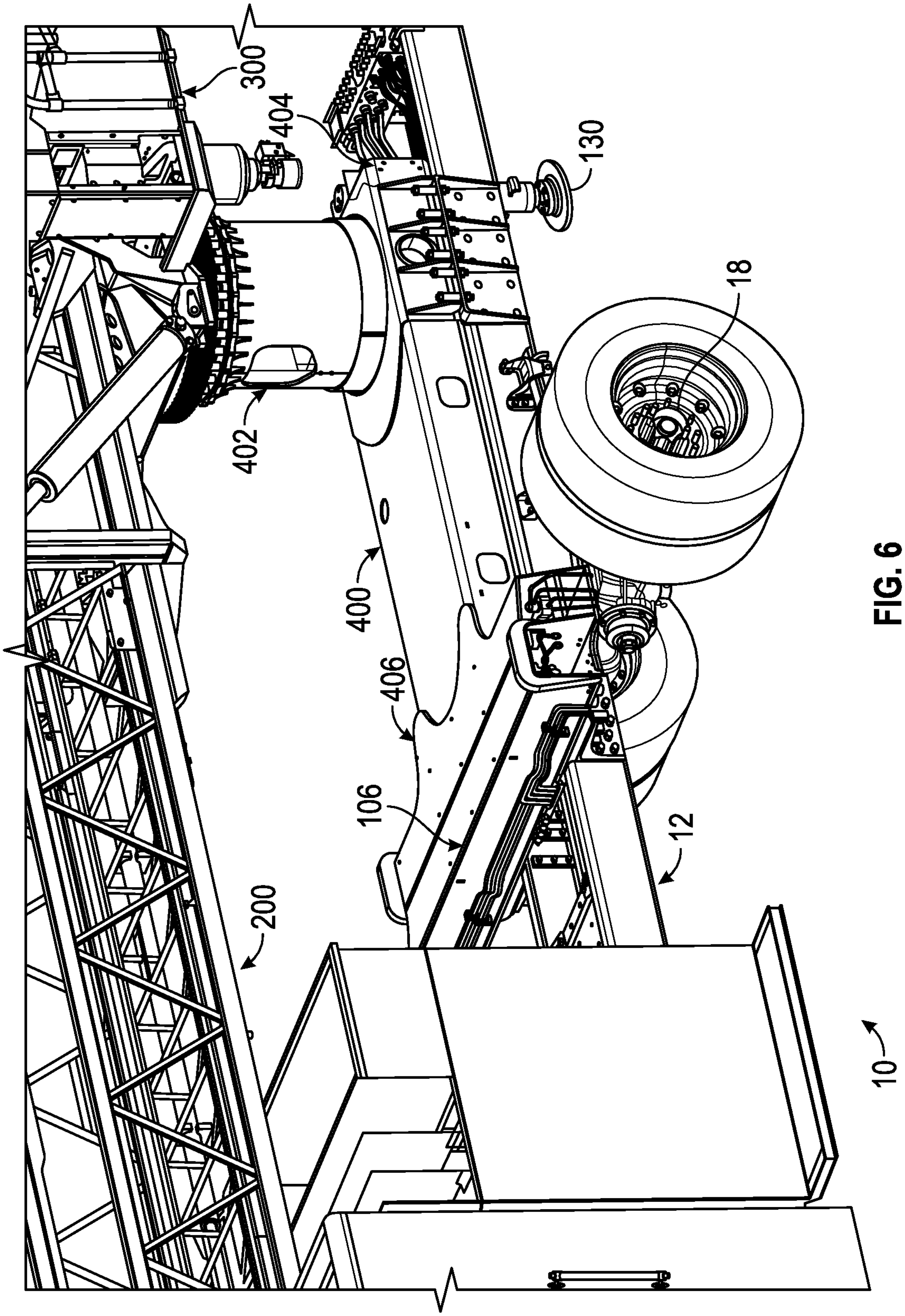
FIG. 6 is a front perspective view of various internal components of the fire apparatus of FIG. 1, according to an exemplary embodiment.

According to the exemplary embodiment shown in FIGS. 5-6, the torque box 400 is coupled to the frame 12. In one embodiment, the torque box 400 extends the full width between the lateral outsides of the first frame rail 11 and the second frame rail 13 of the frame 12. The torque box 400 includes a body portion having a first end 404 and a second end 406. As shown in FIG. 5, a pedestal, shown as pedestal 402, is attached to the first end 404 of the torque box 400. In one embodiment, the pedestal 402 is disposed rearward of (i.e., behind, etc.) the single rear axle 18. The pedestal 402 couples the turntable 300 to the torque box 400. The turntable 300 rotatably couples the first end 202 of the aerial ladder assembly 200 to the pedestal 402 such that the aerial ladder assembly 200 is selectively repositionable into a plurality of operating orientations. According to the exemplary embodiment shown in FIGS. 3-4, a single set of outriggers, shown as outriggers 100, includes a first outrigger 110 and a second outrigger 120. As shown in FIGS. 3-4, the first outrigger 110 and the second outrigger 120 are attached to the second end 406 of the torque box 400 in front of the single rear axle 18 and disposed on opposing lateral sides of the fire apparatus 10. As shown in FIGS. 1-4, the outriggers 100 are moveably coupled to the torque box 400 and may extend outward, away from the longitudinal axis 14, and parallel to a lateral axis 24. According to an exemplary embodiment, the outriggers 100 extend to a distance of eighteen feet (e.g., measured between the center of a pad of the first outrigger 110 and the center of a pad of the second outrigger 120, etc.). In other embodiments, the outriggers 100 extend to a distance of less than or greater than eighteen feet. An actuator may be positioned to extend portions of each of the first outrigger 110 and the second outrigger 120 towards the ground. The actuator may be a linear actuator, a rotary actuator, or still another type of device and may be powered hydraulically, electrically, or still otherwise powered.

According to the exemplary embodiment shown in FIGS. 3-5, a stability foot, shown as stability foot 130, is attached to the first end 404 of the torque box 400. An actuator (e.g., a linear actuator, a rotary actuator, etc.) may be positioned to extend a portion of the stability foot 130 towards the ground. Both the outriggers 100 and the stability foot 130 are used to support the fire apparatus 10 (e.g., while stationary and in use to fight fires, etc.). According to an exemplary embodiment, with the outriggers 100 and stability foot 130 extended, the fire apparatus 10 can withstand a tip capacity of at least 750 pounds applied to the last rung on the second end 204 of the aerial ladder assembly 200 while fully extended (e.g., to provide a horizontal reach of at least 90 feet, to provide a horizontal reach of at least 100 feet, to provide a vertical extension height of at least 95 feet, to provide a vertical extension height of at least 105 feet, to provide a vertical extension height of at least 107 feet, etc.). The outriggers 100 and the stability foot 130 are positioned to transfer the loading from the aerial ladder assembly 200 to the ground. For example, a load applied to the aerial ladder assembly 200 (e.g., a fire fighter at the second end 204, a wind load, etc.) may be conveyed into to the turntable 300, through the pedestal 402 and the torque box 400, and into the ground through at least one of the outriggers 100 and the stability foot 130. While the fire apparatus 10 is being driven or not in use, the actuators of the first outrigger 110, the second outrigger 120, and the stability foot 130 may retract portions of the outriggers 100 and the stability foot 130 into a stored position.

Figure 10:
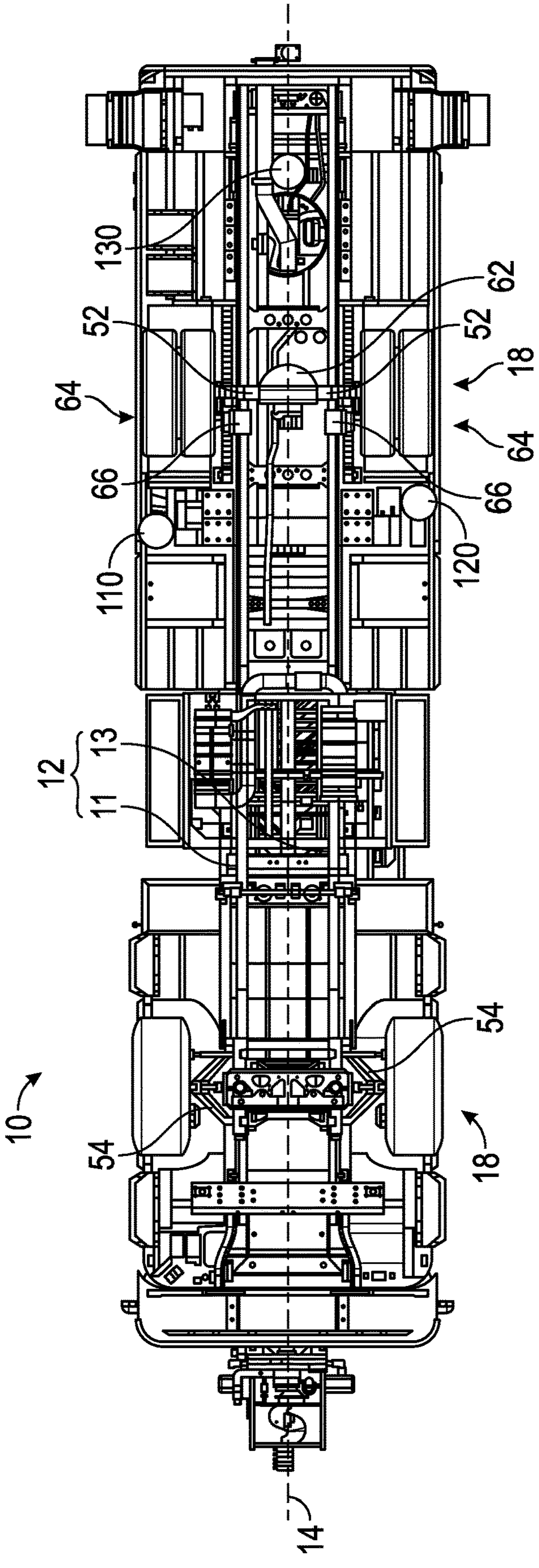
FIG. 10 is a bottom view of the fire apparatus of FIG. 1, according to an exemplary embodiment.
Figure 11:
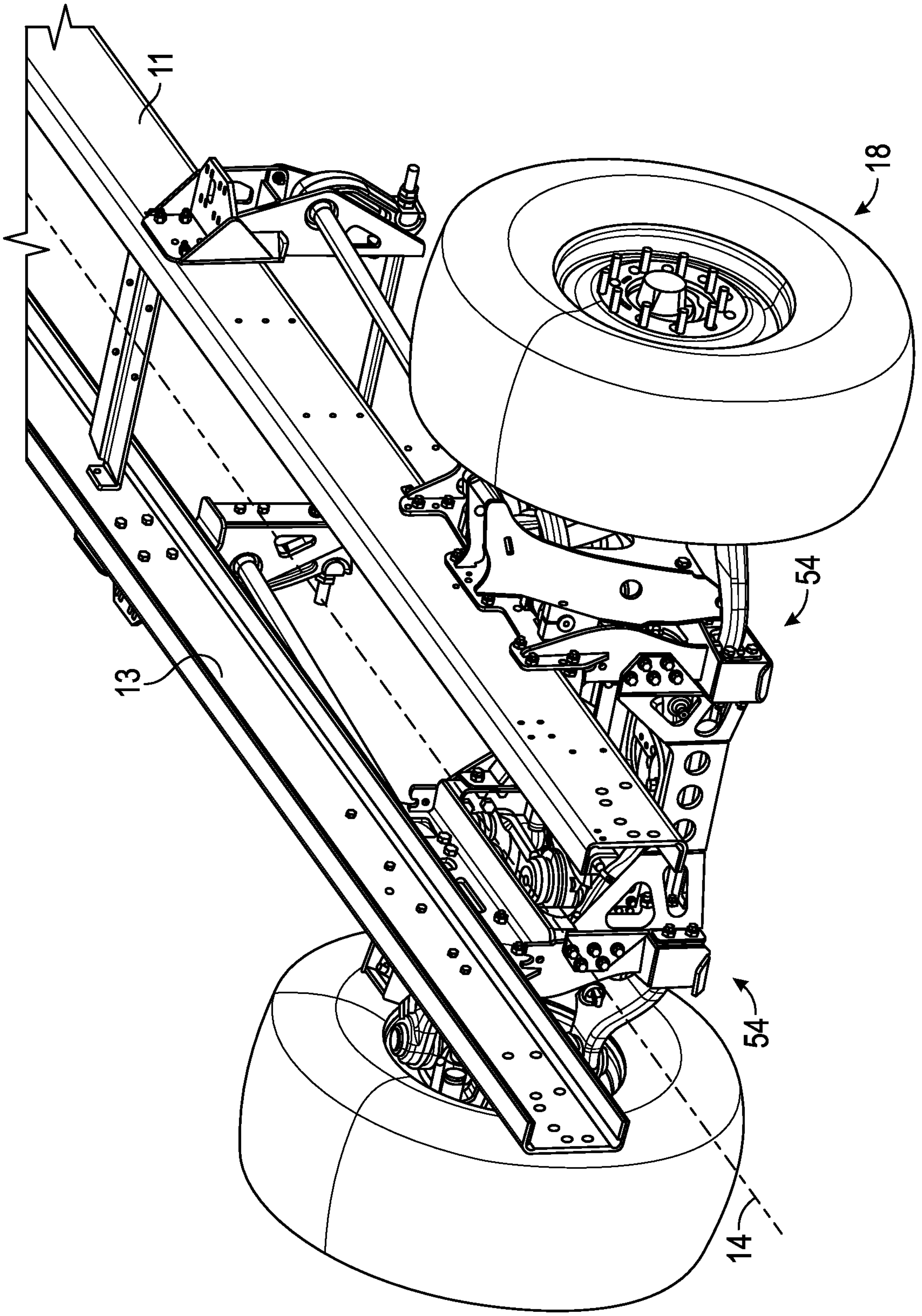
FIG. 11 is a perspective view of a front suspension of the fire apparatus of FIG. 1, according to an exemplary embodiment.
Figure 12:
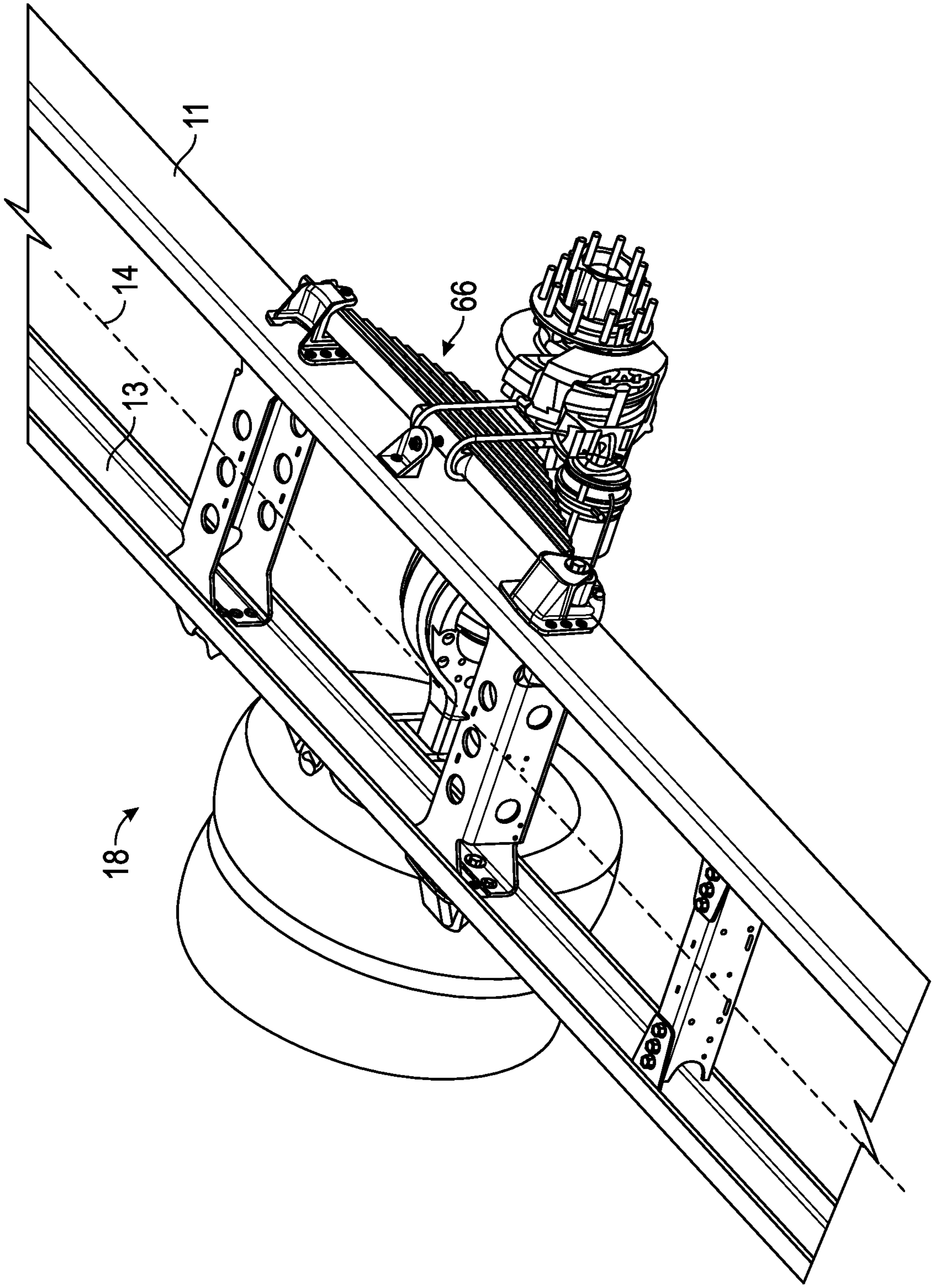
FIG. 12 is a perspective view of a rear suspension of the fire apparatus of FIG. 1, according to an exemplary embodiment.

As shown in FIGS. 10 and 12, the single rear axle 18 includes a differential 62 coupled to a pair of hub assemblies 64 with a pair of axle shaft assemblies 52. As shown in FIGS. 10 and 12, the single rear axle 18 includes a solid axle configuration extending laterally across the frame 12 (e.g., chassis, etc.). A rear suspension, shown as rear suspension 66, includes a pair of leaf spring systems. The rear suspension 66 may couple the single solid axle configuration of the single rear axle 18 to the frame 12. In one embodiment, the single rear axle 18 has a gross axle weight rating of no more than (i.e., less than or equal to, etc.) 33,500 pounds. In other embodiments, a first axle shaft assembly 52 has a first set of constant velocity joints and a second axle shaft assembly 52 has a second set of constant velocity joints. The first axle assembly 52 and the second axle assembly 52 may extend from opposing lateral sides of the differential 62, coupling the differential 62 to the pair of hub assemblies 64. As shown in FIGS. 10-11, a front suspension, shown as front suspension 54, for the front axle 18 includes a pair of independent suspension assemblies. In one embodiment, the front axle 18 has a gross axle weight rating of no more than 33,500 pounds.

According to the exemplary embodiment shown in FIGS. 1-12, the aerial ladder assembly 200 forms a cantilever structure when at least one of raised vertically and extended horizontally. The aerial ladder assembly 200 is supported by the cylinders 56 and by the turntable 300 at the first end 202. The aerial ladder assembly 200 supports static loading from its own weight, the weight of any equipment coupled to the ladder (e.g., the nozzle 38, a water line coupled to the nozzle, a platform, etc.), and the weight of any persons using the ladder. The aerial ladder assembly 200 may also support various dynamic loads (e.g., due to forces imparted by a fire fighter climbing the aerial ladder assembly 200, wind loading, loading due to rotation, elevation, or extension of aerial ladder assembly, etc.). Such static and dynamic loads are carried by the aerial ladder assembly 200. The forces carried by the cylinders 56, the turntable 300, and the frame 12 may be proportional (e.g., directly proportional, etc.) to the length of the aerial ladder assembly 200. At least one of the weight of the aerial ladder assembly 200, the weight of the turntable 300, the weight of the cylinders 56, and the weight of the torque box 400 is traditionally increased to increase at least one of the extension height rating, the horizontal reach rating, the static load rating, and the dynamic load rating. Such vehicles traditionally require the use of a chassis having a tandem rear axle. However, the aerial ladder assembly 200 of the fire apparatus 10 has an increased extension height rating and horizontal reach rating without requiring a chassis having a tandem rear axle (e.g., a tandem axle assembly, etc.). According to the exemplary embodiment shown in FIGS. 1-12, the fire apparatus 10 having a single rear axle 18 is lighter, substantially less difficult to maneuver, and less expensive to manufacture than a fire apparatus having a tandem rear axle.

Pedestal and Torque Box Assembly

Figure 13:
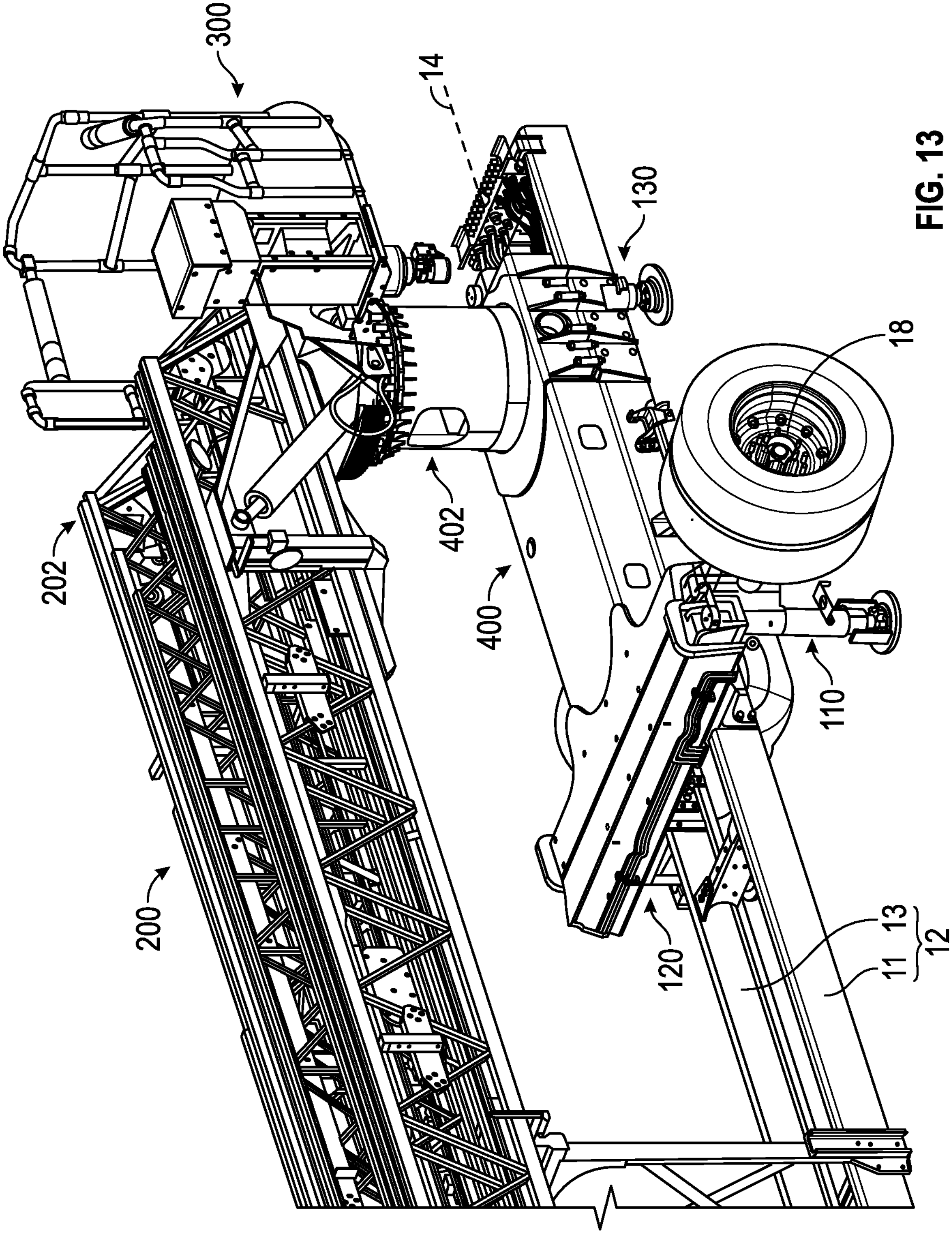
FIG. 13 is a front perspective view of a pedestal, a torque box, a turntable, and an aerial ladder assembly for a fire apparatus, according to an exemplary embodiment.

According to the exemplary embodiment shown in FIG. 13, the torque box 400 and the pedestal 402 include various components that facilitate transferring the loading from the aerial ladder assembly 200 to the frame 12 of the fire apparatus 10. As shown in FIG. 13, a front perspective view of the torque box 400 and the pedestal 402 is shown, according to an exemplary embodiment. According to an exemplary embodiment, the aerial ladder assembly 200 and the turntable 300 are rotatably coupled to the pedestal 402. By way of example, a connection between the turntable 300 and the pedestal 402 may include a slewing bearing (e.g., a rotational rolling-element bearing with an outer gear and an inner bearing element that supports a platform, etc.) to support the turntable 300. A drive member (e.g., a motor, etc.) may drive (e.g., rotate, etc.) the turntable 300. The motor may be mechanically coupled to the outer gear of the slewing bearing via a drive pinion. In other embodiments, the turntable 300 is fixed to the pedestal 402 (i.e., cannot rotate, etc.).

Figure 14:
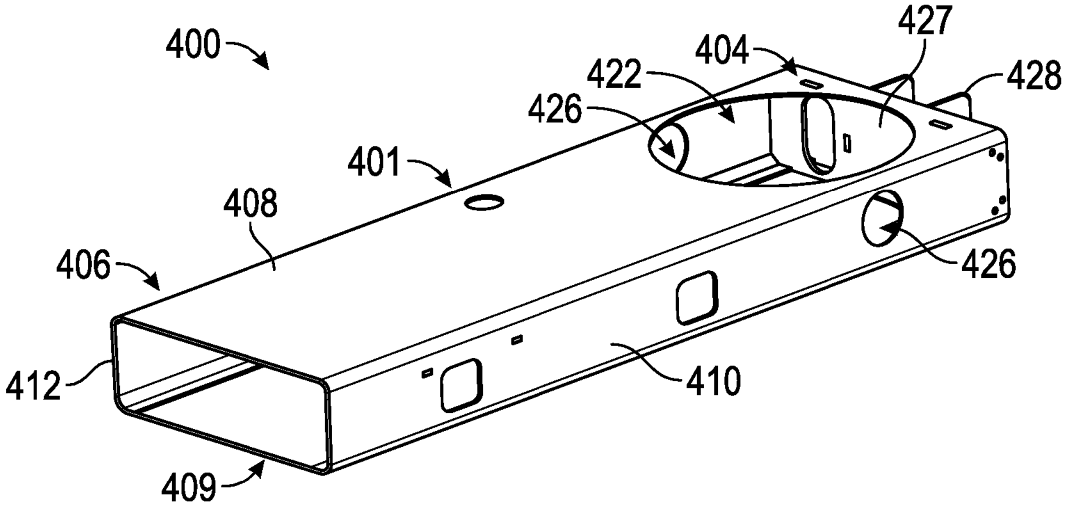
FIG. 14 is a perspective view of the torque box of FIG. 13, according to an exemplary embodiment.
Figure 15:
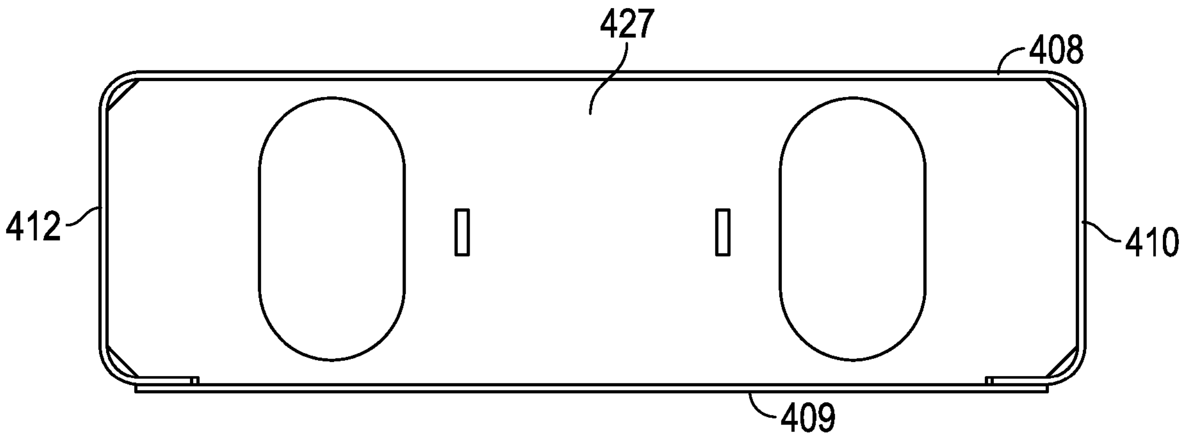
FIG. 15 is a cross-sectional view of the torque box of FIG. 14, according to an exemplary embodiment.
Figure 16:
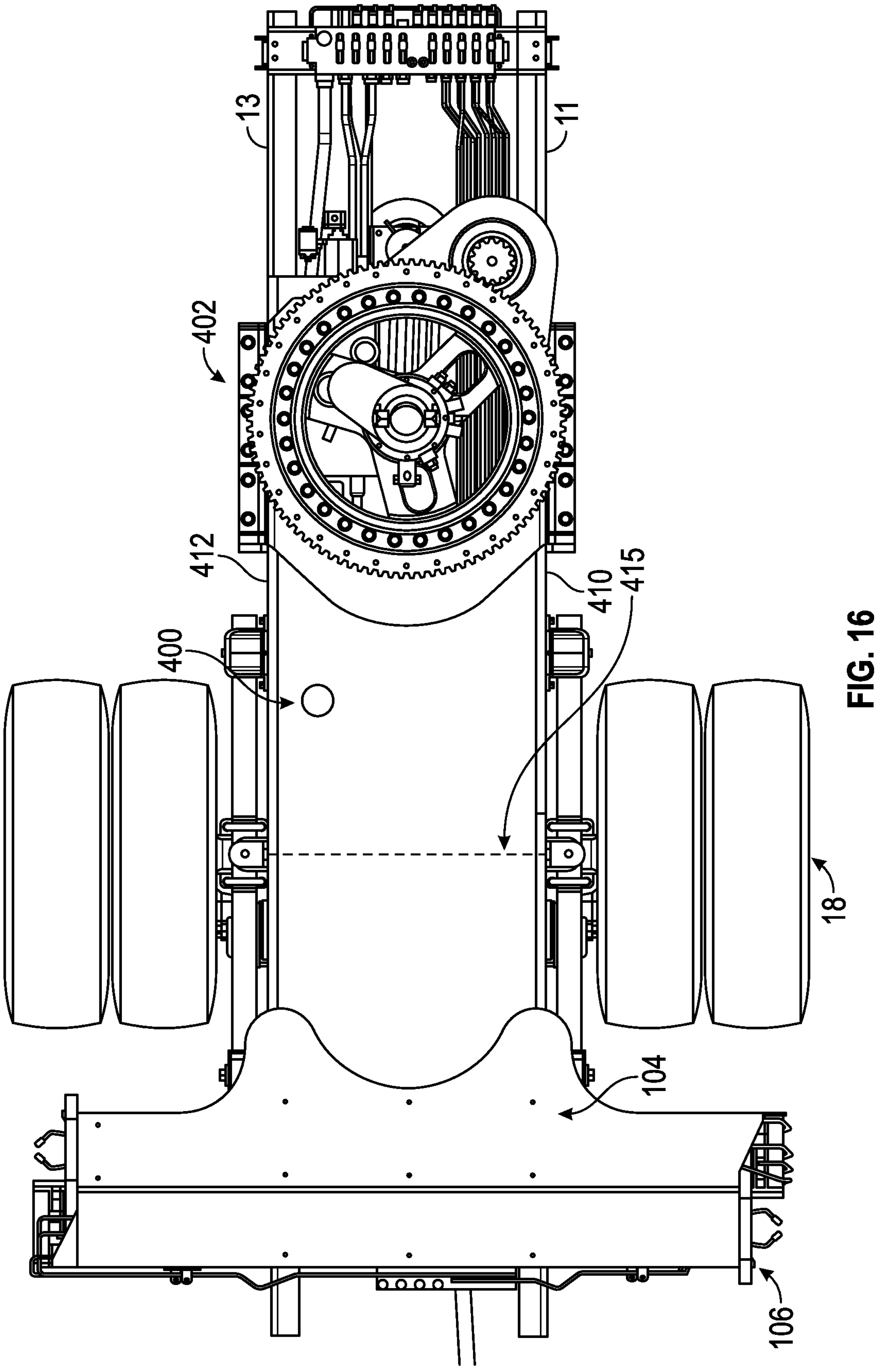
FIG. 16 is a top view of the pedestal and the torque box of FIG. 13, according to an exemplary embodiment.

Referring next to the exemplary embodiment shown in FIGS. 14-22, the torque box 400 is coupled to the pedestal 402. As shown in FIGS. 14-15, the torque box 400 includes a body portion, shown as tubular component 401. In one embodiment, the tubular component 401 has a substantially rectangular cross-sectional shape. The tubular component 401 includes a top surface 408, a bottom surface 409, a first side wall 410, and a second side wall 412. In other embodiments, the tubular component 401 may have a different cross-sectional shape (e.g., square, octagonal, irregular polygon, C-shape, hexagonal, etc.). According to the exemplary embodiment shown in FIG. 16, the torque box 400 has a width 415 (e.g., lateral distance, etc.) that is equal to the spacing between the laterally-outward facing surfaces of the first frame rail 11 and the second frame rail 13 of the frame 12. In one embodiment, the first side wall 410 of the torque box 400 is flush with the laterally-outward facing surface of the first frame rail 11 and the second side wall 412 of the torque box 400 is flush with the laterally-outward facing surface of the second frame rail 13. In other embodiments, the width of the torque box 400 is not the same as the spacing between the laterally-outward facing surfaces of the first frame rail 11 and the second frame rail 13. For example, the width may be equal to the distance from the center of the first frame rail 11 to the center of the second frame rail 13 or greater than the spacing between the first frame rail 11 and the second frame rail 13 of the frame 12. Referring again to FIGS. 14-15, the tubular component 401 includes the first end 404 and the second end 406. The torque box 400 defines an aperture 422 in the top surface 408 that is positioned at the first end 404. As shown in FIG. 14, the torque box 400 defines an aperture 426 through both the first side wall 410 and the second side wall 412. The second end 406 of the torque box 400 is open, while the first end 404 includes a cap, shown as plate 427, to which a bracket, shown as bracket 428, is attached.

Figure 17:
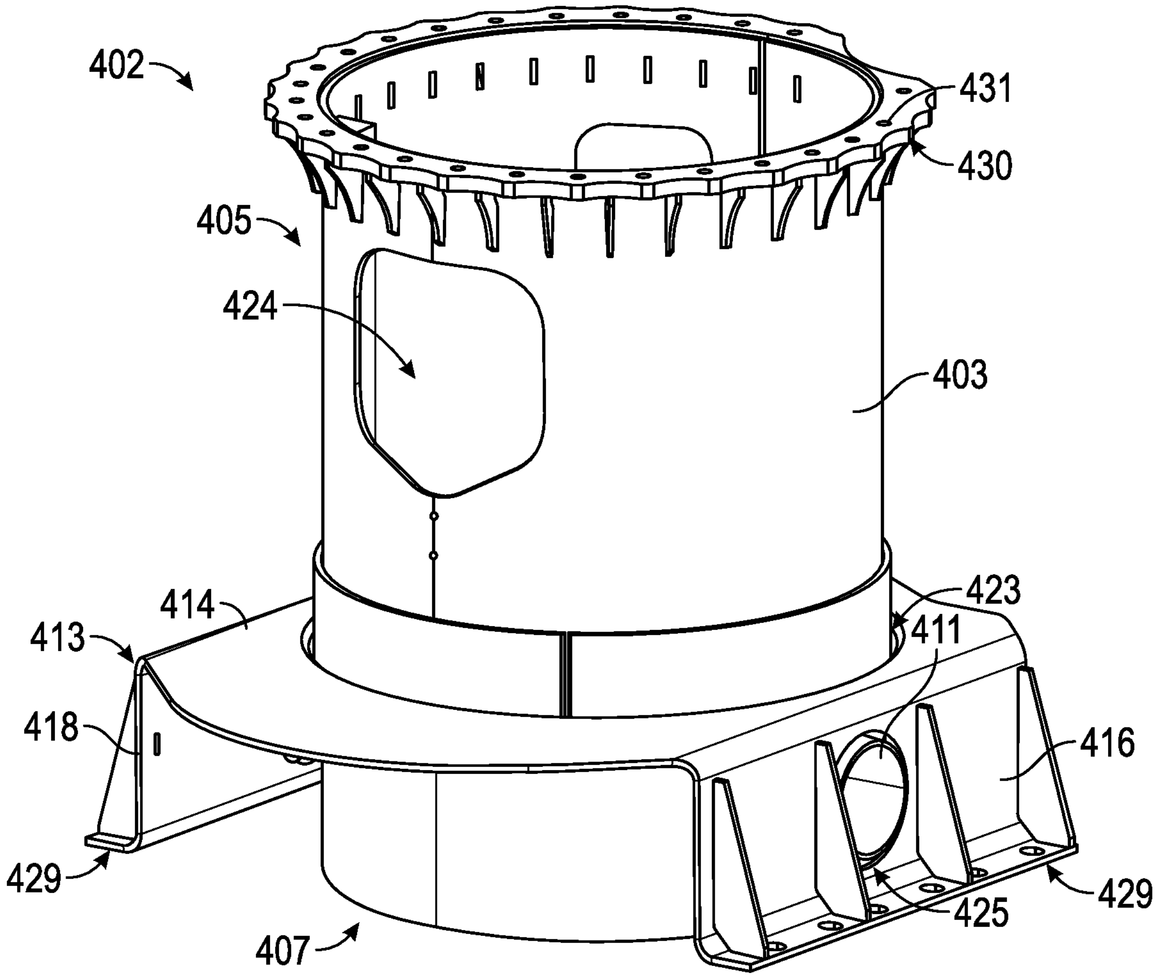
FIG. 17 is a perspective view of the pedestal of FIG. 13, according to an exemplary embodiment.
Figure 18:
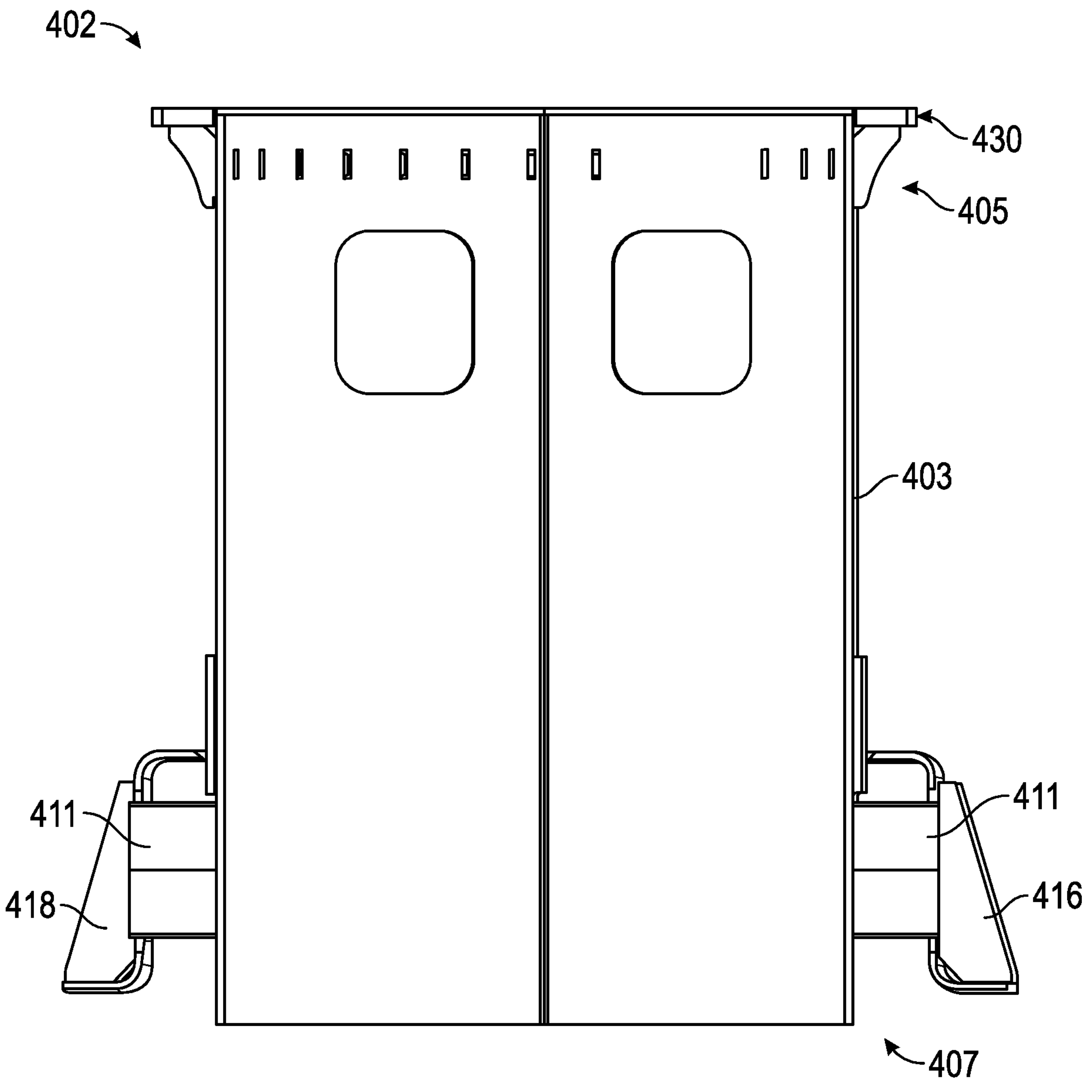
FIG. 18 is a cross-sectional view of the pedestal of FIG. 17, according to an exemplary embodiment.

Referring now to FIG. 17-18, the pedestal 402 includes a body portion, shown as body 403. The body 403 has a substantially cylindrical shape and includes a top end 405 and a bottom end 407. In other embodiments, the body 403 may have another shape (e.g., rectangular, square, hexagonal, etc.). A flange, shown as flange 430, is disposed at the top end 405 of the pedestal 402. As shown in FIG. 17, the flange 430 defines a plurality of holes 431 positioned around the perimeter of pedestal 402. The flange 430 may provide a mounting surface that abuts the connection mechanism (e.g., slewing bearing, etc.) of the pedestal 402 and the turntable 300. The connection mechanism may be fixed to the pedestal 402 with bolts extending through the plurality of holes 431. As shown in FIG. 17, a tube, shown as tube 411, is positioned at the bottom end 407 of the pedestal 402. The pedestal 402 also defines an aperture 424 that faces in a forward direction (e.g., towards the front cabin 20 of the fire apparatus 10, etc.).

Still referring to the exemplary embodiment shown in FIG. 17-18, the pedestal 402 includes a support, shown as plate 413. The plate 413 includes a first wall 414, a first leg 416, and a second leg 418. The first wall 414 defines an aperture 423 that corresponds with the aperture 422 of the torque box 400. As shown in FIG. 17, the aperture 423 receives the bottom end 407 of the pedestal 402. The first leg 416 and the second leg 418 define an aperture 425 that corresponds with the aperture 426 of the torque box 400. A plurality of interfaces 429 are positioned at the end of both the first leg 416 and the second leg 418.

Figure 19:
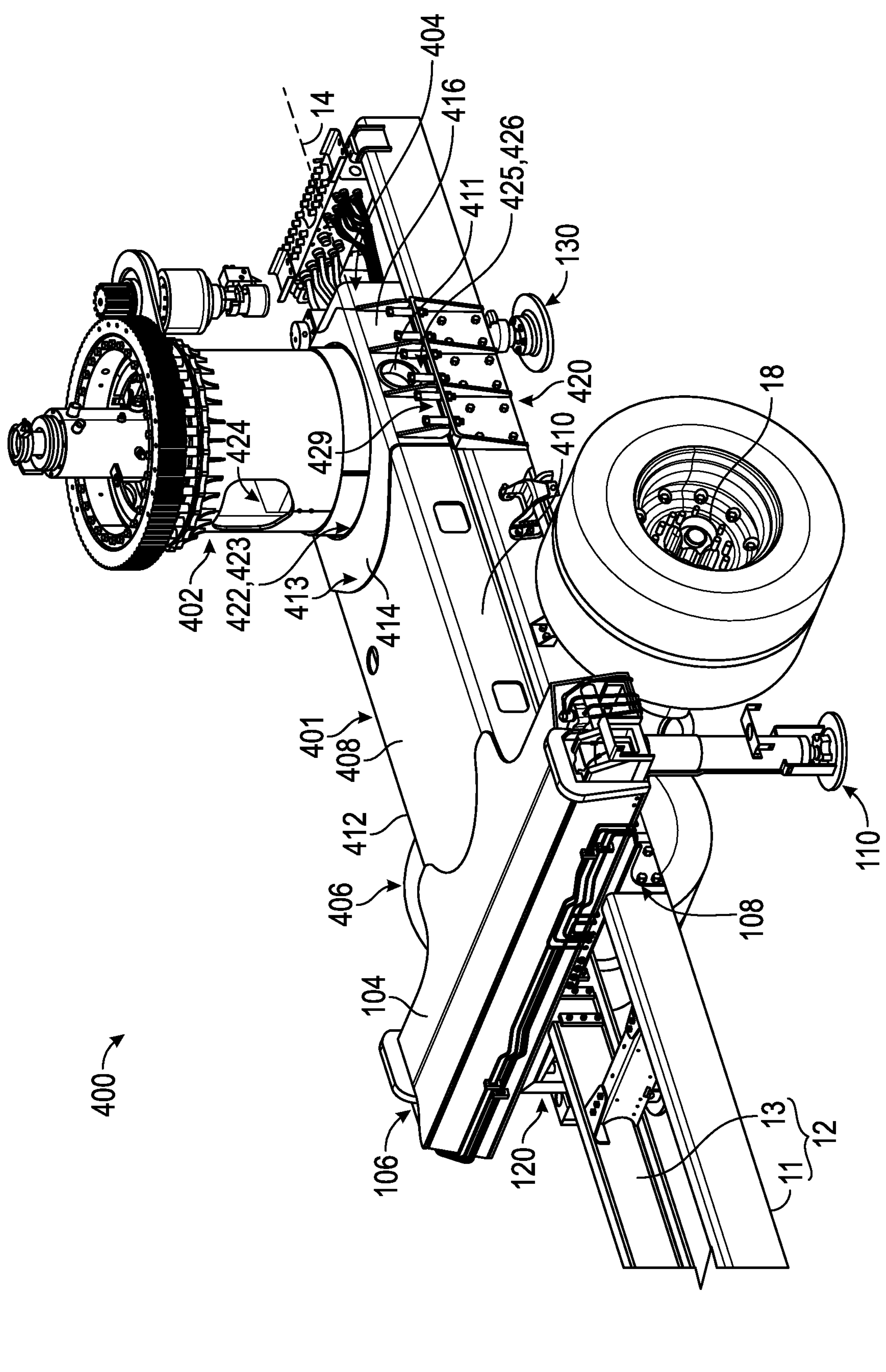
FIG. 19 is a front perspective view of the pedestal and the torque box of FIG. 13, according to an exemplary embodiment.
Figure 20:
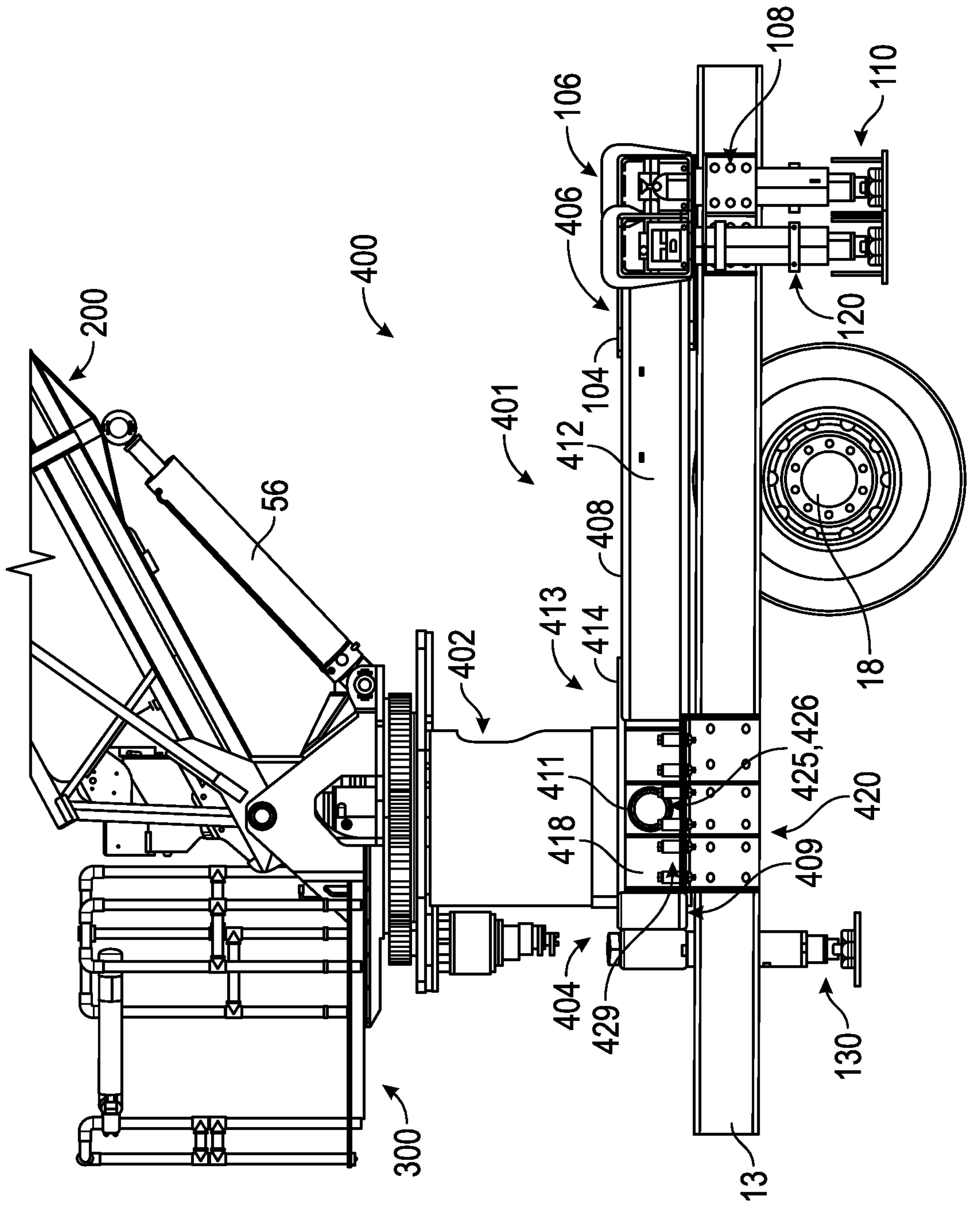
FIG. 20 is a right side view of the pedestal and the torque box of FIG. 13, according to an exemplary embodiment.

As shown in FIGS. 19-20, the first wall 414 of the plate 413 is disposed across the top surface 408 of the tubular component 401. The first leg 416 of the plate 413 is disposed along the first sidewall 410 of the tubular component 401. The second leg 418 of plate 413 is disposed along the second sidewall 412 of the tubular component 401. According to the exemplary embodiment shown in FIGS. 19-21, the plurality of interfaces 429 of the plate 413 are positioned to engage a plurality of brackets 420 that are attached to the frame 12. The plate 413 is configured to secure the first end 404 of the torque box 400 to the frame 12 of the fire apparatus 10. As shown in FIG. 19, the aperture 422 of the tubular component 401 and the aperture 423 of the plate 413 align and receive the pedestal 402. The plate 413 may both secure the torque box 400 to the frame 12 and reinforce the connection area between the torque box 400 and the pedestal 402 (e.g., aperture 422, aperture 423, etc.) while reducing stress concentrations in the tubular component 401.

Still referring to the exemplary embodiment shown in FIGS. 19-20, both the aperture 425 of the plate 413 and the aperture 426 of the torque box 400 align when assembled. The aperture 425 and the aperture 426 are positioned to accept the tube 411 of the pedestal 402. The tube 411 may provide a passageway into the center of the pedestal 402 for hydraulic lines, electrical lines, and other components (e.g., components associated with the aerial ladder assembly 200, etc.). As shown in FIG. 19, the aperture 424 of the pedestal 402 provides an entrance for additional hydraulic lines, electrical lines, water lines, and other components in order to access and operate the various mechanisms of the aerial ladder assembly 200 and the turntable 300.

According to the exemplary embodiment shown in FIGS. 19-20, the bottom surface 409 of the torque box 400 is stacked atop the frame 12. According to an alternative embodiment, torque box 400 forms a portion of the chassis (e.g., suspension or other components may be directly mounted to torque box 400, which forms an integral member of the chassis rather than being stacked atop frame 12, etc.). The tubular component 401 of the torque box 400 extends along the longitudinal axis 14 and spans the single rear axle 18 to transfer loading along the frame 12. Such loading transfer may convey the loading into stability devices (e.g., outrigger, stability feet, etc.) that are positioned to provide a target stability line. As shown in FIGS. 19-20, the first end 404 of the torque box 400 is disposed rearward of the single rear axle 18, while the second end 406 of the torque box 400 is disposed forward of the single rear axle 18. As shown in FIG. 20, the height of the torque box 400 is substantially less than the distance between the frame 12 and the turntable 300. The length (e.g., longitudinal length, etc.) and height (e.g., vertical height, etc.) of the torque box 400 are independent of the size (e.g., length, width, height, etc.) of the ground ladders 46. The length and height of the torque box 400 are reduced such that the torque box 400 has a reduced overall weight. The reduced height of the torque box 400 may facilitate storage aboard the fire apparatus 10 (e.g., for ground ladders, for a reservoir, etc.). The length (e.g., longitudinal distance, etc.) of the torque box 400 may be shorter that those of other vehicles. The pedestal 402 is coupled to the torque box 400 rearward of the single rear axle 18 near the first end 404 of the torque box 400 and spans the gap between the top surface 408 of the torque box 400 and the turntable 300. The pedestal 402 may serve as an intermediate superstructure between the turntable 300 and the torque box 400. In other embodiments, the height of the torque box 400 is equal to the combined height of the torque box 400 and the pedestal 402 shown in the exemplary embodiment of FIG. 20. The pedestal 402 may be omitted, and the turntable 300 may be rotatably coupled directly to the torque box 400.

Referring still to the exemplary embodiment shown in FIGS. 19-20, a housing, shown as outrigger housing 106, abuts the second end 406 of the torque box 400. The outrigger housing 106 is configured to store the set of outriggers 100, which includes the first outrigger 110 and the second outrigger 120. As shown in FIGS. 19-20, the outrigger housing 106 is coupled to both the first frame rail 11 and the second frame rail 13 of the frame 12 with brackets, shown as housing brackets 108. The set of outriggers 100 are moveable between a fully extended position and a retracted position (e.g., via linear actuators, rotary actuators, etc.). During extension, the outriggers 100 protrude from opposing lateral sides of the frame 12. The outrigger housing 106 includes a support, shown as plate 104, which is disposed across the top surface 408 of the tubular component 401. The plate 104 is configured to secure the second end 406 of the torque box 400 to the frame 12. According to an exemplary embodiment, the plate 104 is welded to the tubular component 401. In other embodiments, the connection between the two components may be made using fasteners (e.g., bolts, etc.). The plate 104 is shaped to distribute the stresses due to the loading from the aerial ladder assembly 200.

By way of example, a first load path is defined when the outriggers 100 are in an extended position and engaged with a ground surface (e.g., street, sidewalk, etc.). For example, when a fire fighter is climbing the extended aerial ladder assembly 200, his/her weight creates a force towards the ground which causes a moment (e.g., torque, etc.) about the connection between the aerial ladder assembly 200 and the turntable 300. This loading is then transferred from the turntable 300, down through the pedestal 402, and into the torque box 400. The load travels through the tubular component 401 of the torque box 400, along the longitudinal axis 14, and into the ground through the outrigger housing 106 and the set of outriggers 100.

Figure 21:
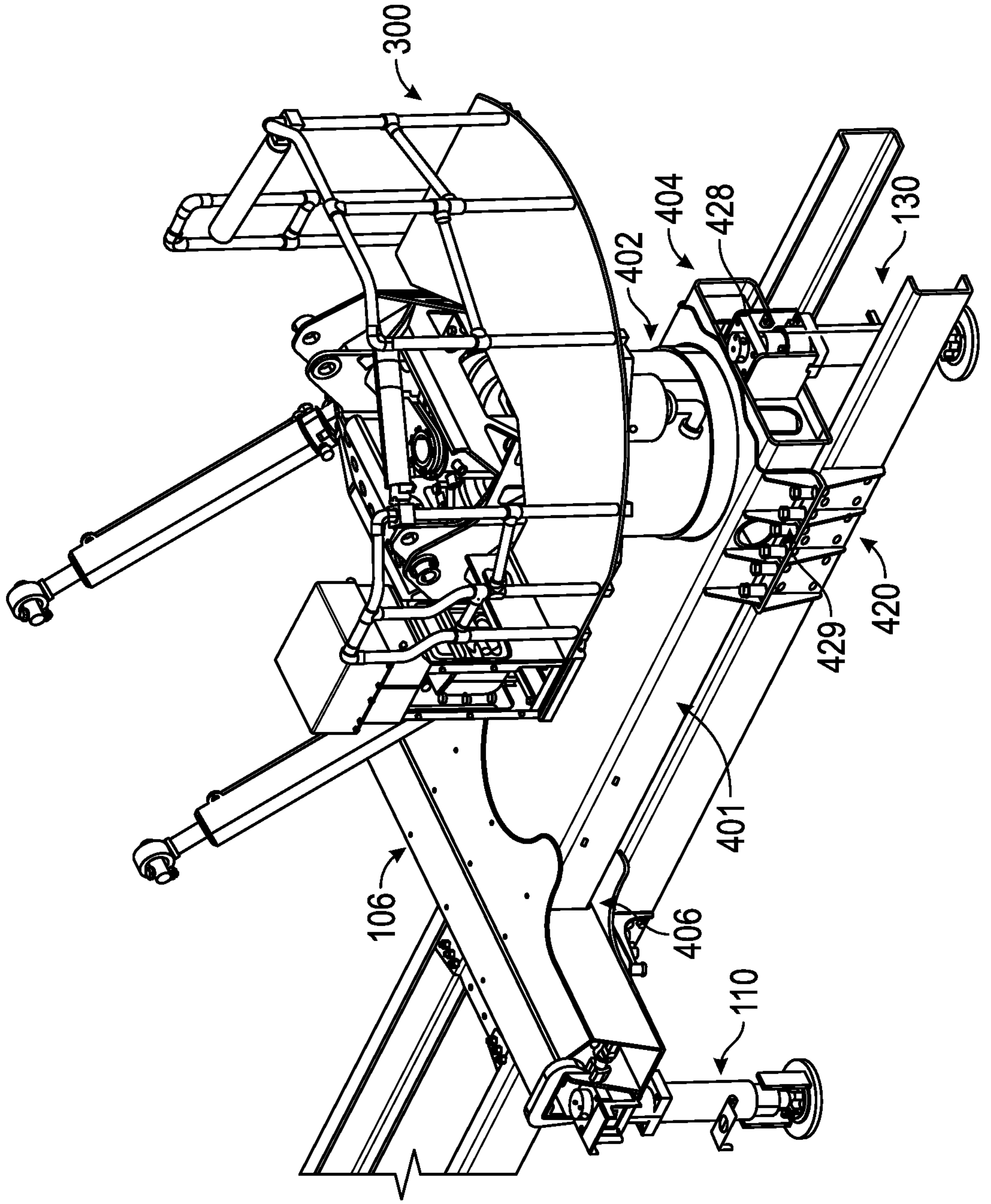
FIG. 21 is a rear perspective view of the pedestal, the torque box, and the turntable of the fire apparatus of FIG. 13, according to an exemplary embodiment.
Figure 22:
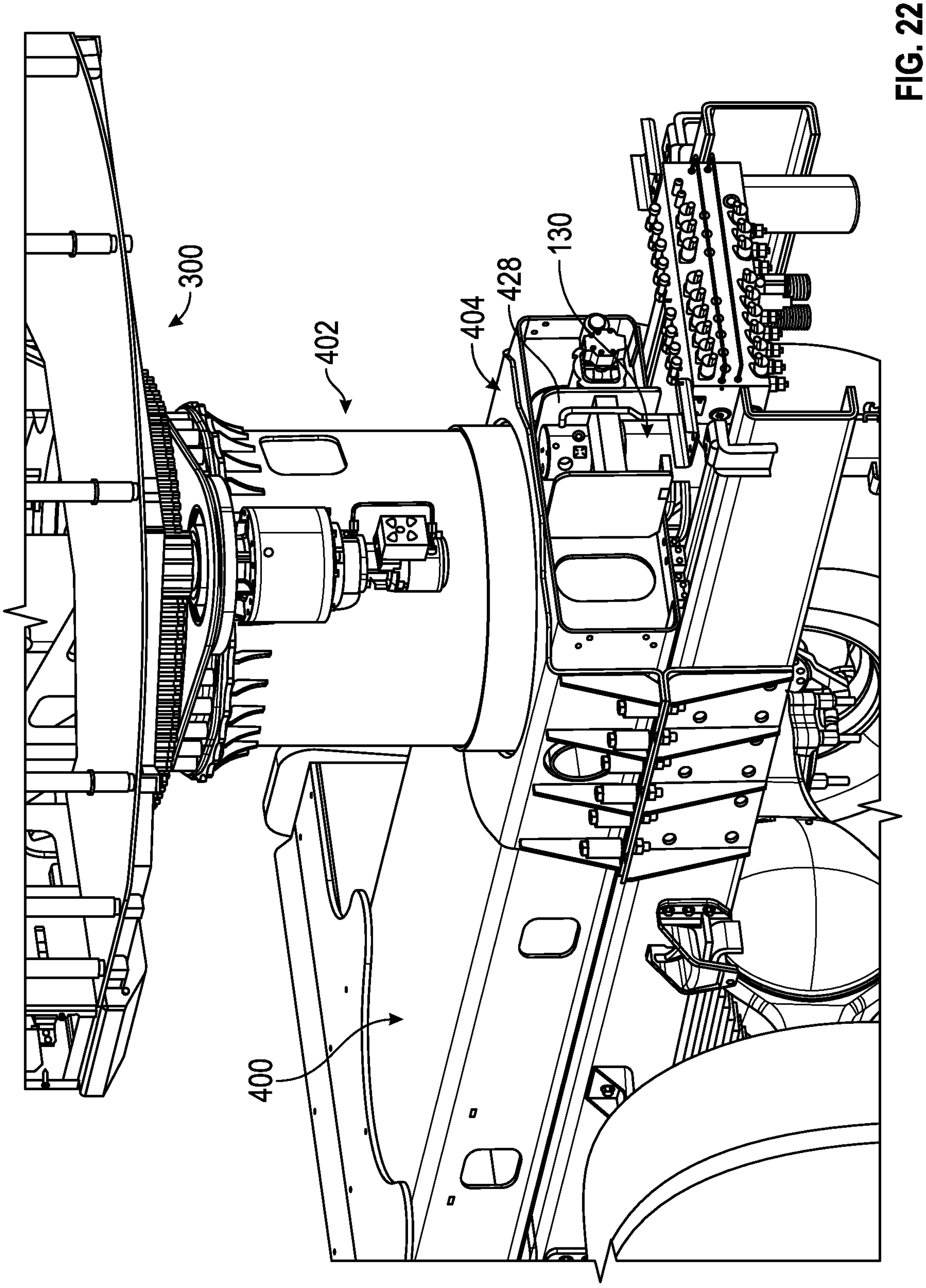
FIG. 22 is a rear perspective view of the pedestal, the torque box, and the turntable of the fire apparatus of FIG. 13, according to an exemplary embodiment.

As shown in the exemplary embodiment of FIGS. 21-22, the single stability foot 130 is coupled to the tubular component 401 via the bracket 428. An actuator (e.g., a linear actuator, rotary actuator, etc.) may extend the stability foot 130 to make contact with the ground and further stabilize the fire apparatus 10. By way of example, a second load path is defined when the stability foot 130 is in an extended position and engaged with a ground surface (e.g., street, sidewalk, etc.). For example, when a fire fighter is climbing the extended aerial ladder assembly 200, his/her weight creates a force towards the ground which causes a moment about the connection between the aerial ladder assembly 200 and the turntable 300. This loading is then transferred from the turntable 300 through the pedestal 402 and into the torque box 400. The load may then travel through the tubular component 401 of the torque box 400, along the longitudinal axis 14, and into the ground through the stability foot 130.

Turntable Assembly

Figure 23:
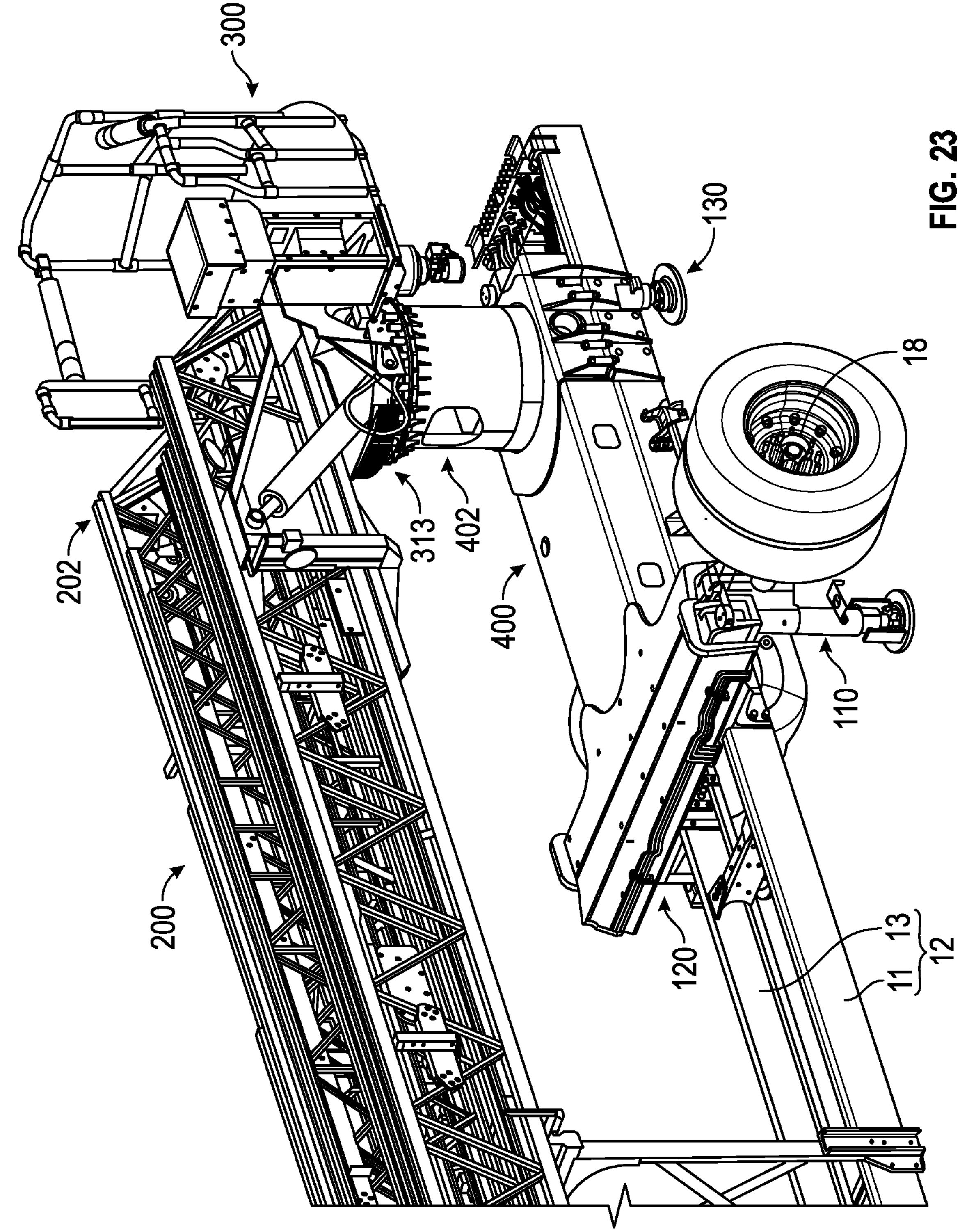
FIG. 23 is a front perspective view of a pedestal, a torque box, a turntable, and an aerial ladder assembly of a fire apparatus, according to an exemplary embodiment.

According to the exemplary embodiment shown in FIGS. 23-32, the turntable 300 includes various components to both operate the aerial ladder assembly 200 and transfer the loading from the aerial ladder assembly 200 to the frame 12 of the fire apparatus 10. As shown in FIG. 23, the first end 202 of aerial ladder assembly 200 is coupled to the turntable 300. The turntable 300 is coupled to the frame 12 with the pedestal 402.

Figure 24:
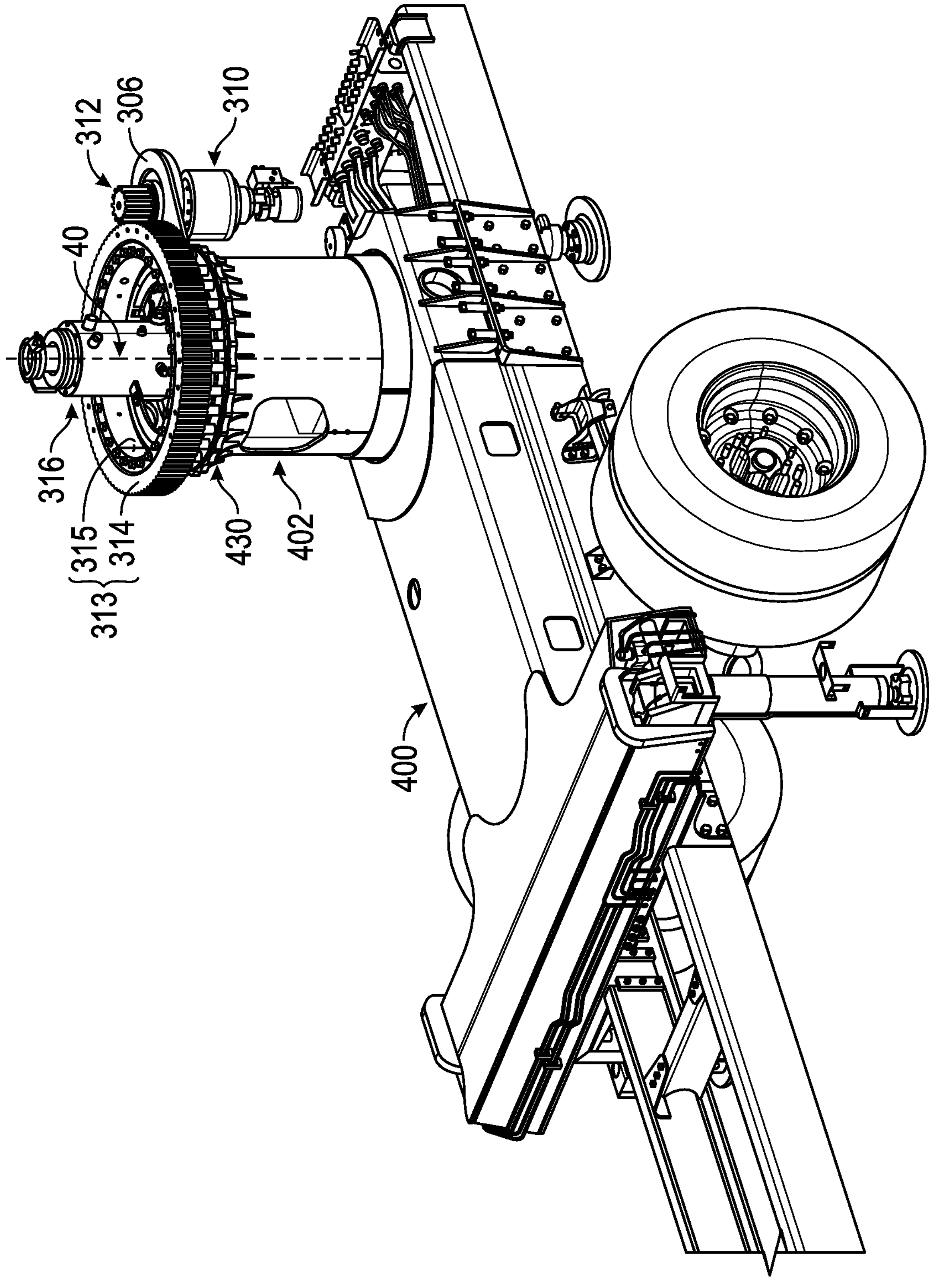
FIG. 24 is a front perspective view of a connector associated with the turntable of FIG. 23, according to an exemplary embodiment.
Figure 25:
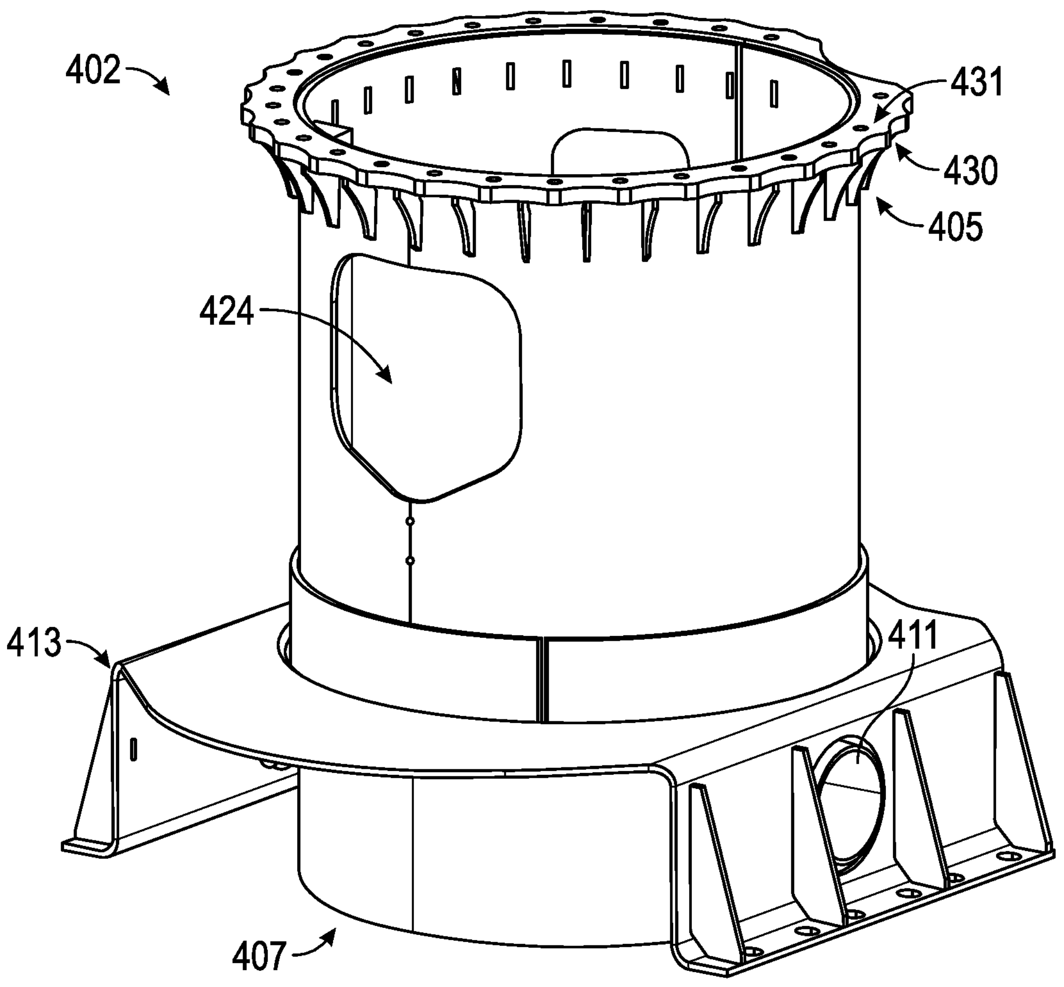
FIG. 25 is a perspective view of the pedestal of FIG. 23, according to an exemplary embodiment.
Figure 26:
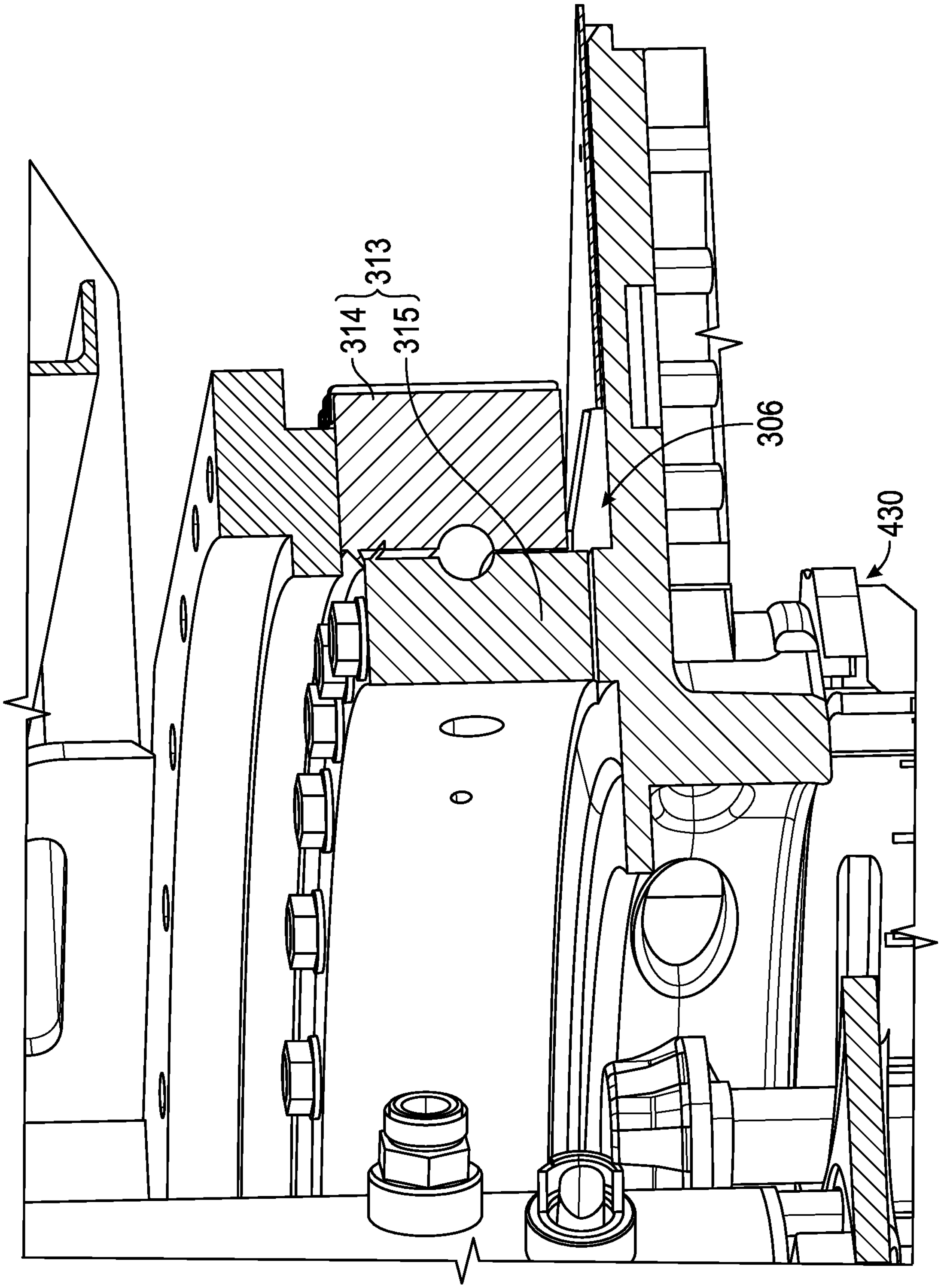
FIG. 26 is a cross-sectional view of the connector of FIG. 24, according to an exemplary embodiment.
Figure 30:
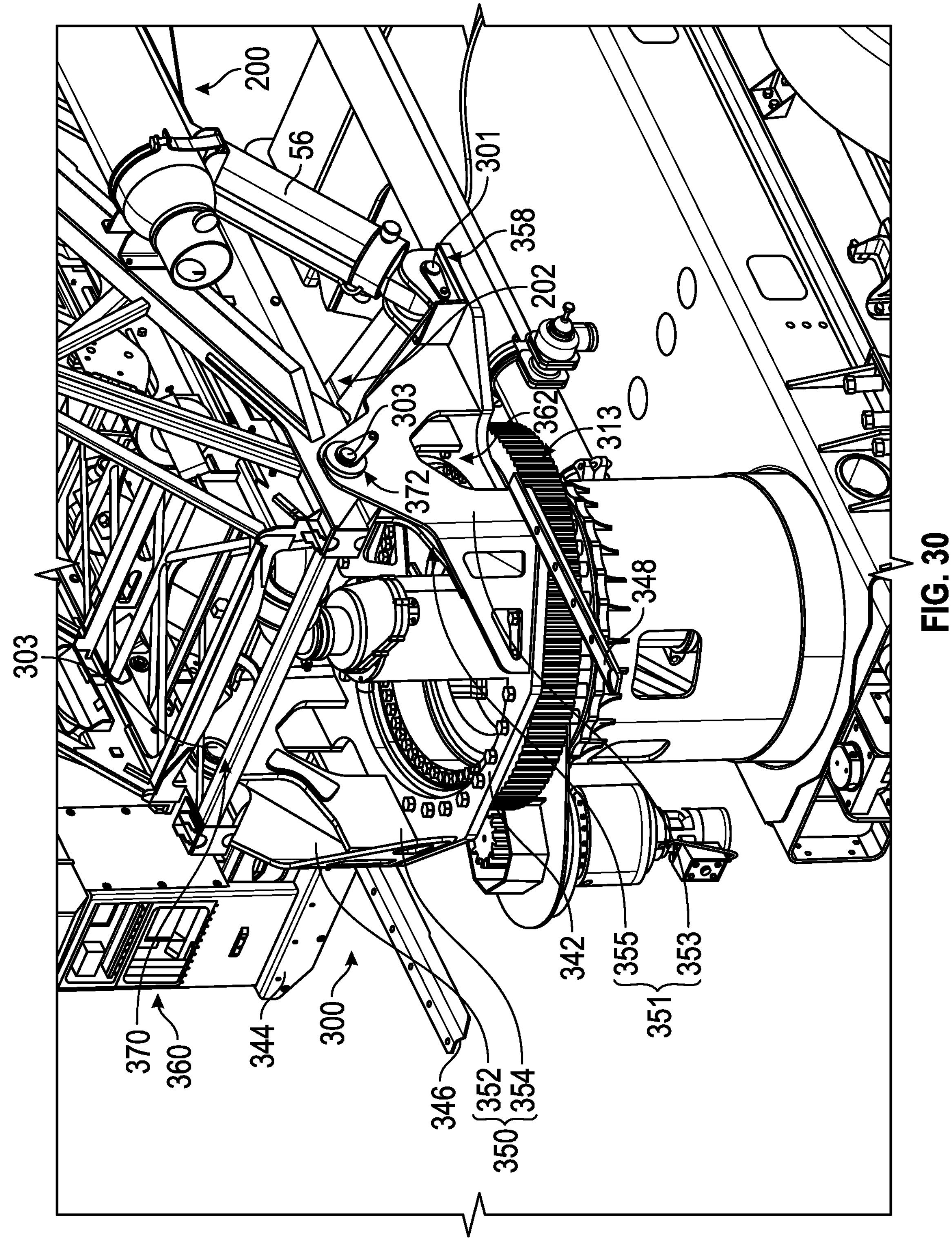
FIG. 30 is a rear perspective view of the connection between the pedestal, the aerial ladder assembly, and the turntable of FIG. 23, according to an exemplary embodiment.

Referring to the exemplary embodiment shown in FIGS. 23-26 and 30, the turntable 300 is rotatably coupled to the pedestal 402. As shown in FIG. 23, a connector, shown as slewing bearing 313, is disposed between the turntable 300 and the pedestal 402. As shown in FIGS. 24 and 26, the slewing bearing 313 is a rotational rolling-element bearing with an outer element, shown as driven gear 314, and an inner element, shown as bearing element 315. The bearing element 315 is coupled to a plate, shown as plate 306, via a plurality of fasteners (e.g., bolts, etc.). As shown in FIGS. 24-26, the flange 430 provides a surface that abuts the plate 306. The plurality of fasteners coupling the plate 306 to the bearing element 315 may engage with the plurality of holes 431 thereby securing the bearing element 315 and the plate 306 to the pedestal 402. As shown in FIG. 24, the driven gear 314 includes a plurality of apertures. As shown in FIG. 30, turntable 300 includes a base plate, shown as base plate 342. The base plate 342 is a superstructure that defines a plurality of apertures that correspond with those defined by the driven gear 314, fasteners associated therewith coupling the turntable 300 and the driven gear 314. In other embodiments, the connector associated with the turntable 300 and the pedestal 402 includes another rotational element which allows rotation of one element (e.g., the turntable 300, etc.) relative to another element (e.g., the pedestal 402, frame 12, etc.).

As shown in FIG. 24, a drive member, shown as motor 310, is coupled to the plate 306. The motor 310 may actuate (e.g., rotate, turn, etc.) the turntable 300. In one embodiment, the motor 310 is an electric motor (e.g., an alternating current (AC) motor, a direct current motor (DC), etc.) configured to convert electrical energy into mechanical energy. In other embodiments, the motor 310 is powered by air (e.g., pneumatic, etc.), a fluid (e.g., a hydraulic cylinder, etc.), mechanically (e.g., a flywheel, etc.), or another source.

As shown in FIG. 24, the motor 310 includes a driving element, shown as drive pinion 312. The drive pinion 312 is mechanically coupled with the driven gear 314 of the slewing bearing 313. In one embodiment, a plurality of teeth on the drive pinion 312 engage a plurality of teeth on the driven gear 314. By way of example, when the motor 310 is actuated (e.g., powered, turned on, etc.), the motor 310 may provide rotational energy (i.e., mechanical energy, etc.) to a motor output shaft. The drive pinion 312 may be coupled to the motor output shaft such that the rotational energy of the motor output shaft drives (e.g., rotates, etc.) the drive pinion 312. The rotational energy of the drive pinion 312 may be transferred to the driven gear 314 via the engaging teeth of both the drive pinion 312 and the driven gear 314. The driven gear 314 rotates about the vertical axis 40, while the bearing element 315 remains in a fixed position relative to the driven gear 314. In embodiments where the base plate 342 of the turntable 300 is coupled to the driven gear 314, the turntable 300 and the aerial ladder assembly 200 rotate with the driven gear 314. In one embodiment, the slewing bearing 313 allows the turntable 300 and aerial ladder assembly 200 to rotate a full 360 degrees. In other embodiments, the turntable 300 is fixed to the pedestal 402 (i.e., cannot rotate, etc.).

Figure 27:
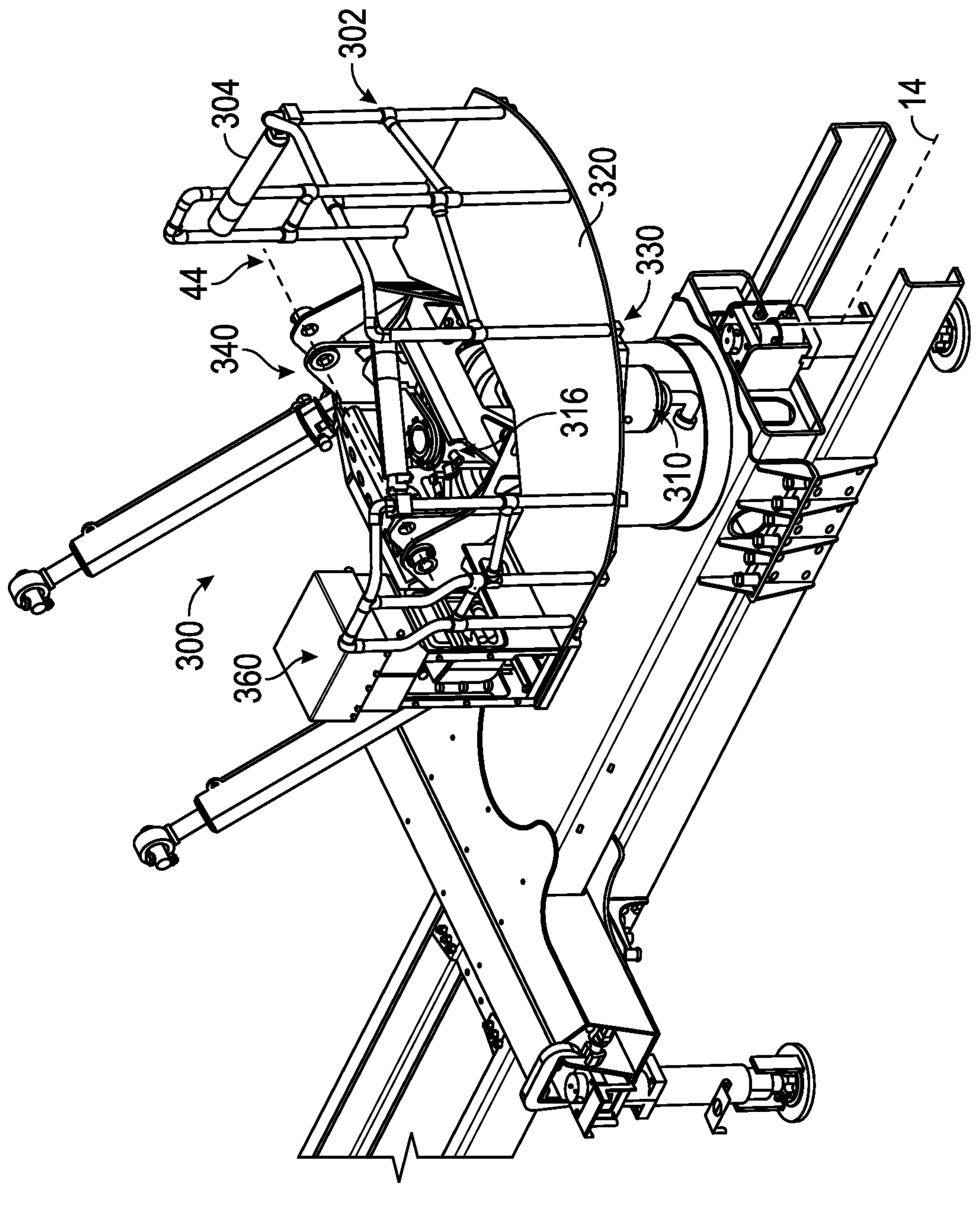
FIG. 27 is a rear perspective view of the turntable of FIG. 23, according to an exemplary embodiment.
Figure 28:
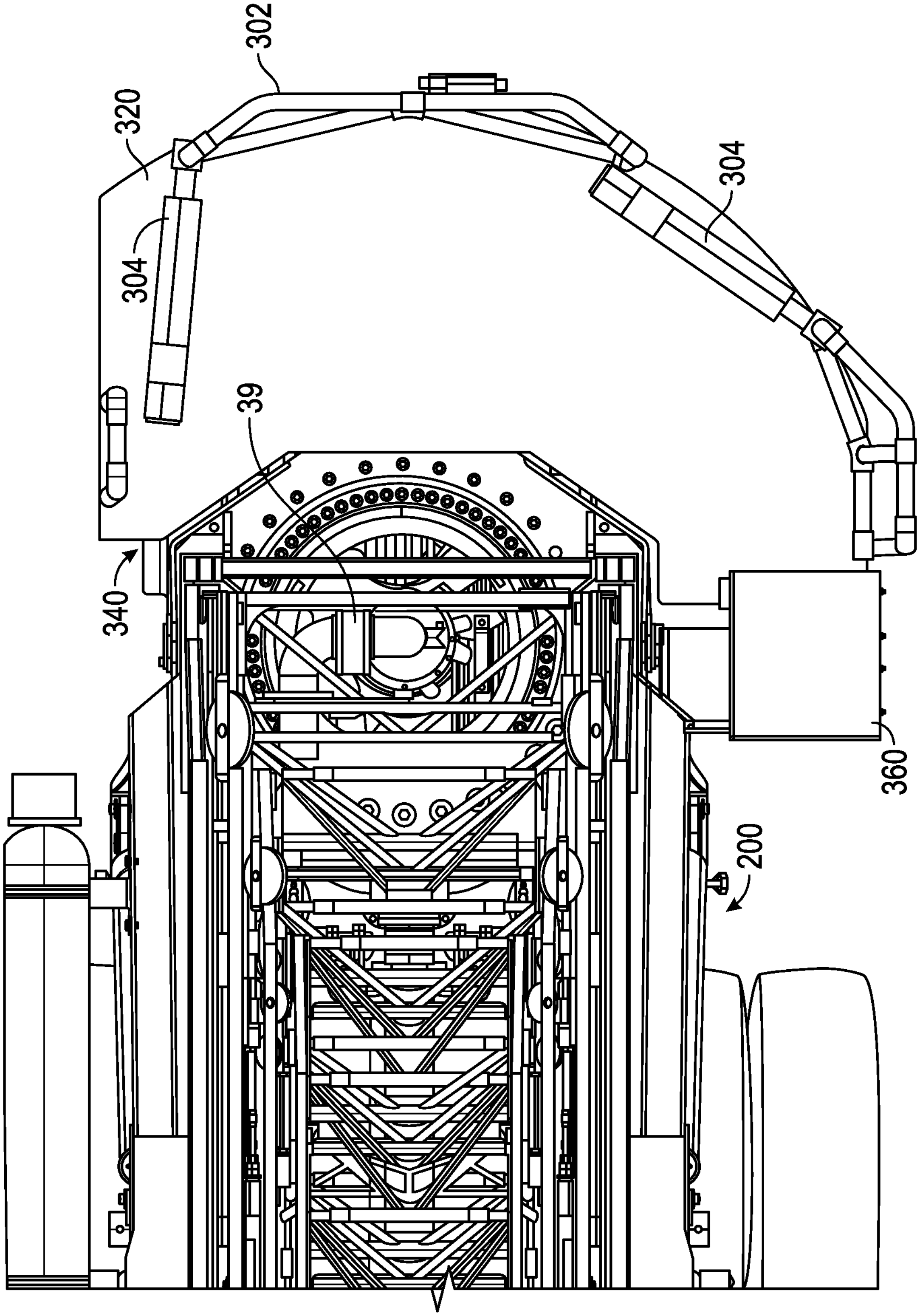
FIG. 28 is a top view of the turntable of FIG. 23, according to an exemplary embodiment.

As shown in FIGS. 24 and 27, a rotation swivel, shown as rotation swivel 316, includes a hollow tube that extends upward from the pedestal 402 and into the turntable 300. The rotation swivel 316 couples (e.g., electrically, hydraulically, etc.) the aerial ladder assembly 200 with other components of fire apparatus 10. By way of example, the hollow tube may define a passageway for water to flow into the aerial ladder assembly 200. Various lines may provide electricity, hydraulic fluid, and water to the aerial ladder assembly 200, the cylinders 56, and the turntable 300. As shown in FIGS. 1 and 28, the nozzle 38 is connected to a water source (e.g., the water tank 58, an external source, etc.) via an intermediate conduit, shown as conduit 39. Conduit 39 extends along the aerial ladder assembly 200 to the rotation swivel 316, according to the exemplary embodiment shown in FIG. 28. The conduit 39 receives water from at least one of the water tank 58 and an external source (e.g., a fire hydrant, etc.) providing water to the nozzle 38.

As shown in FIGS. 27-30, the turntable 300 includes a work platform, shown as work platform 320. Work platform 320 may provide a surface upon which operators (e.g., fire fighters, rescue workers, etc.) may stand while operating the aerial ladder assembly 200 via an input/output (I/O) device, shown as a control console 360. The control console 360 is communicably coupled to various components of the fire apparatus 10 (e.g., the aerial ladder assembly 200, the turntable 300, hydraulic lines, hydraulic pumps, etc.), such that information or signals (e.g., command signals, fluid control, etc.) may be exchanged from the control console 360. The information or signals may relate to one or more components of the fire apparatus 10. According to an exemplary embodiment, the control console 360 enables an operator (e.g., fire fighter, etc.) of the fire apparatus 10 to communicate with one or more components of the fire apparatus 10. By way of example, the control console 360 may include at least one of an interactive display, a touchscreen device, one or more buttons (e.g., a stop button configured to cease water flow through nozzle 38, etc.), joysticks, switches, and voice command receivers. An operator may use a joystick associated with the control console 360 to trigger the actuation of the motor 310 thereby rotating the turntable 300 and aerial ladder assembly 200 to a desired angular position (e.g., to the front, back, or side of fire apparatus 10, etc.). By way of another example, an operator may engage a lever associated with the control console 360 to trigger the extension or retraction of the plurality of sections of the aerial ladder assembly 200.

Figure 29:
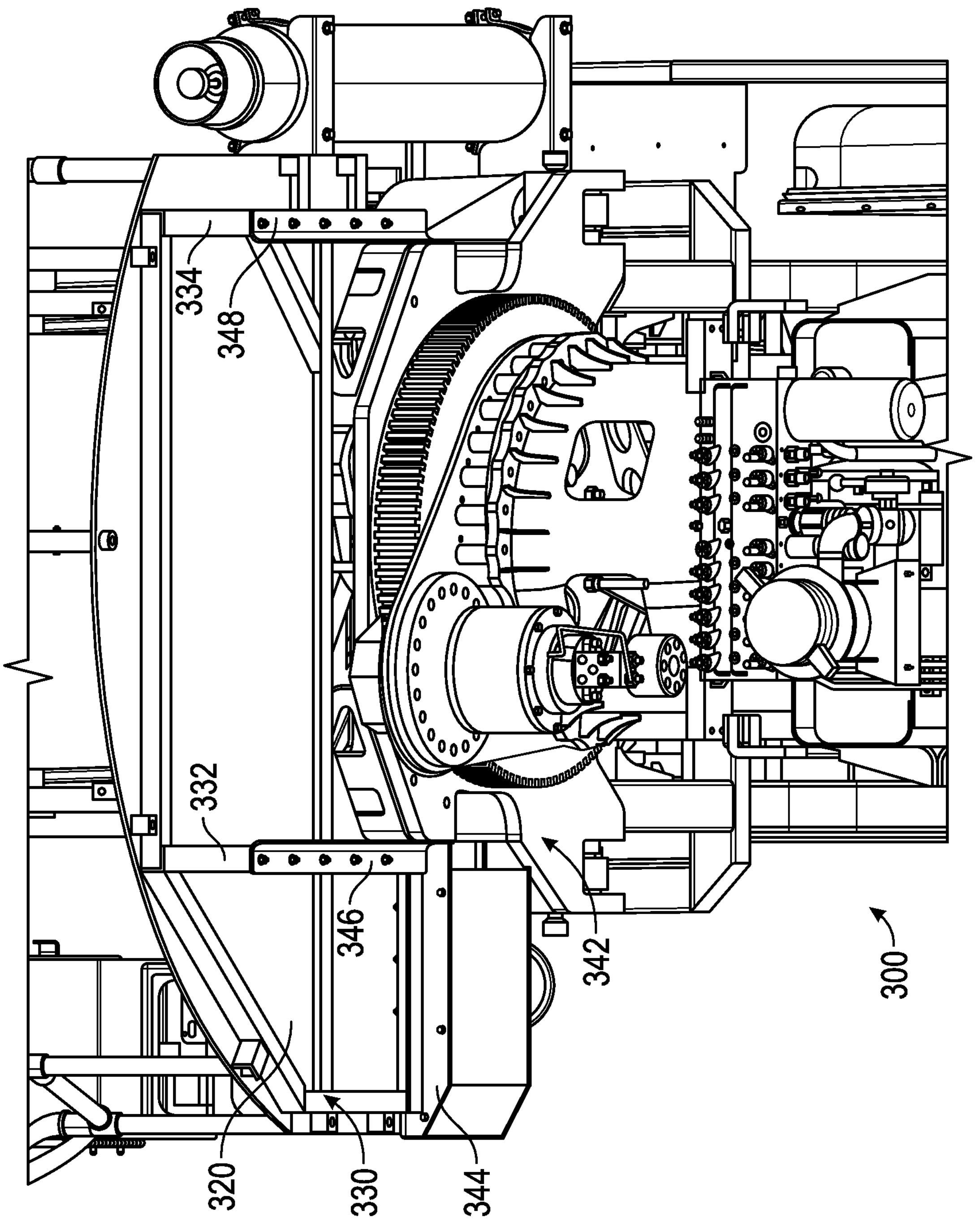
FIG. 29 is a bottom perspective view of the turntable of FIG. 23, according to an exemplary embodiment.

As shown in FIGS. 27 and 29, an underside of the work platform 320 is coupled to a subfloor assembly, shown as truss assembly 330. In one embodiment, the hand rails 302 are coupled to the truss assembly 330 at a plurality of interfaces. The work platform 320 may be an aluminum plate having a thickness of no more than 0.5 inches (i.e., a thickness less than or equal to 0.5 inches, etc.). In other embodiments, the work platform 320 is manufactured using another material or has another thickness. The work platform of a traditional fire apparatus is constructed from thick steel plates thereby increasing the weight of the turntable to provide a desired increase in at least one of the extension height and the horizontal reach of the ladder assembly associated therewith. Work platform 320 may have a weight of less than half the weight of traditional work platforms. In one embodiment, the truss assembly 330 strengthens work platform 320 and provides an interface that couples work platform 320 to the various other components of turntable 300. Truss assembly 330 may carry the various loads applied to work platform 320 into turntable 300. As shown in FIG. 29, the truss assembly 330 includes a first frame member, shown as first truss 332, and a second frame member, shown as second truss 334. As shown in FIGS. 27 and 29, the first truss 332 is parallel to the second truss 334. The first truss 332 and the second truss 334 extend along a longitudinal direction (e.g., defined by the longitudinal axis 14, defined by the aerial ladder assembly 200, etc.), according to an exemplary embodiment.

As shown in FIG. 30, the turntable 300 includes the base plate 342, a first set of side plates 350, and a second set of side plates 351. The first set of side plates 350 includes a first outer plate 352 and a first inner plate 354. The second set of side plates 351 includes a second outer plate 353 and a second inner plate 355. As shown in FIG. 30, the first outer plate 352, the first inner plate 354, the second outer plate 353, and the second inner plate 355 each define an aperture 362. The aperture 362 may reduce the overall weight of the turntable 300 while providing access to an inner portion thereof (e.g., for maintenance, as a passageway for lines, etc.). The first outer plate 352 and the second outer plate 353 both define various other apertures in addition to aperture 362 thereby further reducing the weight of the turntable 300.

As shown in FIGS. 29-30, a first bracket, shown as first bracket 346, and a second bracket, shown as second bracket 348, are coupled to the base plate 342. In one embodiment, first bracket 346 and second bracket 348 are coupled to opposing lateral sides of the base plate 342. As shown in FIGS. 29-30, both the first bracket 346 and the second bracket 348 extend along the longitudinal direction (e.g., defined by the aerial ladder assembly 200, etc.). As shown in FIG. 29, the truss assembly 330 is coupled to the first bracket 346 and the second bracket 348. In one embodiment, the first truss 332 and the second truss 334 are releasably coupled to the first bracket 346 and the second bracket 348, respectively, with a plurality of fasteners (e.g., bolts, etc.). In other embodiments, truss assembly 330 is otherwise coupled to base plate 342. According to the exemplary embodiment shown in FIGS. 29-30, the turntable 300 includes a third bracket, shown as console bracket 344. The console bracket 344 extends laterally outward from the base plate 342, perpendicular to the longitudinal direction (e.g., defined by the aerial ladder assembly 200, etc.). In other embodiments, the console bracket 344 is otherwise positioned. The console bracket 344 may be configured to engage the control console 360 (e.g., may provide a surface to which the control console 360 is coupled, etc.).

Figure 31:
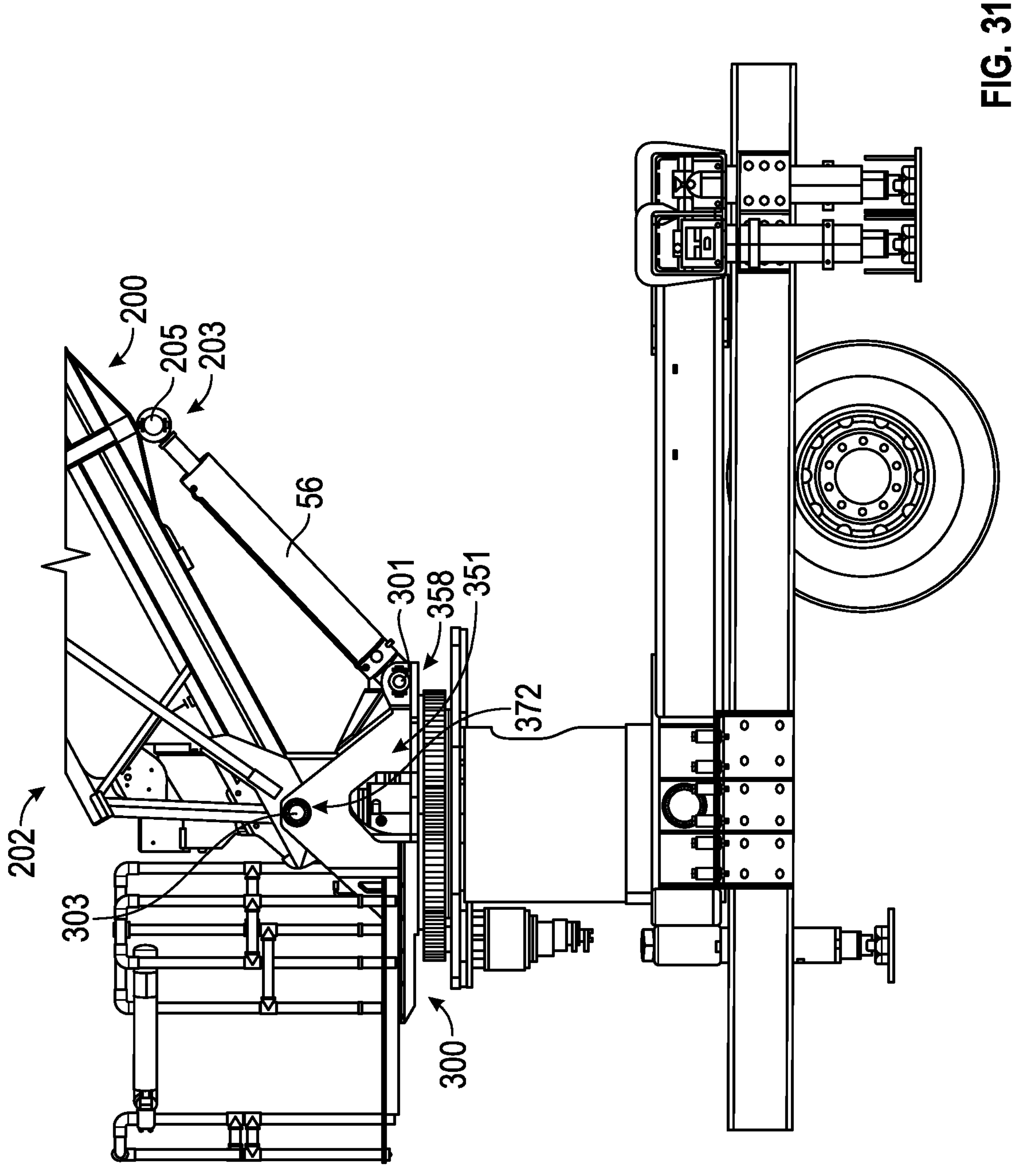
FIG. 31 is a right side view of turntable of FIG. 23, according to an exemplary embodiment.
Figure 32:
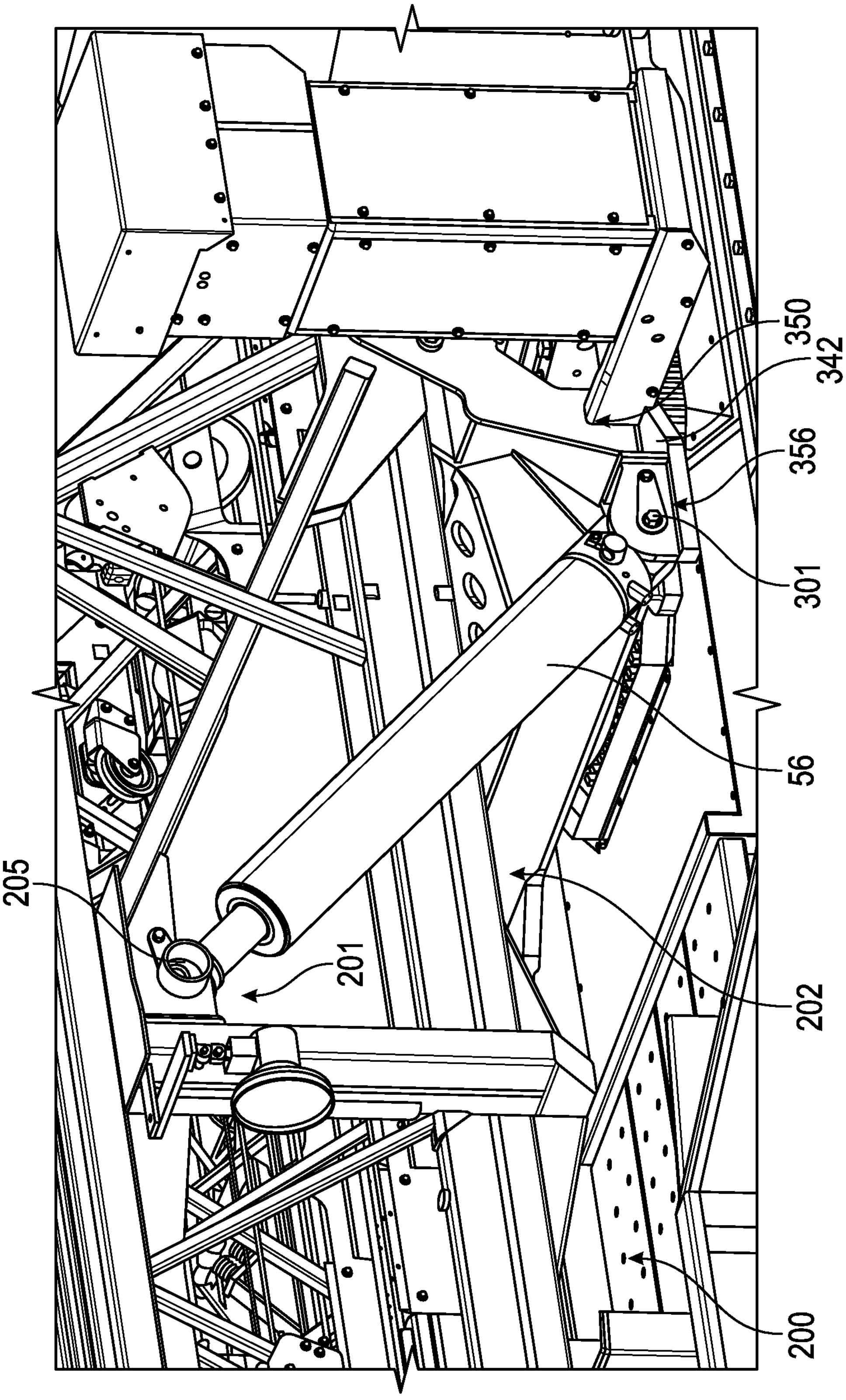
FIG. 32 is a left side perspective view of the connection between the turntable and the aerial ladder assembly of FIG. 23, according to an exemplary embodiment.

Referring to the exemplary embodiment shown in FIGS. 30-32, the first end 202 of the aerial ladder assembly 200 is coupled to the turntable 300 at four connection points. As shown in FIGS. 30-32, two of the connection points are disposed on a first lateral side of the fire apparatus 10 and two of the connection points are disposed on a second lateral side of the fire apparatus 10. As shown in FIG. 30, the first end 202 of the aerial ladder assembly 200 is coupled to the first set of side plates 350 at a first connection, shown as connection 370. A pin, shown as first heel pin 303, is positioned to engage and rotatably couple the aerial ladder assembly 200 to the first set of side plates 350 at the connection 370. As shown in FIG. 30-31, the first end 202 of the aerial ladder assembly 200 is coupled to the second set of side plates 351 at a second connection, shown as connection 372. A second heel pin 303 is positioned to engage and rotatably couple the aerial ladder assembly 200 to the second set of side plates 351 at the connection 372.

As shown in FIG. 32, an end of the cylinder 56 is coupled to the first end 202 of the aerial ladder assembly 200 at a point 201. A second pin, shown as first ladder pin 205, engages and rotatably couples the end the cylinder 56 to the aerial ladder assembly 200 at the point 201. As shown in FIGS. 30-32, the base plate 342 defines a first arm, shown as first arm 356, and a second arm, shown as second arm 358. As shown in FIG. 32, an opposing end of the cylinder 56 is coupled to the turntable 300 at a third connection disposed along the first arm 356. A third pin, shown as first base pin 301, is positioned to engage and rotatably couple the opposing end of the cylinder 56 to the first arm 356. As shown in FIG. 31, an end of the cylinder 56 on the opposing lateral side of the fire apparatus 10 is coupled to the first end 202 of the aerial ladder assembly 200 at a point 203. A second ladder pin 205, is positioned to engage and rotatably couple the end of the cylinder 56 to the aerial ladder assembly 200 at the point 203. As shown in FIGS. 30-31, an opposing end of the cylinder 56 is coupled to the turntable 300 at a fourth connection disposed along second arm 358. A second base pin 301 is positioned to engage and rotatably couple the opposing end of the cylinder 56 to the second arm 358. According to an exemplary embodiment, the cylinders 56 are actuated using the control console 360. When actuated, the cylinders 56 may at least one of extend and retract to rotate the aerial ladder assembly 200 about the heel pins 303.

Aerial Ladder Assembly

Figure 33:
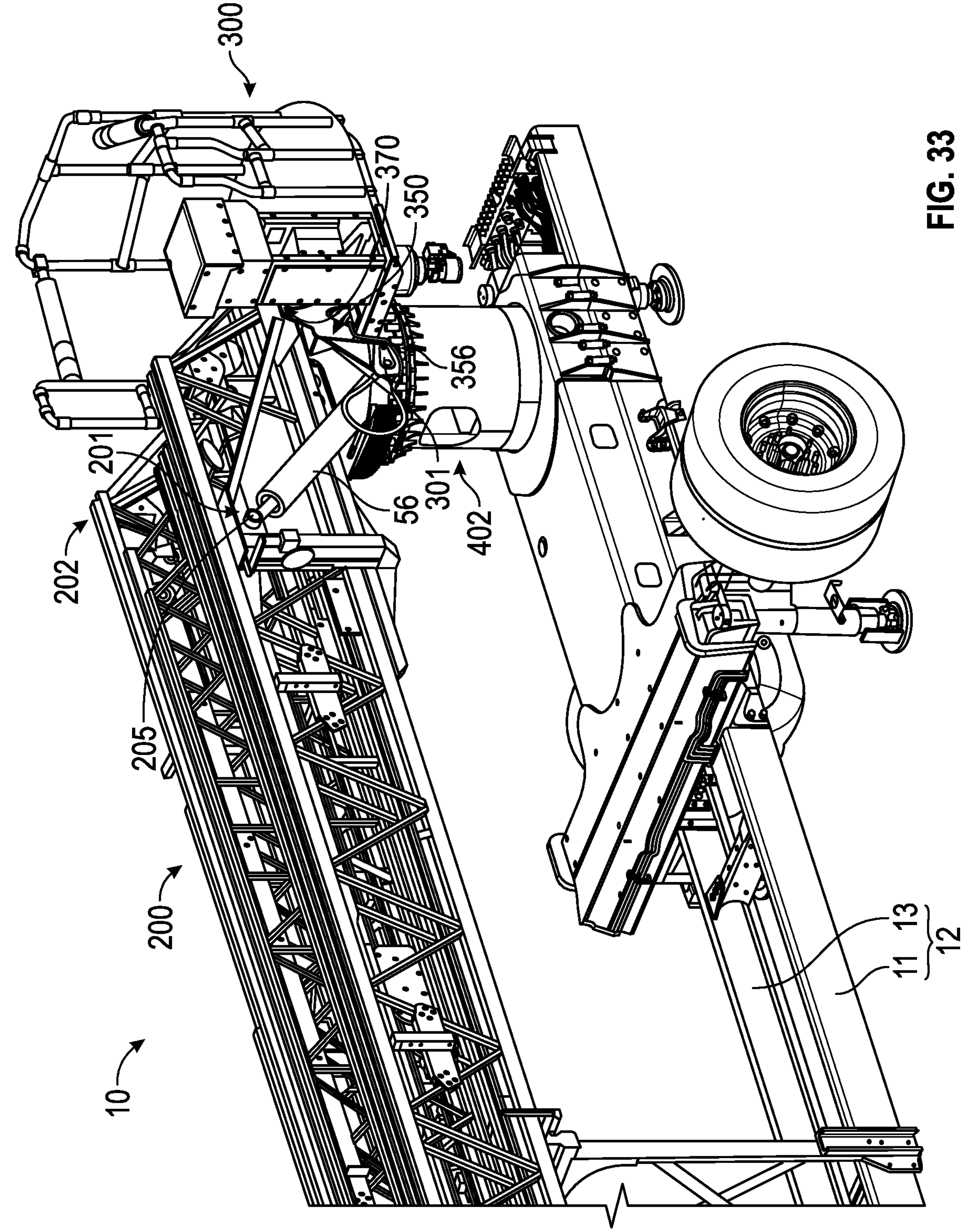
FIG. 33 is a front perspective view of a pedestal, a torque box, a turntable, an aerial ladder assembly, and an outrigger assembly of a fire apparatus, according to an exemplary embodiment.

According to the exemplary embodiment shown in FIGS. 33-42, the aerial ladder assembly 200 transfers applied loading into the frame 12 of the fire apparatus 10. As shown in FIG. 33, the first end 202 of aerial ladder assembly 200 is coupled to the turntable 300. The turntable 300 is coupled to the frame 12 with the pedestal 402.

Figure 34:
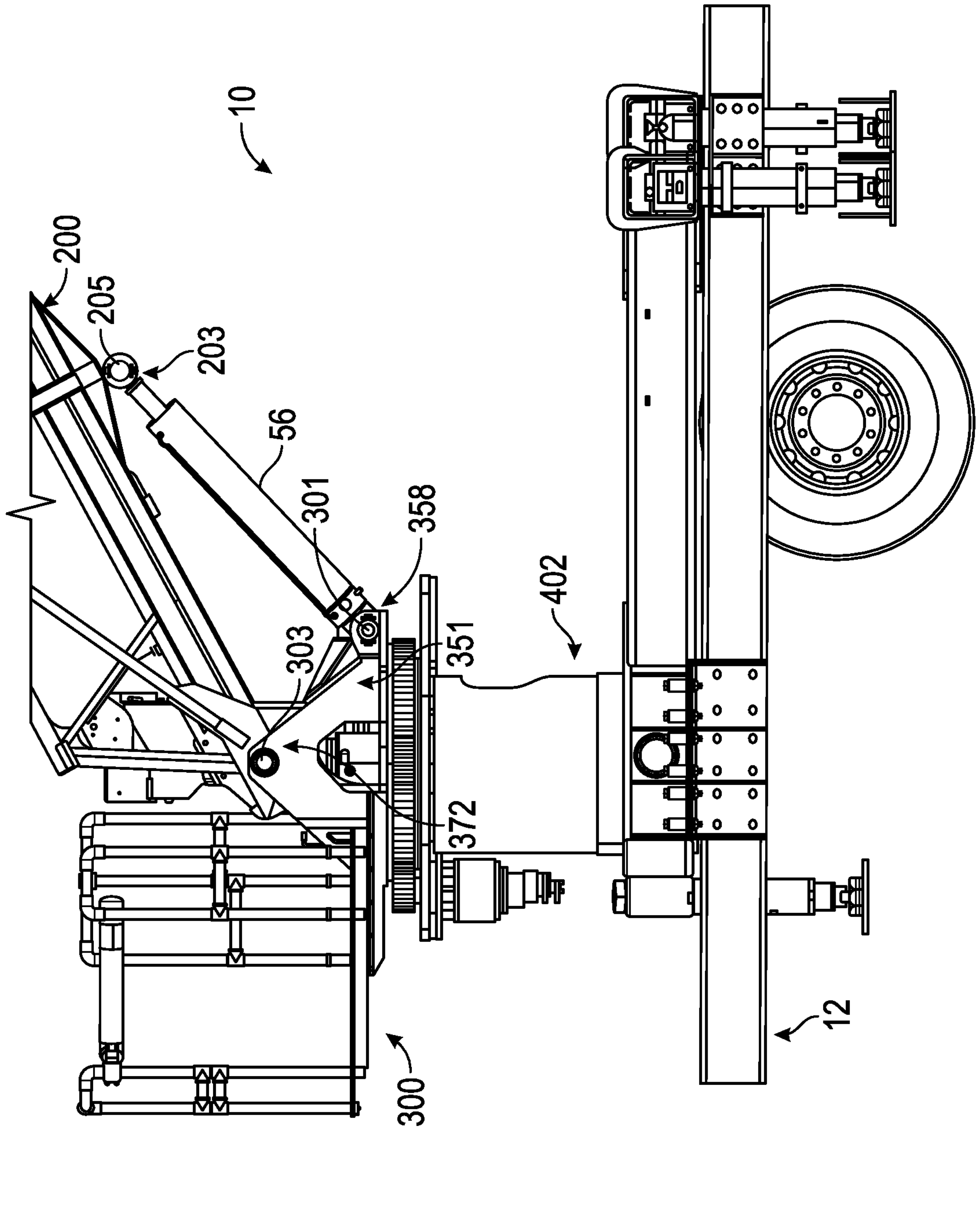
FIG. 34 is a right side view of the connection between the aerial ladder assembly and the turntable of FIG. 33, according to an exemplary embodiment.

Referring to the exemplary embodiment shown in FIGS. 33-34, the first end 202 of the aerial ladder assembly 200 is coupled to the turntable 300 at four connection points. As shown in FIGS. 33-34, two of the connection points are disposed on a first lateral side of the fire apparatus 10, and two of the connection points are disposed on a second lateral side of the fire apparatus 10. As shown in FIG. 33, the first end 202 of the aerial ladder assembly 200 is coupled to the first set of side plates 350 at the connection 370. As shown in FIG. 34, the first end 202 of the aerial ladder assembly 200 is also coupled to the second set of side plates 351 at the connection 372. The first heel pin 303 is positioned to engage and rotatably couple the aerial ladder assembly 200 to the second set of side plates 351 at the connection 372. The second heel pin 303 is positioned to couple the aerial ladder assembly 200 to the first set of side plates 350 at the connection 370.

As shown in FIG. 33, an end of the cylinder 56 is coupled to the first end 202 of the aerial ladder assembly 200 at the point 201. The first ladder pin 205 engages and rotatably couples the end the cylinder 56 to the aerial ladder assembly 200 at the point 201. As shown in FIG. 33, an opposing end of the cylinder 56 is coupled to the turntable 300 at a third connection disposed along the first arm 356. The first base pin 301 is positioned to engage and rotatably couple the opposing end of the cylinder 56 to the first arm 356. As shown in FIG. 34, an end of a second cylinder 56 (e.g., disposed on an opposing lateral side of the fire apparatus 10, etc.) is coupled to the first end 202 of the aerial ladder assembly 200 at the point 203. The second ladder pin 205 is positioned to engage and rotatably couple the end of the second cylinder 56 to the aerial ladder assembly 200 at the point 203. An opposing end of the second cylinder 56 is coupled to the turntable 300 at a fourth connection disposed along the second arm 358. The second base pin 301 is positioned to engage and rotatably couple the opposing end of the second cylinder 56 to the second arm 358. According to an exemplary embodiment, the cylinders 56 are actuatable to rotate the aerial ladder assembly 200 about the heel pins 303.

Figure 35:
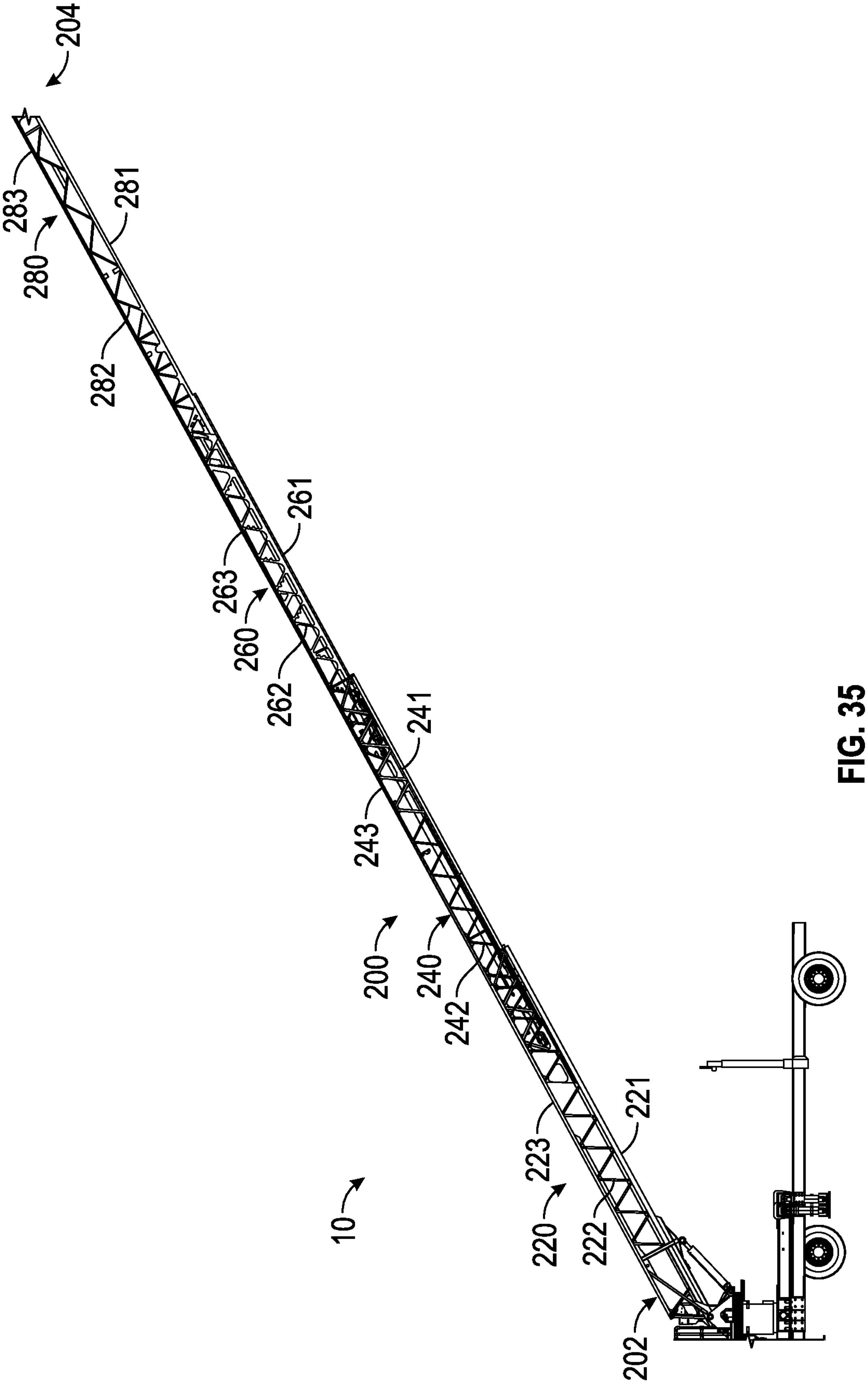
FIG. 35 is a right side view of the aerial ladder assembly of FIG. 33 in an extended configuration, according to an exemplary embodiment.
Figure 36:
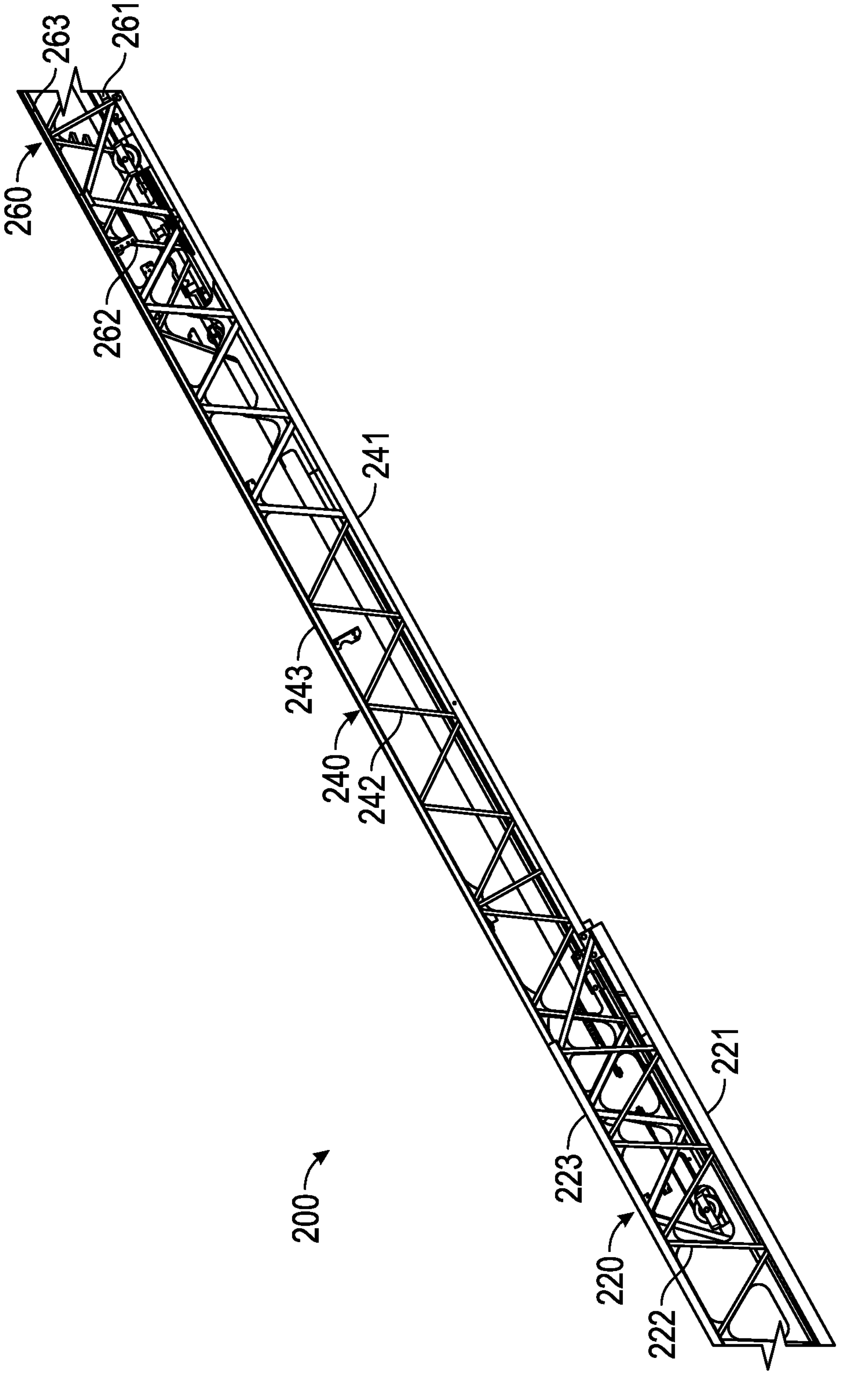
FIG. 36 is a detailed right side view of a base section, a lower middle section, and an upper middle section of the aerial ladder assembly of FIG. 33, according to an exemplary embodiment.

As shown in FIGS. 35-36, the aerial ladder assembly 200 of the fire apparatus 10 includes a plurality of extensible ladder sections. In one embodiment, the ladder sections include a plurality of thin-walled tubes thereby reducing the weight of the aerial ladder assembly 200. As shown in FIGS. 35-36, the plurality of extensible ladder sections includes a first ladder section, shown as base section 220, a second ladder section, shown as lower middle section 240, a third ladder section, shown as upper middle section 260, and a fourth ladder section, shown as fly section 280. The proximal end (e.g., base end, pivot end, etc.) of the base section 220 may define the first end 202 of the aerial ladder assembly 200. The distal end (e.g., free end, platform end, implement end, etc.) of the fly section 280 may define the second end 204 of the aerial ladder assembly 200. According to an exemplary embodiment, the second end 204 of the aerial ladder assembly 200 (e.g., the distal end of the fly section 280, etc.) is extensible to the horizontal reach of at least 90 feet (e.g., at least 100 feet, etc.) when the aerial ladder assembly 200 is selectively repositioned into a plurality of operating orientations (e.g., forward, rearward, sideward, etc.).

According to the exemplary embodiment shown in FIGS. 35-42, the ladder sections of the aerial ladder assembly 200 are slidably coupled. As shown in FIGS. 35-38, the base section 220 includes a pair of frame members, shown as base rails 221, a plurality of lacing members, shown as lacing members 222, a pair of hand rails, shown as hand rails 223, and a plurality of lateral members, shown as lateral members 224. Both the base rails 221 and the hand rails 223 extend along a longitudinal direction of the base section 220. The lacing members 222 couple the base rails 221 to the hand rails 223, as well as add structural support to the base section 220. The lateral members 224 couple the pair of base rails 221.

The lower middle section 240 includes a pair of frame members, shown as base rails 241, a plurality of lacing members, shown as lacing members 242, a pair of hand rails, shown as hand rails 243, and a plurality of lateral members, shown as lateral members 244. Both the base rails 241 and the hand rails 243 extend along a longitudinal direction of the lower middle section 240. The lacing members 242 couple the base rails 241 to the hand rails 243, as well as add structural support to the lower middle section 240. The lateral members 244 couple the pair of base rails 241.

The upper middle section 260 includes a pair of frame members, shown as base rails 261, a plurality of lacing members, shown as lacing members 262, a pair of hand rails, shown as hand rails 263, and a plurality of lateral members, shown as lateral members 264. Both the base rails 261 and the hand rails 263 extend along a longitudinal direction of the upper middle section 260. The lacing members 262 couple the base rails 261 to the hand rails 263, as well as add structural support to the upper middle section 260. The lateral members 264 couple the pair of base rails 261.

The fly section 280 includes a pair of frame members, shown as base rails 281, a plurality of lacing members, shown as lacing members 282, a pair of hand rails, shown as hand rails 283, and a plurality of lateral members. Both the base rails 281 and the hand rails 283 extend along a longitudinal direction of the fly section 280. The lacing members 282 couple the base rails 281 to the hand rails 283, as well as add structural support to the fly section 280. The lateral members of the fly section 280 couple the pair of base rails 281.

Figure 39:
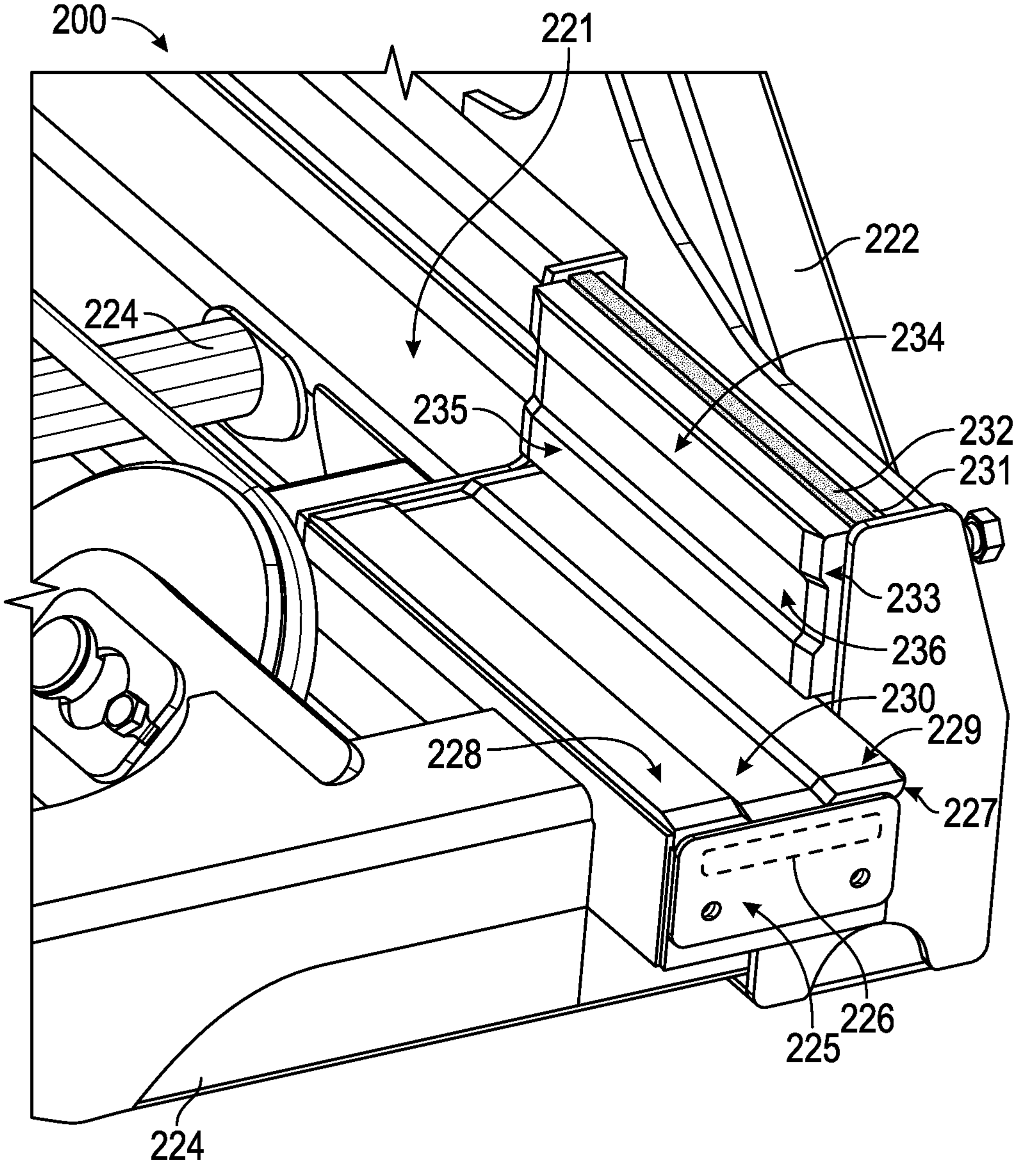
FIG. 39 is a perspective view of a slide pad associated with the base section, according to an exemplary embodiment.

As shown in FIG. 39, the base section 220 includes a bracket, shown as bracket 225. The bracket 225 defines a pocket sized to receive a resilient member, shown as resilient member 226, and a pad, shown as first slide pad 227. The resilient member 226 may couple the first slide pad 227 to the bracket 225. In one embodiment, the resilient member 226 and the first slide pad 227 rest within the pocket but are not otherwise coupled to the bracket 225. In other embodiments, the first slide pad 227 is otherwise coupled to the base rail 221. As shown in FIG. 39, the first slide pad 227 includes a first strip, shown as first strip 228, a second strip, shown as second strip 229, and a body portion, shown as body portion 230. The first strip 228 and the second strip 229 extend from the body portion 230 thereby forming the double-humped profile (e.g., cross-sectional shape, etc.) that extends in a longitudinal direction defined by the body portion 230. The first strip 228 defines a first engagement surface of the first slide pad 227 and the second strip 229 defines a second engagement surface of the first slide pad 227. The first engagement surface (e.g., of the first strip 228, etc.) is spaced an offset distance from the second engagement surface (e.g., of the second strip 229, etc.).

Referring still to FIG. 39, the base section 220 includes a plate, shown as backer plate 231. As shown in FIG. 39, the base section 220 includes a second resilient member, shown as resilient member 232, and a second pad, shown as second slide pad 233. The resilient member 232 couples the second slide pad 233 to the backer plate 231. The second slide pad 233 has a cross-sectional shape that corresponds with the cross-sectional shape (e.g., the same overall profile, similar arrangement of components, etc.) of the first slide pad 227, according to an exemplary embodiment. As shown in FIG. 39, the second slide pad 233 includes a first strip, shown as first strip 234, a second strip, shown as second strip 235, and a body portion, shown as body portion 236. The first strip 234 and the second strip 235 extend from the body portion 236 thereby forming the double-humped profile (e.g., a cross-sectional shape, etc.) that extends in a longitudinal direction defined by the body portion 236. The first strip 234 defines a first engagement surface of the second slide pad 233 and the second strip 235 defines a second engagement surface of the second slide pad 233. The first engagement surface (e.g., of the first strip 234, etc.) is spaced an offset distance from the second engagement surface (e.g., of the second strip 235, etc.).

Figure 37:
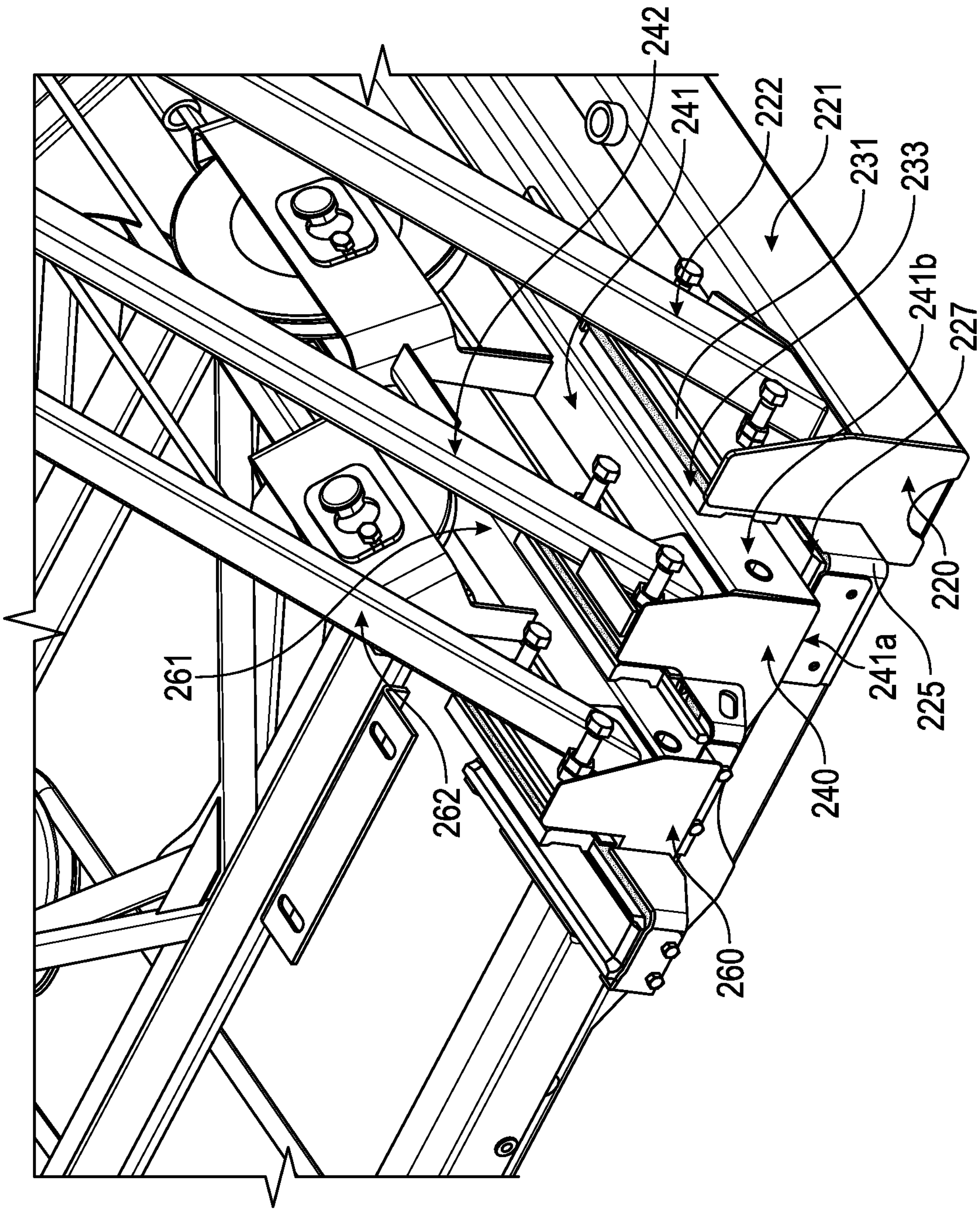
FIGS. 37 and 38 are perspective views of the base section, the lower middle section, and the upper middle section of FIG. 36 in a retracted configuration, according to an exemplary embodiment.
Figure 38:
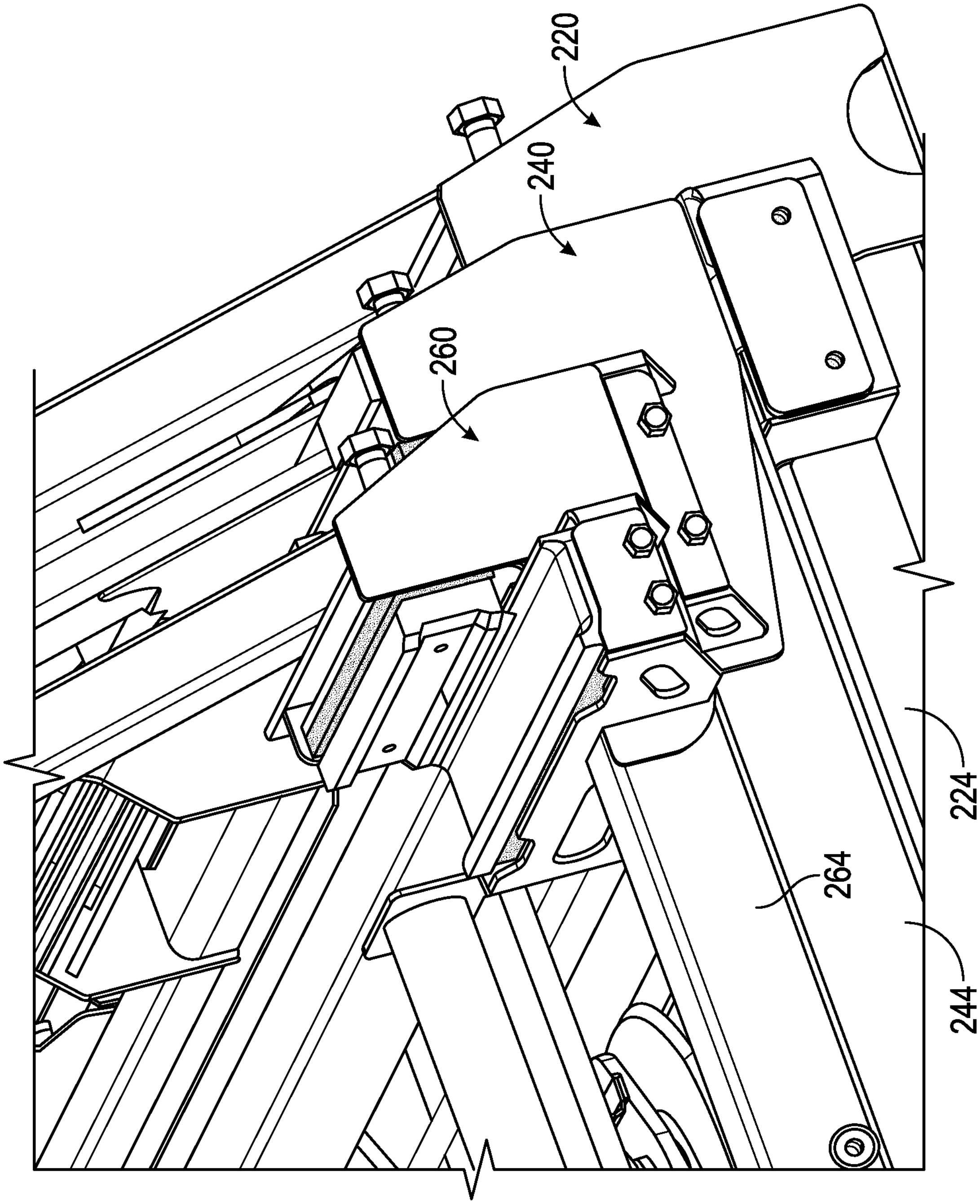

As shown in FIGS. 37 and 39, the first slide pad 227 and the second slide pad 233 slidably couple the base section 220 to the lower middle section 240. The bracket 225 and the backer plate 231 are positioned to support the first slide pad 227 and the second slide pad 233. The first engagement surface (e.g., of first strip 228, of first strip 234, etc.) and the second engagement surface (e.g., of second strip 229, of second strip 235, etc.) of both the first slide pad 227 and the second slide pad 233 abut the base rail 241 of lower middle section 240. As shown in FIG. 37, a bottom wall 241*a* and a sidewall 241*b* of base rail 241 contact the first slide pad 227 and the second slide pad 233, respectively. In one embodiment, the backer plate 231 is adjustably coupled to base rail 241, allowing the second slide pad 233 to be extended or retracted relative to base rail 241. The backer plate 231 may be adjusted to vary a distance between the second slide pad 233 and the sidewall 241*b*. During operation of the aerial ladder assembly 200, the connection between the base section 220 and the lower middle section 240 experiences a variety of loads (e.g., dynamic loads, static loads, wind loads, etc.). By slidably coupling the lower middle section 240 to the base section 220 with the first slide pad 227 and the second slide pad 233, the loading from the lower middle section 240 is transferred along the base section 220. In one embodiment, base section 220 includes similar components on opposing lateral sides thereof.

According to an exemplary embodiment, the resilient member 226 and the resilient member 232 uniformly distribute loading within the first slide pad 227 and the second slide pad 233, respectively. In one embodiment, the resilient member 226 and the resilient member 232 are made of rubber. In other embodiments, the resilient member 226 and the resilient member 232 are made of another flexible material. According to an exemplary embodiment, the first slide pad 227 and the second slide pad 233 are shaped to transfer stresses into corner regions of the bottom wall 241*a* and the sidewall 241*b* of the base rail 241. In one embodiment, the stresses are substantially removed from the middle portions of the bottom wall 241*a* and the sidewall 241*b*, thereby non-uniformly carrying loading through the base rail 241 (i.e., the shape of the first slide pad 227 and the second slide pad 233 drive the loads into the corners of the base rail 241, etc.).

Figure 40:
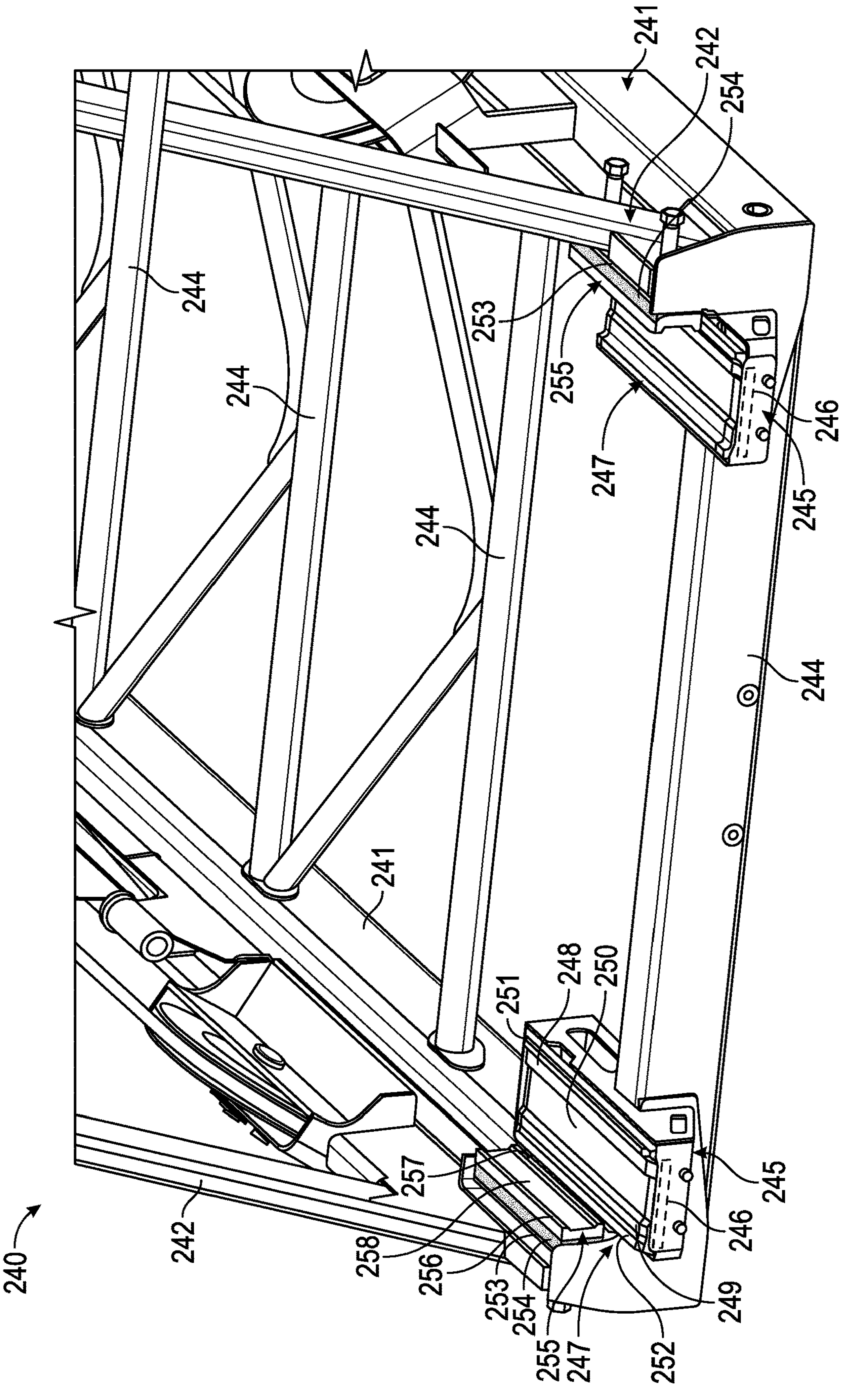
FIG. 40 is a front perspective view of the lower middle section of FIG. 36, according to an exemplary embodiment.
Figure 41:
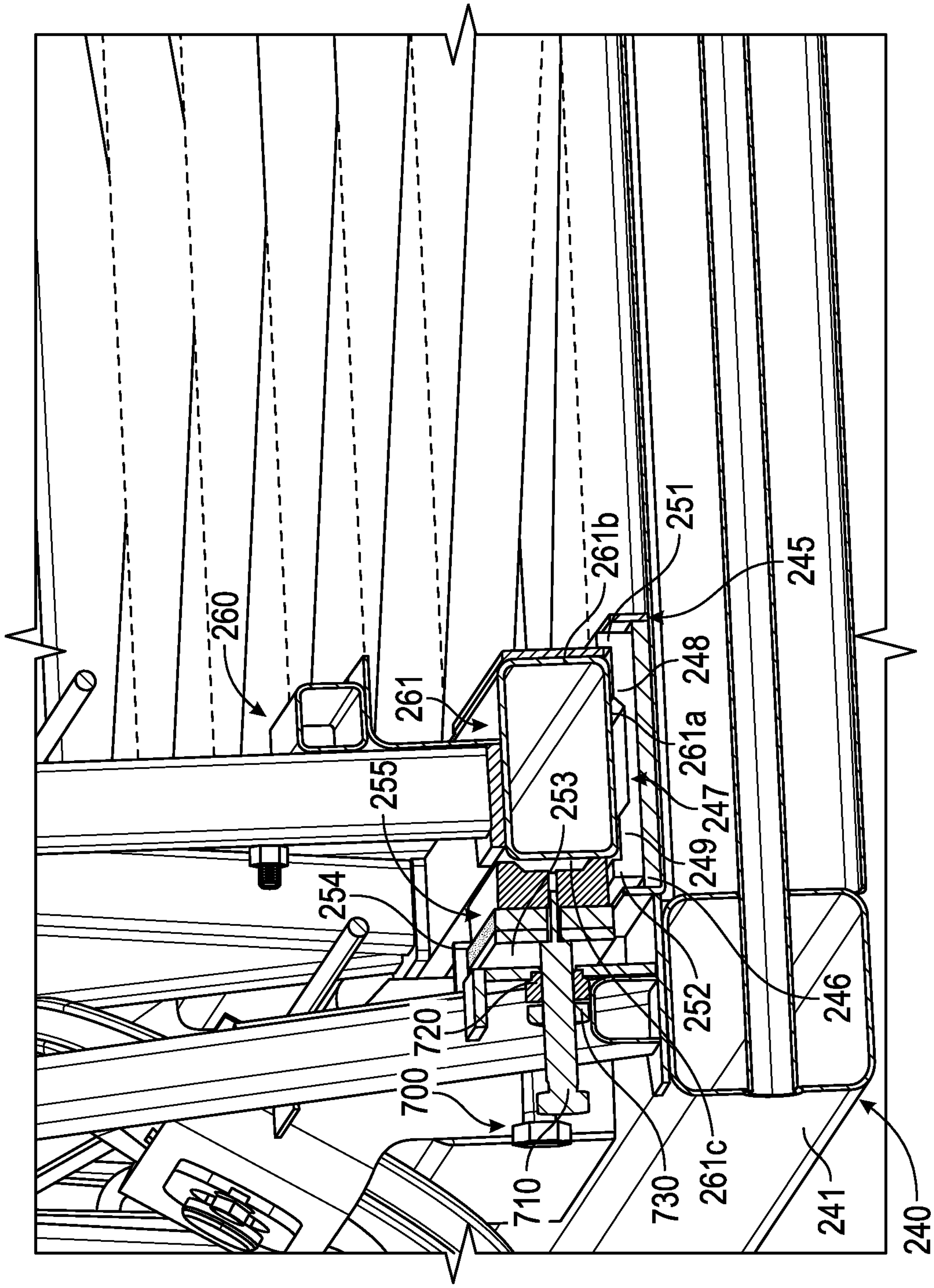
FIG. 41 is a front perspective cross-sectional view of the lower middle section and upper middle section of FIG. 36, according to an exemplary embodiment.

Referring next to FIGS. 40-41, the lower middle section 240 includes a bracket, shown as bracket 245. The bracket 245 defines a pocket sized to receive a resilient member, shown as resilient member 246, and a pad, shown as first slide pad 247. The resilient member 246 may couple the first slide pad 247 to the bracket 245. In one embodiment, the resilient member 246 and the first slide pad 247 rest within the pocket and are not otherwise coupled to bracket 245. In other embodiments, the first slide pad 247 is otherwise coupled to base rail 241. As shown in FIG. 40, the first slide pad 247 includes a first strip, shown as first strip 248, a second strip, shown as second strip 249, and a body portion, shown as body portion 250. The first strip 248 and the second strip 249 extend from the body portion 250 thereby forming a double-humped profile (e.g., cross-sectional shape or profile, etc.) that extends in a longitudinal direction defined by the body portion 250. The first strip 248 defines a first engagement surface of the first slide pad 247 and the second strip 249 defines a second engagement surface of the first slide pad 247. The first engagement surface (e.g., of the first strip 248, etc.) is spaced an offset distance from the second engagement surface (e.g., of the second strip 249, etc.). According to the exemplary embodiment shown in FIG. 40, the first slide pad 247 includes a first flange, shown as first flange 251, extending from the first strip 248 and a second flange, shown as second flange 252, extending from the second strip 249. In one embodiment, the first flange 251 extends perpendicularly from the first strip 248, and the second flange 252 extends perpendicularly from the second strip 249. As shown in FIGS. 20-21, the first flange 251 and the second flange 252 are disposed on opposing lateral sides of the first slide pad 247 and extend along the longitudinal direction thereof.

Referring still to FIG. 40, the lower middle section 240 includes a plate, shown as backer plate 253. As shown in FIGS. 40-41, the lower middle section 240 includes a second resilient member, shown as resilient member 254, and a second pad, shown as second slide pad 255. The resilient member 254 couples the second slide pad 255 to the backer plate 253. The resilient member 254 couples the second slide pad 255 to the bracket 245. The second slide pad 255 has a cross-sectional shape that is different than the cross-sectional shape (e.g., the double-humped profile, etc.) of the first slide pad 247, according to an exemplary embodiment. As shown in FIG. 40, the second slide pad 255 includes a first flange, shown as first flange 256, a second flange, shown as second flange 257, and a body portion, shown as body portion 258. The first flange 256 and the second flange 257 may extend from opposing lateral sides of the body portion 250. In one embodiment, the lower middle section 240 includes similar components on both opposing lateral sides thereof.

As shown in FIG. 41, the first slide pad 247 and the second slide pad 255 slidably couple the upper middle section 260 to the lower middle section 240. The bracket 245 and the backer plate 253 are positioned to support the first slide pad 227 and the second slide pad 233, respectively. The first strip 248 and the second strip 249 of the first slide pad 247 abut (i.e., engage, etc.) a bottom wall 261*a* of the base rail 261 of upper middle section 260. As shown in FIG. 41, the first flange 251 abuts a first sidewall 261*b* of the base rail 261 and the second flange 252 abuts a second sidewall 261*c* of the base rail 261. The shape and components of first slide pad 227 and second slide pad 233 (e.g., strips, flanges, etc.) and pocket design of the lower middle section 240 reduces relative movement between the base rail 261 of the upper middle section 260 and the first slide pad 247. By way of example, the first flange 256 and the second flange 257 may coordinate relative movement between first slide pad 247 and the base rail 261 by engaging (e.g., holding, grabbing, retaining, etc.) the base rail 261. As shown in FIG. 40, a sidewall of the pocket defined by the bracket 245 is spaced a distance from the first slide pad 247, thereby forming a gap. The gap facilitates movement of the first slide pad 247 relative to bracket 245 such that first slide pad 247 may follow the movement of the base rail 261 of the upper middle section 260. Reducing relative movement between first slide pad 247 and the base rail 261 reduces the risk that loading may be applied to middle portions of the bottom wall 261*a* and instead directs loading into corner regions of base rail 261.

Referring again to the exemplary embodiment shown in FIG. 41, the interfaces between the first strip 248 and the first flange 251 and between the second strip 249 and the second flange 252 are shaped to correspond with the corners of the base rail 261 (e.g., have a radius that corresponds with the radius of the corners of base rail 261, etc.). In other embodiments, the interfaces are otherwise shaped (e.g., has a smaller radius than the radius of the corners of base rail 261, etc.). As shown in FIG. 41, the first slide pad 247 is positioned such that the interfaces are disposed along the corners of the base rail 261. During operation of the aerial ladder assembly 200, the connection between the lower middle section 240 and the upper middle section 260 experiences a variety of loads (e.g., dynamic loads, static loads, wind loads, etc.). By slidably coupling the upper middle section 260 to the lower middle section 240 with the first slide pad 247 and the second slide pad 255, the loading from the upper middle section 260 is transferred along the lower middle section 240 while still allowing extension and retraction of the aerial ladder assembly 200.

According to an exemplary embodiment, the resilient member 246 and the resilient member 254 uniformly distribute loading within the first slide pad 247 and the second slide pad 255, respectively. In one embodiment, the resilient member 246 and the resilient member 254 are made of rubber. In other embodiments, the resilient member 246 and the resilient member 254 are made of another flexible material. According to an exemplary embodiment, the first slide pad 247 and the second slide pad 255 are shaped to transfer stresses into corner regions of the bottom wall 261*a* and the second sidewall 261*c* of the base rail 261. In one embodiment, the stresses are substantially removed from the middle portions of the bottom wall 261*a* and the second sidewall 261*c*, thereby non-uniformly carrying loading through the base rail 241 (i.e., the shape of the first slide pad 247 and the second slide pad 255 drive the loads into the corners of the base rail 261, etc.).

According to the exemplary embodiment shown in FIG. 41, the lower middle section 240 includes an adjuster assembly, shown as adjuster assembly 700. As shown in FIG. 41, the adjuster assembly 700 includes a rod, shown as threaded fastener 710 (e.g., bolt, etc.), a first nut, shown as weld nut 720, and a second nut, shown as jam nut 730. The adjuster assembly 700 is configured to vary an offset distance (e.g., gap, space, etc.) between the second slide pad 255 and the base rail 261 of the upper middle section 260. The threaded fastener 710 may be turned to adjust the offset distance. In one embodiment, the weld nut 720 is fixed to the base rail 241 and includes an aperture (e.g., a threaded hole, etc.) that receives the threaded fastener 710. When inserted further into (e.g., threaded into, turned, etc.) the weld nut 720, the threaded fastener 710 moves the backer plate 253, the resilient member 254, and the second slide pad 255 towards the second sidewall 261*c* of the base rail 261. Once a desired offset distance is set, the jam nut 730 may be tightened, fixing the offset distance between the second slide pad 255 and the base rail 261. Other ladder sections (e.g., base section 220, upper middle section 260, etc.) may include similar adjuster assemblies 700 to vary a distance between a slide pad and the base rail of the next ladder section (i.e., the ladder section that extends further outward from the fire apparatus, etc.).

Figure 42:
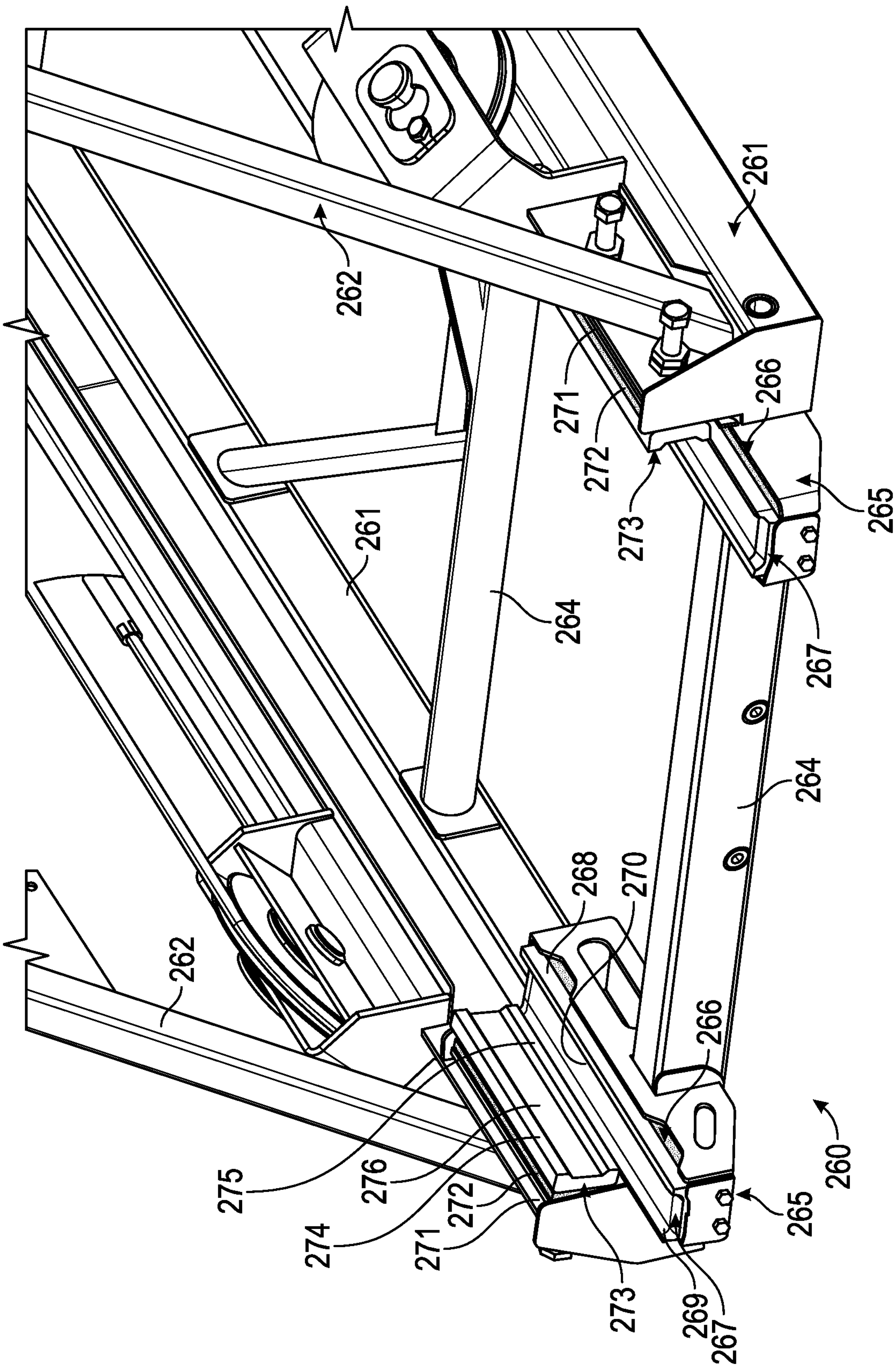
FIG. 42 is a front perspective view of the upper middle section of FIG. 36, according to an exemplary embodiment.

As shown in FIG. 42, the upper middle section 260 includes a bracket, shown as bracket 265. The bracket 265 defines a pocket sized to receive a resilient member, shown as resilient member 266, and a pad, shown as first slide pad 267. The resilient member 266 may couple the first slide pad 267 to the bracket 265. In one embodiment, the resilient member 266 and the first slide pad 267 rest within the pocket and are not otherwise coupled to bracket 265. In other embodiments, the first slide pad 227 is otherwise coupled to base rail 221. The first slide pad 267 includes a first flange, shown as first flange 268, a second flange, shown as second flange 269, and a body portion, shown as body portion 270. As shown in FIG. 42, the first flange 268 and the second flange 269 are coupled to opposing lateral sides of the body portion 270. In one embodiment, at least one of the first flange 268 and the second flange 269 extend only partially along the length of the first slide pad 267. The first flange 268 and the second flange 269 may at least partially define a first engagement surface and a second engagement surface, respectively, of the first slide pad 267.

Referring still to FIG. 42, the upper middle section 260 includes a plate, shown as backer plate 271. As shown in FIG. 42, the upper middle section 260 includes a second resilient member, shown as resilient member 272, and a second pad, shown as second slide pad 273. The resilient member 272 couples the second slide pad 273 to the backer plate 271. At least a portion of the second slide pad 273 has a cross-sectional shape that corresponds with the cross-sectional shape (e.g., the same overall profile, similar arrangement of components, etc.) of the first slide pad 267, according to an exemplary embodiment. As shown in FIG. 42, the second slide pad 273 includes a first flange, shown as first flange 274, a second flange, shown as second flange 275, and a body portion, shown as body portion 276. The first flange 274 and the second flange 275 may be coupled to opposing lateral sides of the body portion 276. As shown in FIG. 42, the first flange 268 has a length that is greater than a length of the second flange 269. The second flange 269 may extend along only a portion of a length of the body portion 270. A portion of the second slide pad 273 (e.g., second flange 275, etc.) extends across a portion of the first slide pad 267, according to the exemplary embodiment shown in FIG. 42. An arrangement of slide pads where one pad (e.g., the second slide pad 273, etc.) extends across a portion of another pad (e.g., the first slide pad 267, etc.) may improve the distribution of stresses within an aerial ladder assembly by directing sideward loading through corner regions of a received base rail without compromising the ability to selectively adjust the gap between the pad and the received base rail. According to an exemplary embodiment, the upper middle section 260 includes similar components on both opposing lateral sides thereof. The fly section 280 is slidably coupled to the upper middle section 260 via the first slide pad 267 and the second slide pad 273. By slidably coupling the fly section 280 to the upper middle section 260 with the first slide pad 267 and the second slide pad 273, the loading from the fly section 280 is transferred along the upper middle section 260.

The sections of aerial ladder assembly 200 may also have pads (e.g., slide pads, etc.) disposed at the proximal ends of the distal ladder sections (e.g., the distal ladder section of each pair of ladder sections relative to the fire apparatus, etc.). The pads may be coupled to the base rail of the distal ladder section and disposed within a channel of the proximal ladder section (e.g., the proximal ladder section of each pair of ladder sections relative to the fire apparatus, etc.). The pads may interface with (e.g., engage, etc.) one or more surfaces of the channel and carry loading between the pair of ladder sections. By way of example, the pads may prevent the distal ladder section from pivoting (e.g., rotating forward, etc.) relative to the proximal ladder section.

While shown coupling particular sections of aerial ladder assembly 200, pads having any of the disclosed shapes may be used to couple any two sections of a ladder assembly. Such pads may carry loading between the ladder sections. The pads may be shaped (e.g., with a double-humped configuration, etc.) to direct stresses into corner regions of the base rails associated with the received ladder section (e.g., the distal ladder section of each pair of ladder sections relative to the fire apparatus, etc.).

Vehicle Stability and Aerial Performance

According to the exemplary embodiment shown in FIGS. 43-56, the first outrigger 110, the second outrigger 120, and the stability foot 130 stabilize the fire apparatus 10 when the aerial ladder assembly 200 is in operation (e.g., being used to extinguish a fire with the nozzle 38, extended to rescue pedestrians from a building, etc.). As shown in FIG. 53, the first outrigger 110, the second outrigger 120, and the stability foot 130 are disposed in a stowed position (e.g., not actuated, not extended, etc.). The first outrigger 110, the second outrigger 120, and the stability foot 130 may remain in the stowed position while the fire apparatus 10 is being driven, while the fire apparatus 10 is not in operation (e.g., not being used, parked, etc.), or any other time the aerial ladder assembly 200 is not being utilized during a fire or rescue situation.

Figure 44:
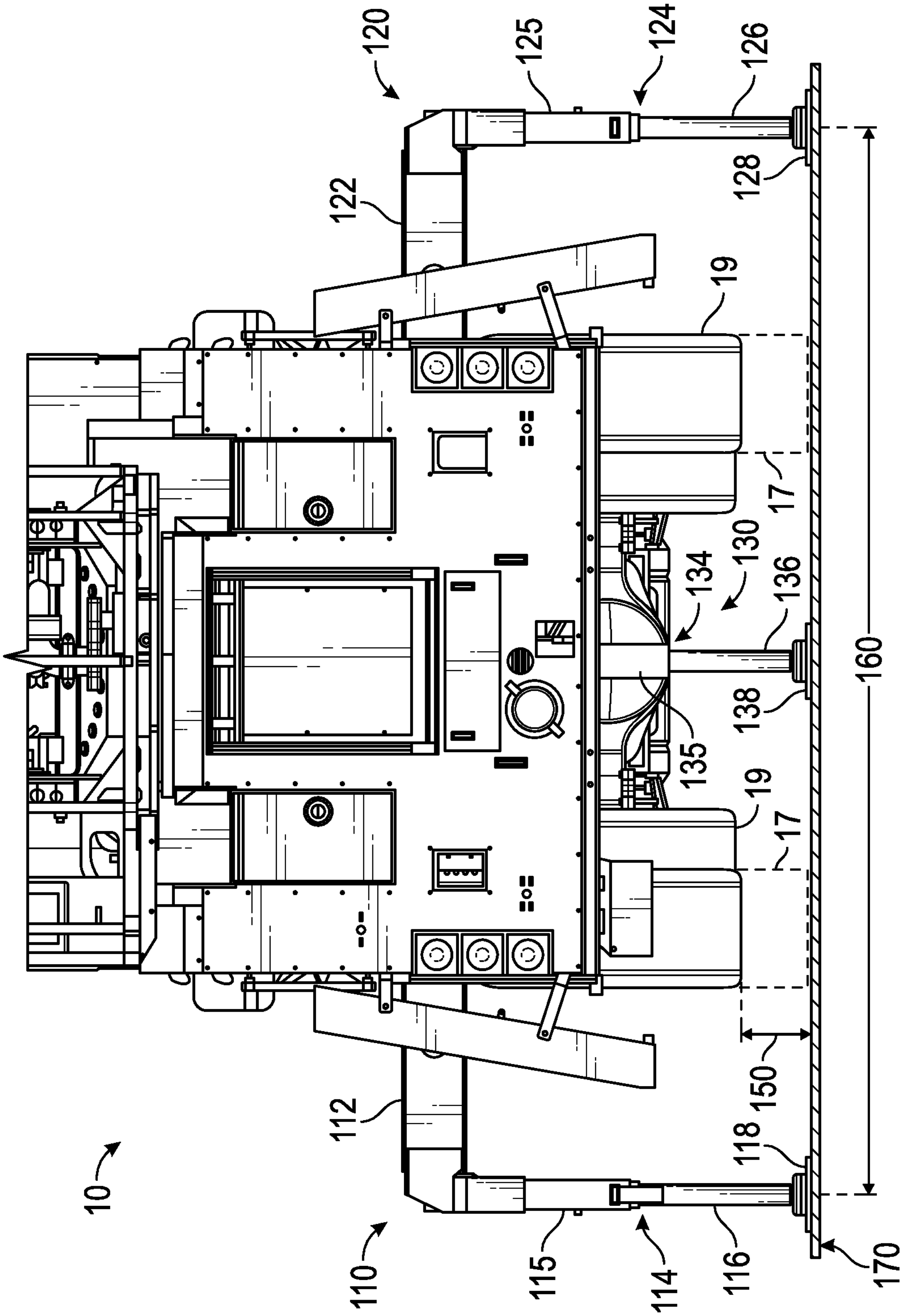
FIG. 44 is a rear view of the single set of outriggers and the stability foot of FIG. 43 in an extended configuration, according to an exemplary embodiment.
Figure 45:
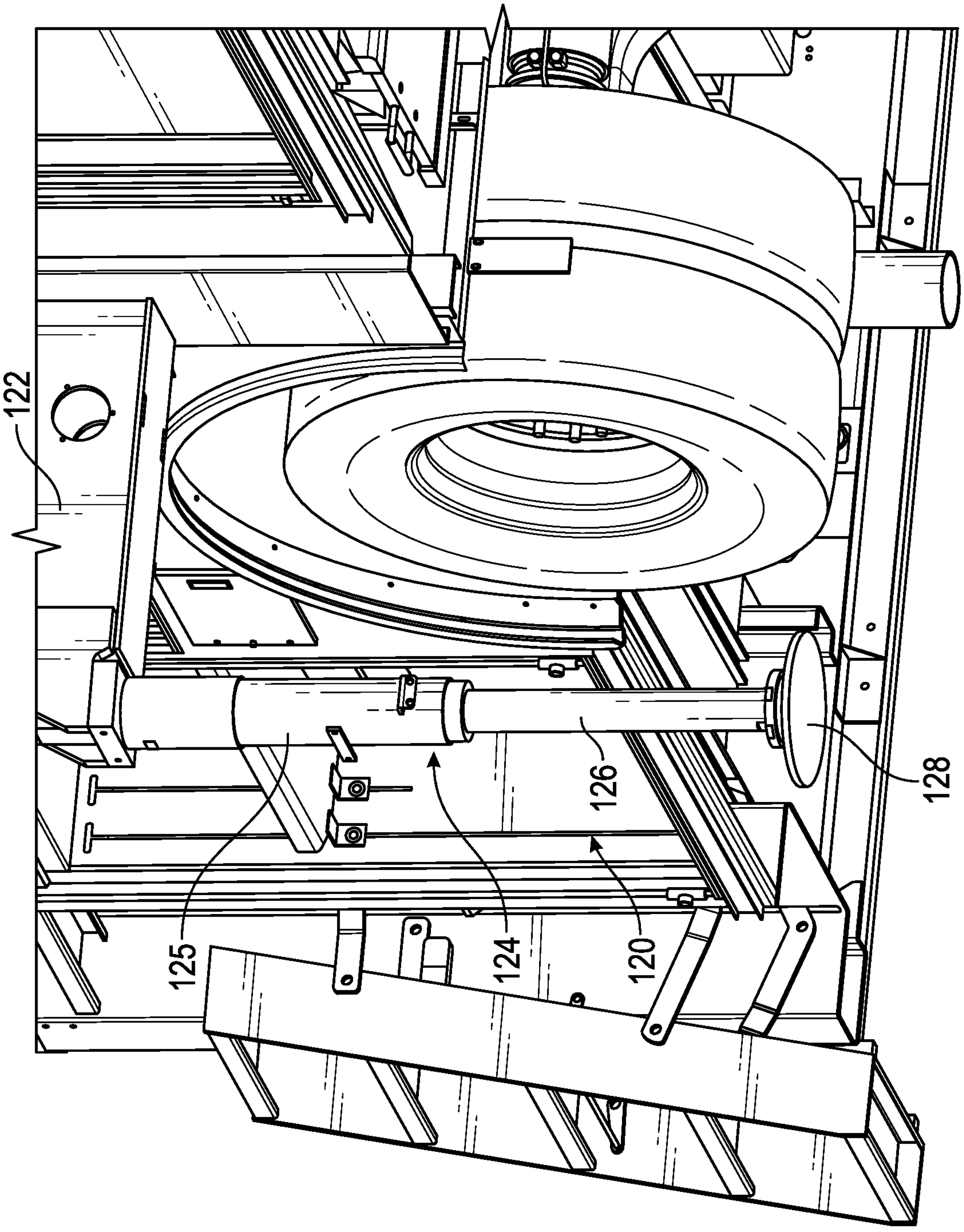
FIG. 45 is a partial view the single set of outriggers of FIG. 43, according to an exemplary embodiment.

As shown in FIGS. 44-45, the first outrigger 110, the second outrigger 120, and the stability foot 130 are disposed in a fully extended position. As shown in FIG. 44, the first outrigger 110 includes a first frame member, shown as first lateral member 112, a first actuator, shown as first cylinder 114, and a first contact pad, shown as first contact pad 118. The first cylinder 114 includes a first cylinder barrel, shown as first cylinder barrel 115, and a first rod, shown as first rod 116. The first rod 116 is coupled to the first contact pad 118. The first cylinder 114 is positioned to extend the first contact pad 118 downward by extending the first rod 116 from the first cylinder barrel 115. The first cylinder 114 extends the first contact pad 118 into contact with a ground surface, shown as ground surface 170. In one embodiment, the first cylinder 114 is a hydraulic cylinder. In other embodiments, the first cylinder 114 is another type of actuator (e.g., a linear actuator, a rotary actuator, or still another type of device, etc.) that may be powered hydraulically, electrically, or still otherwise powered.

As shown in FIGS. 44-45, the second outrigger 120 includes a second frame member, shown as second lateral member 122, a second actuator, shown as second cylinder 124, and a second contact pad, shown as second contact pad 128. The second cylinder 124 includes a second cylinder barrel, shown as second cylinder barrel 125, and a second rod, shown as second rod 126. The second rod 126 is coupled to the second contact pad 128. The second cylinder 124 is positioned to extend the second contact pad 128 downward by extending the second rod 126 from the second cylinder barrel 125. The second cylinder 124 extends the second contact pad 128 into contact with the ground surface 170. In one embodiment, the second cylinder 124 is a hydraulic cylinder. In other embodiments, the second cylinder 124 is another type of actuator (e.g., a linear actuator, a rotary actuator, or still another type of device, etc.) that may be powered hydraulically, electrically, or still otherwise powered.

Figure 43:
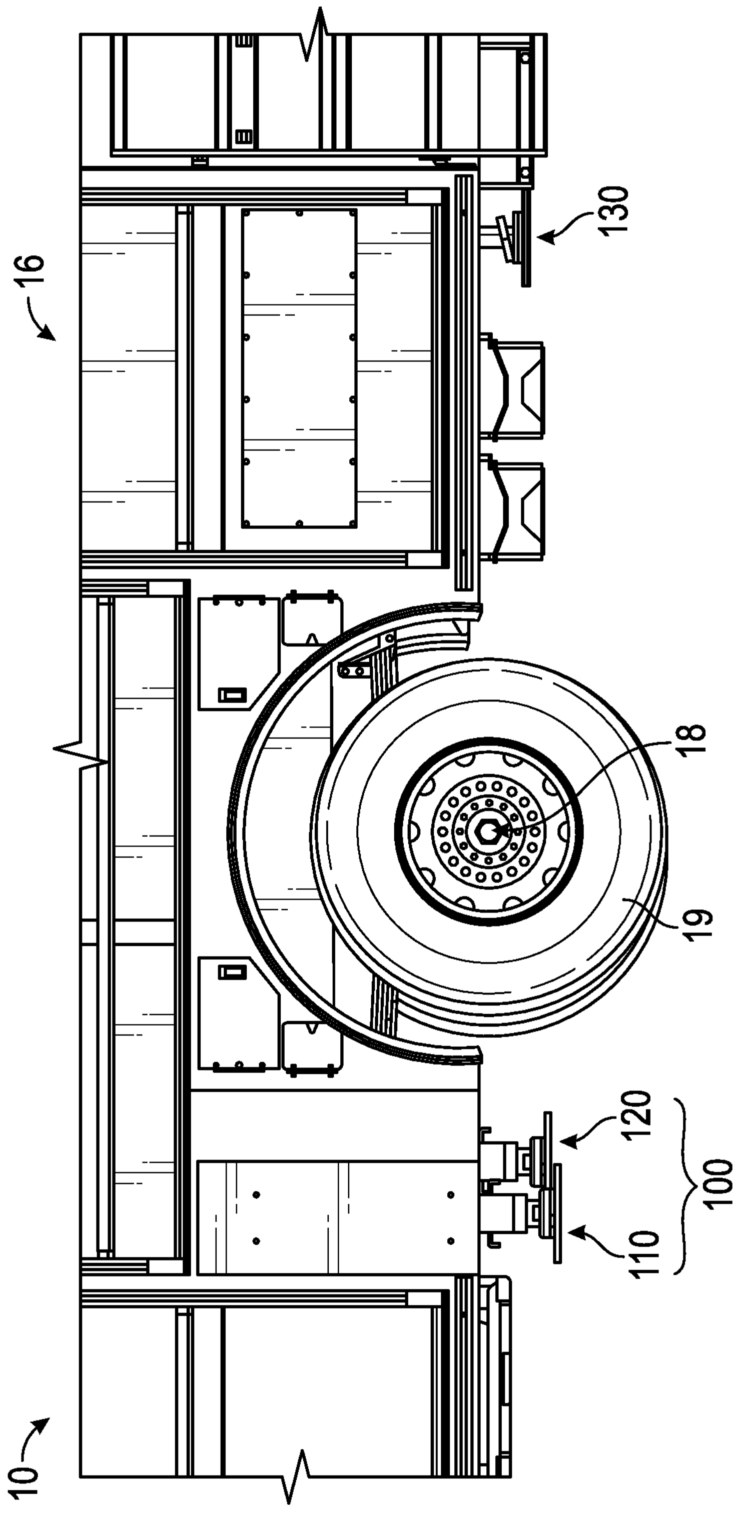
FIG. 43 is a left side view of a single set of outriggers and a stability foot provided with the fire apparatus of FIG. 1, according to an exemplary embodiment.

According to the exemplary embodiment shown in FIGS. 6 and 43-44, the outrigger housing 106 slidably couples the first outrigger 110 and the second outrigger 120 to the frame 12. As shown in FIG. 44, the first lateral member 112 and the second lateral member 122 are disposed in the fully extended position and spaced a distance 160. In one embodiment, an actuator (e.g., a linear actuator, a rotary actuator, etc.) or a pair of actuators is positioned within the outrigger housing 106 to extend the first lateral member 112 and the second lateral member 122 laterally outward from opposing lateral sides of the frame 12. The distance 160 may be the distance between the center of the first contact pad 118 and the center of the second contact pad 128 when the pair of outriggers 100 is fully extended. In one embodiment, the distance 160 is no more than eighteen feet. In other embodiments, the distance 160 is greater than eighteen feet.

As shown in FIG. 44, the stability foot 130 includes a third actuator, shown as third cylinder 134, and a third contact pad, shown as third contact pad 138. The third cylinder 134 includes a third cylinder barrel, shown as third cylinder barrel 135, and a third rod, shown as third rod 136. The third rod 136 is coupled to the third contact pad 138. The third cylinder 134 is positioned to extend the third contact pad 138 downward by extending the third rod 136 from the third cylinder barrel 135. The third cylinder 134 extends the third contact pad 138 into contact with the ground surface 170. In one embodiment, the third cylinder 134 is a hydraulic cylinder. In other embodiments, the third cylinder 134 is another type of actuator (e.g., a linear actuator, a rotary actuator, or still another type of device, etc.) that may be powered hydraulically, electrically, or still otherwise powered.

Referring to FIGS. 43-44, the fire apparatus 10 includes a pair of front tires, shown as front tires 17, and a set of rear tires, shown as rear tires 19. When actuated, the first outrigger 110, the second outrigger 120, and the stability foot 130 elevate the rear section 16 of the fire apparatus 10 from the ground surface 170. The front tires 17 may remain in contact with the ground surface 170, while the rear tires 19 may be lifted a height, shown as height 150, above the ground surface 170. In one embodiment, the height 150 is less than twelve inches. In other embodiments, the height 150 is at least twelve inches.

As shown in FIGS. 46-51, a load, shown as load 600 (e.g., tip load, tip capacity, etc.), may be applied to the aerial ladder assembly 200 (e.g., at the furthest-most rung of fly section 280, etc.), and various components of the fire apparatus 10 each have a center of gravity ("CG"). Such components may have a first CG, shown as ladder assembly CG 610, a second CG, shown as front cabin CG 620, a third CG, shown as pump CG 630, a fourth CG, shown as water tank CG 640, a fifth CG, shown as rear section CG 650, and a sixth CG, shown as turntable CG 660. The ladder assembly CG 610 may be representative of the CG of the four ladder sections of the aerial ladder assembly 200 (e.g., the base section 220, the lower middle section 240, the upper middle section 260, the fly section 280, etc.). The front cabin CG 620 may be representative of the CG of the various components in and around the front cabin 20 (e.g., the front axle 18, front tires 17, front suspension 54, front body assembly, front portion of the chassis, etc.). The pump CG 630 may be representative of the CG of the pump 22 and the components of the pump house 50. The water tank CG 640 may be representative of the CG of the water tank 58. The rear section CG 650 may be representative of the CG of the various component of the rear section 16 (e.g., the rear axle 18, rear tires 19, outriggers 100, stability foot 130, torque box 400, pedestal 402, ground ladders 46, rear body assembly, rear portion of the chassis, etc.). The turntable CG 660 may be representative of the CG of the turntable 300.

Figure 46:
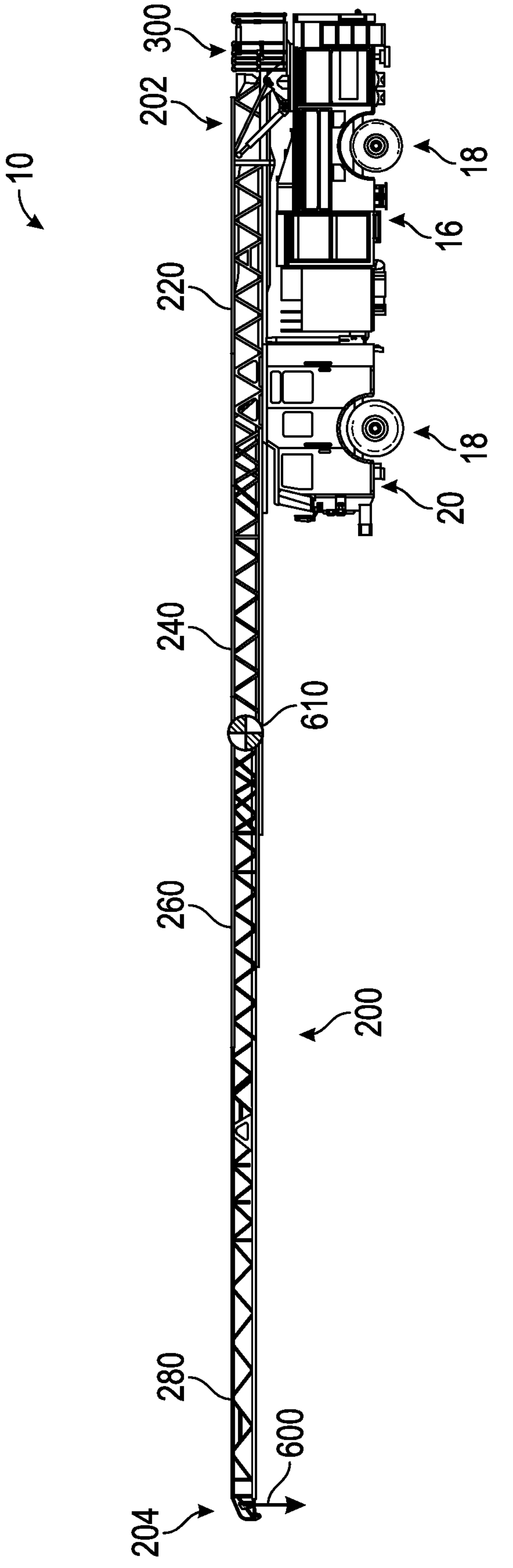
FIG. 46 is a left side view of the fire apparatus of FIG. 1 with an aerial ladder assembly extended, according to an exemplary embodiment.
Figure 47:
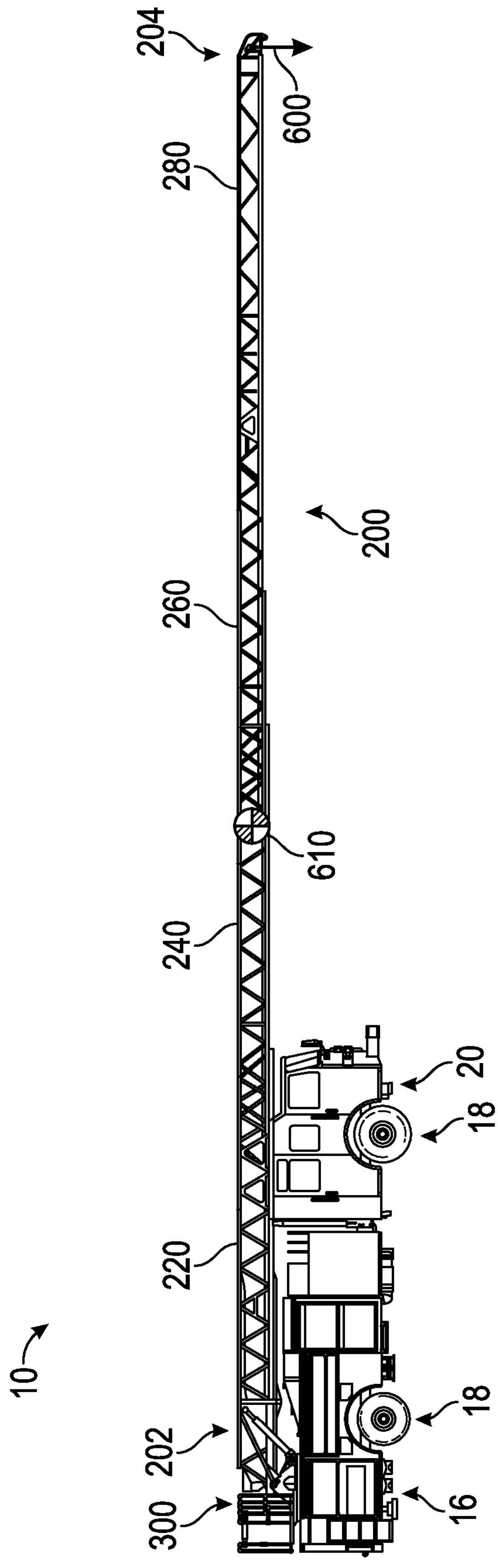
FIG. 47 is a right side view of the fire apparatus of FIG. 1 with an aerial ladder assembly extended, according to an exemplary embodiment.

As shown in FIGS. 48-51, the aerial ladder assembly 200 is disposed in a retracted configuration. During operation, the aerial ladder assembly 200 may be extended as shown in FIGS. 46-47. While shown in FIGS. 48-51 as disposed in the retracted configuration, it should be understood that the aerial ladder assembly 200 may be extended during use in various operating orientations. A variety of stability lines are generated for the fire apparatus 10 while in the various operating orientations. The stability lines may be disposed along the single front axle 18, through the center of the single front axle 18 and one of the first outrigger 110 and the second outrigger 120, through the stability foot 130 and one of the first outrigger 110 and the second outrigger 120, or laterally across the stability foot 130, among other alternatives.

The various components of the fire apparatus 10 produce a positive moment or a negative moment that varies based on the location of their respective CGs. Positive moments (e.g., torques, etc.) may be generated by load 600 and the weights of components having CGs located on a first side of the stability line (e.g., a side of the stability line where the load 600 is located, etc.). Negative moments may be generated by the weights of components having CGs located on an opposing second side of the stability line (e.g., a side of the stability line where the load 600 is not located, etc.). According to an exemplary embodiment, various components of the fire apparatus 10 (e.g., frame 12, turntable 300, rear section 16, pump 22, water tank 58, etc.) are positioned such that their weights counterbalance a total positive moment (e.g., generated by load 600 and the weights of components having CGs located on the first side of the stability line, etc.) when the aerial ladder assembly 200 is extended to the horizontal reach of at least 90 feet (e.g., at least 100 feet, etc.). The magnitude of the positive and negative moments are proportional to the distances (e.g., perpendicular distances, etc.) between the component's CG and the stability line (e.g., a greater distance from the stability line increases the moment, a shorter distance from the stability line decreases the moment, a CG disposed on the stability line results in a negligible moment or zero moment, etc.).

Figure 48:
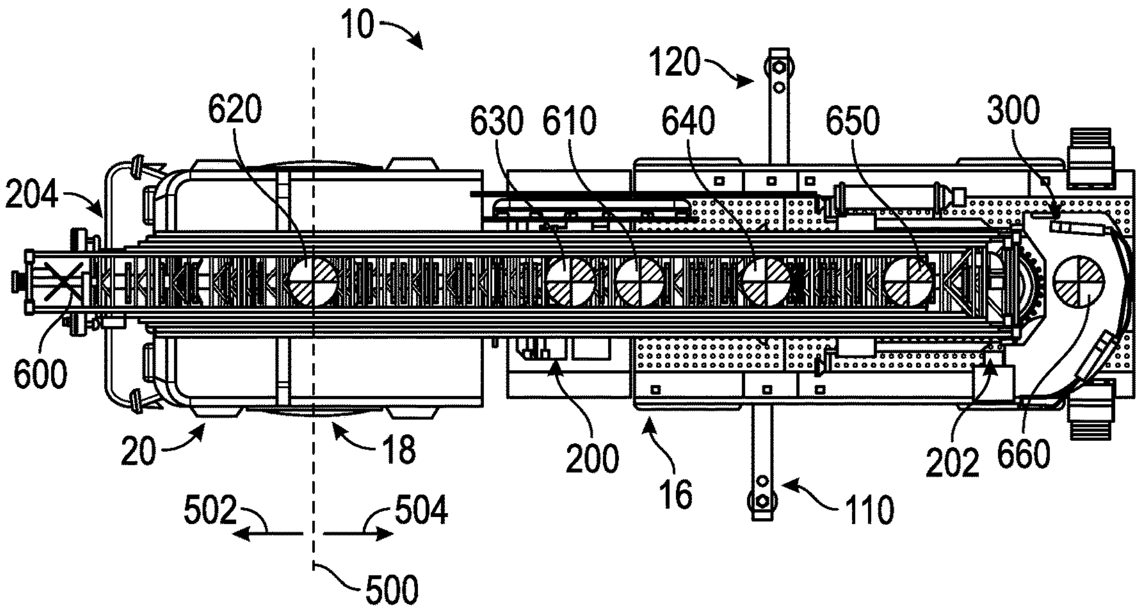
FIG. 48 is a top view of the fire apparatus of FIG. 1 with the single set of outriggers extended and an aerial ladder assembly positioned forward, according to an exemplary embodiment.

As shown in FIGS. 46-48, the aerial ladder assembly 200 is configured in a first operating orientation. In the first operating orientation, the aerial ladder assembly 200 is disposed in a forward position in which the aerial ladder assembly 200 extends over the front cabin 20 (e.g., parallel to the longitudinal axis 14, etc.). When aerial ladder assembly 200 is extended, the ladder assembly CG 610 may be positioned forward of the front cabin 20 (e.g., within the lower middle section 240, near the connection between the lower middle section 240 and the upper middle section 260 of the aerial ladder assembly 200, etc.). As shown in FIG. 48, the fire apparatus 10 includes a stability line 500 when the aerial ladder assembly 200 is selectively positioned in the first operating orientation (e.g., a forward position, etc.). The stability line 500 is disposed along the single front axle 18. As shown in FIG. 48, when the load 600 is applied to the second end 204 of the aerial ladder assembly 200 while in the first operating orientation, the load 600 generates a first positive moment 502 about the stability line 500. The ladder assembly CG 610 generates a second positive moment 502 about the stability line 500. The front cabin CG 620 may generate a negligible moment about the stability line 500 as the front cabin CG 620 may be substantially disposed along the stability line 500. The pump CG 630, the water tank CG 640, the rear section CG 650, and the turntable CG 660, among other components, generate negative moments 504 about the stability line 500. In the first operating orientation, the negative moments 504 at least balance the positive moments 502 while the aerial ladder assembly 200 is extended to the horizontal reach of at least 90 feet (e.g., at least 100 feet, etc.) and a load 600 of at least 750 pounds is applied.

Figure 49:
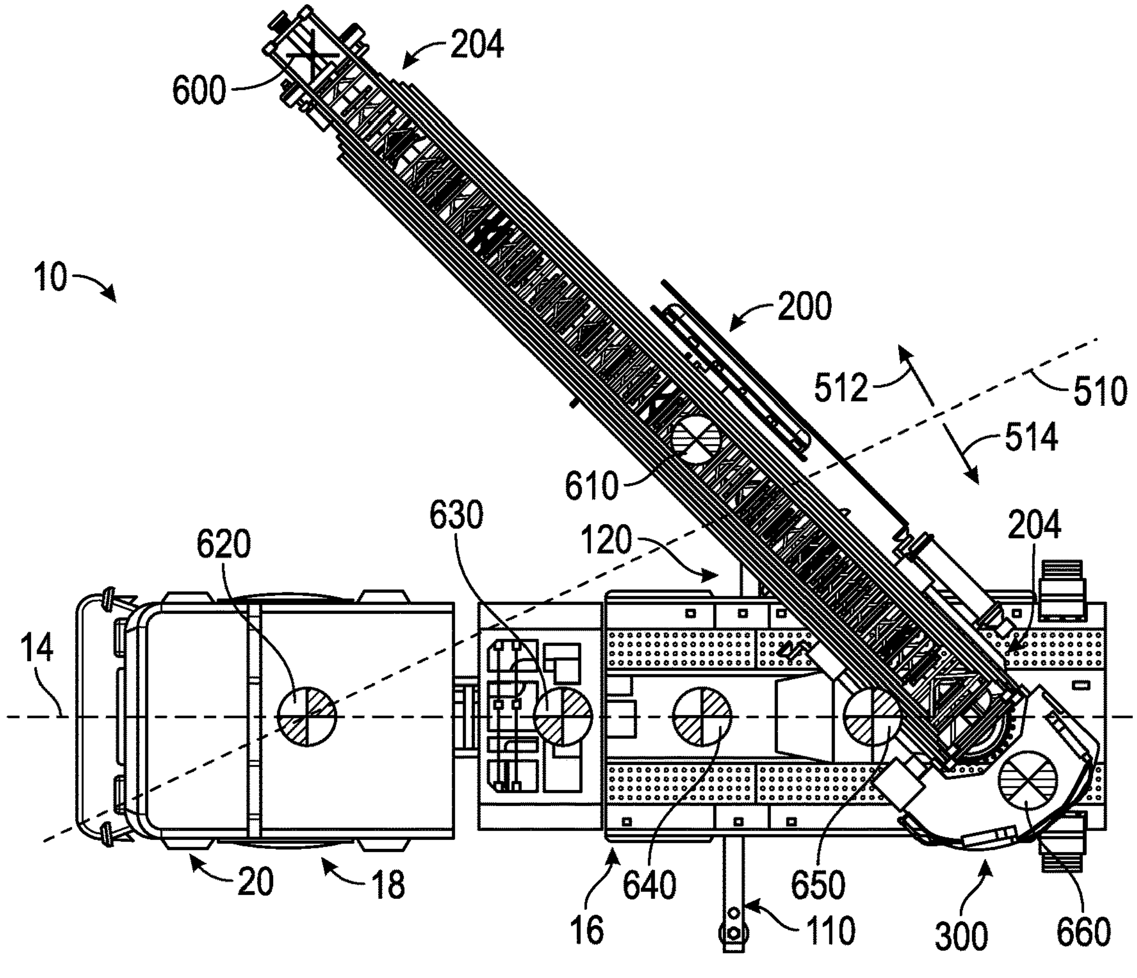
FIG. 49 is a top view of the fire apparatus of FIG. 1 with the single set of outriggers extended and an aerial ladder assembly positioned at a forward angle, according to an exemplary embodiment.

As shown in FIG. 49, the aerial ladder assembly 200 is configured in a second operating orientation. In the second operating orientation, the aerial ladder assembly 200 is disposed in a forward angled position in which the aerial ladder assembly 200 extends off to a side of the fire apparatus 10, biased towards the front cabin 20. As shown in FIG. 49, the fire apparatus 10 includes a stability line 510 when the aerial ladder assembly 200 is selectively positioned in the forward angled position (e.g., a forward angled position to the right side, a forward angled position to the left side, etc.). As shown in FIG. 49, the aerial ladder assembly 200 is selectively positioned to extend off to the right side of the fire apparatus 10 at a forward angle. The stability line 510 may extend through the center of the single front axle 18 and the second outrigger 120. In other embodiments, the aerial ladder assembly 200 is selectively positioned to extend off to the left side of the fire apparatus 10 at a forward angle, and the stability line 510 may extend through the center of the single front axle 18 and the first outrigger 110. As shown in FIG. 49, when the load 600 is applied to the second end 204 of the aerial ladder assembly 200 while in the second operating orientation, the load 600 generates a first positive moment 512 about the stability line 510. The ladder assembly CG 610 generates a second positive moment 512 about the stability line 510. The front cabin CG 620 may generate a negligible moment about the stability line 510 as the front cabin CG 620 may be substantially disposed along the stability line 510. The pump CG 630, the water tank CG 640, the rear section CG 650, and the turntable CG 660, among other components, generate negative moments 514 about the stability line 510. In the second operating orientation, the negative moments 514 at least balance the positive moments 512 while the aerial ladder assembly 200 is extended to the horizontal reach of at least 90 feet (e.g., at least 100 feet, etc.) and a load 600 of at least 750 pounds is applied.

Figure 50:
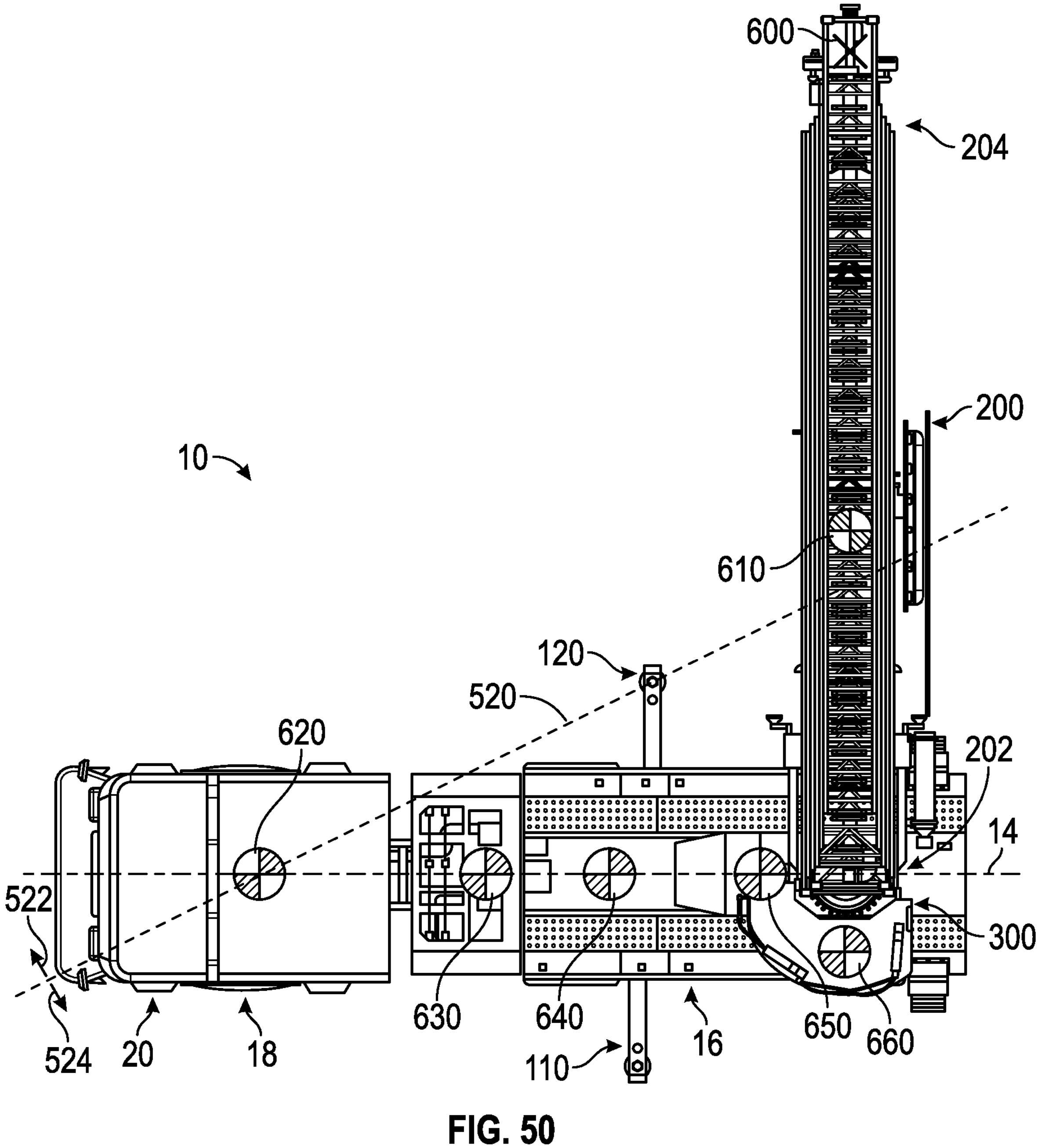
FIG. 50 is a top view of the fire apparatus of FIG. 1 with the single set of outriggers extended and an aerial ladder assembly positioned to one side, according to an exemplary embodiment.

As shown in FIG. 50, the aerial ladder assembly 200 is configured in a third operating orientation. In the third operating orientation, the aerial ladder assembly 200 is disposed in a sideward position in which the aerial ladder assembly 200 extends from a lateral side of the chassis (e.g., perpendicular to the longitudinal axis 14, etc.). As shown in FIG. 50, the fire apparatus 10 includes a stability line 520 when the aerial ladder assembly 200 is selectively positioned in the third operating orientation (e.g., laterally to the right side, laterally to the left side, etc.). As shown in FIG. 50, the aerial ladder assembly 200 is selectively positioned to extend laterally off to the right side of the fire apparatus 10. The stability line 520 may extend through the center of the single front axle 18 and the second outrigger 120. In other embodiments, the aerial ladder assembly is selectively positioned to extend laterally off to the left side of the fire apparatus 10, and the stability line 520 may extend through the center of the single front axle 18 and the first outrigger 110. As shown in FIG. 20, when the load 600 is applied to the second end 204 of the aerial ladder assembly 200 while in the third operating orientation, the load 600 generates a first positive moment 522 about the stability line 520. The ladder assembly CG 610 generates a second positive moment 522 about the stability line 520. The front cabin CG 620 may generate a negligible moment about the stability line 520 as the front cabin CG 620 may be substantially disposed along the stability line 520. The pump CG 630, the water tank CG 640, the rear section CG 650, and the turntable CG 660, among other components, generate negative moments 524 about the stability line 520. In the third operating orientation, the negative moments 524 at least balance the positive moments 522 while the aerial ladder assembly 200 is extended to the horizontal reach of at least 90 feet (e.g., at least 100 feet, etc.) and a load 600 of at least 750 pounds is applied.

Figure 51:
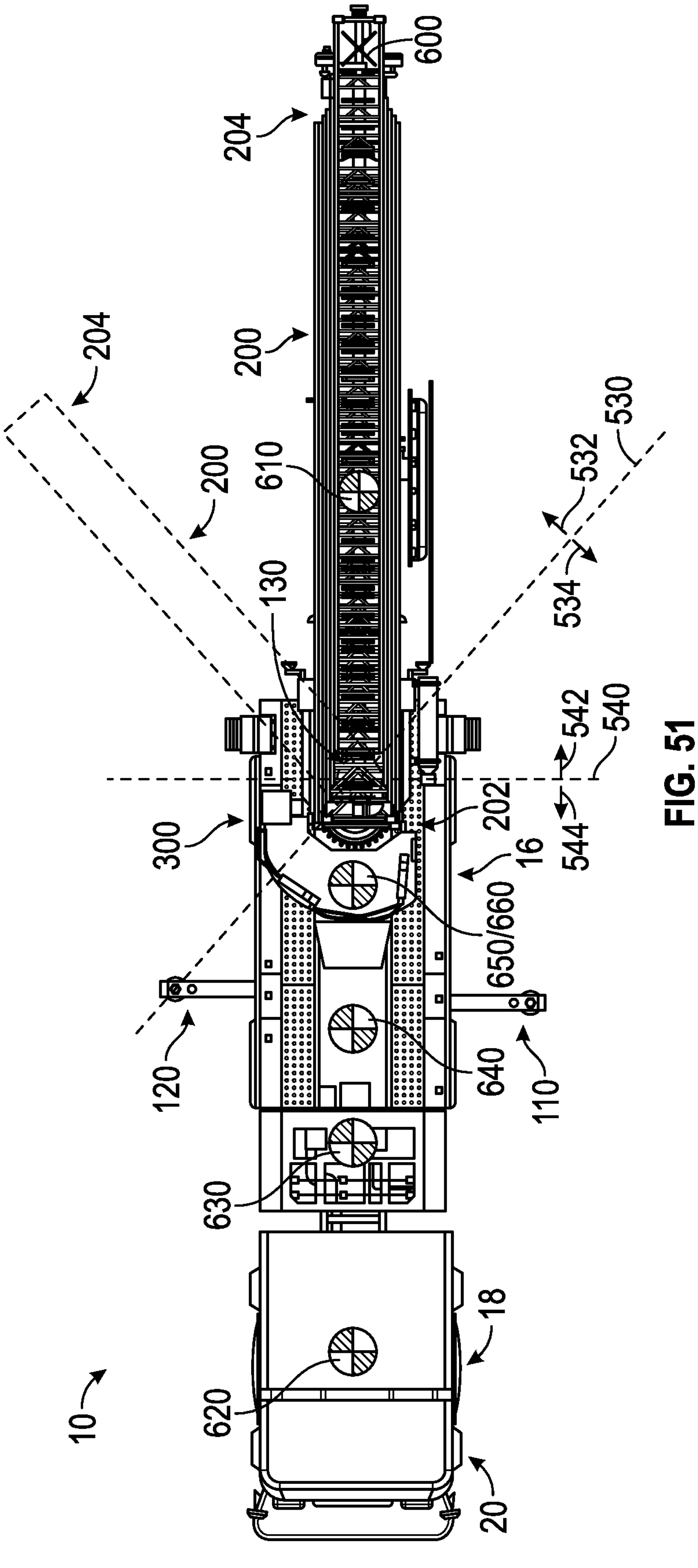
FIG. 51 is a top view of the fire apparatus of FIG. 1 with the single set of outriggers extended and an aerial ladder assembly positioned both at a rearward angle and backward, according to an exemplary embodiment.

As shown in FIG. 51, the aerial ladder assembly 200 is configured in a fourth operating orientation and a fifth operating orientation. In the fourth operating orientation, the aerial ladder assembly 200 is disposed in a rearward angled position in which the aerial ladder assembly 200 is extended off to a side of the fire apparatus 10, biased towards the rear section 16. As shown in FIG. 51, the fire apparatus 10 includes a stability line 530 when the aerial ladder assembly 200 is selectively positioned in the fourth operating orientation (e.g., a rearward angled position to the right side, a rearward angled position to the left side, etc.). As shown in FIG. 51, the aerial ladder assembly 200 is selectively positioned to extend off to the right side of the fire apparatus 10 at a rearward angle. The stability line 530 extends through the second outrigger 120 and the stability foot 130. In other embodiments, the aerial ladder assembly 200 is selectively positioned to extend off to the left side of the fire apparatus 10 at a rearward angle, and the stability line 530 extends through the first outrigger 110 and the stability foot 130. As shown in FIG. 51, the load 600 is applied to the second end 204 of the aerial ladder assembly 200 while in the fourth operating orientation, and the load 600 generates a first positive moment 532 about the stability line 530. The ladder assembly CG 610 generates a second positive moment 532 about the stability line 530. The front cabin CG 620, the pump CG 630, the water tank CG 640, the rear section CG 650, and the turntable CG 660, among other components, generate negative moments 534 about the stability line 530. In the fourth operating orientation, the negative moments 534 at least balance the positive moments 532 while the aerial ladder assembly 200 is extended to the horizontal reach of at least 90 feet (e.g., at least 100 feet, etc.) and a load 600 of at least 750 pounds is applied.

FIG. 51 also shows the aerial ladder assembly 200 configured in a fifth operating orientation. In the fifth operating orientation, the aerial ladder assembly 200 is disposed in a rearward position in which the aerial ladder assembly 200 extends away from the front cabin 20 (e.g., parallel to the longitudinal axis 14, opposite of the first operating orientation, etc.). As shown in FIG. 51, the fire apparatus 10 includes a stability line 540 when the aerial ladder assembly 200 is selectively positioned in the fifth operating orientation (e.g., an opposing rearward position, etc.). The stability line 540 is a line disposed laterally across the stability foot 130 (e.g., perpendicular to the aerial ladder assembly 200, perpendicular to the longitudinal axis 14, etc.). As shown in FIG. 51, when the load 600 is applied to the second end 204 of the aerial ladder assembly 200 while in the fifth operating orientation, the load 600 generates a first positive moment 542 about the stability line 540. The ladder assembly CG 610 generates a second positive moment 542 about the stability line 500. The front cabin CG 620, the pump CG 630, the water tank CG 640, the rear section CG 650, and the turntable CG 660, among other components, generate negative moments 544 about the stability line 540. In the fifth operating orientation, the negative moments 544 at least balance the positive moments 542 while the aerial ladder assembly 200 is extended to the horizontal reach of at least 90 feet (e.g., at least 100 feet, etc.) and a load 600 of at least 750 pounds is applied.

Figure 52:
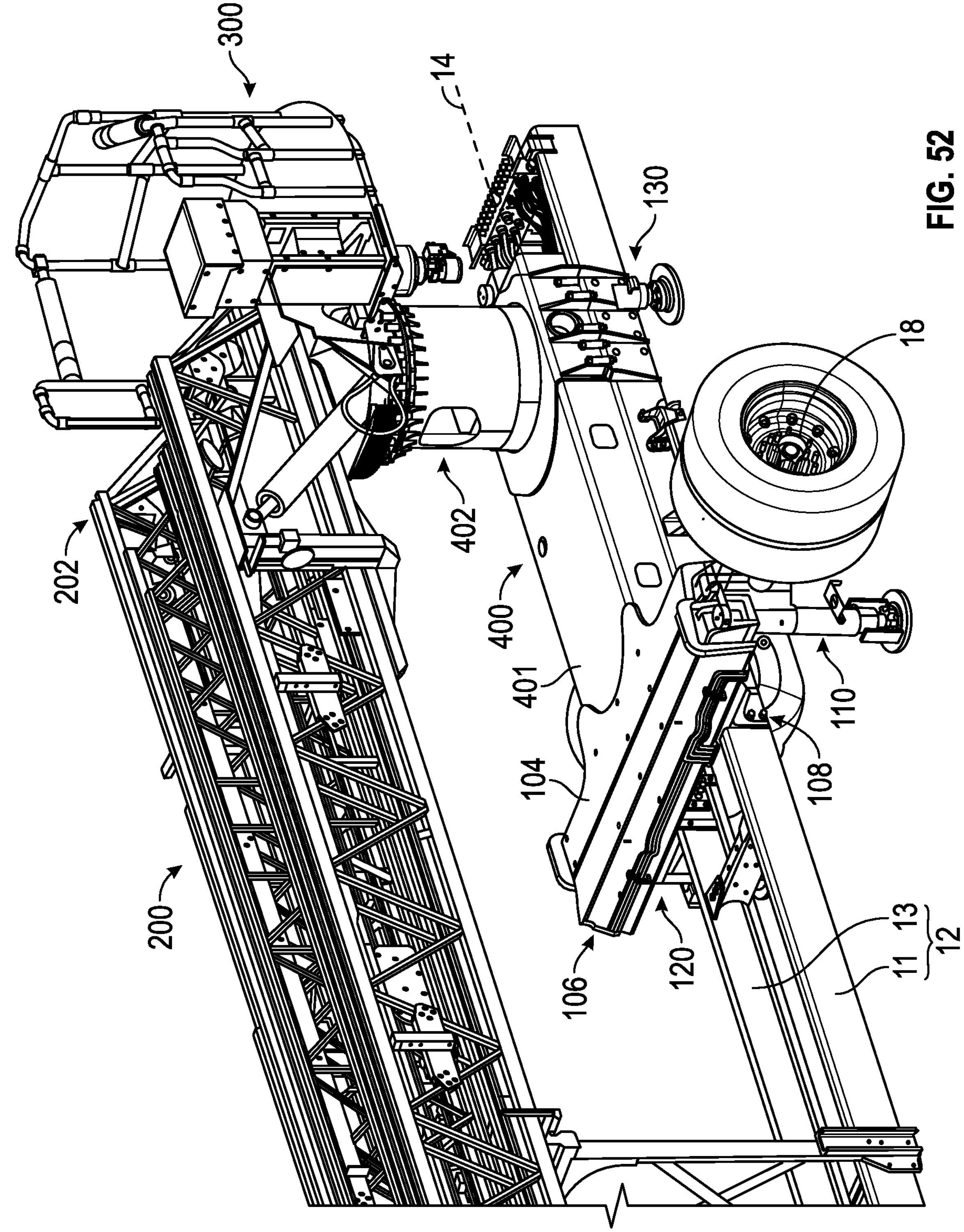
FIG. 52 is another front perspective view of the pedestal, the torque box, the turntable, the aerial ladder assembly, and the outrigger assembly of the fire apparatus, according to an exemplary embodiment.
Figure 53:
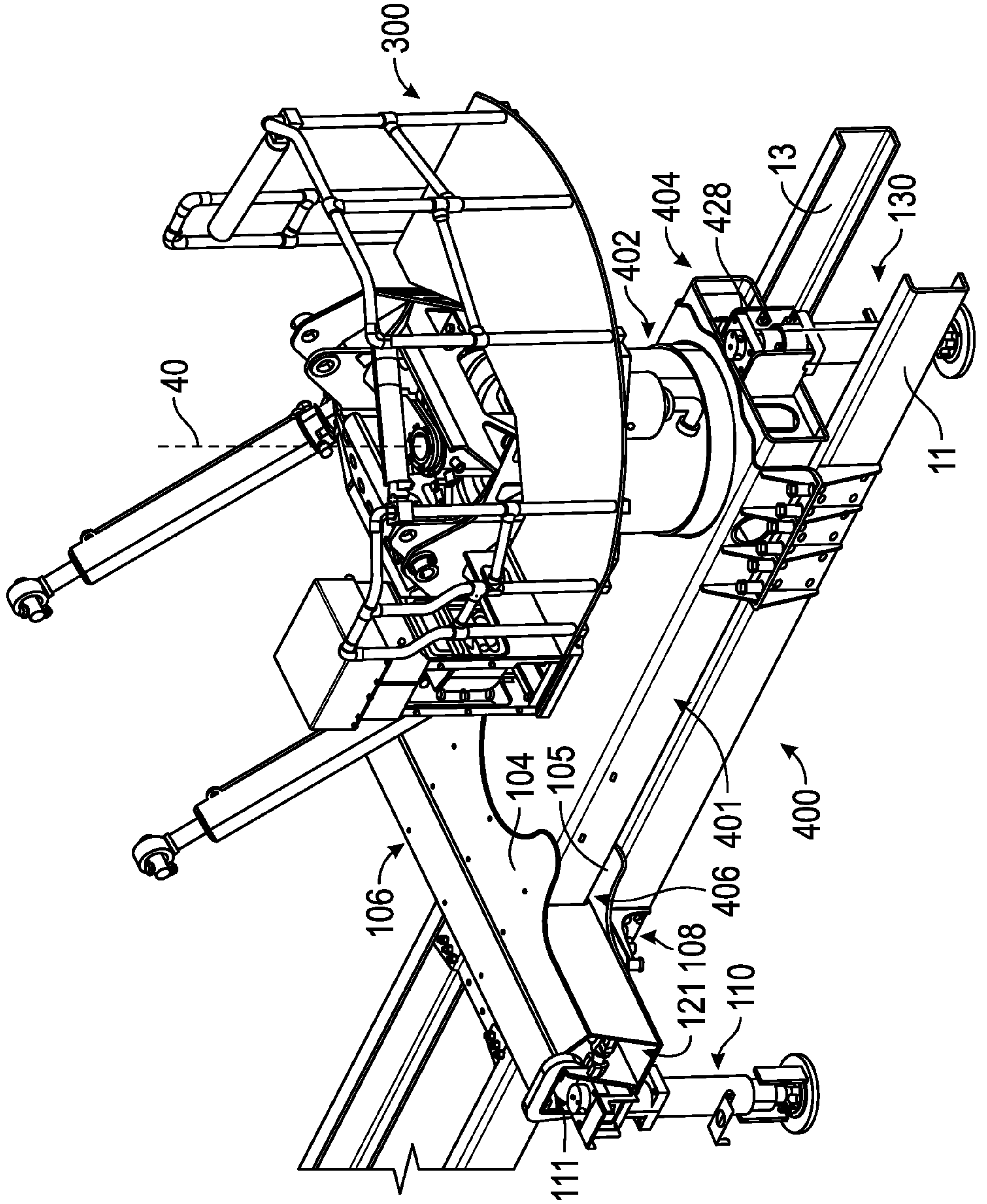
FIG. 53 is a rear perspective view of the outrigger assembly of FIG. 52, according to an exemplary embodiment.

According to the exemplary embodiment shown in FIG. 52, the first outrigger 110, the second outrigger 120, and the stability foot 130 are positioned to transfer loading from the aerial ladder assembly 200 to the ground (e.g., the ground surface 170, etc.). As shown in FIGS. 52-56, the outrigger housing 106 abuts the second end 406 of the tubular component 401. The top plate 104 is disposed across the top surface of the tubular component 401, while the bottom plate 105 is disposed across the bottom surface of the tubular component 401. According to an exemplary embodiment, the top plate 104 and the bottom plate 105 are welded to the tubular component 401. In other embodiments, the tubular component 401 is fastened to the top plate 104 and the bottom plate 105 (e.g., with bolts, etc.). The top plate 104 and the bottom plate 105 are shaped to distribute the stresses generated by the loading from the aerial ladder assembly 200.

Figure 54:
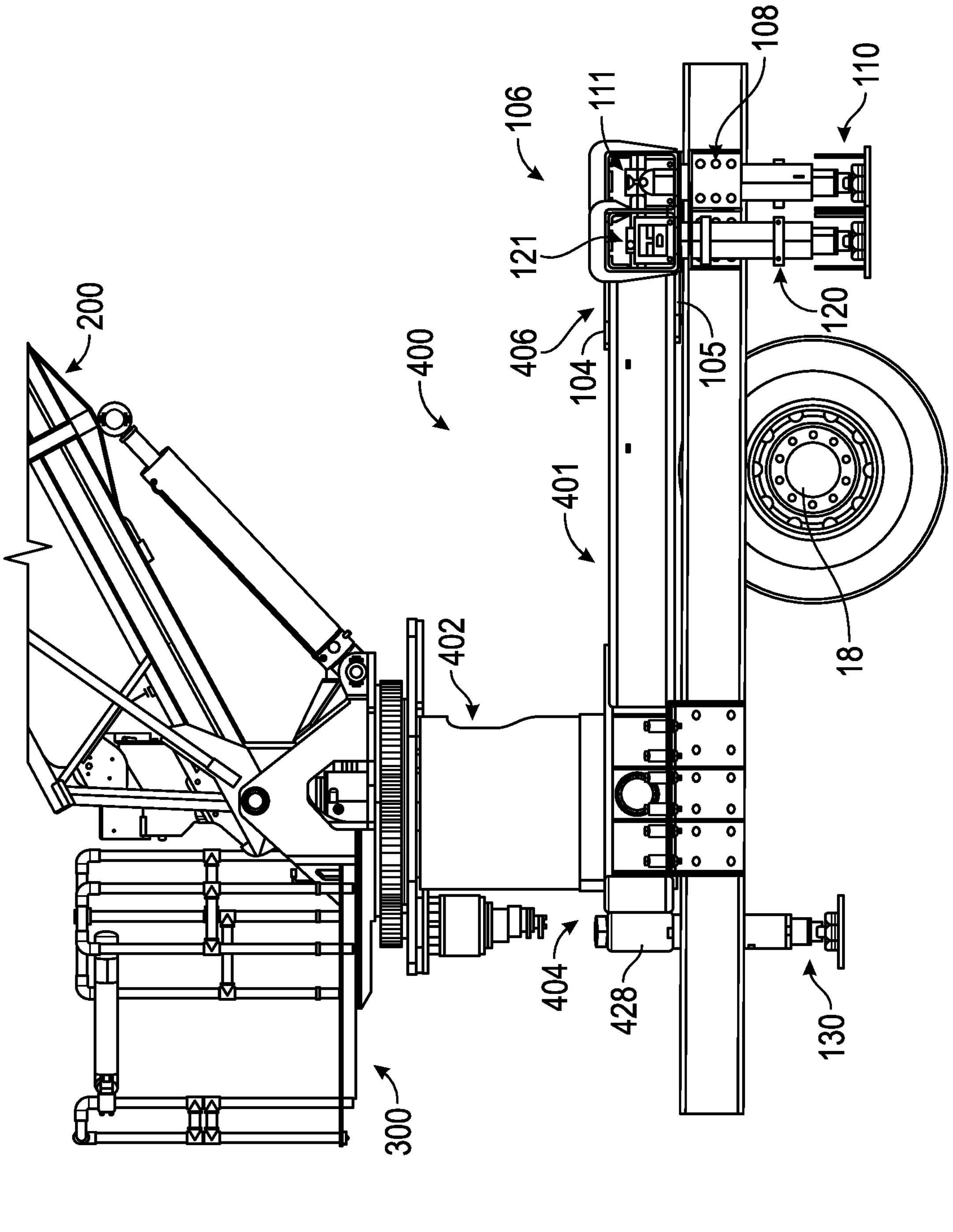
FIG. 54 is a right side view of the outrigger assembly of FIG. 52, according to an exemplary embodiment.
Figure 55:
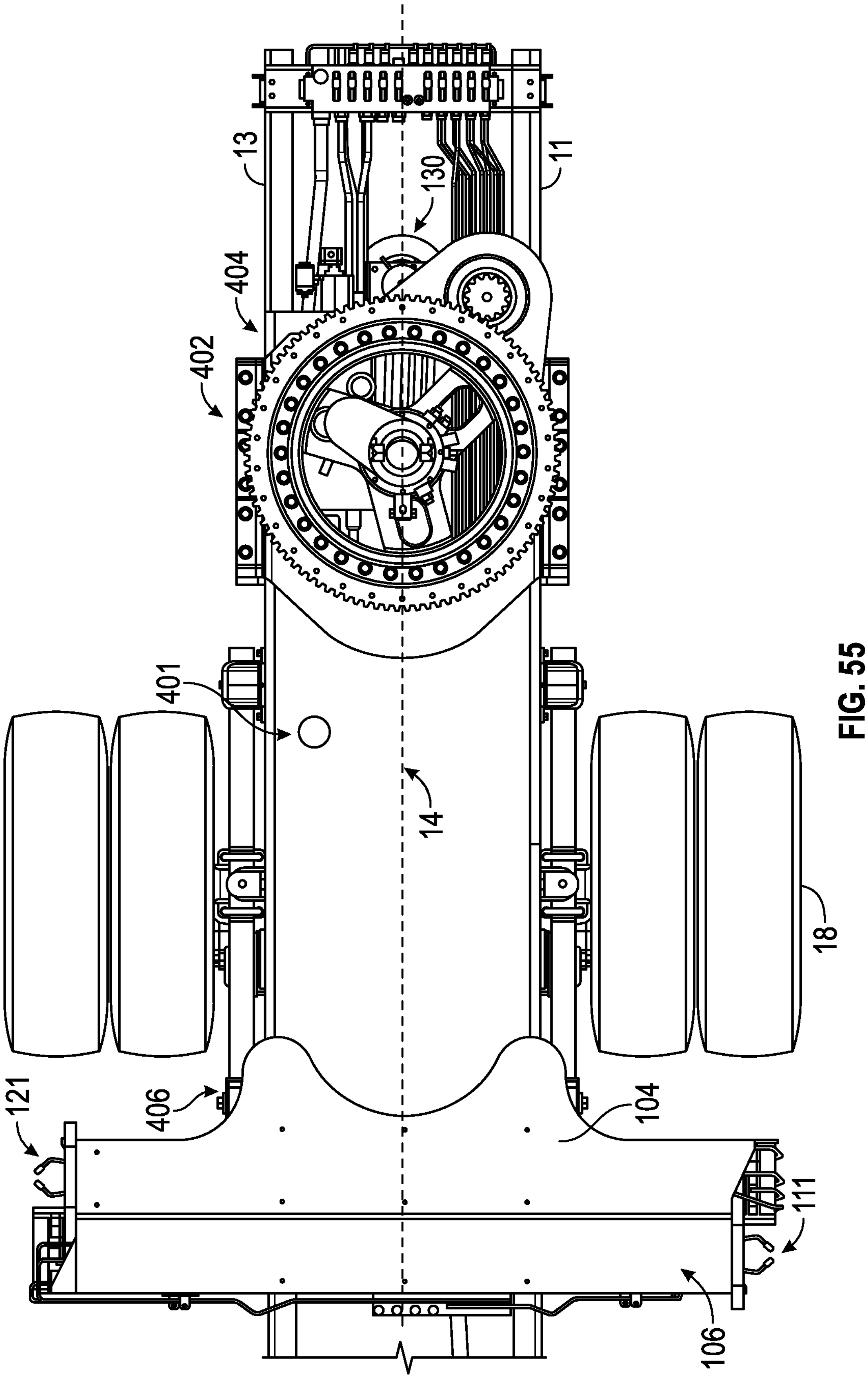
FIG. 55 is a top view of the outrigger assembly of FIG. 52, according to an exemplary embodiment.
Figure 56:
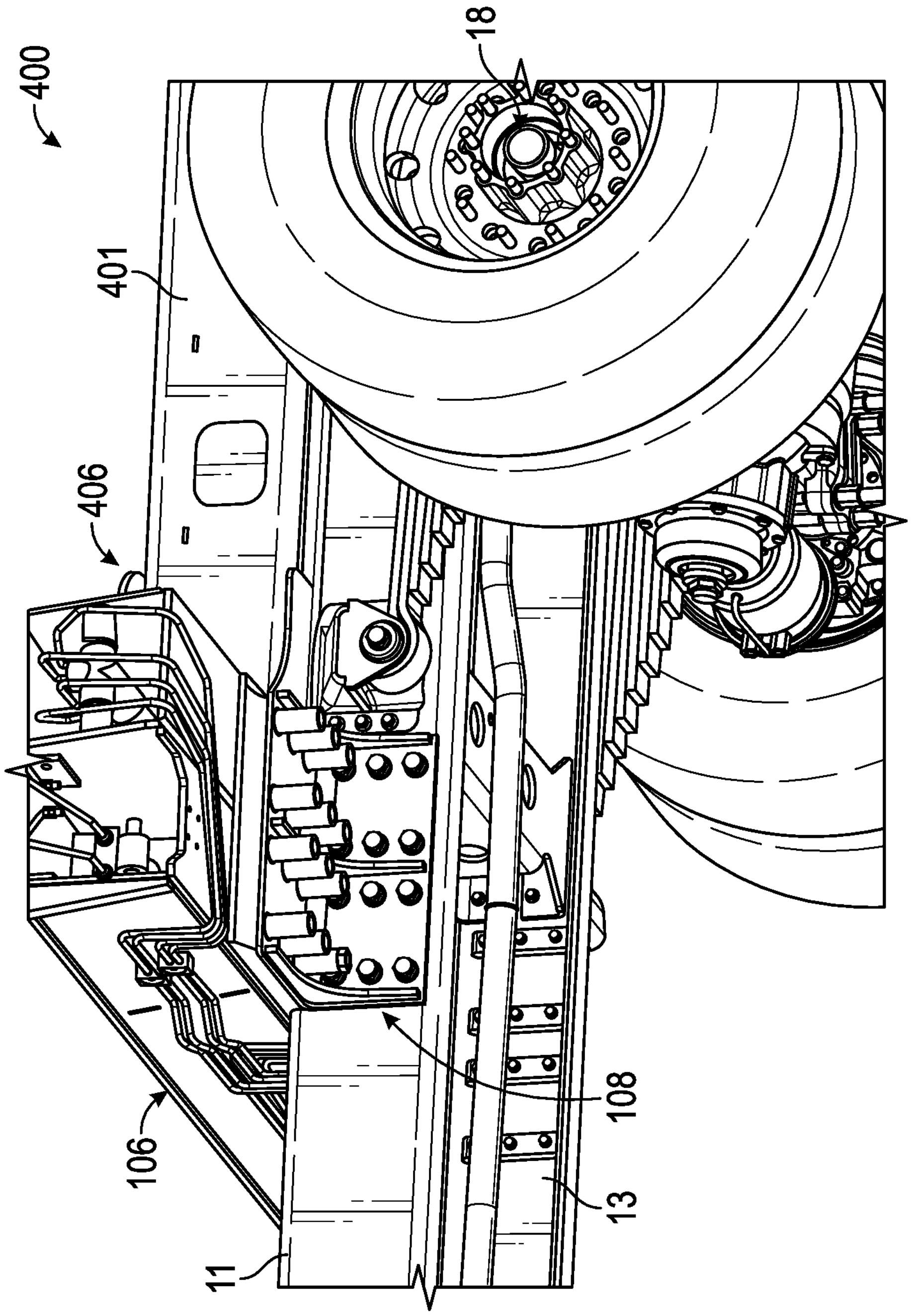
FIG. 56 is a perspective view of the connection of the outrigger assembly of FIG. 52 to the fire apparatus, according to an exemplary embodiment.

Referring still to FIGS. 52-56, the outrigger housing 106 is configured to store the set of outriggers 100. In one embodiment, the outrigger housing 106 slidably couples the first outrigger 110 and the second outrigger 120 to the frame 12. The outrigger housing 106 defines two apertures, a first slot 111 and a second slot 121. The first slot 111 is configured to receive the first lateral member 112 of the first outrigger 110, and the second slot 121 is configured to receive the second lateral member 122 of the second outrigger 120, according to an exemplary embodiment. As shown in FIGS. 52-54 and 56, the outrigger housing 106 is coupled to both the first frame rail 11 and the second frame rail 13 of the frame 12 with the housing brackets 108. As shown in FIGS. 52, 54, and 56, the housing brackets 108 couple the outriggers housing 106 (i.e., the outriggers 100, etc.) adjacent and slightly forward of the single rear axle 18.

According to an exemplary embodiment, the stability foot 130 is disposed rearward of the single rear axle 18. As shown in FIGS. 52-55 the stability foot is attached to the first end 404 of the tubular component 401 with the bracket 428. In one embodiment, the stability foot 130 is disposed not only rearward of the single rear axle 18, but also rearward of the pedestal 402. The stability foot 130 positioned rearward of the outriggers 100 increases the stability of the fire apparatus 10 when the aerial ladder assembly 200 is selectively repositioned into the opposing rearward operating orientation (e.g., the fifth operating orientation, etc.). As shown in FIG. 55, the stability foot 130 is positioned between the first frame rail 11 and the second frame rail 13 (e.g., along a center line of the frame 12, along the longitudinal axis 14, etc.). In alternate embodiments, the stability foot 130 is positioned on one side of the fire apparatus 10 (e.g., positioned to one side of the longitudinal axis 14, etc.). In still other embodiments, fire apparatus 10 includes a plurality of stability feet 130. For example, an individual stability foot 130 may be disposed along each of the first frame rail 11 and the second frame rail 13.

A first load path and a second load path may be defined when the outriggers 100 are in an extended position and the first contact pad 118 and the second contact pad 128 are engaged with the ground surface 170 (e.g., street, sidewalk, etc.). For example, when a fire fighter is climbing the extended aerial ladder assembly 200, his/her weight creates a force towards the ground that causes a moment (e.g., torque, etc.) about the connection between the aerial ladder assembly 200 and the turntable 300. This loading is then transferred from the turntable 300, down through the pedestal 402, and into the torque box 400. The tubular component 401 of the torque box 400 may carry the load along the longitudinal axis 14 and into the ground surface 170 through (a) the outrigger housing 106 and the first contact pad 118 (e.g., defining the first load path, etc.) and (b) the outrigger housing 106 and the second contact pad 128 (e.g., defining the second load path, etc.) of the set of outriggers 100.

A third load path may be defined when the third contact pad 138 of the stability foot 130 is in an extended position and is engaged with the ground surface 170 (e.g., street, sidewalk, etc.). For example, when a fire fighter is climbing the extended aerial ladder assembly 200, his/her weight creates a force towards the ground that causes a moment about the connection between the aerial ladder assembly 200 and the turntable 300. This loading is then transferred from the turntable 300 through the pedestal 402 and into the torque box 400. The tubular component 401 of the torque box 400 may carry the load along the longitudinal axis 14 and into the ground through the third contact pad 138 of the stability foot 130. The first, second, and third load paths may facilitate operating the aerial ladder assembly 200 in a plurality of operating configurations and at a horizontal reach of at least 90 feet (e.g., at least 100 feet, etc.).

Ladder Section Construction

It should be understood that the following disclosure regarding FIGS. 57-66 can be applied to the fire apparatus 10 and the aerial ladder assembly 200 of FIGS. 1-56. According to the exemplary embodiment shown in FIG. 57, a vehicle, shown as fire apparatus 1010, includes a chassis, shown as frame 1012, that defines a longitudinal axis 1014. A body assembly, shown as rear section 1016, axles 1018, and a cab assembly, shown as front cabin 1020, are coupled to frame 1012. In one embodiment, the longitudinal axis 1014 is generally aligned with a frame rail of the fire apparatus 1010 (e.g., front to back, etc.).

Figure 57:
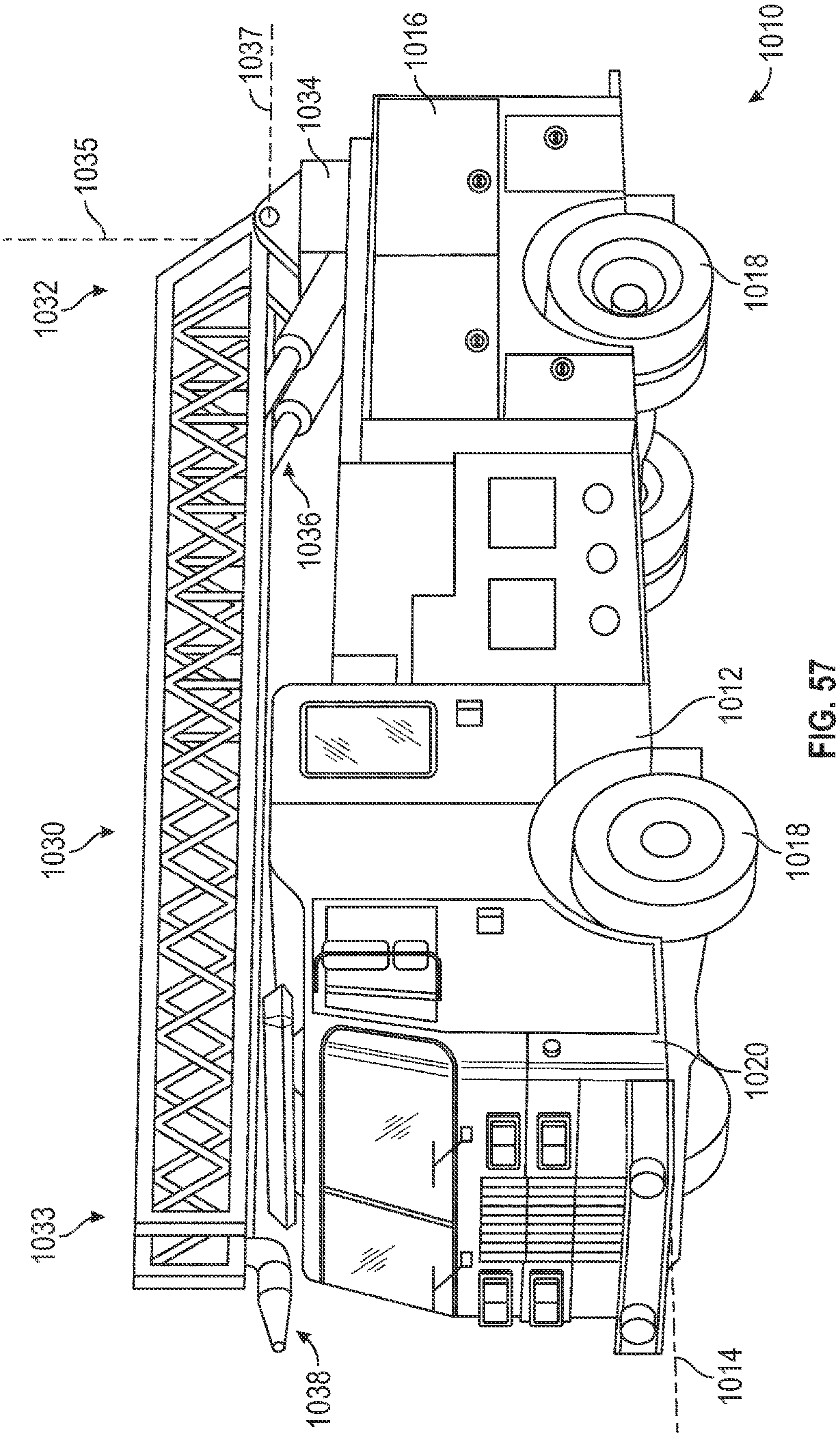
FIG. 57 is a front perspective view of a fire apparatus, according to an exemplary embodiment.

Referring still to the exemplary embodiment shown in FIG. 57, the front cabin 1020 is positioned forward of the rear section 1016 (e.g., with respect to a forward direction of travel for the vehicle along the longitudinal axis 1014, etc.). According to an alternative embodiment, the cab assembly may be positioned behind the rear section 1016 (e.g., with respect to a forward direction of travel for the vehicle along the longitudinal axis 1014, etc.). The cab assembly may be positioned behind the rear section 1016 on, by way of example, a rear tiller fire apparatus. In some embodiments, the fire apparatus 1010 is a ladder truck with a front portion that includes the front cabin 1020 pivotally coupled to a rear portion that includes the rear section 1016.

As shown in FIG. 57, the fire apparatus 1010 is an aerial truck that includes an aerial ladder assembly, shown as aerial ladder assembly 1030. While shown attached to fire apparatus 1010, aerial ladder assembly 1030 may be coupled to various types of vehicles (e.g., rescue vehicles, defense vehicles, lift vehicles, etc.). Aerial ladder assembly 1030 includes a first end 1032 (e.g., base end, proximal end, pivot end, etc.) and a second end 1033 (e.g., free end, distal end, platform end, implement end, etc.). While shown as a single ladder section, aerial ladder assembly 1030 may include a plurality of extensible ladder sections and have a first end 1032 and a second end 1033. According to an exemplary embodiment, aerial ladder assembly 1030 is coupled to frame 1012 at first end 1032. By way of example, aerial ladder assembly 1030 may be directly coupled to frame 1012 or indirectly coupled to frame 1012 (e.g., with an intermediate superstructure, etc.). As shown in FIG. 57, the first end 1032 of aerial ladder assembly 1030 is coupled to a turntable 1034. Turntable 1034 may be directly or indirectly coupled to frame 1012 (e.g., with an intermediate superstructure, via rear section 1016, etc.). According to an exemplary embodiment, turntable 1034 rotates relative to the frame 1012 about a generally vertical axis 1035. According to an exemplary embodiment, the turntable 1034 is rotatable a full 360 degrees relative to the frame 1012. In other embodiments, the rotation of the turntable 1034 relative to the frame 1012 is limited to a range less than 360 degrees or the turntable 1034 is fixed relative to the frame 1012. According to the exemplary embodiment shown in FIG. 57, the turntable 1034 is positioned at the rear end of the rear section 1016 (e.g., rear mount, etc.). In other embodiments, the turntable 1034 is positioned at the front end of the rear section 1016, proximate the front cabin 1020 (e.g., mid mount, etc.). In still other embodiments, the turntable 1034 is disposed along front cabin 1020 (e.g., front mount, etc.).

According to the exemplary embodiment shown in FIG. 57, first end 1032 is pivotally coupled to the turntable 1034 such that the aerial ladder assembly 1030 may be rotated about a generally horizontal axis 1037 with an actuator, shown as hydraulic cylinder 1036. The actuator may be a linear actuator, a rotary actuator, or still another type of device and may be powered hydraulically, electrically, or still otherwise powered. In one embodiment, aerial ladder assembly 1030 is rotatable between a generally horizontal lowered position (e.g., the position shown in FIG. 57, etc.) and a raised position. In one embodiment, extension and retraction of hydraulic cylinders 1036 rotates aerial ladder assembly 1030 about the horizontal axis 1037 and raises or lowers, respectively, the second end 1033 of aerial ladder assembly 1030. In the raised position, the aerial ladder assembly 1030 allows access between the ground and an elevated height for a fire fighter or a person being aided by the fire fighter.

Referring still to the exemplary embodiment shown in FIG. 57, an implement, shown as nozzle 1038 (e.g., deluge gun, water cannon, deck gun, etc.) is disposed at the second end 1033 of the aerial ladder assembly 1030. The nozzle 1038 is connected to a water source at ground level via intermediate conduit extending along the aerial ladder assembly 1030 (e.g., along the side of the aerial ladder assembly 1030, beneath the aerial ladder assembly 1030, in a channel provided in the aerial ladder assembly 1030, etc.). By pivoting the aerial ladder assembly 1030 to the raised position, the nozzle 1038 may be elevated to expel water from a higher elevation and facilitate suppressing a fire. In some embodiments, the second end 1033 of the aerial ladder assembly 1030 includes a basket. The basket may be configured to hold at least one of fire fighters and persons being aided by the fire fighters. The basket provides a platform from which a fire fighter may complete various tasks (e.g., operate the nozzle 1038, create ventilation, overhaul a burned area, perform a rescue operation, etc.).

In some embodiments, aerial ladder assembly 1030 is extendable and includes a plurality of sections that may be actuated between an extended configuration and a retracted configuration. By way of example, aerial ladder assembly 1030 may include multiple, nesting sections that telescope with respect to one another. In the extended configuration (e.g., deployed position, use position, etc.), the aerial ladder assembly 1030 is lengthened, and the second end 1033 is extended away from the first end 1032. In the retracted configuration (e.g., storage position, transport position, etc.), the aerial ladder assembly 1030 is shortened to withdraw the second end 1033 towards the first end 1032.

The aerial ladder assembly 1030 forms a cantilever structure. According to the exemplary embodiment shown in FIG. 57, aerial ladder assembly 1030 is supported by the hydraulic cylinders 1036 and by the turntable 1034 at the first end 1032. The aerial ladder assembly 1030 supports static loading from its own weight, the weight of any equipment coupled to the ladder (e.g., the nozzle 1038, a water line coupled to the nozzle, a platform, etc.), and the weight of any persons using the ladder. Aerial ladder assembly 1030 may also be subjected to various dynamic loads (e.g., due to forces imparted by a fire fighter climbing the aerial ladder assembly 1030, wind loading, loading due to rotation, elevation, or extension of aerial ladder assembly, etc.). Such static and dynamic loads are carried by aerial ladder assembly 1030. The forces carried by the hydraulic cylinders 1036, the turntable 1034, and frame 1012 may be proportional (e.g., directly proportional, etc.) to the length of the aerial ladder assembly 1030. Increasing at least one of the extension height rating, the horizontal reach rating, the static load rating, and the dynamic load rating traditionally increases the weight of aerial ladder assembly 1030, the weight of turntable 1034, or the weight of hydraulic cylinders 1036, among other components, and traditionally requires the use of a chassis having two rear axles. Aerial ladder assembly 1030 has an increased extension height rating and horizontal reach rating without requiring a chassis having two rear axles (e.g., a tandem axle assembly, etc.), according to an exemplary embodiment. Aerial ladder assembly 1030 described herein has an improved strength to weight ratio, thereby allowing for an aerial ladder assembly 1030 having an increased extension height an horizontal reach to be utilized on the fire apparatus 1010 having a single rear axle 1018. Fire apparatus 1010 having a single rear axle 1018 is smaller, lighter, more maneuverable, and less expensive to manufacture than fire apparatuses having two rear axles. According to an exemplary embodiment, the aerial ladder assembly 1030 for the fire apparatus 1010 has an extension height rating of at least 95 feet (e.g., 105 feet, 107 feet, etc.) and a horizontal reach rating of at least 90 feet (e.g., at least 100 feet, etc.).

Figure 58:
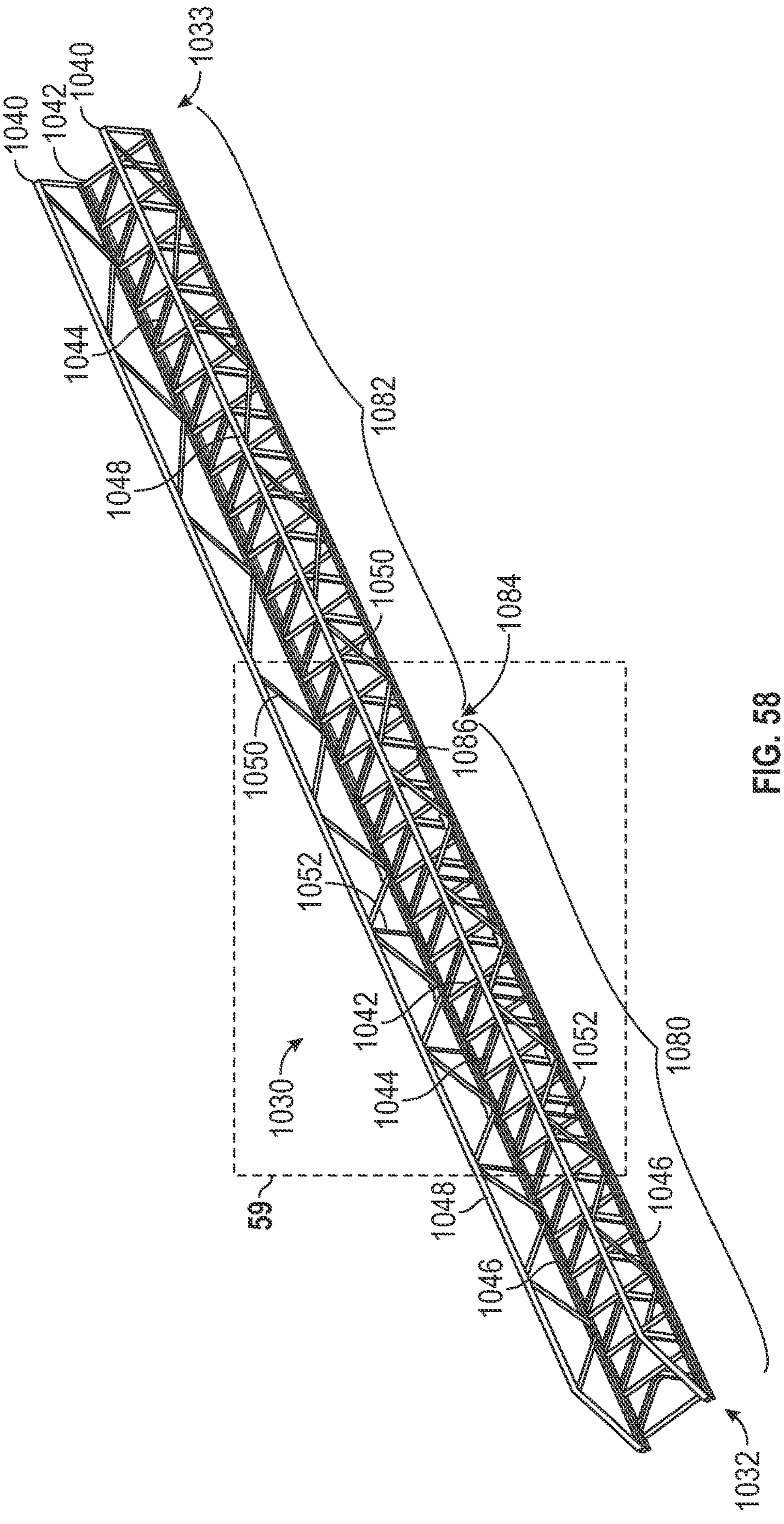
FIG. 58 is a perspective view of a ladder assembly for a fire apparatus, according to an exemplary embodiment.
Figure 59:
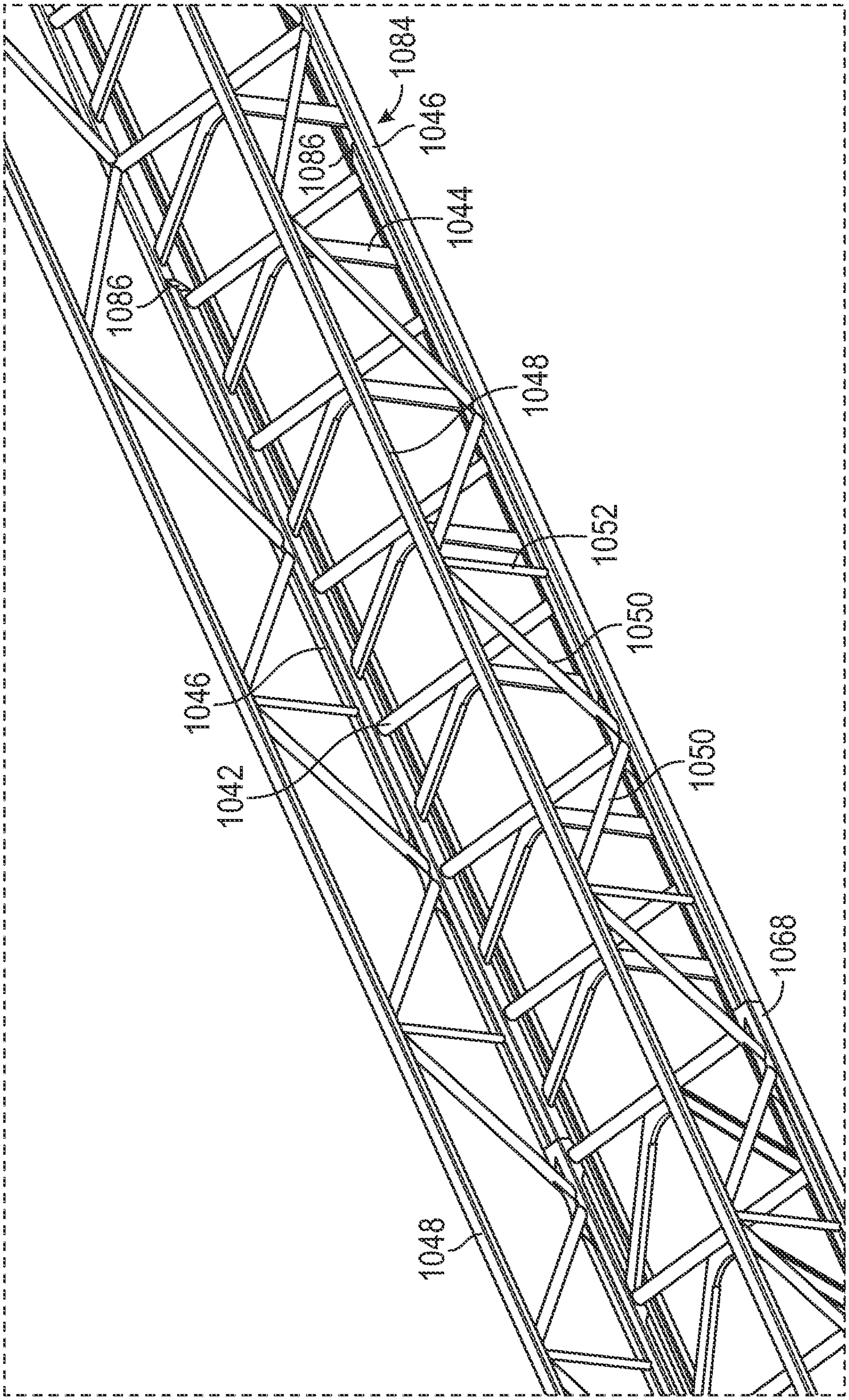
FIG. 59 is a detail perspective view of the ladder assembly of FIG. 58, according to an exemplary embodiment.
Figure 60:
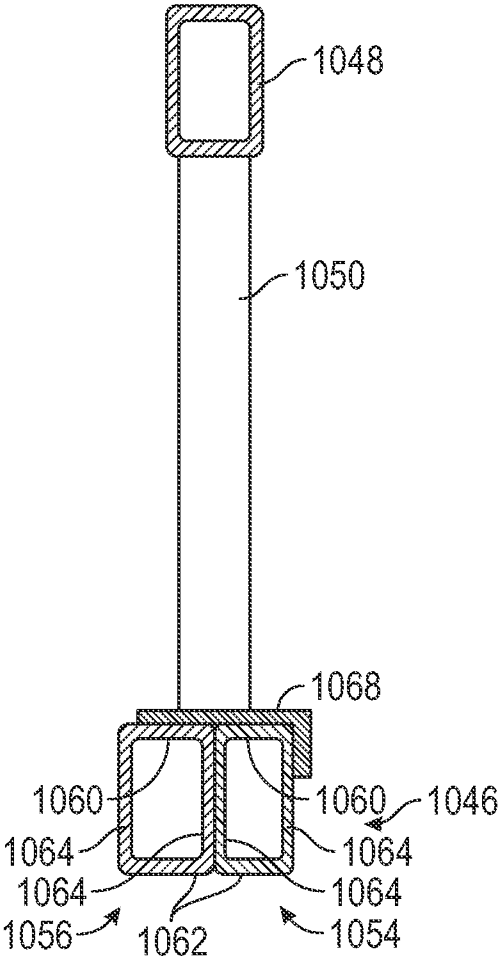
FIG. 60 is a sectional view of a truss member of the ladder assembly of FIG. 58, according to an exemplary embodiment.

Referring next to FIGS. 58-60, the aerial ladder assembly 1030 includes a plurality of structural members. In some embodiments, the aerial ladder assembly 1030 is a section (e.g., a fly section, etc.) of a telescoping ladder. According to the exemplary embodiment shown in FIGS. 58-60, aerial ladder assembly 1030 includes a pair of truss members, shown as truss members 1040. Truss members 1040 are structural members, according to an exemplary embodiment, that carry static and dynamic loading experienced by aerial ladder assembly 1030. In one embodiment, truss members 1040 are generally parallel and extend along a longitudinal direction. As shown in FIGS. 58-60, a plurality of cross members, shown as rungs 1042, couple the first truss member 1040 to the second truss member 1040. In one embodiment, rungs 1042 extend laterally between truss members 1040 (e.g., across the longitudinal direction along which truss members 1040 extend, etc.). As shown in FIGS. 58-60, rungs 1042 are supported by braces, shown as rung supports 1044.

According to an exemplary embodiment, the truss members 1040 each include a lower longitudinal member, shown as base rail 1046 (e.g., lower rail, bottom rail, etc.), and an upper longitudinal member, shown as hand rail 1048 (e.g., upper rail, top rail, etc.). As shown in FIGS. 58-60, base rails 1046 are separated an offset distance from one another, and hand rails 1048 are elevated relative to base rails 1046. The base rails 1046 are coupled to the hand rails 1048 by a plurality of supports, shown as lacing members 1050 and lacing members 1052. As shown in FIGS. 58-60, lacing members 1050 are angled relative to base rails 1046 and hand rails 1048. Lacing members 1052 are perpendicular to base rails 1046 and hand rails 1048, according to an exemplary embodiment. In one exemplary embodiment, truss members 1040 are generally vertically oriented, with each base rail 1046 and corresponding hand rail 1048 extending within the same vertical planes. According to an alternative embodiment, truss members 1040 are inclined relative to one another (e.g., disposed at an offset angle relative to one another, etc.), such that the distance between the base rails 1046 of the truss members 1040 is different than the distance between the hand rails 1048 of the truss members 1040.

As shown in the sectional view of FIG. 60, truss member 1040 includes a plurality of tubular components. According to an exemplary embodiment, hand rail 1048 is a hollow, tubular member. Hand rail 1048 may be a single, continuous tubular element or may include a plurality of tubular elements that are coupled (e.g., welded, etc.) end-to-end. As shown in FIG. 60, hand rail 1048 includes a tubular member having a rectangular cross sectional shape. In other embodiments, hand rail 1048 has a different cross sectional shape (e.g., round, oval, hexagonal, etc.). In still other embodiments, hand rail 1048 includes a different arrangement of structural components (e.g., a pair of tubular members, a solid angle element, a solid channel, a bar, etc.).

Referring still to FIG. 60, base rail 1046 includes a first member 1054 and a second member 1056. According to the exemplary embodiment shown in FIG. 60, first member 1054 is disposed inward of second member 1056 (e.g., first member 1054 is disposed closer to a centerline of aerial ladder assembly 1030, etc.). As shown in FIG. 60, first member 1054 and second member 1056 are hollow rectangular tubes. In one embodiment, first member 1054 and second member 1056 each have two side walls 1064 extending between a top wall 1060 and a bottom wall 1062. According to an exemplary embodiment, the first member 1054 and is positioned along the second member 1056 such that a side wall 1064 of the first member 1054 abuts a side wall 1064 of the second member 1056. In some embodiments, the side walls 1064 of the first member 1054 and the second member 1056 are welded together along an interface of the side walls 1064. By way of example, the first member 1054 and the second member 1056 may be welded together along a joint at the top or bottom of the side walls 1064. In other embodiments, the first member 1054 and the second member 1056 are welded together along top walls 1060 or bottom walls 1062 (e.g., with spot welds, etc.). Using thin-walled rectangular tubular components reduces the cost of aerial ladder assembly 1030.

Referring again to FIG. 58, the aerial ladder assembly 1030 has a first zone 1080 and a second zone 1082 separated by a transition point 1084. According to an exemplary embodiment, base rails 1046 have a shape (e.g., cross sectional shape, cross sectional area, thickness of material for the structural components, number of structural components, etc.) that corresponds to a particular length or length range along aerial ladder assembly 1030. The shape of base rails 1046 may vary along the length of aerial ladder assembly 1030. By way of example, the base rails 1046 may have a first shape within first zone 1080 and a second shape within second zone 1082. Such base rails 1046 may be tuned to the particular loading experienced by the particular length or length range of aerial ladder assembly 1030. According to an exemplary embodiment, the first zone 1080 is proximate to the first end 1032 of the aerial ladder assembly 1030 and the second zone 1082 is proximate the second end 1033 of the aerial ladder assembly 1030. In one embodiment, the base rails 1046 along first zone 1080 include both the first member 1054 and second member 1056 while the base rails 1046 along the second zone 1082 include only one rail (e.g., the first member 1054, etc.). By way of example, the first member 1054 may continue along both the first zone 1080 and the second zone 1082 of each the truss member 1040. One of the rails (e.g., the second member 1056, etc.) may terminate at the transition point 1084 between the first zone 1080 and the second zone 1082. As shown in FIG. 58, the second member 1056 tapers to an end 1086 at the transition point 1084.

In one embodiment, the aerial ladder assembly 1030 is unsupported at the second end 1033. The bending moments generated by the various loads imparted on the aerial ladder assembly 1030 are smaller at second end 1033 and larger at first end 1032, where the aerial ladder assembly 1030 is coupled to the turntable 1034 and to the hydraulic cylinders 1036. According to an exemplary embodiment, base rails 1046 include two tubular elements (e.g., first member 1054 and second member 1056, etc.) to carry the increased bending moment experienced by first zone 1080 of aerial ladder assembly 1030. Aerial ladder assembly 1030 having base rails 1046 that include a single tubular element (e.g., only first member 1054, etc.) along second zone 1082 has an increased strength-to-weight ratio.

Figure 61:
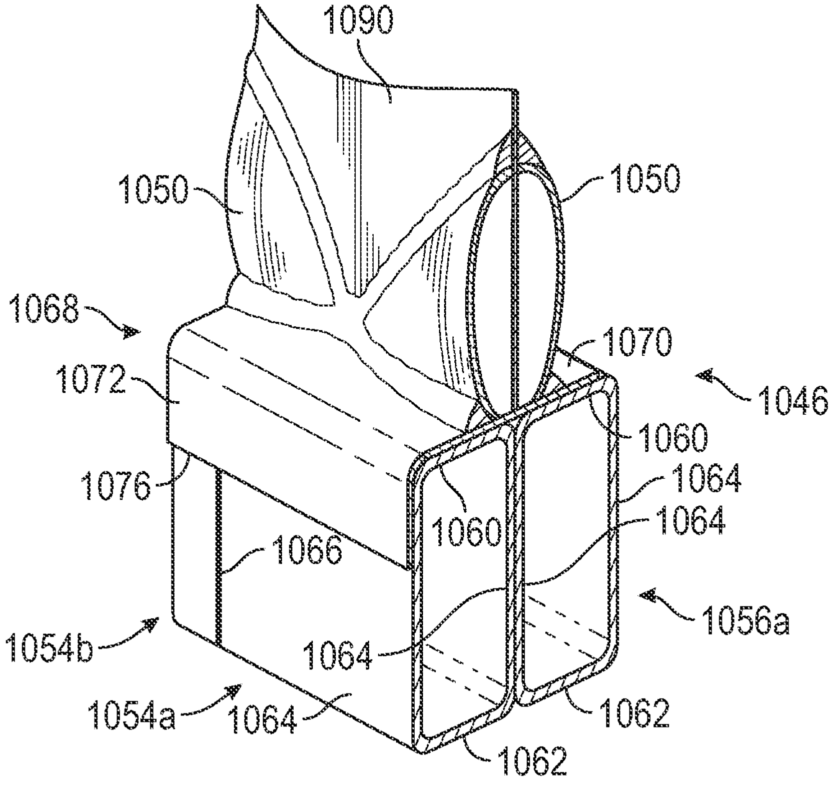
FIG. 61 is a perspective view of a section of a lower longitudinal member of the ladder assembly of FIG. 58, according to an exemplary embodiment.
Figure 62:
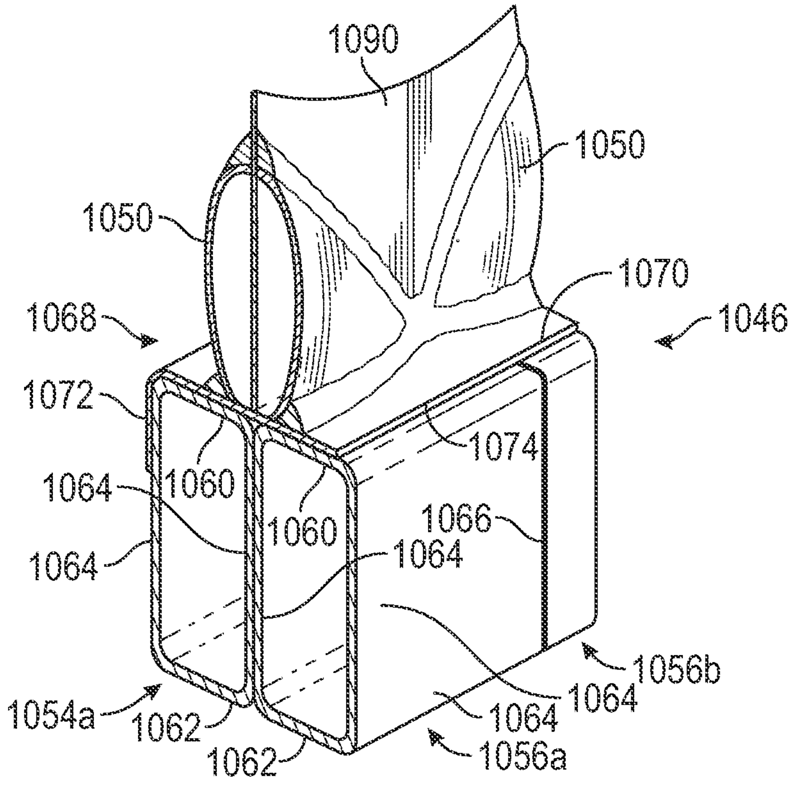
FIG. 62 is a perspective view of a section of a lower longitudinal member of the ladder assembly of FIG. 58, according to an exemplary embodiment.

Referring next to FIGS. 61 and 62, base rails 1046 include various components that are coupled (e.g., welded, etc.) together. According to an exemplary embodiment, at least one of the first member 1054 and the second member 1056 include a plurality of components that are positioned end-to-end. By way of example, first member 1054 may include a first section 1054*a* and a second section 1054*b* while second member 1056 may include a first section 1056*a* and a second section 1056*b*. The various portions of first member 1054 and second member 1056 may have lengths that are shorter than the overall length of base rails 1046. As shown in FIGS. 61 and 62, a brace, shown as brace 1068, is disposed at a union 1066 of the first and second portions of first member 1054 and second member 1056. The brace 1068 is positioned along the top walls 1060 of first member 1054 and second member 1056 and spans union 1066, according to an exemplary embodiment. As shown in FIGS. 61 and 62, brace 1068 has an "L"-shaped cross-section and includes a top plate 1070 and a side leg 1072. In one embodiment, side leg 1072 is angularly offset (e.g., ninety degrees, etc.) relative to top plate 1070. Side leg 1072 may facilitate positioning brace 1068 atop first member 1054 and second member 1056, thereby simplifying manufacturing. In one embodiment, brace 1068 is manufactured by bending a sheet of material to form top plate 1070 and side leg 1072. As shown in FIGS. 61 and 62, the brace 1068 is positioned such that the top plate 1070 abuts the top walls 1060 of the first member 1054 and the second member 1056 and the side leg 1072 abuts the outer side wall 1064 of the first member 1054. According to an exemplary embodiment, the brace 1068 has a width that is approximately equal to the combined widths of the first member 1054 and the second member 1056 such that a distal edge 1074 of the top plate 1070 does not extend beyond the outer side wall 1064 of the first member 1054 when the brace 1068 is positioned on the first member 1054 and the second member 1056. The side leg 1072 has a height that is less than the height of the first member 1054 to minimize the weight of the brace 1068 and the overall weight of the aerial ladder assembly 1030. In other embodiments, the side leg 1072 may have a height that is approximately equal to the height of the first member 1054. In another embodiment, the brace 1068 may be positioned with the side leg 1072 oriented along the inner side wall 1064 of the second member 1056. In other embodiments, the brace 1068 may have a second side leg opposite the side leg 1072 that is configured to extend along the inner side wall 1064 of the second member 1056.

According to an exemplary embodiment, brace 1068 facilitates manufacturing aerial ladder assembly 1030. By way of example, the brace 1068 may be used in the manufacturing process as a fixture to position the first member 1054 and second member 1056 relative to one other. In an exemplary embodiment, the first section 1054*a* and the second section 1054*b* of first member 1054 are positioned against the top plate 1070 and the side leg 1072 of the brace 1068. The first section 1054*a* and the second section 1054*b* of first member 1054 may then be coupled (e.g., welded, etc.) together and/or coupled to the brace 1068. The first section 1056*a* and the second section 1056*b* of second member 1056 may then be positioned against the side walls 1064 of the first section 1054*a* and the second section 1054*b* of first member 1054 and against the top plate 1070 of the brace 1068. The first section 1056*a* and the second section 1056*b* of second member 1056 may then be at least one of coupled together, coupled to the brace 1068, and coupled to the first member 1054.

The brace 1068 may be coupled to the first section 1054*a* and the second section 1054*b* of first member 1054 with a weld along a distal edge 1076 of the side leg 1072. The weld may be continuous and extend along the length of the brace 1068 or may include a plurality of intermittent welds (e.g., skip welds, etc.). According to an exemplary embodiment, the brace 1068 is coupled to the first section 1056*a* and the second section 1056*b* of second member 1056 along the distal edge 1074 of the top plate 1070. The weld may be continuous and extend along the length of the brace 1068 or may include a plurality of intermittent welds (e.g., skip welds, etc.).

Figure 63:
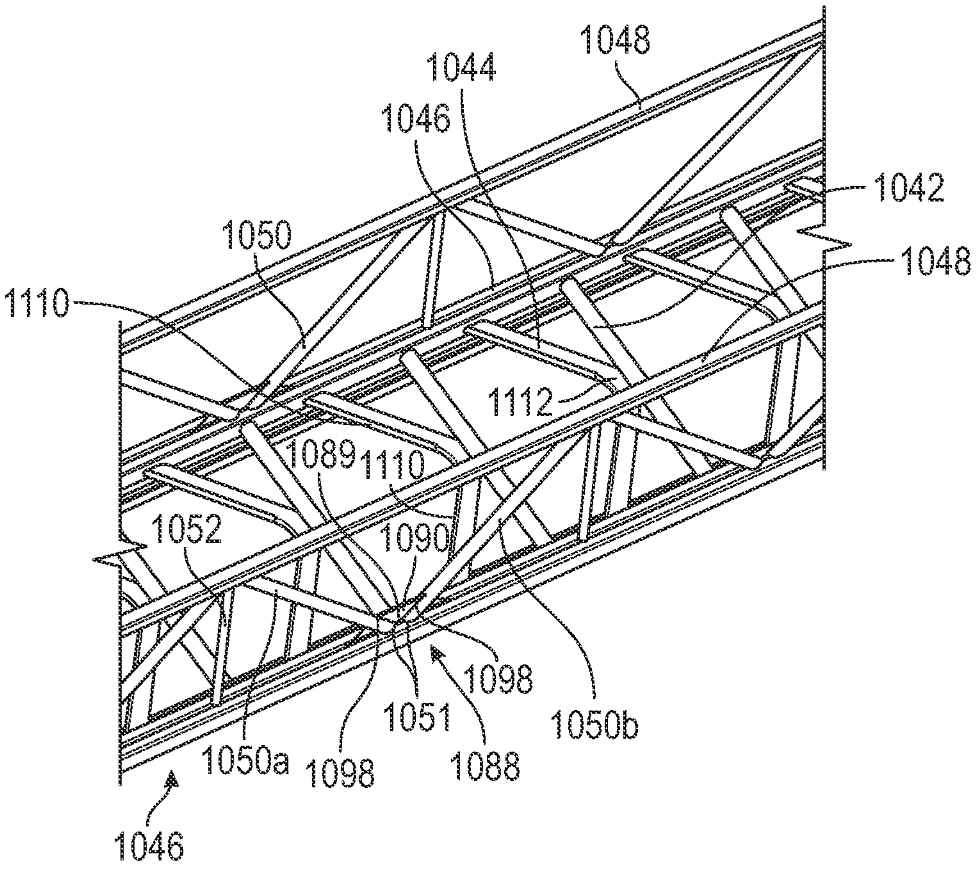
FIG. 63 is a detail perspective view of the ladder assembly of FIG. 58, according to an exemplary embodiment.
Figure 64:
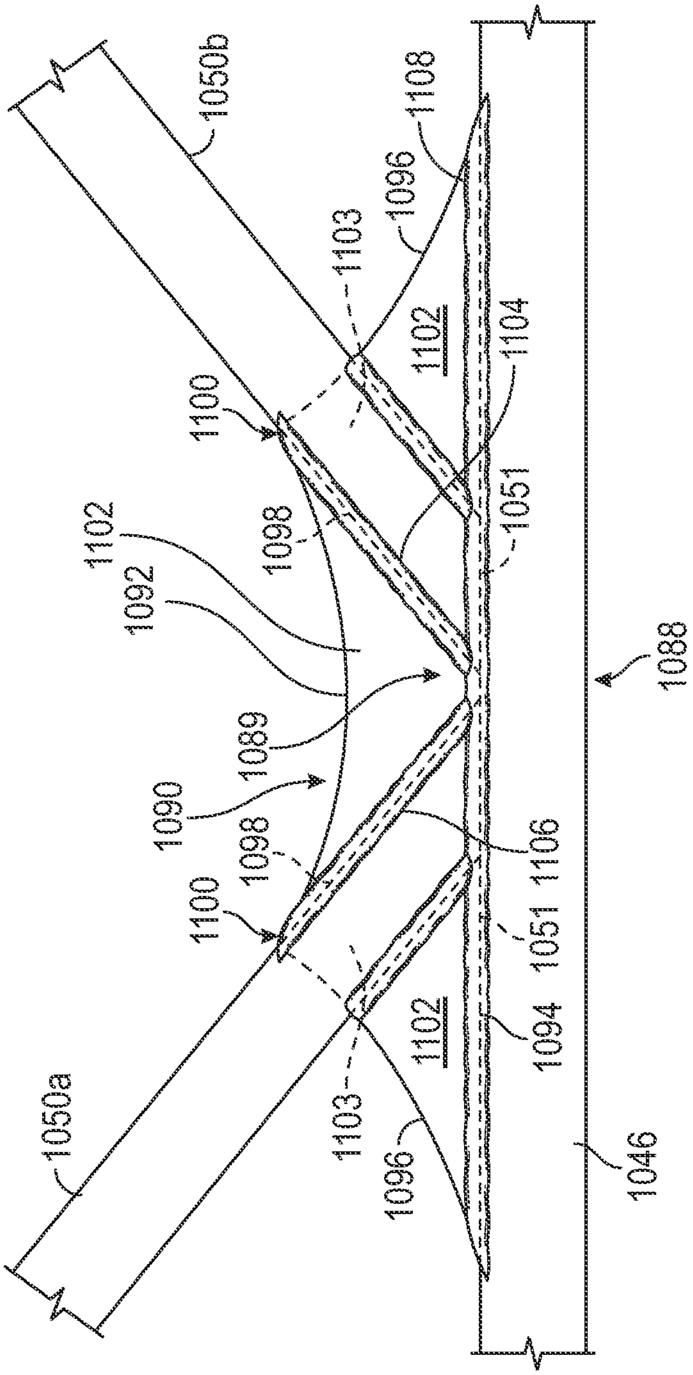
FIG. 64 is a side plan view of the ladder assembly of FIG. 58, according to an exemplary embodiment.

Referring next to FIGS. 63 and 64, the lacing members 1050 and the lacing members 1052 couple the hand rails 1048 to the base rails 1046. According to an exemplary embodiment, lacing members 1050 include lacing members 1050*a* and lacing members 1050*b*. As shown in FIGS. 63 and 64, lacing members 1050 extend between hand rails 1048 and base rails 1046. In one embodiment, lacing members 1050 include ends 1051 that abut base rails 1046. Ends 1051 of lacing members 1050 are coupled to base rails 1046, according to an exemplary embodiment. The lacing members 1050*a* and 1050*b* alternate along the length of the aerial ladder assembly 1030, with the ends 1051 of the lacing members 1050*a* and 1050*b* meeting at a plurality of common interfaces, shown as joints 1088. As shown in FIGS. 63 and 64, joints 1088 are disposed along base rails 1046 at regular intervals. In other embodiments, the spacing between joints 1088 may be non-uniform along the length of aerial ladder assembly 1030. In some embodiments, lacing members 1052 are provided at one or more of the joints 1088.

According to an exemplary embodiment, aerial ladder assembly 1030 includes lacing members 1050 and the lacing members 1052 that are manufactured from thin-walled tubular members. Such an aerial ladder assembly 1030 may have a reduced overall weight. In one embodiment, the arrangement of the various components of aerial ladder assembly 1030 facilitate such construction without sacrificing load, vertical extension, or horizontal reach ratings. The lacing members 1050 and the lacing members 1052 may have a similar cross-sectional shape or may have different cross-sectional shapes. According to an exemplary embodiment, lacing members 1050 are circular tubes and lacing members 1052 are circular tubes. In other embodiments, the lacing members 1050 and lacing members 1052 may be otherwise shaped. By way of example, the lacing members 1050 and the lacing members 1052 may be tubes with a rectangular or hexagonal cross-sectional shape. In still other embodiments, the lacing members may be other structural members (e.g., angles, channels, rods, etc.). The size and/or shape of the lacing members 1050 and the lacing members 1052 may vary along the length of the aerial ladder assembly 1030.

Referring still to the exemplary embodiment shown in FIGS. 61-64, the joints 1088 between the lacing members 1050 and the base rails 1046 include reinforcing members, shown as gussets 1090. According to an exemplary embodiment, gusset 1090 is a flat plate. As shown in FIG. 64, gusset 1090 is generally trapezoidal and includes an upper edge 1092, a lower edge 1094, and two sides 1096. According to an exemplary embodiment, the lower edge 1094 of gusset 1090 is positioned along (e.g., abuts, contacts, engages, interfaces with, etc.) the base rail 1046. In one embodiment, the lower edge 1094 of gusset 1090 is disposed along a brace 1068 positioned at a joint 1088. In another embodiment, the lower edge 1094 of gusset 1090 is disposed along the top wall 1060 of the first member 1054 and/or the second member 1056.

According to an exemplary embodiment, gusset 1090 is a continuous body extending from base rail 1046 upward into engagement with lacing members 1050. As shown in FIG. 63, lacing members 1050 define a plurality of apertures (e.g., slots, grooves, slits, etc.), shown as slots 1098 that receive gusset 1090. Gusset 1090 may extend entirely through lacing member 1050 and into direct engagement with base rail 1046. In one exemplary embodiment, the plurality of slots 1098 are formed in the lacing members 1050 by laser cutting. In other embodiments, the plurality of slots 1098 are otherwise formed (e.g., water jet cut, machined, etc.) in the lacing members 1050. Intact portions of lacing members 1050 pass around the gusset 1090 and terminate at ends 1051. In one embodiment, ends 1051 are positioned along (e.g., abut, contact, engage, interface with, etc.) the base rail 1046. In one embodiment, the ends 1051 are disposed along a brace 1068 positioned at a joint 1088. In another embodiment, the ends 1051 are disposed along the top wall 1060 of the first member 1054 and/or the second member 1056. As shown in FIGS. 63 and 64, the ends 1051 of the lacing members 1050 may be separated by a gap 1089. According to an exemplary embodiment, ends 1051 of lacing members 1050 and lower edge 1094 of gusset 1090 contact base rail 1046, thereby directly transferring loading and stresses between base rail 1046 and lacing members 1050. In one embodiment, an aerial ladder assembly 1030 having a gusset 1090 that extends through lacing members 1050 defines additional load paths not present in traditional ladder assemblies.

As shown in FIG. 64, the upper edge 1092 spans the space between the lacing members 1050. The sides 1096 span the space between the lacing members 1050 and the base rail 1046. According to an exemplary embodiment, the upper edge 1092 and the sides 1096 may be inwardly curved (e.g., scalloped, etc.). The upper edge 1092 and the sides 1096 may approach the surface of the lacing members 1050 at a relatively shallow angle, such that the corners 1100 of the exposed portions 1102 of the gusset 1090 approach an angle of 180 degrees. In one embodiment, gusset 1090 having an inwardly curved upper edge 1092 and sides 1096 improves load transfer between base rail 1046 and lacing members 1050.

The gusset 1090 is coupled to the lacing members 1050 with welds 1104 and welds 1106. In one embodiment, welds 1104 and welds 1106 continue along a first side of the gusset 1090, around a corner 1100 of gusset 1090, and along an opposing second side of the gusset 1090. In some embodiments, welds 1104 and 1106 may not extend around the corners 1100 but may instead comprise separate welds formed on either side of the gusset 1090. In one embodiment, the gusset 1090 defines a single unitary body that extends from upper edge 1092, through outer surface of the lacing members 1050 (e.g., into the slot 1098, etc.), and to a concealed portion 1103 within the lacing member 1050. Gusset 1090 further extends downward from concealed portion 1103 to base rail 1046. In one embodiment, the single unitary body defines a continuous load path between the various components of aerial ladder assembly 1030. Gusset 1090 also reduces stress concentrations within the joint 1088. The continuous extension of gusset 1090 from upper edge 1092 to concealed portion 1103 also improves the likelihood that corners 1100 will remain intact during a welding operation (e.g., to reduce the amount of corner 1100 that is melted and assumed into the weld bead, etc.). A relatively smooth transition is therefore maintained between the upper edge 1092 and the lacing members 1050 and between the sides 1096 and the lacing members 1050, reducing the stress concentrations that may otherwise be formed between the lacing members 1050 and the gusset 1090. Such a reduction in stress concentrations facilitates a reduction in the weight of various components (e.g., lacing members 1050, base rails 1046, etc.), thereby reducing the weight of aerial ladder assembly 1030.

The lacing members 1050 and the gusset 1090 are coupled to the base rail 1046 with a weld 1108. Weld 1108 extends around the base of the joint 1088, coupling the ends 1051 of the lacing members 1050 and the lower edge 1094 of gusset 1090 to the base rail 1046. The weld 1108 may couple the ends 1051 of the lacing members 1050 and the lower edge 1094 to a brace 1068 or directly to the top wall 1060 of the first member 1054 and/or the second member 1056.

Because the gusset 1090 passes through the lacing members 1050 via the slots 1098, stresses (e.g., sheer stresses, bending stresses, etc.) at the joint 1088 can flow through the gusset 1090 and directly into the base rail 1046 instead of passing through the ends 1051 of the lacing members 1050. Aerial ladder assembly 1030 may thereby include smaller lacing members 1050 (e.g., smaller in diameter, smaller in wall thickness, etc.) than truss members having gussets 1090 that do not pass through lacing members 1050 or extend downward to base rail 1046.

The configuration of the lacing members 1050 and the gussets 1090 also aids in the manufacturing of truss members 1040 and the structural integrity of the joints 1088. The slots 1098 position the gusset 1090 relative to the lacing members 1050 along a preferred vertical plane (e.g., a vertical plane passing through the neutral axis of the lacing members 1050, etc.). The slots 1098 allow the gusset 1090 to be accurately positioned relative to lacing members 1050 without the use of an additional fixture. The slots 1098 thereby reduce the risk that the gussets 1090 will be welded in a skewed orientation (e.g., angled in a lateral direction, etc.).

Figure 65:
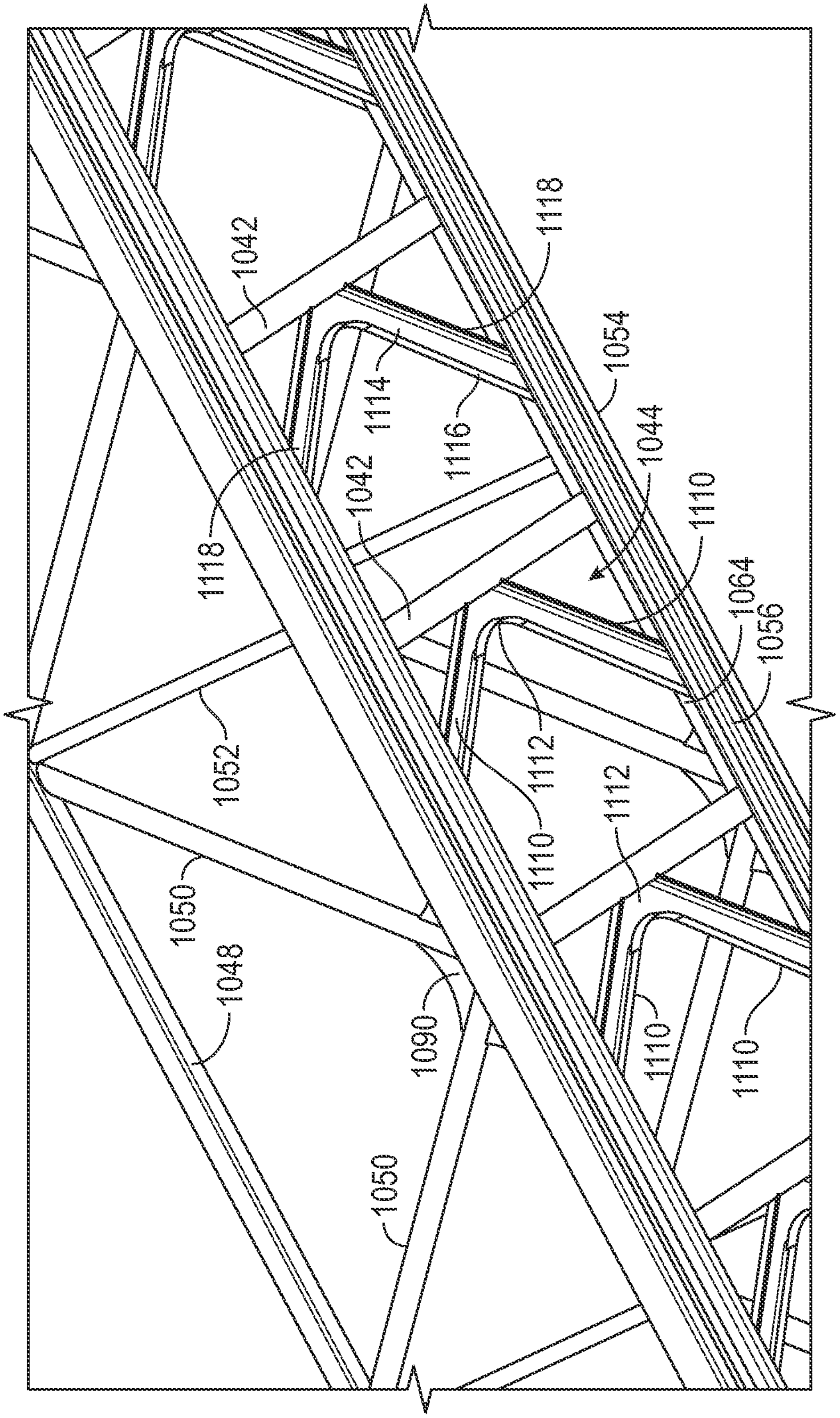
FIG. 65 is a detail lower perspective view of the ladder assembly of FIG. 58, according to an exemplary embodiment.

Referring to the exemplary embodiment shown in FIGS. 63 and 65, rungs 1042 extend laterally between the base rails 1046 of the truss members 1040. The rungs 1042 facilitate the ascent and descent of a fire fighter or a person being aided by the fire fighter along aerial ladder assembly 1030. In an exemplary embodiment, the rungs 1042 are coupled to the inner side wall 1064 of the second members 1056 of the truss members 1040. In other embodiments, the rungs 1042 are coupled to the top walls or the bottom walls of the first member 1054 and the second member 1056. The rungs 1042 may also be coupled to braces 1068 disposed along base rails 1046.

In an exemplary embodiment, the rungs 1042 are thin-walled, tubular members thereby reducing the weight of the aerial ladder assembly 1030. Rungs 1042 may have a cross-sectional shape (e.g., round, elliptical, D-shaped, etc.) that facilitates the engagement thereof (e.g., grasping, stepping, etc.) by a fire fighter or a person being aided by the fire fighter. Rung supports 1044 strengthen aerial ladder assembly 1030, according to an exemplary embodiment. In one embodiment, rung supports 1044 are coupled to rungs 1042. Rungs 1042 and rung supports 1044 may define a plurality of braces (e.g., K-braces, etc.) that couple the truss members 1040 together. The rung supports 1044 are a V-shaped members that are coupled to the rungs 1042 at a point between the two truss members 1040. In an exemplary embodiment, the rung supports 1044 are positioned rearward of (e.g., toward the first end 1032 relative to, etc.) the rungs 1042. The rung supports 1044 include a pair of arms 1110 extending between the rungs 1042 and base rails 1046. In one embodiment, the arms 1110 are connected by a transition portion 1112 that is coupled (e.g., welded, etc.) to the rung 1042. In other embodiments, the rung supports 1044 may not include the transition portions 1112, and the arms 1110 may be separate members that are coupled directly to the rungs 1042. As shown in FIG. 65, the distal ends of the arms 1110 are coupled to the base rails 1046.

In an exemplary embodiment, rung supports 1044 are formed from a plate with one or more bending operations. As shown in FIG. 65, the rung supports 1044 include a main body 1114, a first flange 1116 that extends downward from a rearward edge of the main body 1114, and a pair of flanges 1118 that extend downward form a forward edge of the main body 1114. The rung supports 1044 have a reduced weight compared to a brace formed of thin-walled tubular members or other traditional designs while providing lateral strength and stiffness to the aerial ladder assembly 1030. In other embodiments, the rung supports 1044 are thin-walled tubular members. The size and shape of the rung supports 1044 (e.g., wall thickness, width of the main body, height of the flanges 1116 and 1118, angle of the arms 1110, etc.) may vary along the length of the ladder. For example, the rung supports 1044 provided along the first zone 1080 of the aerial ladder assembly 1030 may be configured to resist greater lateral forces than the rung supports 1044 provided along the second zone 1082 of the aerial ladder assembly 1030. Aerial ladder assembly 1030 has a reduced weight due to the configuration of rung supports 1044 (e.g., the weight of the rung supports 1044 and the weight of the aerial ladder assembly 1030 is reduced by not configuring all of the rung supports 1044 to be capable of supporting the maximum lateral forces, etc.).

Figure 66:
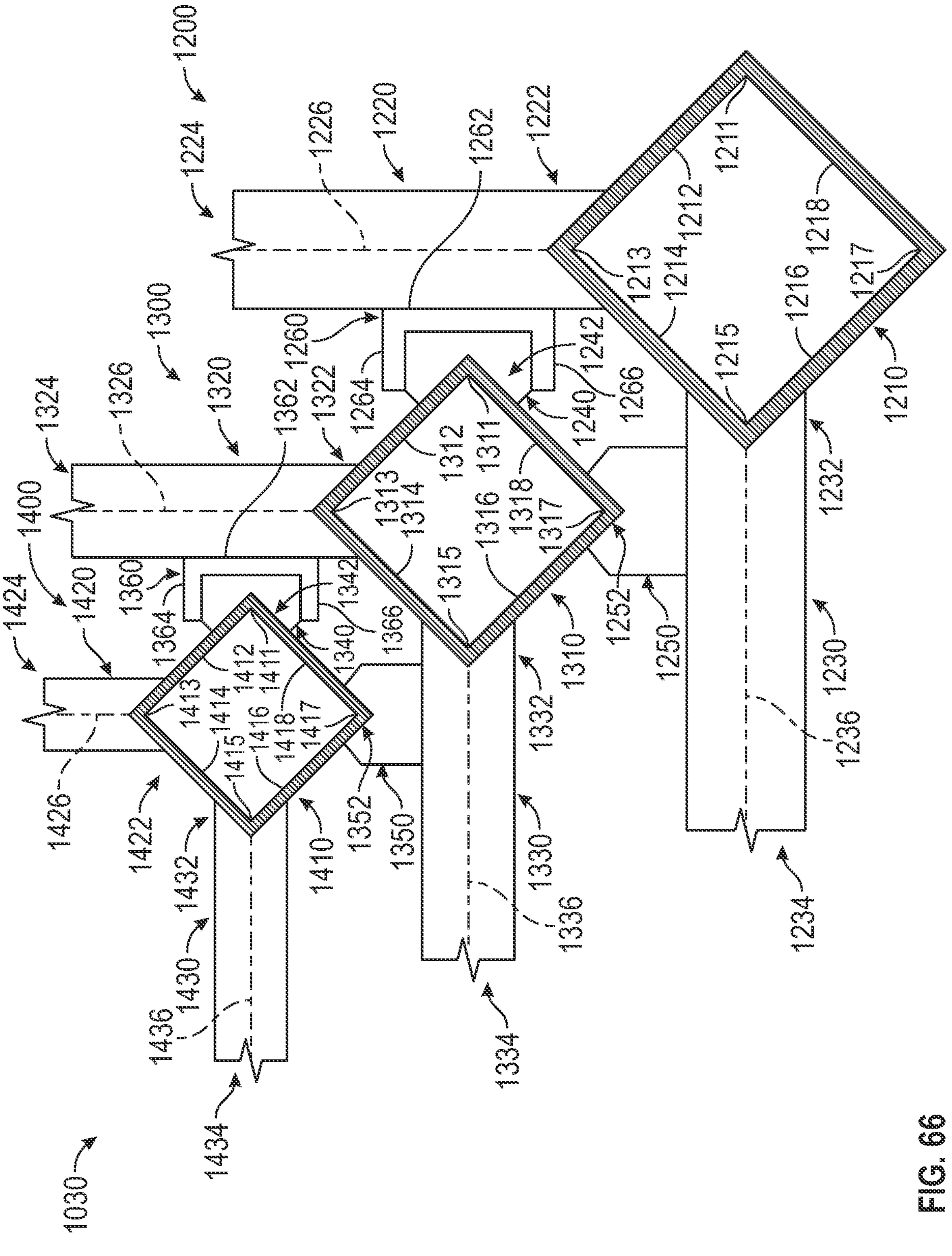
FIG. 66 is a cross-sectional view of a multi-section ladder assembly, according to an another exemplary embodiment.

According to the alternative embodiment shown in FIG. 66, the aerial ladder assembly 1030 includes a plurality of telescoping ladder sections including a first ladder section, shown as first ladder section 1200, a second ladder section, shown as second ladder section 1300, and a third ladder section, shown as third ladder section 1400. As shown in FIG. 66, the aerial ladder assembly 1030 includes three sections. In other embodiments, the aerial ladder assembly 1030 has more or fewer ladder sections (e.g., two sections, four sections, five sections, etc.).

According to the exemplary embodiment shown in FIG. 66, the first ladder section 1200 includes a first base rail, shown as base rail 1210, a first lacing member, shown as lacing member 1220, and a first rung member, shown as rung member 1230. As shown in FIG. 66, the base rail 1210 is defined by wall 1212, wall 1214, wall 1216, and wall 1218. Each wall is coupled perpendicularly to an adjacent wall, forming a substantially rectangular cross-sectional shape. As shown in FIG. 66, wall 1212, wall 1214, wall 1216, and wall 1218 have a common length such that base rail 1210 has a generally square cross-sectional shape. In other embodiments, the base rail 1210 may have another cross-sectional shape (e.g., triangular, circular, hexagonal, etc.). A corner is defined at each of the points where adjacent walls intersect. As shown in FIG. 66, the base rail 1210 includes four corners, shown as corner 1211, corner 1213, corner 1215, and corner 1217. According to an exemplary embodiment, corner 1211 and corner 1215 are horizontally-aligned while corner 1213 and corner 1217 are vertically-aligned. It should be understood that, while shown in the cross-sectional view of FIG. 66 as corners, corner 1211, corner 1213, corner 1215, and corner 1217 may define edges that extend along the length of base rail 1210.

The lacing member 1220 includes a first end (e.g., proximal end, base end, etc.), shown as first end 1222, and a second end (e.g., distal end, railing end, etc.), shown as second end 1224. As shown in FIG. 66, the lacing member 1220 defines an axis, shown as axis 1226, which is disposed along a centerline of the lacing member 1220. In one embodiment, axis 1226 is positioned vertically. In other embodiments, lacing member 1220 is tilted (e.g., tilted outward from a centerline of the first ladder section 1200, etc.) such that axis 1226 is angularly offset relative to a vertical axis. Lacing member 1220 may have various cross-sectional shapes (e.g., circular, rectangular, square, etc.). As shown in FIG. 66, the first end 1222 of the lacing member 1220 abuts the wall 1212 and the wall 1214 of the base rail 1210. In one embodiment, base rail 1210 is positioned such that corner 1213 and corner 1217 are positioned along axis 1226. Base rail 1210 may thereby have a substantially diamond-shaped configuration. The second end 1224 of the lacing member 1220 may extend toward a hand rail. The rung member 1230 includes a first end, shown as first end 1232, and a second end, shown as second end 1234. The rung member 1230 defines an axis, shown as axis 1236, which is disposed along a centerline of the rung member 1230. In one embodiment, axis 1236 is positioned horizontally. Rung member 1230 may have various cross-sectional shapes (e.g., circular, square, rectangular, etc.). The first end 1232 of the rung member 1230 abuts the wall 1214 and the wall 1216 of the base rail 1210. In one embodiment, base rail 1210 is positioned such that corner 1211 and corner 1215 are disposed along axis 1236. The second end 1234 of the rung member 1230 may extend toward a second base rail 1210.

Referring still to FIG. 66, a channel member, shown as channel member 1260, is attached to an interior surface of the lacing member 1220 (e.g., a surface disposed laterally inward and facing a centerline of the first ladder section 1200, etc.). As shown in FIG. 66, the channel member 1260 includes a base 1262 that abuts the lacing member 1220, a first flange 1264, and a second flange 1266. The channel member 1260 is configured to receive a first slide pad, shown as slide pad 1240. The slide pad 1240 includes a notch, shown as notch 1242. A second slide pad, shown as slide pad 1250, directly abuts the rung member 1230. The slide pad 1250 also includes a notch, shown as notch 1252. In other embodiments, at least one of slide pad 1240 and slide pad 1250 has another cross-sectional shape. According to an alternative embodiment, at least one of slide pad 1240 and slide pad 1250 are otherwise coupled to lacing member 1220 and rung member 1230 or coupled to still another component of first ladder section 1200.

According to the exemplary embodiment shown in FIG. 66, the second ladder section 1300 includes a first base rail, shown as base rail 1310, a first lacing member, shown as lacing member 1320, and a first rung member, shown as rung member 1330. As shown in FIG. 66, the base rail 1310 is defined by wall 1312, wall 1314, wall 1316, and wall 1318. Each wall is coupled perpendicularly to an adjacent wall, forming a substantially rectangular cross-sectional shape. As shown in FIG. 66, wall 1312, wall 1314, wall 1316, and wall 1318 have a common length such that base rail 1310 has a generally square cross-sectional shape. In other embodiments, the base rail 1310 may have another cross-sectional shape (e.g., triangular, circular, hexagonal, etc.). A corner is defined at each of the points where adjacent walls intersect. As shown in FIG. 66, the base rail 1310 includes four corners, shown as corner 1311, corner 1313, corner 1315, and corner 1317. According to an exemplary embodiment, corner 1311 and corner 1315 are horizontally-aligned while corner 1313 and corner 1317 are vertically-aligned. It should be understood that, while shown in the cross-sectional view of FIG. 66 as corners, corner 1311, corner 1313, corner 1315, and corner 1317 may define edges that extend along the length of base rail 1310.

The lacing member 1320 includes a first end (e.g., proximal end, base end, etc.), shown as first end 1322, and a second end (e.g., distal end, railing end, etc.), shown as second end 1324. As shown in FIG. 66, the lacing member 1320 defines an axis, shown as axis 1326, which is disposed along a centerline of the lacing member 1320. In one embodiment, axis 1326 is positioned vertically. In other embodiments, lacing member 1320 is tilted (e.g., tilted outward from a centerline of the second ladder section 1300, etc.) such that axis 1326 is angularly offset relative to a vertical axis. Lacing member 1320 may have various cross-sectional shapes (e.g., circular, rectangular, square, etc.). As shown in FIG. 66, the first end 1322 of the lacing member 1320 abuts the wall 1312 and the wall 1314 of the base rail 1310. In one embodiment, base rail 1310 is positioned such that corner 1313 and corner 1317 are positioned along axis 1326. Base rail 1310 may thereby have a substantially diamond-shaped configuration. The second end 1324 of the lacing member 1320 may extend toward a hand rail. The rung member 1330 includes a first end, shown as first end 1332, and a second end, shown as second end 1334. The rung member 1330 defines an axis, shown as axis 1336, which is disposed along a centerline of the rung member 1330. In one embodiment, axis 1336 is positioned horizontally. Rung member 1330 may have various cross-sectional shapes (e.g., circular, square, rectangular, etc.). The first end 1332 of the rung member 1330 abuts the wall 1314 and the wall 1316 of the base rail 1310. In one embodiment, base rail 1310 is positioned such that corner 1311 and corner 1315 are disposed along axis 1336. The second end 1334 of the rung member 1330 may extend toward a second base rail 1310.

Referring still to FIG. 66, a channel member, shown as channel member 1360, is attached to an interior surface of the lacing member 1320 (e.g., a surface disposed laterally inward and facing a centerline of the second ladder section 1300, etc.). As shown in FIG. 66, the channel member 1360 includes a base 1362 that abuts the lacing member 1320, a first flange 1364, and a second flange 1366. The channel member 1360 is configured to receive a first slide pad, shown as slide pad 1340. The slide pad 1340 includes a notch, shown as notch 1342. A second slide pad, shown as slide pad 1350, directly abuts the rung member 1330. The slide pad 1350 also includes a notch, shown as notch 1352. In other embodiments, at least one of slide pad 1340 and slide pad 1350 has another cross-sectional shape. According to an alternative embodiment, at least one of slide pad 1340 and slide pad 1350 are otherwise coupled to lacing member 1320 and rung member 1330 or coupled to still another component of second ladder section 1300.

According to the exemplary embodiment shown in FIG. 66, the third ladder section 1400 includes a first base rail, shown as base rail 1410, a first lacing member, shown as lacing member 1420, and a first rung member, shown as rung member 1430. As shown in FIG. 66, the base rail 1410 is defined by wall 1412, wall 1414, wall 1416, and wall 1418. Each wall is coupled perpendicularly to an adjacent wall, forming a substantially rectangular cross-sectional shape. As shown in FIG. 66, wall 1412, wall 1414, wall 1416, and wall 1418 have a common length such that base rail 1410 has a generally square cross-sectional shape. In other embodiments, the base rail 1410 may have another cross-sectional shape (e.g., triangular, circular, hexagonal, etc.). A corner is defined at each of the points where adjacent walls intersect. As shown in FIG. 66, the base rail 1410 includes four corners, shown as corner 1411, corner 1413, corner 1415, and corner 1417. According to an exemplary embodiment, corner 1411 and corner 1415 are horizontally-aligned while corner 1413 and corner 1417 are vertically-aligned. It should be understood that, while shown in the cross-sectional view of FIG. 66 as corners, corner 1411, corner 1413, corner 1415, and corner 1417 may define edges that extend along the length of base rail 1410.

The lacing member 1420 includes a first end (e.g., proximal end, base end, etc.), shown as first end 1422, and a second end (e.g., distal end, railing end, etc.), shown as second end 1424. As shown in FIG. 66, the lacing member 1420 defines an axis, shown as axis 1426, which is disposed along a centerline of the lacing member 1420. In one embodiment, axis 1426 is positioned vertically. In other embodiments, lacing member 1420 is tilted (e.g., tilted outward from a centerline of the third ladder section 1400, etc.) such that axis 1426 is angularly offset relative to a vertical axis. Lacing member 1420 may have various cross-sectional shapes (e.g., circular, rectangular, square, etc.). As shown in FIG. 66, the first end 1422 of the lacing member 1420 abuts the wall 1412 and the wall 1414 of the base rail 1410. In one embodiment, base rail 1410 is positioned such that corner 1413 and corner 1417 are disposed along axis 1426. Base rail 1410 may thereby have a substantially diamond-shaped configuration. The second end 1424 of the lacing member 1420 may extend toward a hand rail. The rung member 1430 includes a first end, shown as first end 1432, and a second end, shown as second end 1434. The rung member 1430 defines an axis, shown as axis 1436, which is disposed along a centerline of the rung member 1430. In one embodiment, axis 1436 is positioned horizontally. Rung member 1430 may have various cross-sectional shapes (e.g., circular, square, rectangular, etc.). The first end 1432 of the rung member 1430 abuts the wall 1414 and the wall 1416 of the base rail 1410. In one embodiment, base rail 1410 is positioned such that corner 1411 and corner 1415 are disposed along axis 1436. The second end 1434 of the rung member 1430 may extend toward a second base rail 1410.

According to the exemplary embodiment shown in FIG. 66, first ladder section 1200 is configured to receive second ladder section 1300. As shown in FIG. 66, notch 1242 of slide pad 1240 and notch 1252 of slide pad 1250 have a cross-sectional shape that corresponds to a cross-sectional shape of base rail 1310 of second ladder section 1300. Notch 1242 and notch 1252 may thereby receive corner 1311 and corner 1317 of base rail 1310, respectively. An actuator may be used to extend and retract second ladder section 1300 from first ladder section 1200. During actuation (e.g., extension, retraction, etc.), base rail 1310 of second ladder section 1300 may slide along slide pad 1240 and slide pad 1250, within notch 1242 and notch 1252. Second ladder section 1300 is configured to receive third ladder section 1400. As shown in FIG. 66, notch 1342 of slide pad 1340 and notch 1352 of slide pad 1350 have a cross-sectional shape that corresponds to a cross-sectional shape of base rail 1410 of third ladder section 1400. Notch 1342 and notch 1352 may thereby receive corner 1411 and corner 1417 of base rail 1410, respectively. An actuator may be used to extend and retract third ladder section 1400 from second ladder section 1300. During actuation (e.g., extension, retraction, etc.), base rail 1410 of third ladder section 1400 may slide along slide pad 1340 and slide pad 1350, within notch 1342 and notch 1352. In other embodiments, third ladder section 1400 includes slide pads shaped to receive an additional ladder section (e.g., a fly section, etc.). Such slide pads may be shaped and interact in a manner like those of first ladder section 1200 and second ladder section 1300.

According to an exemplary embodiment, the ladder assembly includes base rails that are positioned such that loading imparted by the lacing members and that rungs is directed into corners of the base rails. The ladder assembly may also include slide pads shaped to receive the base rails (e.g., corners of the base rails, etc.) such that stresses transferred between ladder sections also flow through the corners of the base rails. In one embodiment, positioning and configuring the base rails, slide pads, lacing members, and rungs to direct loading through the corners of the base rails reduces weight, improves strength, and enhances the horizontal reach of the ladder assembly.

Lightweight Platform

It should be understood that the following disclosure regarding FIGS. 67A-80C can be applied to the fire apparatus 10 and the aerial ladder assembly 200 of FIGS. 1-56. According to the exemplary embodiment shown in FIGS. 67A-69, a fire apparatus or firefighting vehicle, shown as fire apparatus 2010, includes a cab assembly, shown as front cabin 2020, and a body assembly, shown as rear section 2030, defining a longitudinal axis 2014. In one embodiment, the longitudinal axis 2014 extends along a direction defined by a frame or chassis 2016 of the fire apparatus 2010 (e.g., front-to-back, etc.). As shown in FIGS. 67A-70B, the front cabin 2020 is positioned forward of the rear section 2030 (e.g., with respect to a forward direction of travel for the fire apparatus 2010 along the longitudinal axis 2014, etc.). According to an alternative embodiment, the front cabin 2020 may be positioned behind the rear section 2030 (e.g., with respect to a forward direction of travel for the fire apparatus 2010 along the longitudinal axis 2014, etc.). The front cabin 2020 may be positioned behind the rear section 2030 on, by way of example, a rear tiller fire apparatus.

Figure 67A:
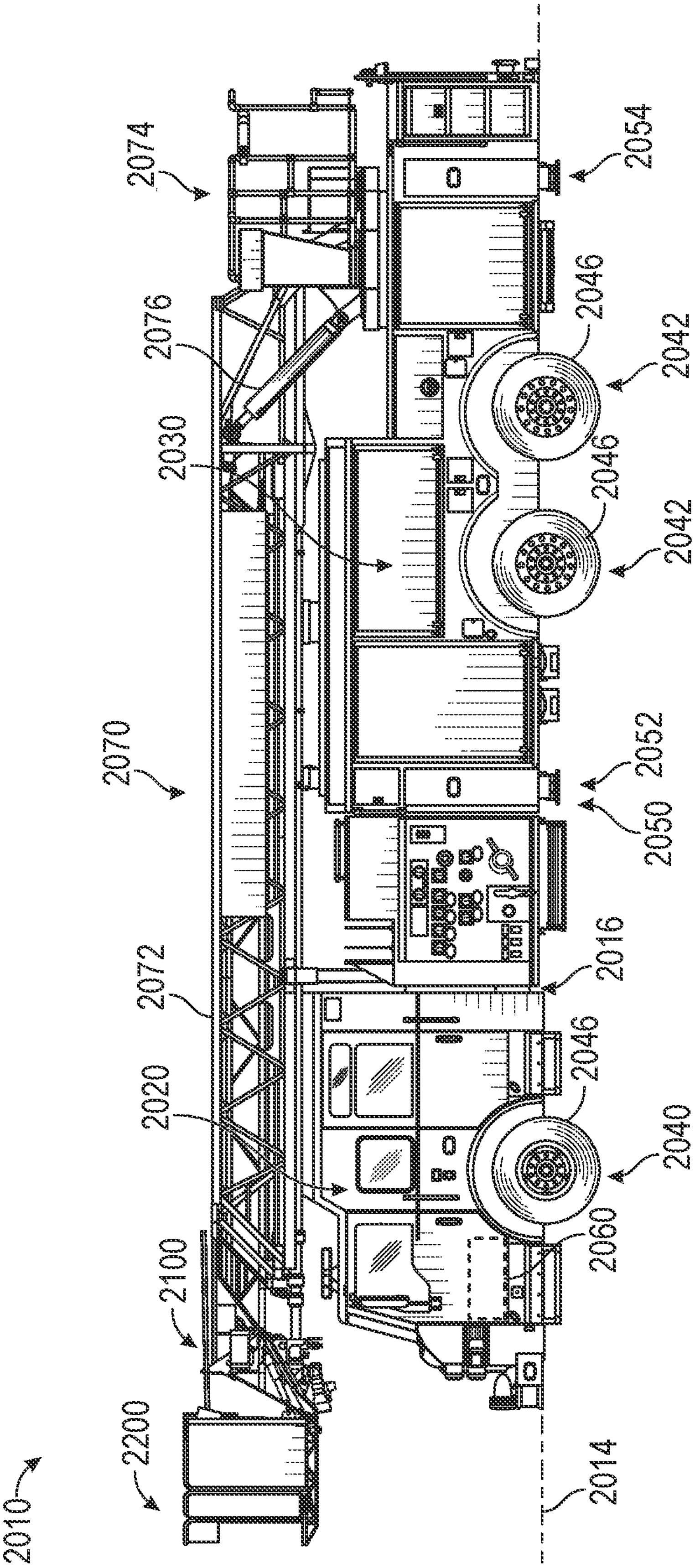
FIG. 67A is a side view of a tandem fire apparatus, according to an exemplary embodiment.
Figure 67B:
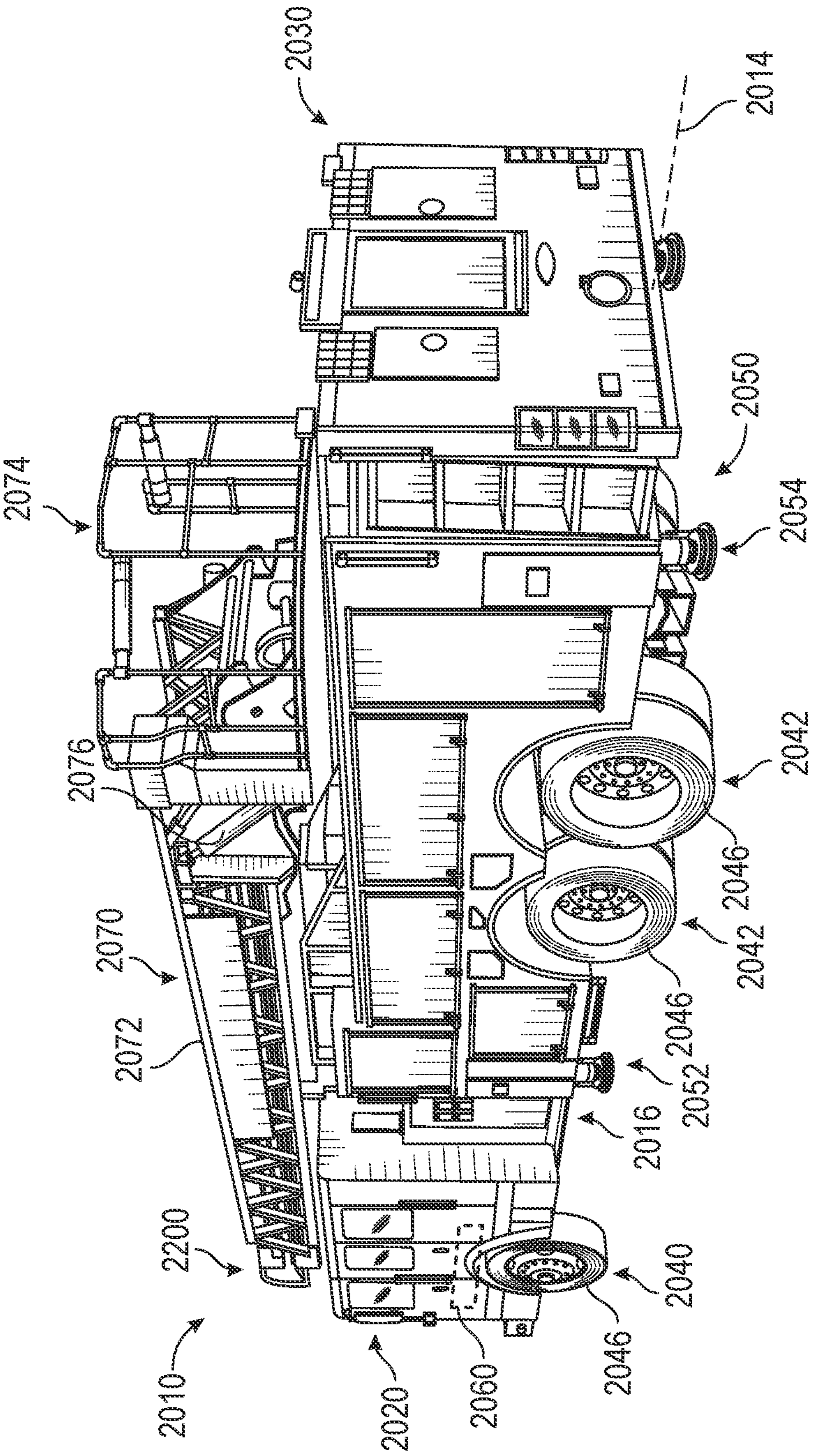
FIG. 67B is a rear perspective view of the tandem rear axle fire apparatus of FIG. 67A, according to an exemplary embodiment.
Figure 68:
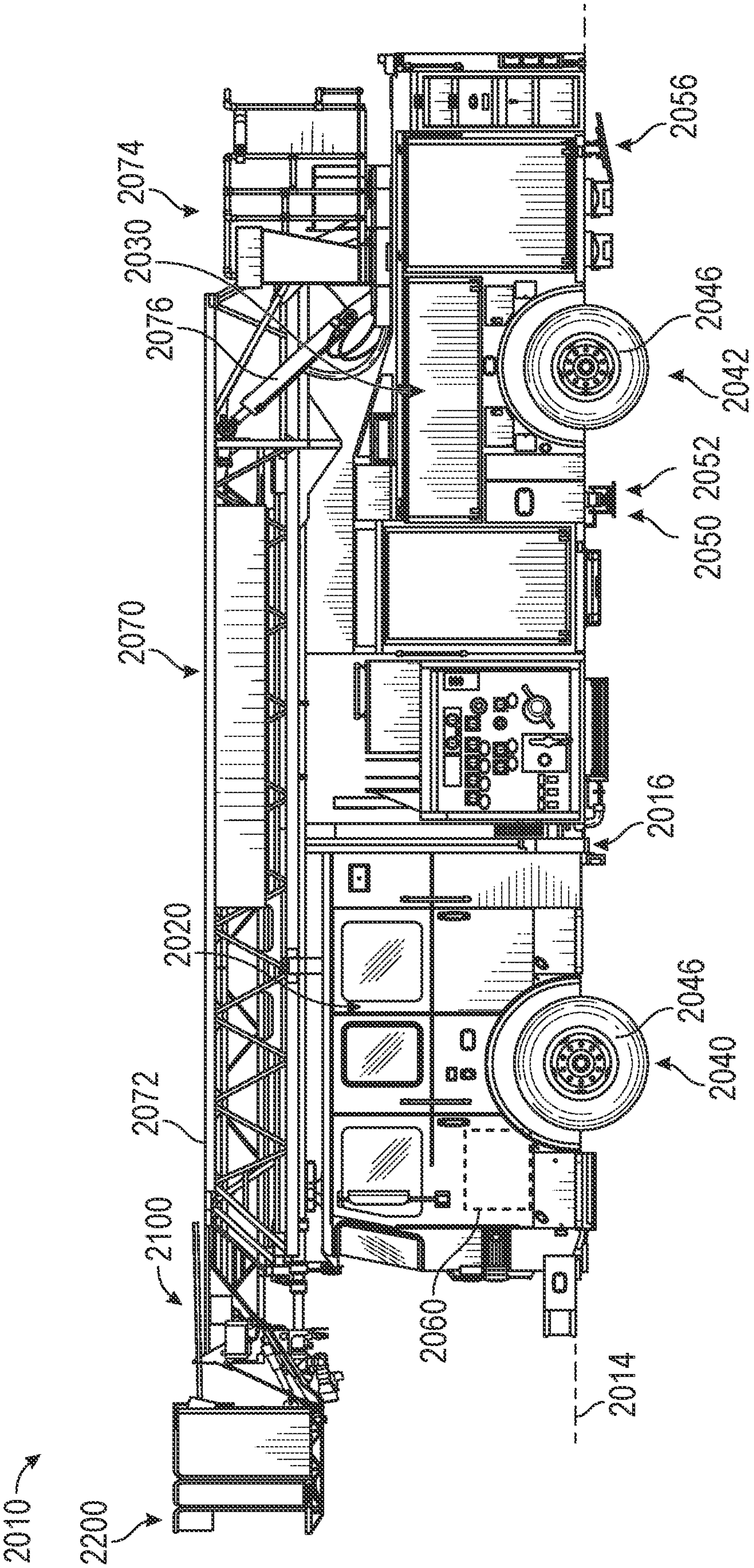
FIG. 68 is a side view of a single rear axle fire apparatus, according to an exemplary embodiment.
Figure 69:
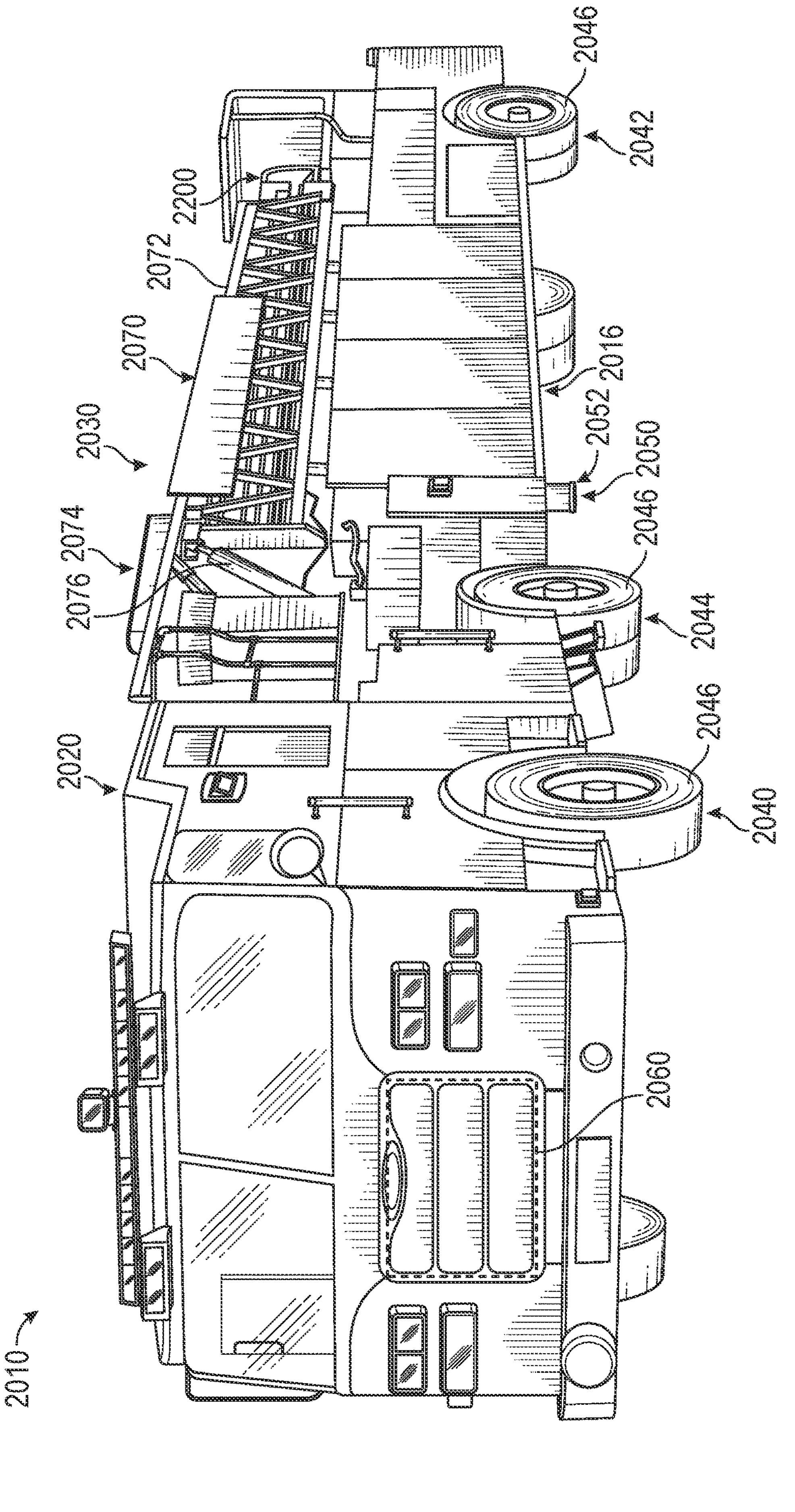
FIG. 69 is a front perspective view of a tiller fire apparatus, according to an exemplary embodiment.

As shown in FIGS. 67A and 67B, the fire apparatus 2010 is configured as a tandem rear axle fire apparatus. In this embodiment, the fire apparatus 2010 includes a first axle, shown as front axle 2040, positioned along the front cabin 2020 and a pair of second axles, shown as rear axles 2042, positioned along the rear section 2030. As shown in FIG. 68, the fire apparatus 2010 is configured as a single rear axle fire apparatus. In this embodiment, the fire apparatus 2010 has a front axle 2040 positioned along the front cabin 2020 and a single rear axle 2042 positioned along the rear section 2030. As shown in FIG. 69, the fire apparatus 2010 is configured as a tiller fire apparatus. In this embodiment, the fire apparatus 2010 has a front axle 2040 positioned along the front cabin 2020, a rear axle 2042 positioned along the rear section 2030, and a third axle, shown as intermediate axle 2044, positioned along the front cabin 2020 between the front axle 2040 and the rear axle 2042. In this embodiment, the rear section 2030 of the fire apparatus 2010 is pivotably coupled to the front cabin 2020 (e.g., similar to a trailer, etc.). As shown in FIGS. 67A-69, the front axle 2040, the rear axle(s) 2042, and the intermediate axle 2044 of the fire apparatus 2010 include tractive assemblies, shown as wheel and tire assemblies 2046, rotatably coupled to the chassis 2016 and configured to support the fire apparatus 2010 on the ground. In other embodiments, the fire apparatus 2010 includes another type of tractive element (e.g., a track, etc.). In some embodiments, the fire apparatus 2010 is configured as another type of fire apparatus (e.g., an aircraft rescue and firefighting ("ARFF") truck, etc.). In alternative embodiments, the vehicle is configured as a vehicle other than a fire apparatus. By way of example, the vehicle may be mining equipment, construction equipment, farming equipment, an aerial truck, a rescue truck, a boom lift, and/or still another vehicle (e.g., any type of vehicle that may include a ladder assembly or boom assembly).

As shown in FIGS. 67A-69, the fire apparatus 2010 includes a stabilization system, shown as stabilization system 2050. As shown in FIGS. 67A and 67B, the stabilization system 2050 of the fire apparatus 2010 includes first stabilizers, shown as outriggers 2052, positioned along the rear section 2030 between the front axle 2040 and the rear axles 2042, and second stabilizers, shown as downriggers 2054, positioned along the rear section 2030 rearward of the rear axles 2042. In some embodiments, the downriggers 2054 of the fire apparatus 2010 are replaced with a stability foot. As shown in FIG. 68, the stabilization system 2050 of the fire apparatus 2010 includes the outriggers 2052 positioned along the rear section 2030 between the front axle 2040 and the rear axle 2042 and a third stabilizer, shown as stability foot 2056, positioned along the rear section 2030 rearward of the rear axle 2042. In some embodiments, the stability foot 2056 of the fire apparatus 2010 is replaced with the downriggers 2054. As shown in FIG. 69, the stabilization system 2050 of the fire apparatus 2010 includes the outriggers 2052 positioned along the rear section 2030 between the intermediate axle 2044 and the rear axle 2042. In some embodiments, the fire apparatus 2010 additionally includes at least one of the downriggers 2054 and the stability foot 2056. In some embodiments, the fire apparatus 2010 additionally or alternatively includes the outriggers 2052, the downriggers 2054, and/or the stability foot 2056 positioned along the front cabin 2020 (e.g., forward of the front axle 2040, rearward of the front axle 2040, etc.). In other embodiments, the stabilization system 2050 is omitted.

As shown in FIGS. 67A-69, the fire apparatus 2010 includes a powertrain system, shown as powertrain 2060. The powertrain 2060 may include a primary driver (e.g., an engine, a motor, etc.), an energy generation device (e.g., a generator, etc.), an energy storage device (e.g., a battery, capacitors, ultra-capacitors, etc.) electrically coupled to the energy generation device, and/or a drivetrain (e.g., a transmission, a transfer case, a driveshaft, a differential, the front axle 2040, the rear axle(s) 2042, the intermediate axle 2044, etc.). The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front axle 2040, the rear axle(s) 2042, and the intermediate axle 2044. In some embodiments, the front axle 2040, the rear axle(s) 2042, and/or the intermediate axle 2044 include an individual motive driver (e.g., a motor that is electrically coupled to the energy storage device, etc.) configured to facilitate independently driving each of the wheel and tire assemblies 2046. In some embodiments, a transmission of the fire apparatus 2010 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 2046, etc.). The final drive may then propel or move the fire apparatus 2010. In such embodiments, the fire apparatus 2010 may not include the generator and/or the energy storage device. The powertrain 2060 of the fire apparatus 2010 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, propane, hydrogen, electricity, etc.).

As shown in FIGS. 67A-69, the fire apparatus 2010 includes a ladder assembly, shown as aerial ladder assembly 2070. The aerial ladder assembly 2070 includes a ladder 2072 and a turntable assembly, shown as turntable 2074, coupled to a first end (e.g., base end, proximal end, pivot end, lower end, etc.) of the ladder 2072. A platform, shown as basket 2200, is coupled to an opposing, second end (e.g., free end, distal end, platform end, implement end, water nozzle end, etc.) of the ladder 2072. According to an exemplary embodiment, the ladder 2072 includes a plurality of ladder sections. In some embodiments, the plurality of sections of the ladder 2072 are extendable. An actuator may selectively reconfigure the ladder 2072 between an extended configuration and a retracted configuration. By way of example, the ladder 2072 may include a plurality of nested sections that telescope with respect to one another. In the extended configuration (e.g., deployed position, use position, etc.), the ladder 2072 may be lengthened such that the basket 2200 is extended away from the fire apparatus 2010. In the retracted configuration (e.g., storage position, transport position, etc.), the ladder 2072 may be shortened such that the basket 2200 is withdrawn towards the fire apparatus 2010. In other embodiments, the ladder 2072 includes a single, fixed length ladder section. In an alternative embodiment, the fire apparatus 2010 does not include the aerial ladder assembly 2070, but may alternatively include a boom lift, crane assembly, or another type of moveable and/or extendable assembly. Accordingly, the ladder 2072 may include a single ladder section, multiple ladder sections configured to extend and retract relative to one another, one or more boom sections (e.g., structural members without steps), or a combination thereof.

The turntable 2074 may be directly or indirectly coupled to the chassis 2016 (e.g., with an intermediate superstructure, a torque box, through the rear section 2030, etc.). According to an exemplary embodiment, the turntable 2074 is pivotably coupled to the rear section 2030. In some embodiments, the turntable is rotatable a full 360 degrees. In some embodiments, the rotation of the turntable 2074 is limited to a range of less than 360 degrees (e.g., dependent on the stability of the fire apparatus 2010, the operating parameters of the aerial ladder assembly 2070, etc.). The turntable 2074 may be coupled to an actuator positioned to facilitate pivoting (e.g., rotating, turning, etc.) the turntable 2074. In one embodiment, the actuator is an electric motor (e.g., an alternating current (AC) motor, a direct current motor (DC), etc.) configured to convert electrical energy into mechanical energy. In other embodiments, the actuator is powered by air (e.g., pneumatic, etc.), a fluid (e.g., a hydraulic cylinder, etc.), mechanically (e.g., a flywheel, etc.), or another source. In other embodiments, the turntable 2074 is fixed to the rear section 2030 (i.e., cannot rotate).

As shown in FIGS. 67A-68, the fire apparatus 2010 includes the aerial ladder assembly 2070 in a rear mount configuration. In a rear mount configuration, the pedestal 2074 is positioned rearward of the rear axles 2042. In other embodiments, the aerial ladder assembly 2070 is positioned in a mid-mount configuration. In a mid-mount configuration, the pedestal 2074 is positioned between the front axle 2040 and the rear axle 2042. In FIG. 69, the fire apparatus 2010 is a tiller configuration where the rear section 2030 is pivotable relative to the front cabin 2020. In this configuration, the pedestal 2074 is coupled to the rear section 2030 near a front end of the rear section 2030. In this configuration, the pedestal 2074 may extend directly above the intermediate axle 2044.

As shown in FIGS. 67A-68, the first end of the ladder 2072 is pivotably coupled to the turntable 2074. Actuators, shown as cylinders 2076 are positioned to pivot the ladder 2072 and/or the basket 2200 about a horizontal axis (e.g., a axis that extends through a pivotal joint between the ladder 2072 and the turntable 2074, etc.). The actuator may be a linear actuator, a rotary actuator, or still another type of device and may be powered hydraulically, pneumatically, electrically, or still otherwise powered. In one embodiment, the ladder 2072 is pivotable between a lowered position (e.g., the position shown in FIGS. 67A-69, etc.) and a raised position. The ladder 2072 may be generally horizontal or at a relatively shallow angle (e.g., 10 degrees, etc.) below or above horizontal when disposed in the lowered position (e.g., a stored position, etc.). In one embodiment, extension and retraction of the cylinders 2076 pivots the ladder 2072 and the basket 2200 about the horizontal axis and raises or lowers, respectively, the second end of ladder 2072 (e.g., the basket 2200, etc.). In the raised position, the aerial ladder assembly 2070 facilitates accessing an elevated height (e.g., for a fire fighter, a person being aided by the fire fighter, etc.).

According to an exemplary embodiment, the aerial ladder assembly 2070 forms a cantilever structure when at least one of raised vertically and extended horizontally. The aerial ladder assembly 2070 is supported by the cylinders 2076 and by the turntable 2074 at the first end. The aerial ladder assembly 2070 supports static loading from its own weight, the weight of any equipment coupled to the ladder 2072 (e.g., the basket 2200, the nozzle 2150, the conduit 2152 coupled to the nozzle 2150, etc.), and the weight of any persons using the ladder 2072 and/or the basket 2200. The aerial ladder assembly 2070 may also support various dynamic loads (e.g., forces imparted by a fire fighter or other persons climbing the ladder 2072; wind loading; loading due to rotation, elevation, or extension of aerial ladder assembly; the weight of persons in the basket 2200; etc.). Such static and dynamic loads are carried by the aerial ladder assembly 2070. The forces carried by the cylinders 2076, the turntable 2074, and/or the chassis 2016 may be proportional (e.g., directly proportional, etc.) to the length of the ladder 2072.

Figure 70A:
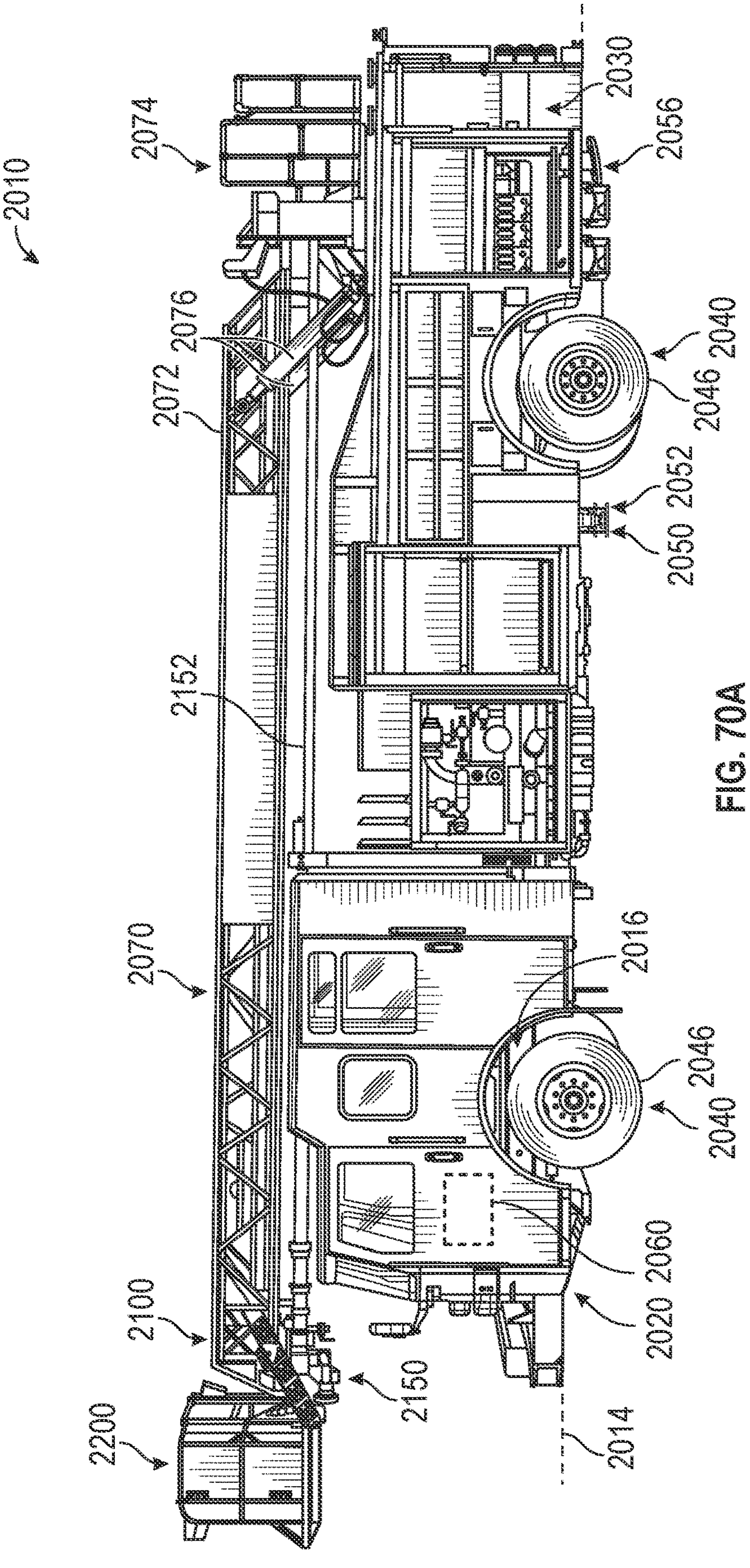
FIG. 70A is a left side view of a fire apparatus, according to an exemplary embodiment.
Figure 70B:
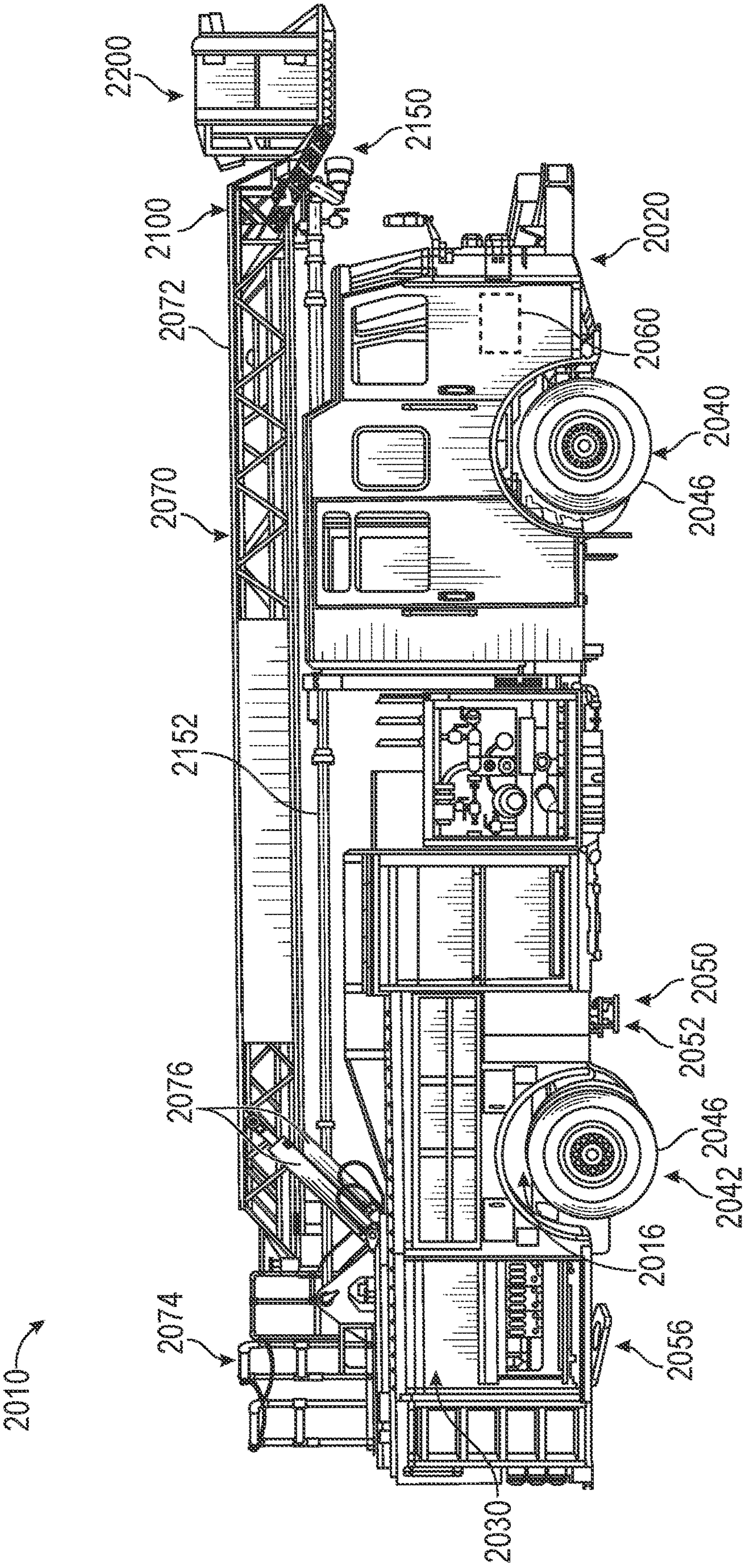
FIG. 70B is a right side view of the fire apparatus of FIG. 70A, according to an exemplary embodiment.
Figure 71A:
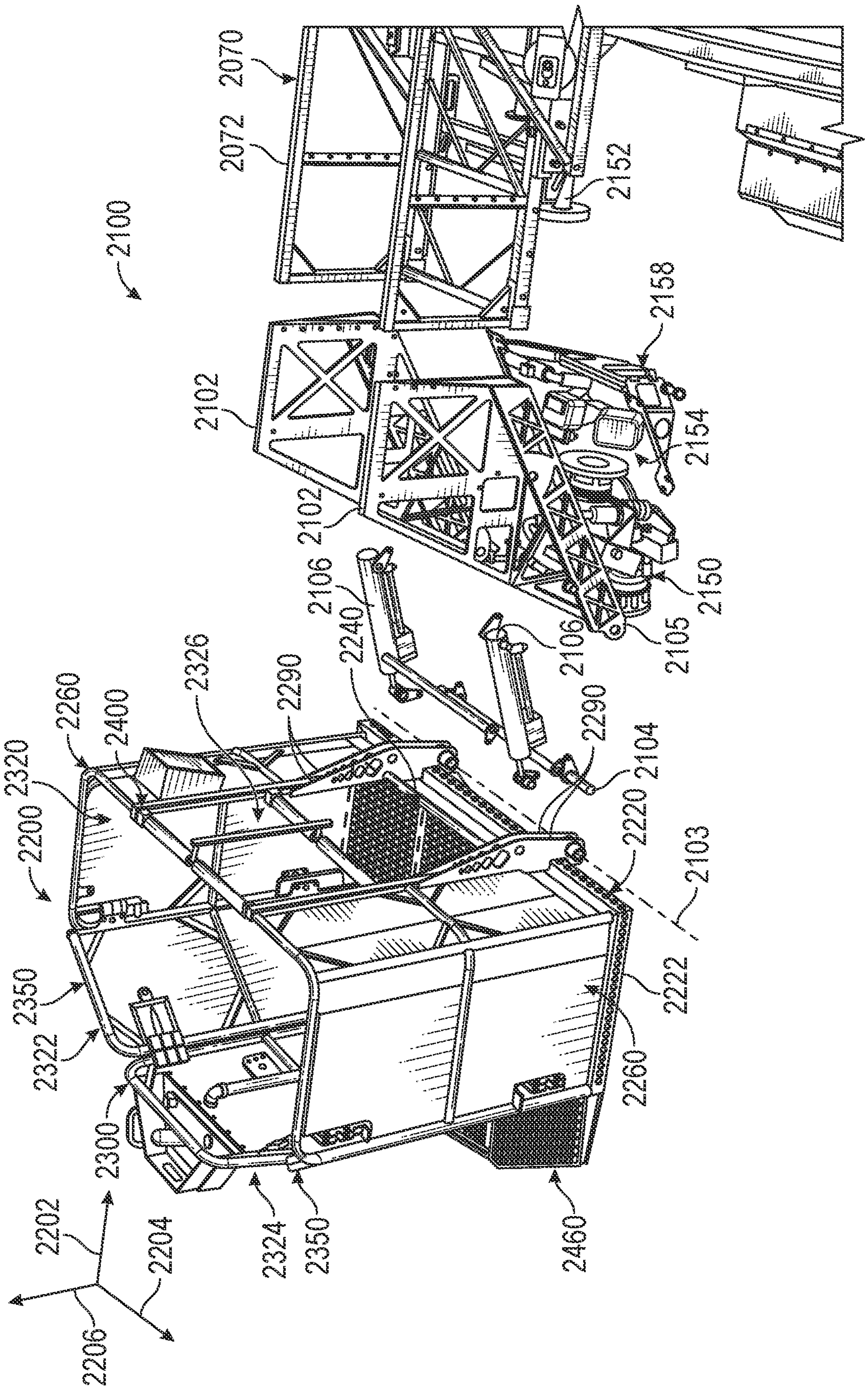
FIG. 71A is an exploded view of a section of the fire apparatus of FIG. 70A, according to an exemplary embodiment.
Figure 71B:
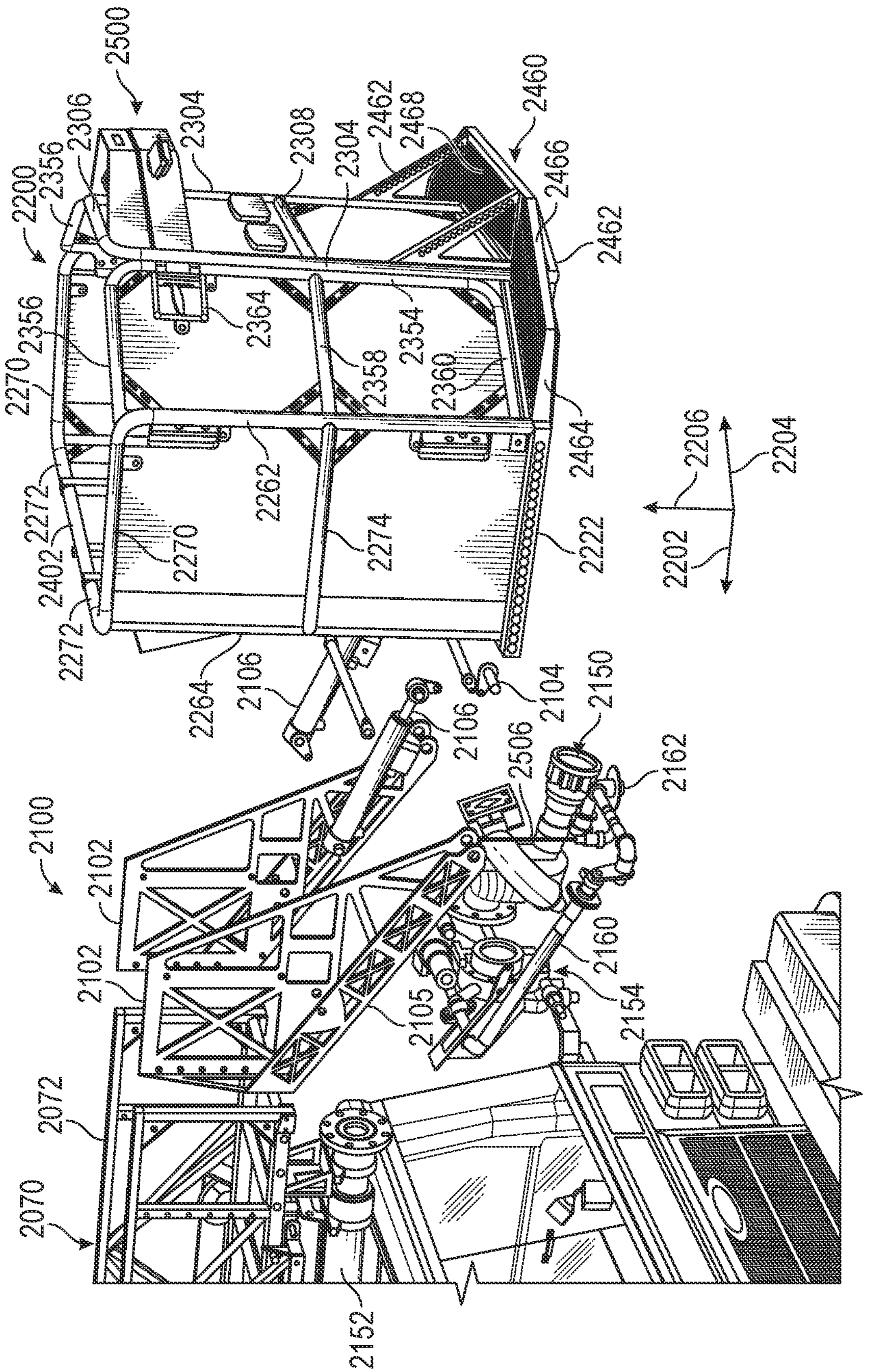
FIG. 71B is another exploded view of a section of the fire apparatus of FIG. 70A, according to an exemplary embodiment.
Figure 71C:
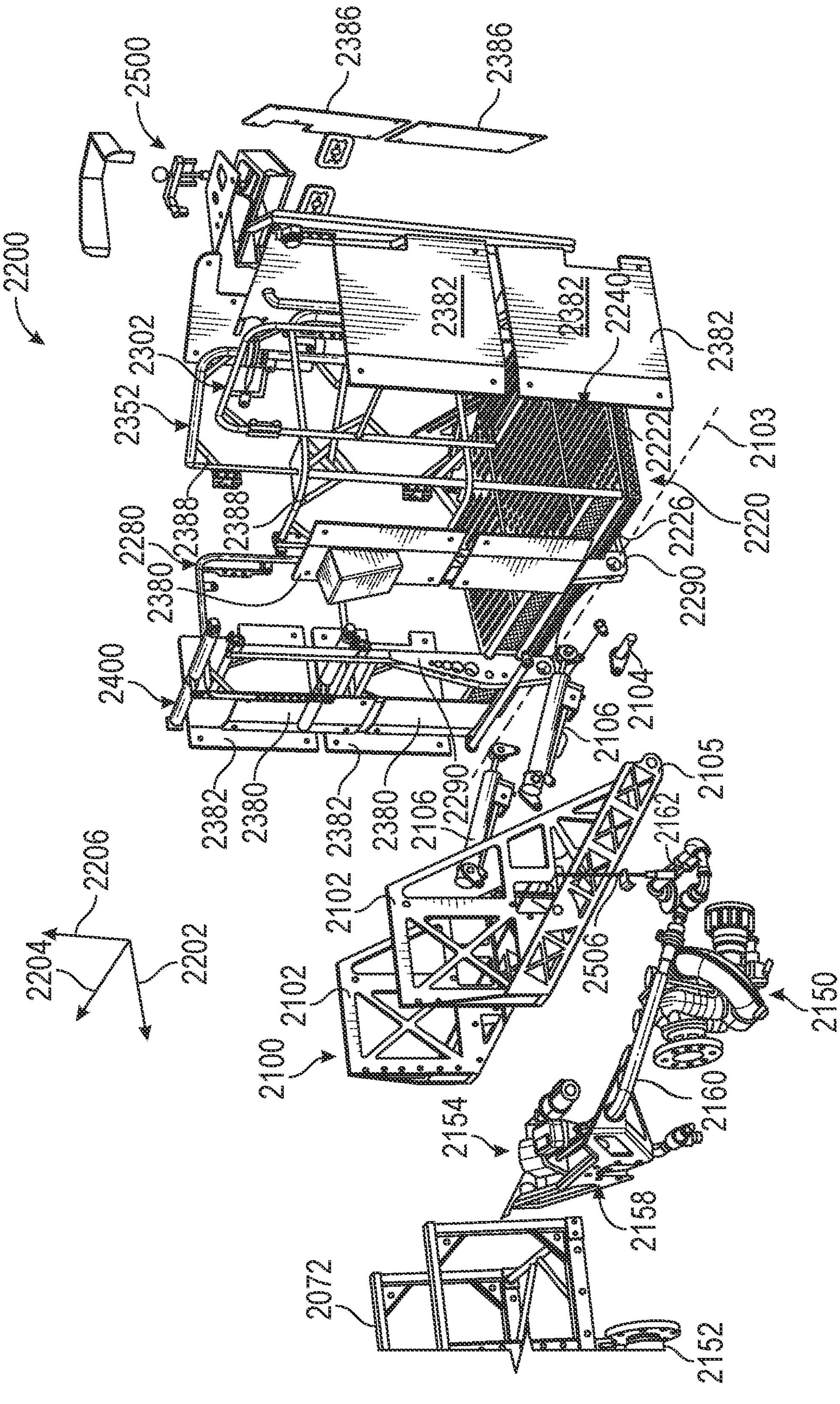
FIG. 71C is another exploded view of a section of the fire apparatus of FIG. 70A, according to an exemplary embodiment.

As shown in FIGS. 70A-71C, the basket 2200 is coupled to the ladder 2072 through a mount, shown as mount assembly 2100. As shown in FIGS. 71A-71C, the mount assembly 2100 includes a first set of side plates, shown as side plates 2102, each side plate 2102 having a first end coupled to the ladder 2072 and a second end coupled to the basket 2200. The second end of the side plates 2102 may be pivotably coupled to the basket 2200 such that the basket 2200 pivots about a horizontal axis 2103 (e.g., an axis that extends through a pivotal joint between the basket 2200 and the side plates 2102, etc.). By pivotably coupling the basket 2200 to the mount assembly 2100, the basket 2200 may be rotated relative to the mount assembly 2100 in order to maintain a consistent vertical orientation of the basket 2200 when the ladder 2072 moves between the raised and lowered positions. In some embodiments, the horizontal axis 2103 about which basket 2200 pivots is vertically offset below the ladder 2072 when the ladder 2072 is in a horizontal configuration to facilitate passage of an operator between the ladder 2072 and the basket 2200. Additionally, a distance between the side plates 2102 may be adjusted to facilitate passage of a user between the side plates 2102.

As shown in FIGS. 71A-71C, the mount assembly 2100 includes a set of pins, shown as pivot pins 2104, about which the basket 2200 is configured to pivot. According to an exemplary embodiment, the pivot pins 2104 are aligned with the horizontal axis 2103 about which the basket 2200 pivots. As shown in FIGS. 71A-71C, the mount assembly 2100 further includes a second set of side plates, shown as side plates 2105. In some embodiments the side plates 2105 are positioned parallel to the side plates 2102 and are laterally offset a distance outside of the side plates 2102. According to an exemplary embodiment, the side plates 2102 and the side plates 2105 are configured to each support an end of the corresponding pivot pin 2104. In some embodiments, each side plate 2102 is integrally formed with each side plate 2105 as a single unitary body (e.g., formed from a single piece of sheet metal).

As shown in FIGS. 71A-71C, the basket 2200 is pivotably coupled to the mount assembly 2100 with one or more actuators, shown as cylinders 2106. According to an exemplary embodiment, the cylinders 2106 are positioned to pivot the basket 2200 about the pivot pins 2104. The actuators may be linear actuators, rotary actuators, or still other types of devices and may be powered hydraulically, pneumatically, electrically, or still otherwise powered. In one embodiment, extension and retraction of the cylinders 2106 pivots the basket 2200 about the horizontal axis 2103. The cylinders 2106 are pivotably coupled to the basket 2200 at a first end, and pivotably coupled to the mount assembly 2100 at a second end opposite the first end. The locations of the points at which the cylinders 2106 are coupled to the basket 2200 and the mount assembly 2100 may be selected to optimize the mechanical advantage of the cylinders 2106 on the basket 2200. As shown in FIGS. 71A-71C, each cylinder 2106 extends directly between the corresponding side plate 2102 and the corresponding side plate 2105.

Figure 72:
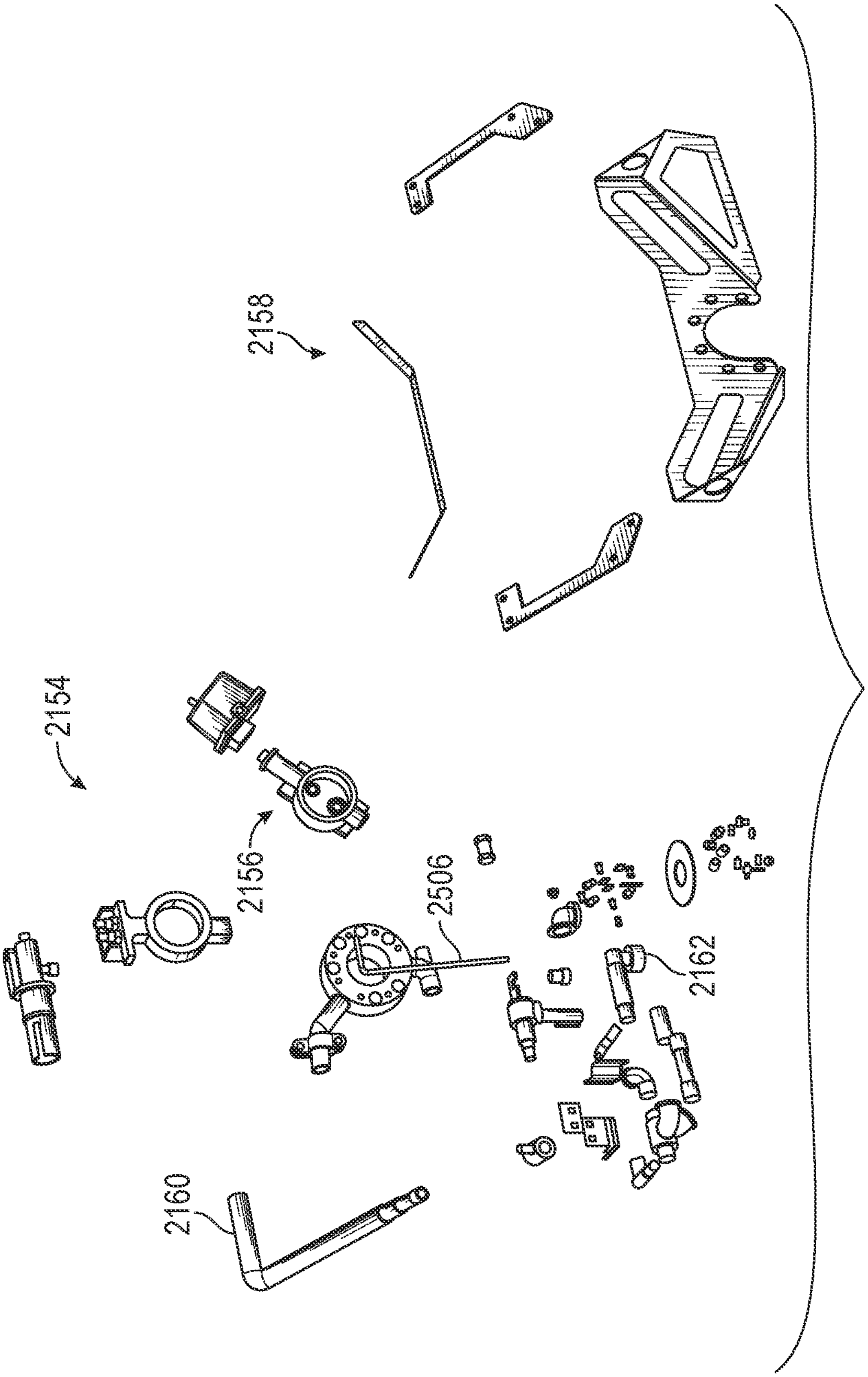
FIG. 72 is an exploded view of a waterway assembly and a waterway mount of the fire apparatus of FIG. 70A, according to an exemplary embodiment.

According to the exemplary embodiment shown in FIGS. 71A-71C, the aerial ladder assembly 2070 further includes a nozzle (e.g., a deluge gun, a water cannon, a deck gun, a monitor, etc.), shown as nozzle 2150. As shown in FIGS. 70A and 70B, the nozzle 2150 may be connected to a source of fire suppressant fluid (e.g., an onboard water tank, an external source such as a fire hydrant or tanker truck, etc.) through a pipe, hose, or conduit, shown as conduit 2152. The conduit 2152 may be configured to telescope or otherwise extend to accommodate extension of the ladder 2072. As shown in FIGS. 71A-72, the conduit 2152 extends along the aerial ladder assembly 2070 (e.g., along the side of the aerial ladder assembly 2070, beneath the aerial ladder assembly 2070, in a channel provided in the aerial ladder assembly 2070, etc.). By pivoting the aerial ladder assembly 2070 into the raised position, the nozzle 2150 may be elevated to facilitate expelling fire suppressant fluid (e.g., water, foam, etc.) from a higher elevation to suppress a fire. In some embodiments, the aerial ladder assembly 2070 does not include the nozzle 2150.

As shown in FIGS. 71A-72, a waterway, shown as waterway assembly 2154, is structurally and fluidly coupled between the conduit 2152 and the nozzle 2150. Waterway assembly 2154 may include a valve 2156 (e.g., an electrically actuated valve, a mechanically actuated valve, etc.) configured to control the flow of fluid to the nozzle 2150. The waterway assembly 2154 is coupled to the mount assembly 2100 by a mounting bracket, shown as waterway mount 2158. In some embodiments, the waterway assembly 2154 is capable of sending 1500 gallons per minute of fluid to the nozzle 2150. In other embodiments, the waterway assembly 2154 is capable of sending more or less than 1500 gallons per minute to the nozzle 2150. In some embodiments, the waterway assembly 2154 includes one or more conduits (e.g., a conduit 2160) to direct a portion of the flow of fluid along a secondary flow path to another location (e.g., to a single monitor, to multiple monitors, to a shower nozzle, etc.). In some embodiments, the waterway assembly 2154 is capable of sending 1250 gallons per minute of fluid along the secondary flow path. In other embodiments, the waterway assembly 2154 is capable of sending more or less than 1250 gallons per minute along the secondary flow path. As shown in FIGS. 71C and 72, a secondary flow path includes a conduit 2160 that directs fluid to a nozzle assembly, shown as shower nozzle 2162, that is coupled to an underside of the basket 2200. The shower nozzle 2162 may be configured to provide a spray of water to reduce the temperature of the basket 2200 when near a fire or other heat source. The shower nozzle 2162 may spray fluid directly onto the basket or may spray fluid below the basket 2200. The waterway assembly 2154 may direct approximately 75 gallons per minute along the secondary flow path in this configuration. In other embodiments, the waterway assembly 2154 is omitted.

Referring to FIGS. 73A-73F, a basket or platform is shown on the fire apparatus 2010 as a basket 2200. The basket 2200 provides a platform from which a fire fighter may complete various tasks (e.g., operate the nozzle 2150, create ventilation in a structure, overhaul a burned area, perform a rescue operation, etc.). The basket 2200 may be configured to hold users including at least one of fire fighters (i.e., operators) and persons being aided by the fire fighters. In some embodiments, the rear end of the basket 2200 is accessible through an opening (e.g., the third access opening 2326) from the ladder 2072 to facilitate access to the basket 2200 from the ground. In some embodiments, the front and/or sides of the basket 2200 are accessible through an opening (e.g., the first access opening 2322 or the second access opening 2324) to facilitate accessing a location remote from the chassis 2016. The basket 2200 may include one or more walls, railings, and/or doors around a perimeter of the basket to support the fire fighters and prevent accidental egress from the basket 2200. The basket 2200 is defined herein using a longitudinal axis 2202, a lateral axis 2204, and a vertical axis 2206. The longitudinal axis 2202, the lateral axis 2204, and the vertical axis 2206 are in a fixed orientation relative to the basket 2200 regardless of the position of the basket 2200 relative to the ladder 2072 or the chassis 2016.

Figure 74:
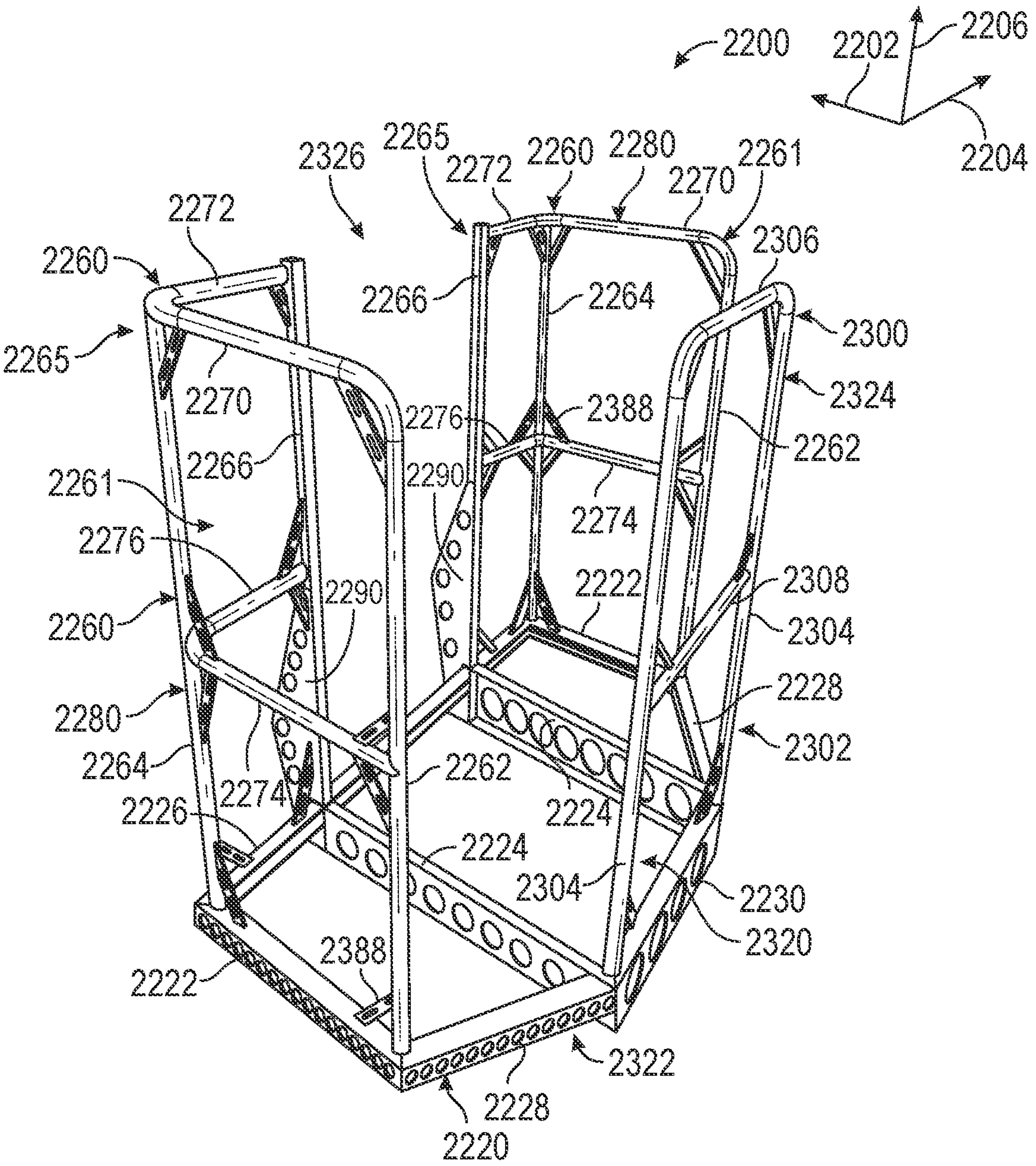
FIG. 74 is a perspective view of a basket of the fire apparatus of FIG. 70A, according to an exemplary embodiment.
Figure 75:
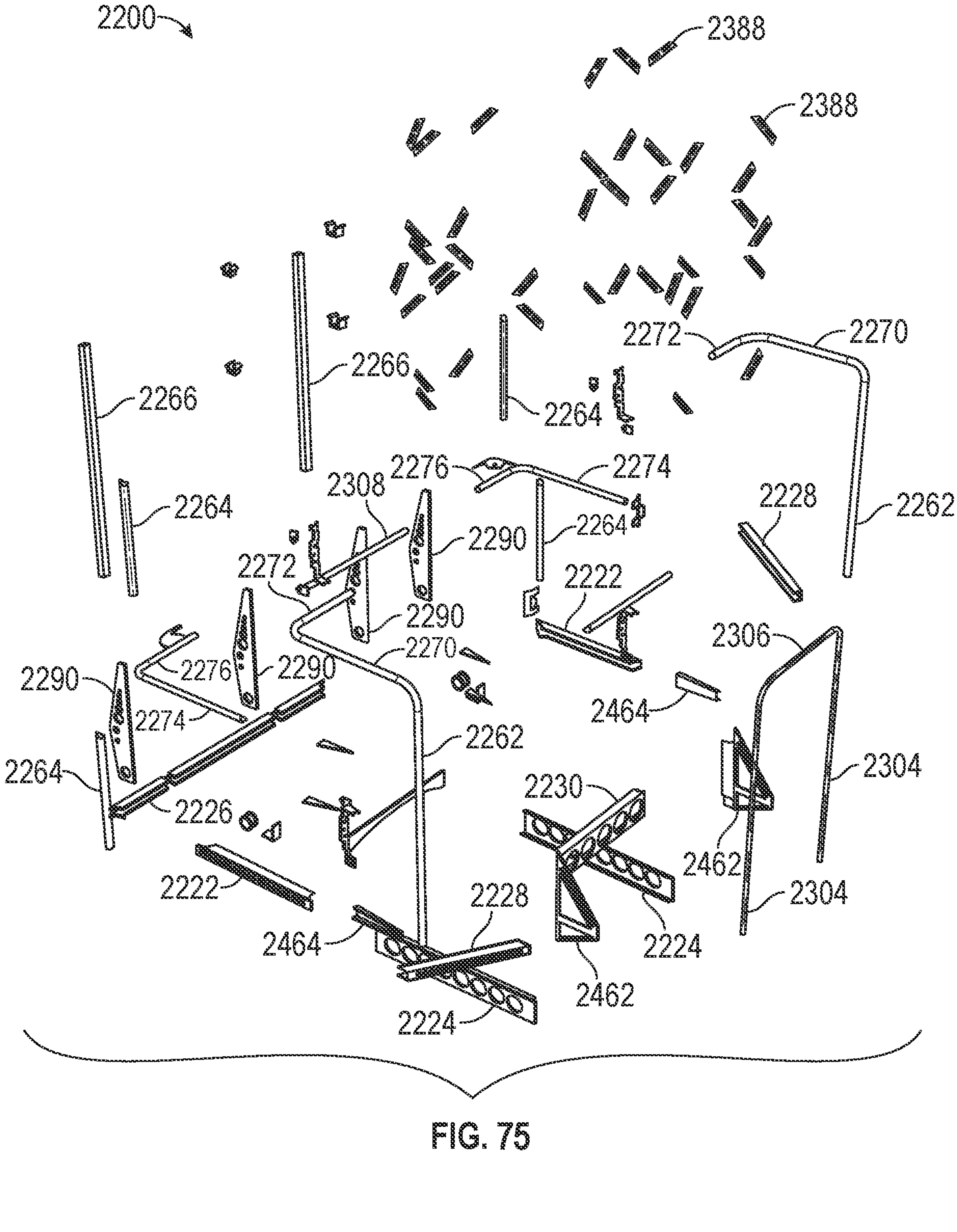
FIG. 75 is an exploded view of a basket of the fire apparatus of FIG. 70A, according to another exemplary embodiment.

As shown in FIGS. 71C, 74, and 75, the basket 2200 includes a subfloor assembly, shown as lower frame assembly 2220. The lower frame assembly 2220 includes a set of lower side members, shown as outer members 2222, each having a front end portion and a rear end portion, and a set of lower center members, shown as inner members 2224, each having a front end portion and a rear end portion. The outer members 2222 and the inner members 2224 extend longitudinally (i.e., in a longitudinal direction) with respect to the basket 2200 along the lower frame assembly 2220. Accordingly, the outer members 2222 and the inner members 2224 may extend substantially parallel to one another. Alternatively, one or more of the outer members 2222 and the inner members 2224 may extend at an angle (i.e., not parallel or perpendicular) to one another. The outer members 2222 are laterally offset a first distance from one another, and the inner members 2224 are laterally offset a second distance from one another, where the first distance is larger than the second distance. The inner members 2224 extend directly between the outer members 2222. The inner members 2224 are longer than the outer members 2222.

As shown in FIGS. 74 and 75, the lower frame assembly 2220 includes a lower rear member, shown as rear member 2226, disposed at a rear end portion of the lower frame assembly 2220. The rear member 2226 extends laterally (i.e., in a lateral direction) with respect to the basket 2200 and has a left end portion and a right end portion. The left end portion and the right end portion of the rear member 2226 are directly coupled to the rear end portions of each outer members 2222, respectively. The rear end portions of the inner members 2224 are coupled to the rear member 2226 between the left and right end portions of the rear member 2226. The inner member 2224 may be directly or indirectly coupled to the rear member 2226. The outer members 2222 and the inner members 2224 extend longitudinally forward from the rear member 2226.

As shown in FIGS. 74 and 75, the lower frame assembly 2220 further includes a set of lower angled members, shown as angled members 2228, each having a front end portion and a rear end portion. The rear end portions of the angled members 2228 are directly coupled to the front end portions of the outer members 2222. The angled members 2228 extend at an angle from the outer members 2222 longitudinally forward (i.e., away from the rear member 2226) and laterally inward (i.e., towards a longitudinal centerline of the basket 2200 that extends in a longitudinal direction).

As shown in FIGS. 74 and 75, a lower front member, shown as front member 2230, is disposed at a front end of the lower frame assembly 2220 and extending laterally. The front member 2230 may or may not extend substantially parallel to the rear member 2226. The front member 2230 is longitudinally offset a distance from the rear member 2226. This distance is greater than the lengths of the outer members 2222. The front member 2230 is directly coupled to the front end portion of each inner member 2224. The front member 2230 may be directly or indirectly (e.g., through the inner members 2224) coupled to the front end portion of each angled member 2228. The front member 2230 has a width approximately equal to the distance between the inner members 2224. In other embodiments, the front member is wider than the distance between the inner members 2224 and accordingly is shorter than the rear member 2226. In some embodiments, the angled members 2228 are omitted, and the front member 2230 extends to the outer members 2222. As shown in FIGS. 74 and 75, the outer members 2222, the inner members 2224, the rear member 2226, the angled members 2228, and the front member 2230 are made from C-shaped channel. The outer members 2222, the inner members 2224, the rear member 2226, the angled members 2228, and the front member 2230 may be made with material having various cross sectional shapes (e.g., channel, square tube, round tube, etc.) and dimensions and from various materials (e.g., stainless steel, aluminum, etc.). For example, the outer members 2222 shown as being made from channel of a first height, and the inner members 2224 are shown as being made from channel with a second, larger height. The outer members 2222, the inner members 2224, the rear member 2226, the angled members 2228, and the front member 2230 may each be formed from multiple individual members (e.g., in the form of a truss).

Figure 73A:
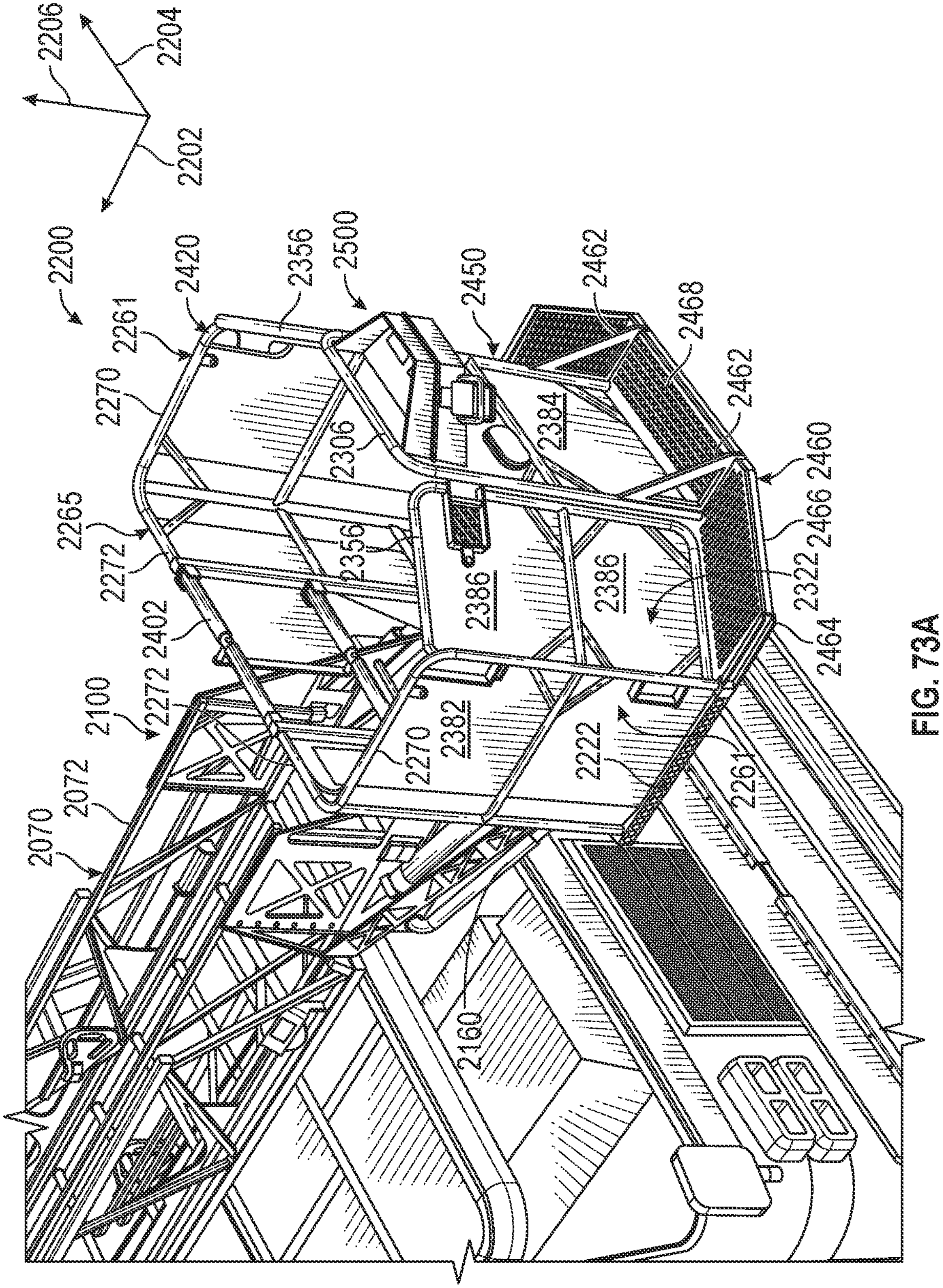
FIG. 73A is a perspective view of a section of the fire apparatus of FIG. 70A, according to an exemplary embodiment.
Figure 73B:
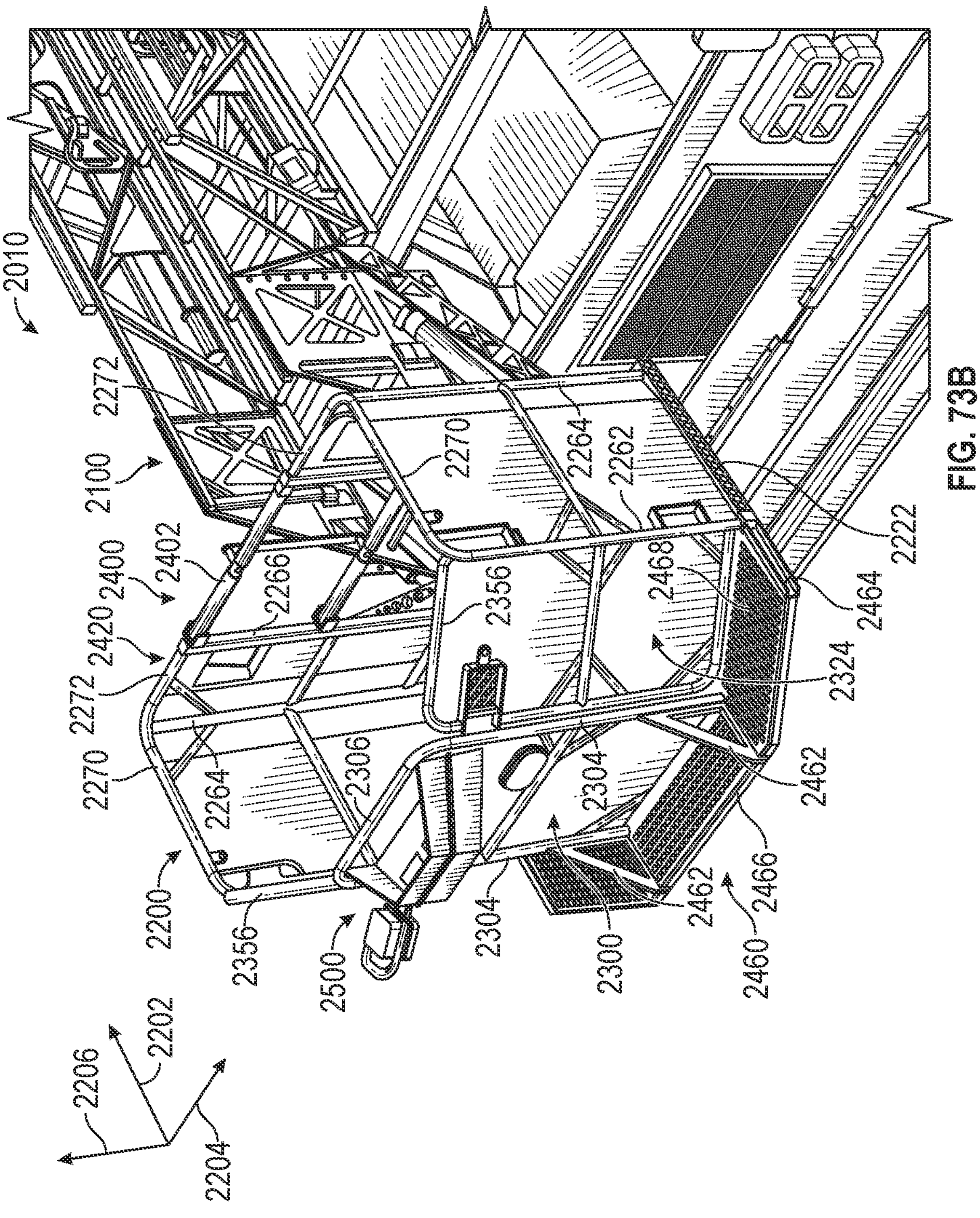
FIG. 73B is another perspective view of a section of the fire apparatus of FIG. 70A, according to an exemplary embodiment.
Figure 73C:
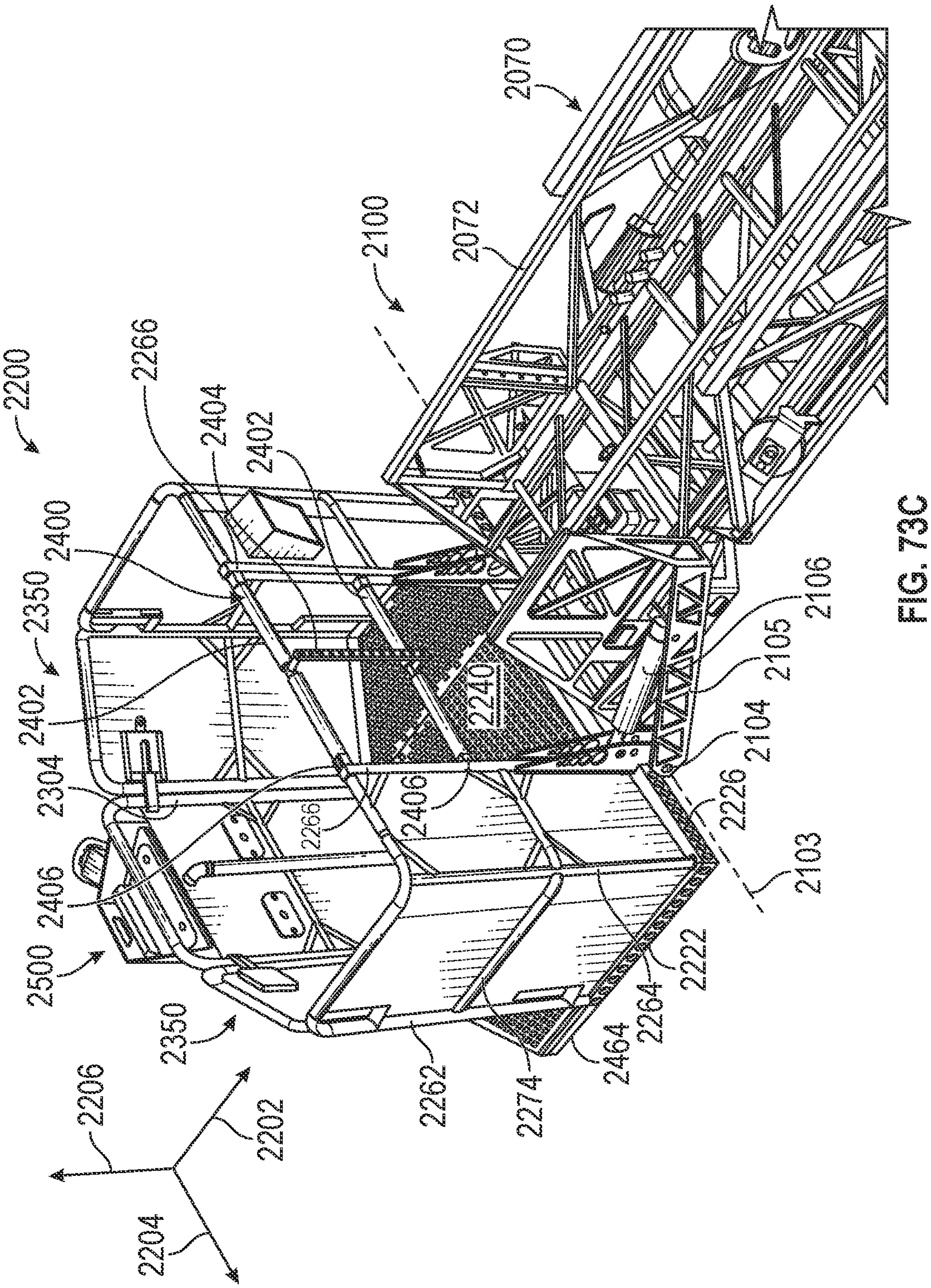
FIG. 73C is another perspective view of a section of the fire apparatus of FIG. 70A, according to an exemplary embodiment.
Figure 73D:
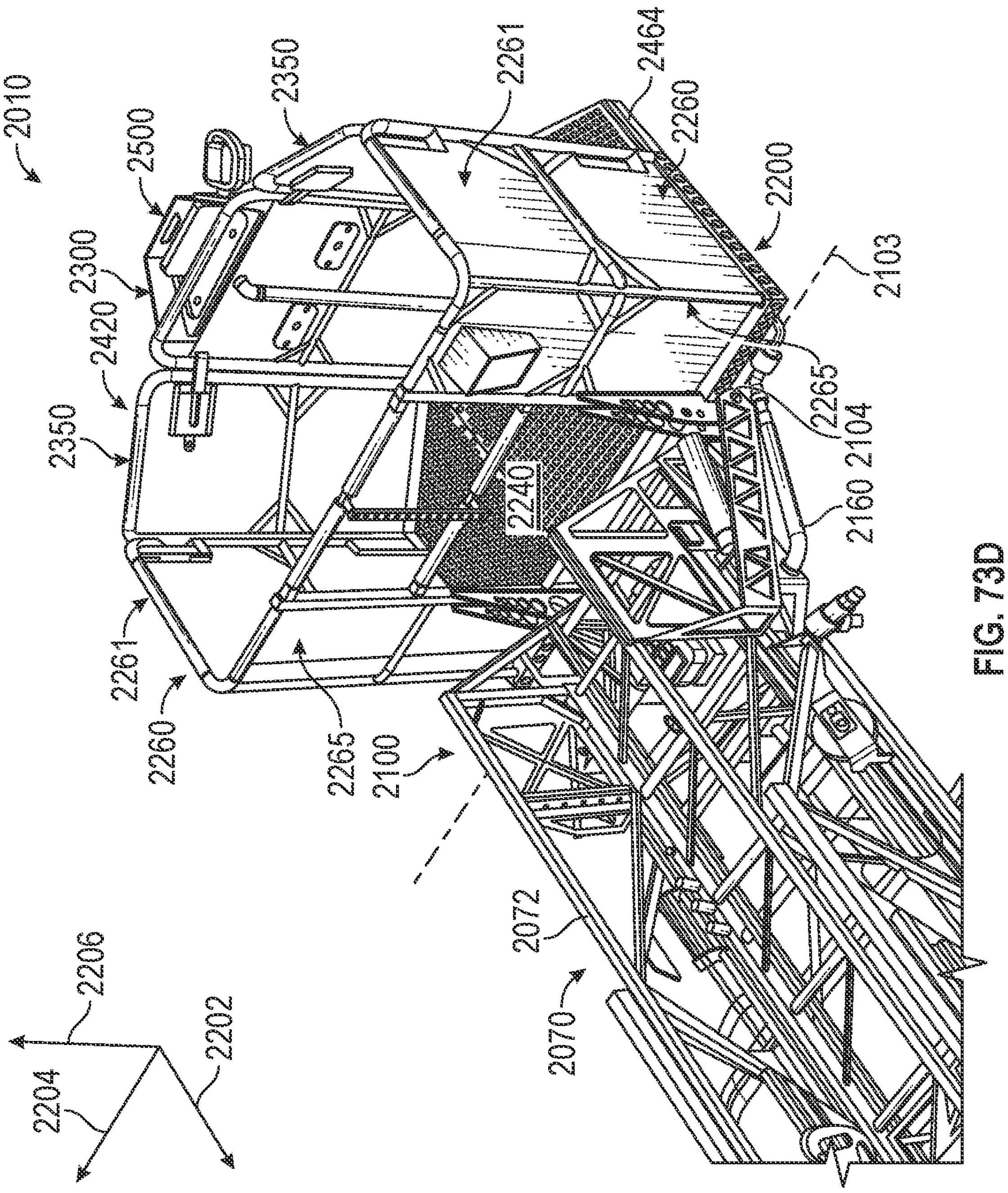
FIG. 73D is another perspective view of a section of the fire apparatus of FIG. 70A, according to an exemplary embodiment.
Figure 73E:
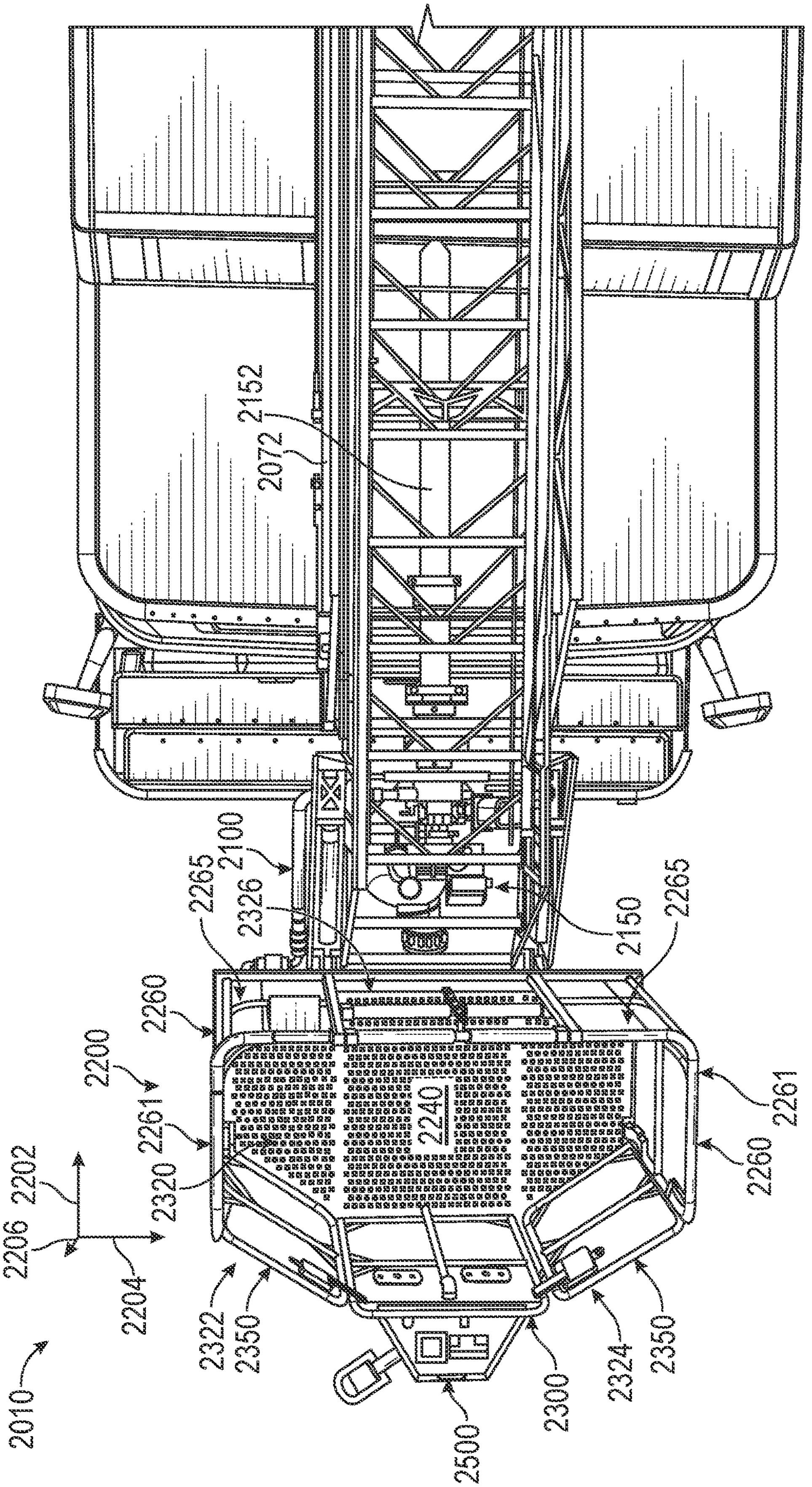
FIG. 73E is a top view of a section of the fire apparatus of FIG. 70A, according to an exemplary embodiment.

As shown in FIGS. 71A and 73E, the basket 2200 includes a work platform, shown as floor panel 2240, coupled to a top surface of the lower frame assembly 2220. Floor panel 2240 provides a surface upon which users or operators (e.g., fire fighters, rescue workers, etc.) may stand while operating the aerial ladder assembly 2070. The floor panel 2240 distributes the weight of the users throughout the lower frame assembly 2220, supporting the users. In some embodiments, the floor panel 2240 is made from one continuous piece of material. In other embodiments, the floor panel 2240 is formed from a number of smaller sheets or panels. The floor panel 2240 may define various cutouts (e.g., apertures, slots, etc.) around other components of the basket 2200. The floor panel 2240 may incorporate a surface that prevents the operator from slipping (e.g., a surface with raised perforations, a rubberized surface, etc.).

As shown in FIG. 74, the basket 2200 further includes a pair of wall assemblies, shown as corner walls 2260. There is one corner wall 2260 disposed on each side of the longitudinal centerline of the basket 2200. As shown in FIG. 74, the corner walls 2260 each include a first wall or lateral wall, shown as side wall 2261. As shown in FIGS. 74 and 75, the side walls 2261 each include a first vertical or upright member, shown as side upright member 2262 and a second vertical or upright member, shown as middle upright member 2264. The corner walls 2260 each further include a rear wall 2265. The rear wall 2265 shares the middle upright member 2264 with the corresponding side wall 2261 and further includes a third vertical or upright member, shown as rear upright member 2266. Alternatively, each side wall 2261 and each rear wall 2265 may include a separate middle upright member 2264. In such an embodiment, there may be a space between each side wall 2261 and the corresponding rear wall 2265.

The side upright members 2262, the middle upright members 2264, and the rear upright members 2266 each extend vertically (i.e., in a vertical direction) and include an upper end portion and a lower end portion. The upper end portions are positioned above the floor panel, and the lower end portions are positioned below the floor panel. The lower end portion of each side upright member 2262 is directly coupled to the corresponding outer member 2222 and the corresponding angled member 2228. The side upright members 2262 are coupled to the lower frame assembly 2220 near the intersections of the outer members 2222 and the angled members 2228. The lower end portion of each middle upright member 2264 is directly coupled to the corresponding outer member 2222 and the rear member 2226. The middle upright members 2264 are coupled to the lower frame assembly 2220 near the intersections of the outer members 2222 and the rear member 2226. The lower end portion of each rear upright member 2266 may be directly or indirectly coupled to the corresponding inner member 2224 and the rear member 2226. The rear upright members 2266 are coupled to the lower frame assembly 2220 near the intersections between the rear member 2226 and the inner members 2224. The side upright members 2262, the middle upright members 2264, and the rear upright members 2266 each extend above the floor panel 2240.

As shown in FIG. 74, the rear upright members 2266 and the middle upright members 2264 are longitudinally aligned (i.e., at the same longitudinal position). By way of example, a lateral axis could extend through both of the rear upright members 2266 and both of the middle upright members 2264. The middle upright members 2264 are each laterally aligned with (i.e., at the same longitudinal position as) one of the side upright members 2262. By way of example, a longitudinal line could extend through one of the middle upright members 2264 and one of the side upright members 2262. The inner members 2224 are each laterally aligned with one of the rear upright members 2266. By way of example, the inner members 2224 are laterally offset a first distance from one another, the rear upright members 2266 are laterally offset a second distance from one another, and the first distance and the second distance are approximately equal.

In some embodiments, the side upright members 2262, the middle upright members 2264, and/or the rear upright members 2266 are coupled to a top surface of the lower frame assembly 2220. In other embodiments, an aperture (e.g. a hole or a slot) is defined in the top surface of the lower frame assembly 2220, and the side upright members 2262, the middle upright members 2264, and/or the rear upright members 2266 are coupled to a surface of the lower frame assembly 2220 below the top surface (e.g., an inside surface, a bottom surface, etc.). In yet other embodiments, the side upright members 2262, the middle upright members 2264, and/or the rear upright members 2266 are each coupled to one or more side surfaces of the lower frame assembly 2220.

As shown in FIGS. 74 and 75, the side walls 2261 each further include an upper longitudinal member, shown as upper side member 2270, and a middle longitudinal member, shown as middle side member 2274. The upper side member 2270 and the middle side member 2274 each extend longitudinally and are substantially parallel to one another. The rear walls 2265 each include an upper lateral member, shown as upper rear member 2272, and a middle lateral member, shown as middle rear member 2276. The upper rear member 2272 and the middle rear member 2276 each extend laterally and are substantially parallel to one another. The upper side member 2270 is directly coupled to the upper end portion of the side upright member 2262 and the upper end portion of the middle upright member 2264. The upper rear member 2272 is directly coupled to the upper end portion of the middle upright member 2264 and the upper end portion of the rear upright member 2266. The middle side member 2274 is directly coupled to the side upright member 2262 and the middle upright member 2264 and located between the lower frame assembly 2220 and the upper side member 2270. The middle rear member 2276 is directly coupled to the middle upright member 2264 and the rear upright member 2266 and located between the lower frame assembly 2220 and the upper rear member 2272. In some embodiments, one or more of the upper side member 2270, the upper rear member 2272, the middle side member 2274, and the middle rear member 2276 are oriented generally horizontally. As shown in FIG. 74, the side upright member 2262, the middle upright member 2264, the rear upright member 2266, the upper side member 2270, the upper rear member 2272, the middle side member 2274, and the middle rear member 2276 of each corner wall 2260 form a corner wall frame 2280.

As shown in FIG. 71C, the basket 2200 includes rear supports, shown as rear supports 2290. The rear supports 2290 are coupled to each side of the rear upright members 2266 and oriented generally vertically. The rear supports 2290 each define an aperture configured to receive one of the pivot pins 2104, thereby pivotably coupling the basket to the mount assembly 2100. The rear supports 2290 may incorporate and/or couple to a bearing surface (e.g., a bushing, a bearing, etc.) that contacts the pivot pin 2104 to better distribute the loading and mitigate wear. The apertures defined by the rear supports 2290 are positioned adjacent the lower end portion of the rear upright members 2266. Accordingly, the horizontal axis 2103 about which the basket 2200 rotates is positioned below the floor panel 2240.

Figure 73F:
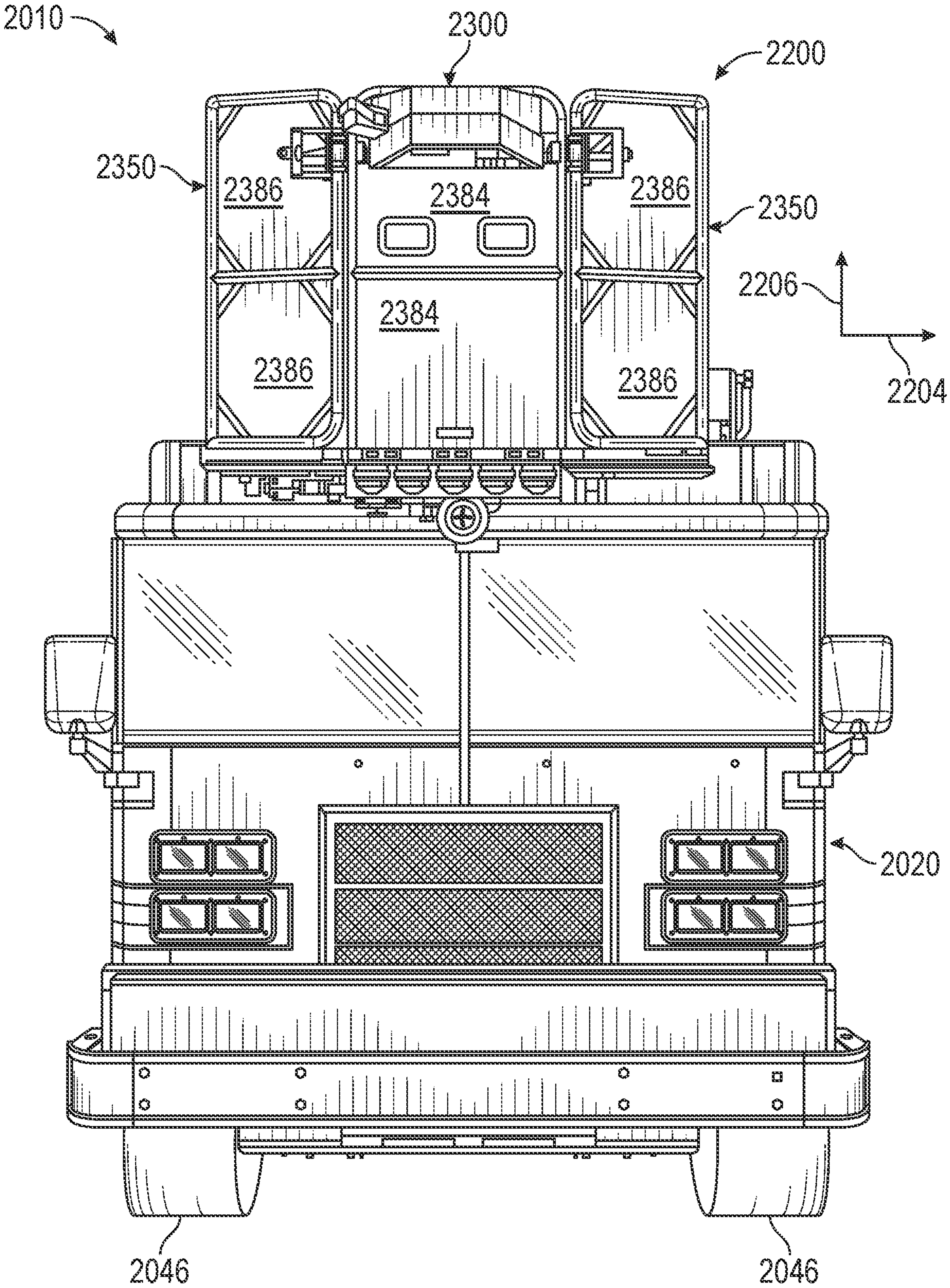
FIG. 73F is a front view of the fire apparatus of FIG. 70A, according to an exemplary embodiment.

As shown in FIGS. 73F and 74, the basket 2200 further includes one or more front walls, shown as front wall 2300. In some embodiments, the basket 2200 includes one front wall 2300 disposed along the longitudinal centerline of the basket 2200. As shown in FIG. 74, the front wall 2300 includes a frame, shown as front wall frame 2302. As shown in FIG. 74, the front wall frame 2302 includes a set of vertical or upright members, shown as front upright members 2304, each including an upper end portion and a lower end portion. The upper end portion is positioned above the floor panel 2240 and the lower end portion is positioned below the floor panel 2240. The lower end portion of each front upright member 2304 is directly or indirectly coupled to the front member 2230, the corresponding inner member 2224, and the corresponding angled member 2228. The front upright members 2304 are coupled to the lower frame assembly 2220 proximate the intersections of the inner members 2224, the angled members 2228, and the front member 2230. As shown in FIG. 74, the front wall frame 2302 further includes a first lateral member, shown as upper front member 2306, and a second lateral member, shown as middle front member 2308. The upper front member 2306 is directly coupled to the upper end portions of the front upright members 2304. The middle front member 2308 is directly coupled to the front upright members 2304 and located between the upper front member 2306 and the lower frame assembly 2220. In some embodiments, one or both of the upper front member 2306 and the middle front member 2308 are oriented generally horizontally.

Referring to FIGS. 73E and 74, the basket 2200 defines an enclosed area or working area 2320 configured to contain one or more users. The working area 2320 is a space defined above the floor panel 2240 and between the corner walls 2260 and the front wall 2300. The basket 2200 further defines a number of access openings configured to facilitate a user entering and/or exiting the working area 2320 of the basket 2200 from outside of the basket 2200. A first access opening 2322 is defined between one of the side walls 2261 and the front wall 2300, and a second access opening 2324 is defined between the other of the side walls 2261 and the front wall 2300. Specifically, the first access opening 2322 and the second access opening 2324 are defined between one of the front upright members 2304 and the nearest side upright member 2262. Each front upright member 2304 is offset longitudinally forward and laterally inward from the nearest side upright member 2262. Accordingly, the first access opening 2322 and the second access opening 2324 are angled relative to the front wall 2300 and the side wall

2261. A third access opening 2326 is defined between the rear walls 2265. Specifically, the third access opening 2326 is defined between the rear upright members 2266. The rear upright members 2266 are longitudinally aligned such that the third access opening 2326 extends laterally.

Figure 76A:
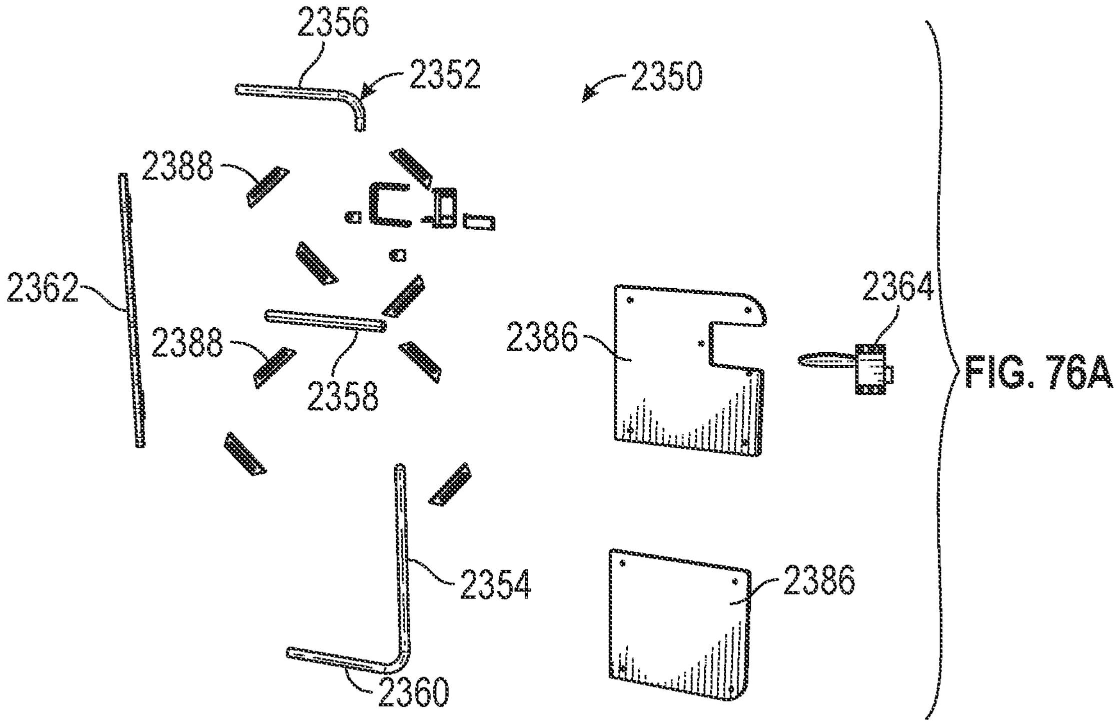
FIG. 76A is an exploded view of a front door of a basket of the fire apparatus of FIG. 70A, according to an exemplary embodiment.
Figure 76B:
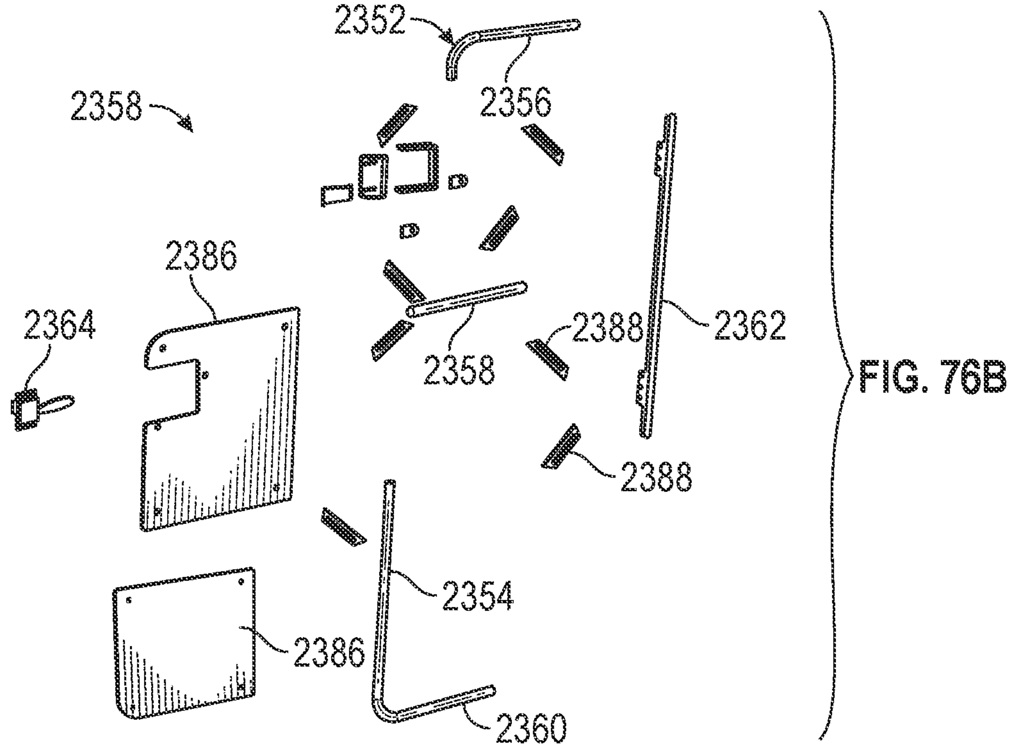
FIG. 76B is an exploded view of a front door of a basket of the fire apparatus of FIG. 70A, according to an exemplary embodiment.

As shown in FIGS. 73F, 76A, and 76B, the basket further includes a pair of front doors, shown as front doors 2350. The front doors 2350 facilitate the operators entering or exiting the working area 2320 of the basket 2200 through the first access opening 2322 and the second access opening 2324 while selectively closing to prevent accidental egress from the basket 2200. As shown in FIGS. 76A and 76B, the front doors 2350 include a front door frame, shown as front door frame 2352, the front door frame 2352 including a vertical or upright front door member, shown as vertical front door member 2354, an upper horizontal front door member, shown as upper front door member 2356, a middle horizontal front door member, shown as middle front door member 2358, and a lower horizontal front door member, shown as lower front door member 2360. The upper front door member 2356, the middle front door member 2358, and the lower front door member 2360 are directly coupled to the vertical front door member 2354. The upper front door member 2356 is positioned near a top end of the vertical front door member 2354. The lower front door member 2360 is positioned near a bottom end of the vertical front door member 2354. The middle front door member 2358 is positioned between the upper front door member 2356 and the lower front door member 2360. In some embodiments, the upper front door member 2356, the middle front door member 2358, and the lower front door member 2360 extend from the same side of the vertical front door member 2354 (e.g., in the same direction).

As shown in FIGS. 76A and 76B, each front door 2350 further includes a hinge 2362 coupled to the front door frame 2352. The hinge 2362 pivotably couples the front door frame 2352 to the corresponding side wall 2261. In other embodiments, the hinge 2362 pivotably couples the front door frame 2352 to the front wall 2300. In some embodiments, the front door 2350 includes multiple hinges 2362 to facilitate distributing the load on the front door 2350 to the rest of the basket 2200. The hinge 2362 facilitates rotating the front door 2350 about a vertical axis between a closed position, shown in FIG. 73E, and an open position. In the closed position, the front door 2350 extends between the side wall 2261 and the front wall 2300, preventing movement of a user through the corresponding first access opening 2322 or second access opening 2324. In the open position, the front door 2350 moves away from the side wall 2261 or the front wall 2300, allowing movement of a user through the corresponding first access opening 2322 or second access opening 2324. In some embodiments, the front door 2350 opens by rotating inward such that the front door 2350 extends within the working area 2320 when in the open position. In other embodiments, the front door 2350 opens by rotating outward. In yet other embodiments, the hinge 2362 is omitted and the front door 2350 instead includes a slide to facilitate the front door 2350 translating relative to the other component of the basket 2200.

As shown in FIGS. 76A and 76B, the front door 2350 further includes a latch, shown as locking latch 2364. The locking latch 2364 is coupled to the side of the front door frame 2352 opposite the hinge 2362. As shown, the locking latch 2364 selectively couples the front door 2350 to the front wall 2300. In other embodiments, the locking latch 2364 selectively couples the front door 2350 to the side wall 2261. The locking latch 2364 may be received by another component of the basket 2200. The locking latch 2364 is configured to prevent the front door 2350 from opening (e.g., rotating, sliding, etc.) when in a locked position and to allow the front door 2350 to move freely when in an unlocked position. The locking latch 2364 is configured to move to the unlocked position in response to a user input (e.g., turning a knob, pressing a button, etc.). In some embodiments, when the front door 2350 is closed (e.g., by the operator pushing or pulling), the locking latch 2364 automatically moves to the locked position to prevent the front door 2350 from opening.

Figure 77:
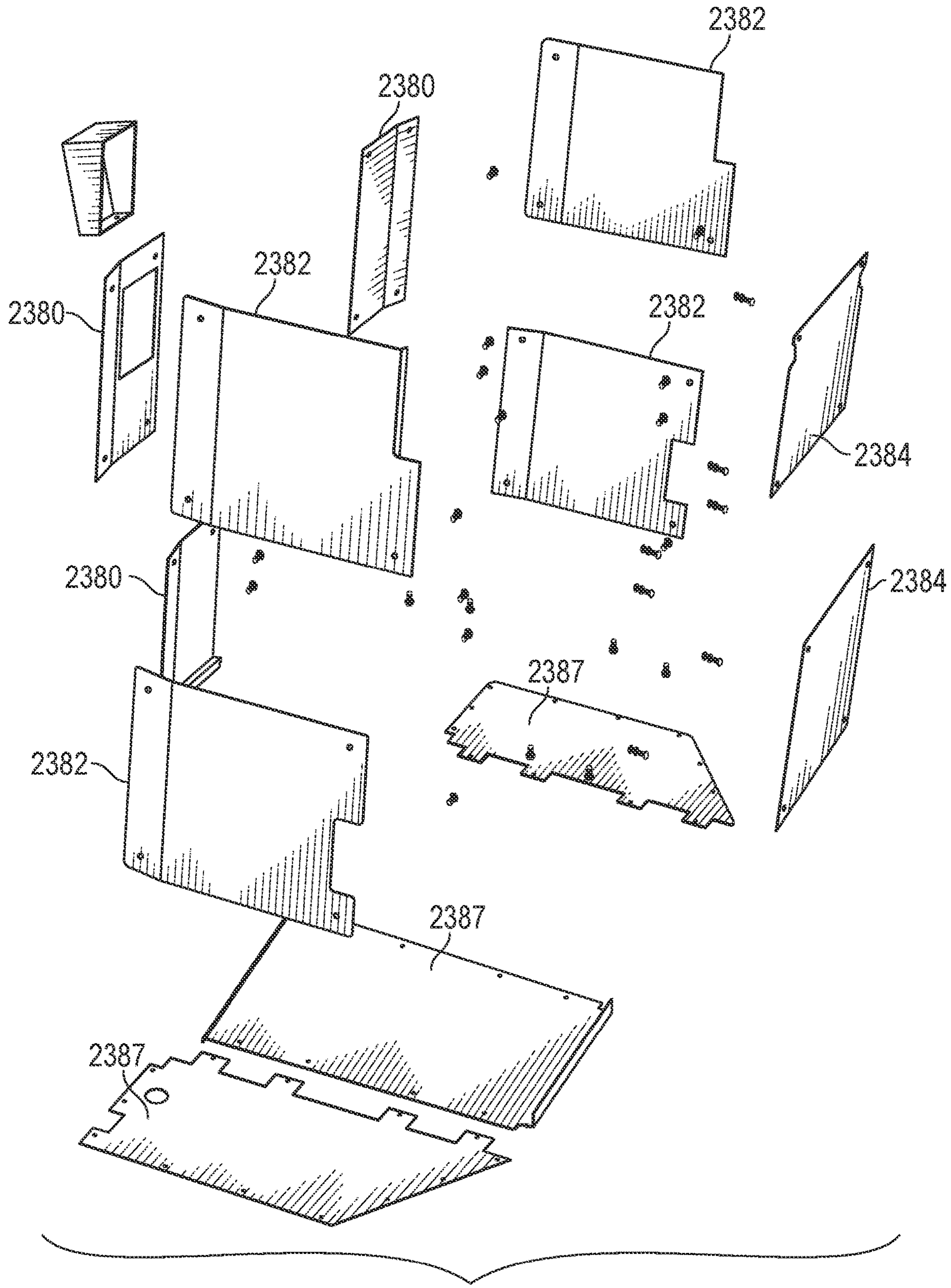
FIG. 77 is an exploded view of various heat-resistant panels of a basket of the fire apparatus of FIG. 70A, according to an exemplary embodiment.

As shown in FIGS. 71C and 77, the corner walls 2260 each further include rear panels, shown as rear heat-resistant panels 2380, and side panels, shown as side heat-resistant panels 2382. As shown in FIGS. 73F and 77, the front wall 2300 includes front panels, shown as front heat-resistant panels 2384. As shown in FIGS. 73F, 76A, and 76B, the front doors 2350 each include front door panels, shown as heat-resistant front door panels 2386. As shown in FIG. 77, the lower frame assembly 2220 includes bottom panels, shown as heat-resistant bottom panels 2387, that extend along a bottom side of the lower frame assembly 2220. The heat-resistant panels 2380, 2382, 2384, 2386, and 2387 may be made from a heat-resistant material (e.g., an insulative material, a material that reflects thermal energy, etc.) to facilitate shielding the users in the working area 2320 from nearby heat sources (e.g., a burning building). Specifically, the heat-resistant panels 2380, 2382, 2384, and 2386 reduce a rate of heat transfer from a heat source positioned outside of the basket 2200 into the working area 2320 relative to the basket 2200 configured without the heat-resistant panels 2380, 2382, 2384, 2386, and 2387. The heat-resistant panels 2380, 2382, 2384, 2386, and 2387 cover or partially cover openings in the corner wall frames 2280, the front wall frames 2302, the front door frame 2352, and the lower frame assembly 2220. As shown in FIG. 71C, the corner wall frames 2280, front wall frame 2302, and front door frames 2352 each include one or more connectors, shown as gusset plates 2388. The gusset plates 2388 may be coupled to other components of the corner wall frames 2280, the front wall frame 2302, the front door frames 2352, and/or the lower frame assembly 2220. The gusset plates 2388 facilitate attachment of the heat-resistant panels 2380, 2382, 2384, and 2386 to the corner wall frames 2280, front wall frame 2302, front door frames 2352, and/or the lower frame assembly 2220. The heat-resistant bottom panels 2387 may be directly coupled to one or more members of the lower frame assembly 2220. In some embodiments, two or more of the heat-resistant panels are integrally formed as a single unitary body (e.g., are formed from a single piece of material)

As shown in FIG. 73C, the basket 2200 further includes a door, shown as rear door 2400, the rear door 2400 including rear door members, shown as rear door members 2402 and rear door handle, shown as rear door handle 2404. The rear door members 2402 are pivotably coupled to one of the rear upright members 2266. As shown in FIG. 73C, the rear door members 2402 are each received by an interface, shown as interface 2406. The interfaces 2406 may be coupled to the rear upright member 2266 opposite the rear upright member 2266 that is coupled to rear door members 2402. In some embodiments, the rear door handle 2404 is pivotably coupled to each of the rear door members 2402 to form a four bar mechanism that includes the rear door members 2402, the rear door handle 2404, and the rear upright member 2266. In some of these embodiments, the user may lift on the rear door handle 2404 to rotate the rear door 2400 about a horizontal axis to facilitate access to the basket 2200 from the ladder 2072. In other embodiments the rear door 2400 rotates about a vertical axis. As shown in FIG. 73B, the rear door member 2402, the upper rear members 2272, the upper side members 2270, the upper front door members 2356, and the upper front member 2306 cooperate to form an upper rail, shown as upper rail 2420.

In some embodiments, two or more components of the basket 2200 are integrally formed as a single unitary body (e.g., are formed from a single piece of tube). By way of example, as shown in FIG. 75, the upper rear member 2272, the upper side member 2270, and the side upright member 2262 are formed from a single piece of bent tube. By way of another example, as shown in FIG. 75, the middle rear member 2276 and the middle side member 2274 are formed from a single piece of bent tube. In other embodiments, the rear heat-resistant panels 2380 and the side heat-resistant panels may be integrally formed such that the corner wall frame 2280 is covered by a single heat-resistant panel. In some embodiments, one or more components of the basket 2200 are omitted. By way of example, the middle side member 2274 and the middle rear member 2276 may be omitted. In some embodiments, one or more components of the basket 2200 shown as integrally formed may be separated into multiple sections. By way of example, the middle upright member 2264 may be split into two separate sections. In some embodiments, various components of the basket 2200 are made from steel having a 100,000 psi yield strength.

Figure 9:
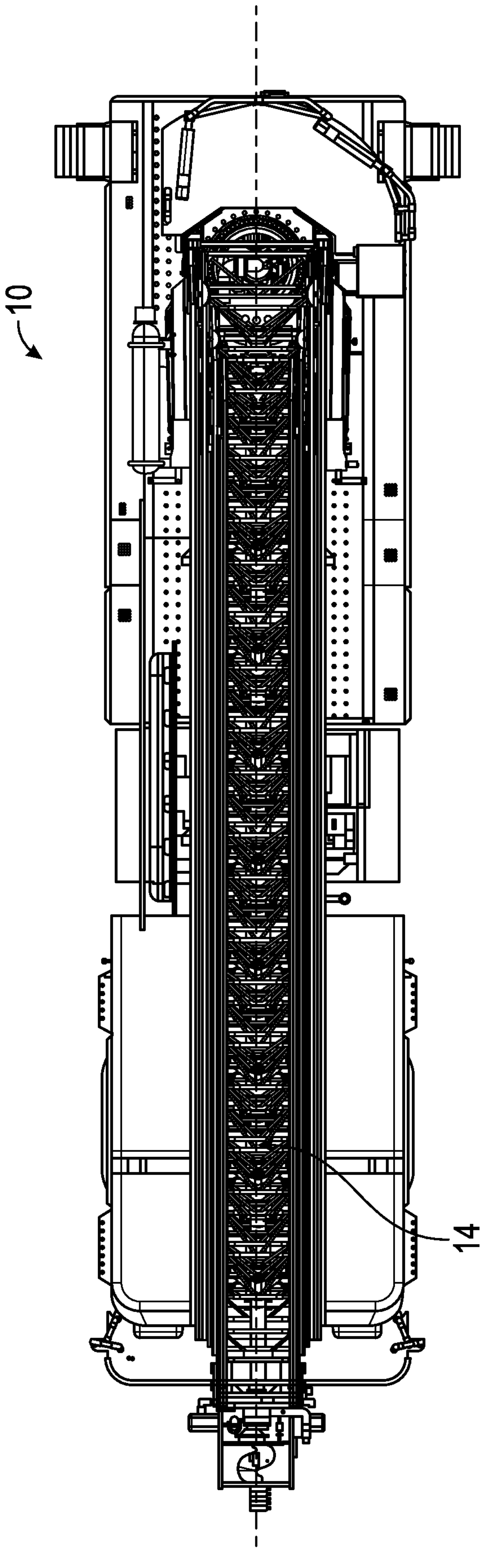
FIG. 9 is a top view of the fire apparatus of FIG. 1, according to an exemplary embodiment.

As shown in FIGS. 71A and 73A, the basket 2200 further includes an extension or platform, shown as platform extension 2460, that extends outside of the perimeter defined by the outermost edge of the rear door 2400, the side walls 2261, the front doors 2350, and the front wall 2300, and is supported by the lower frame assembly 2220. The platform extension 2460 may facilitate egress from and entrance onto the basket 2200 (e.g., from a building). As shown in FIG. 73A, the platform extension 2460 forms a cantilever structure. As shown in FIGS. 73A and 9, the platform extension 2460 is supported by center platform supports, shown as center platform supports 2462, by side platform supports, shown as side platform supports 2464, and by a platform support rail, shown as platform support rail 2466. A panel 2468 is coupled to the platform support rail 2466 and defines a top surface of the platform extension 2460. The side platform supports 2464 are coupled to the outer members 2222 and extend longitudinally forward. The side platform supports 2464 extend from the outer members 2222 to the platform support rail 2466. The center platform supports 2462 are coupled to and extend longitudinally forward from the front upright members 2304 and the inner members 2224 towards the platform support rail 2466. The center platform supports 2462 extend upward along front upright members 2304 and downwards along the inner members 2224 to better support the cantilever structure. The center platform supports 2462 and the side platform supports 2464 are directly coupled to the platform support rail 2466. The panel 2468 is positioned such that a top surface of the panel 2468 is substantially aligned with a top surface of the floor panel 2240. In some embodiments, the floor panel 2240 and the panel 2468 are integrally formed from a single member. As shown in FIG. 73A, the panel 2468 is positioned entirely between an outer surface of one side wall 2261 and an outer surface of the other side wall 2261. This arrangement reduces the overall width of the basket 2200 while still facilitating access through the first access opening 2322 and the second access opening 2324.

Figure 78:
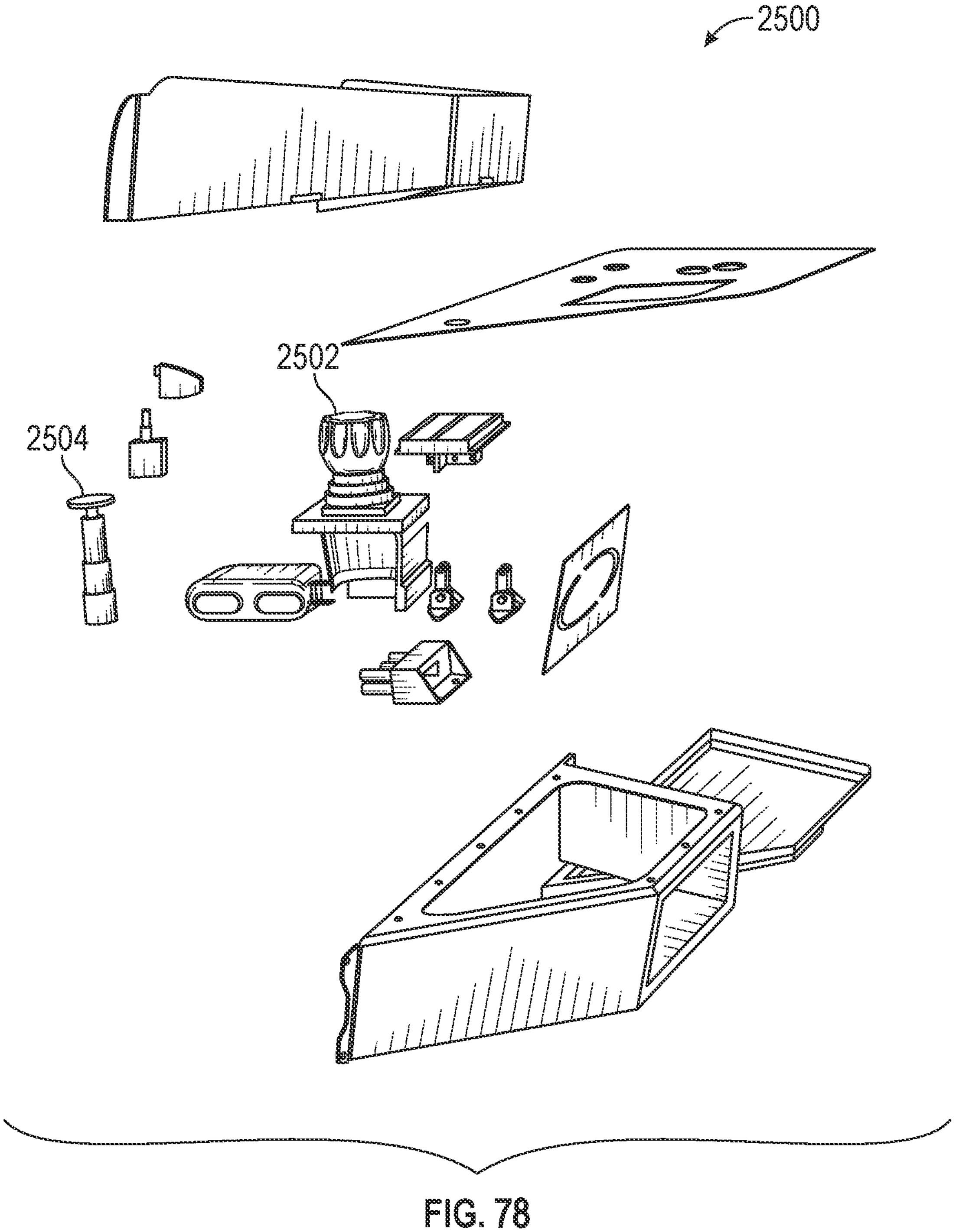
FIG. 78 is an exploded view of a control console of the fire apparatus of FIG. 70A, according to an exemplary embodiment.

As shown in FIGS. 73A and 78, the floor panel 2240 provides a surface upon which operators can stand and control the aerial ladder assembly 2070 the using an input/output (I/O) device, shown as a control console 2500. In some embodiments, the control console 2500 is coupled to the front wall 2300. In other embodiments, the control console 2500 is located elsewhere on the basket 2200. The control console 2500 is communicably coupled to a control system of the fire apparatus 2010 such that information or signals (e.g., command signals, etc.) may be exchanged between the control console 2500 and other components of the fire apparatus 2010 (e.g., the ladder 2072, the turntable 2074, the waterway assembly 2154, hydraulic pumps, etc.). According to an exemplary embodiment, the control console 2500 enables an operator (e.g., fire fighter, etc.) of the fire apparatus 2010 to control one or more components of the fire apparatus 2010. By way of example, the control console 2500 may include at least one of an interactive display, a touchscreen device, one or more buttons (e.g., a button configured to begin or cease water flow through the waterway assembly 2154, etc.), joysticks, switches, and voice command receivers configured to receive a command input from the operator. As shown in FIG. 78, the control console 2500 includes a joystick 2502 and an emergency stop button 2504. An operator may use the joystick 2502 to control rotation of the turntable 2074 relative to the chassis 2016, rotation of the ladder 2072 relative to the turntable 2074, rotation of the basket 2200 relative to the ladder 2072, and extension and/or retraction of the ladder 2072 to bring the basket 2200 to a desired position (e.g., to the front, back, or side of fire apparatus 2010, etc.). The emergency stop button 2504 is configured to disable operation of the aerial ladder assembly 2070 when pressed. In other embodiments, an operator may engage a lever associated with the control console 2500 to trigger the extension or retraction of the plurality of sections of the aerial ladder assembly 2070. In yet another embodiment, an operator may use the control console 2500 to enable, disable, or direct various lights (e.g., lights located on the basket 2200, etc.). In addition to the control console 2500, the basket 2200 may include various manual controls. By way of example, as shown in FIGS. 71C and 72, the basket 2200 includes an interface, shown as handle 2506, coupled to the shower nozzle 2162. The handle 2506 extends through the floor panel 2240 and into the working area 2320 so as to be accessible from inside the basket 2200. When pulled, the handle 2506 opens a valve within the shower nozzle 2162 to initiate fluid flow through the shower nozzle 2162.

As shown in FIGS. 73A-74, various components of the basket 2200 are aligned with one another such that each of the components extend with a common plane. The components of each side wall 2261 and the corresponding outer member 2222 extend within a side plane of the basket 2200. The components of both rear walls 2265 and the rear member 2226 extend within a back plane of the basket 2200. The components of the front wall 2300 and the front member 2230 extend within a front plane of the basket 2200. With the front doors 2350 closed, the components of each front door 2350 and the corresponding angled member 2228 extend within an angled plane of the basket. The components of the lower frame assembly 2220, the side platform supports 2464, and the platform support rail extend within a bottom plane of the basket 2200. The floor panel 2240 and the panel 2468 extend within a work surface plane of the basket 2200.

Figure 79A:
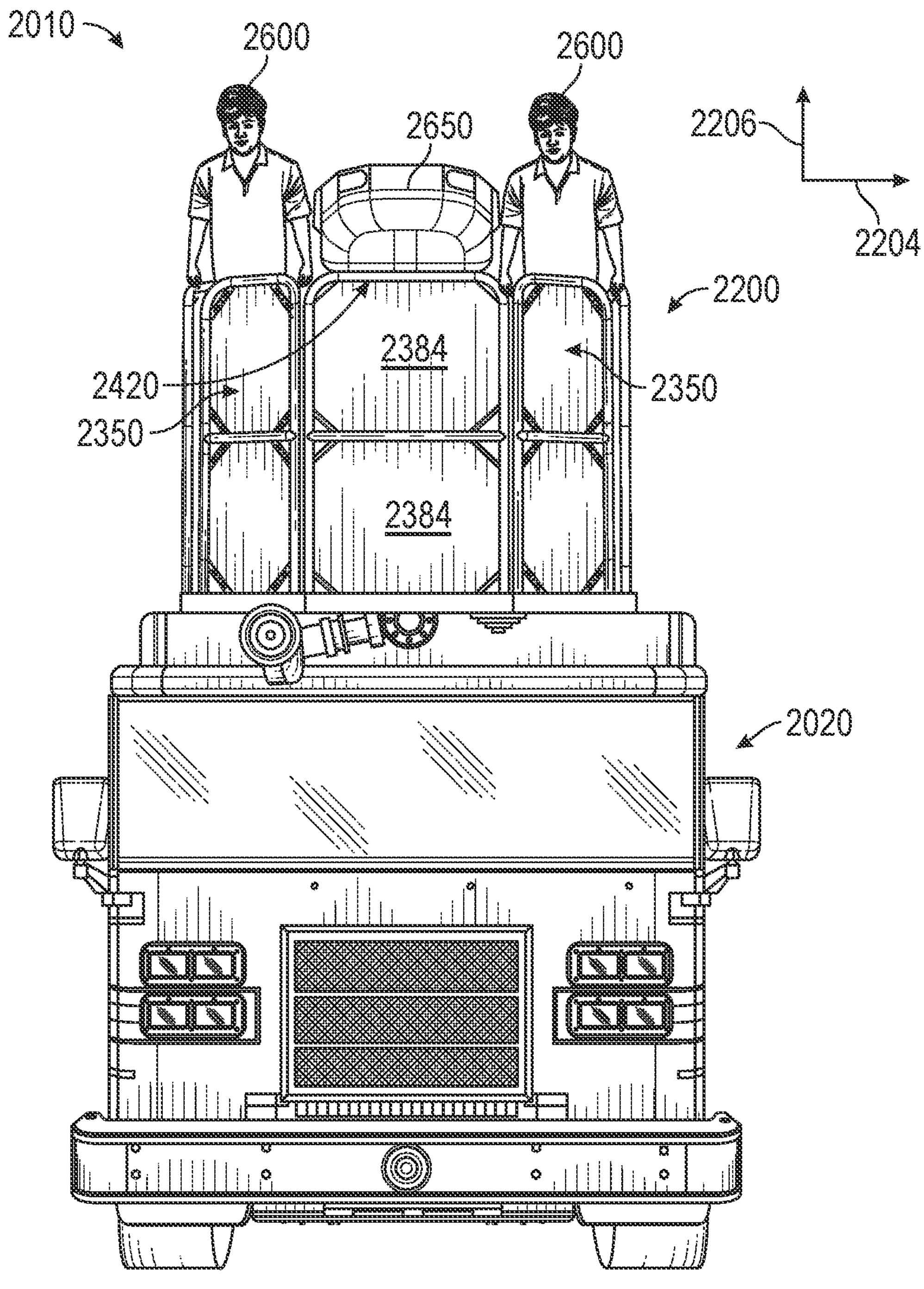
FIG. 79A is a front view of a fire apparatus, according to an exemplary embodiment.
Figure 79B:
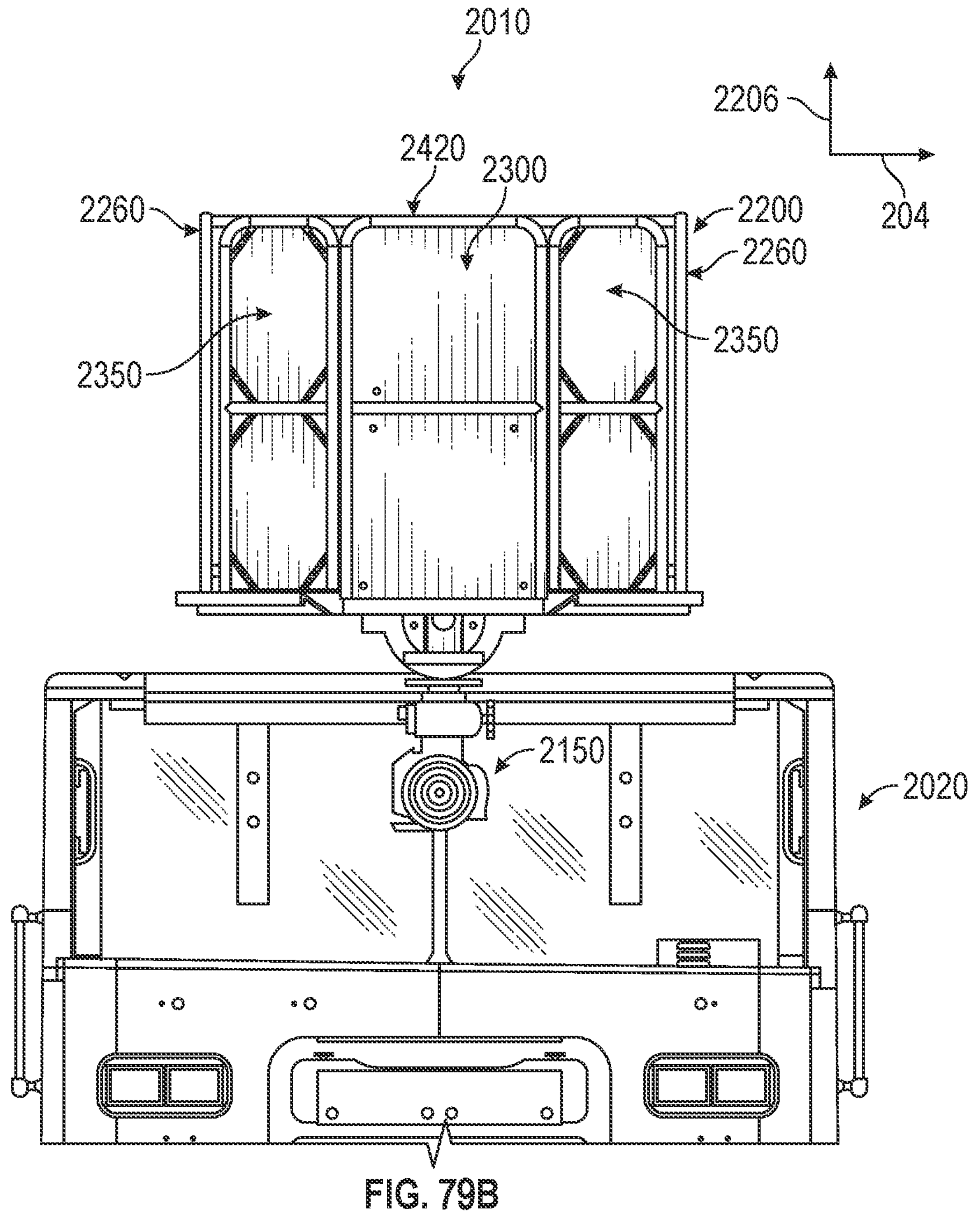
FIG. 79B is a front view of a fire apparatus, according to an exemplary embodiment.

FIGS. 79A and 79B show the basket 2200 on the fire apparatus 2010 in a fully retracted position. In some embodiments, the basket 2200 is brought to the fully retracted position before driving the fire apparatus 2010. A maximum driving height dimension is defined between the upper rail 2420 and the ground when the basket 2200 is in the fully retracted position. In some embodiments, the maximum driving height dimension is approximately 12.5 feet. In other embodiments, the maximum driving height dimension is less than or greater than 12.5 feet.

FIG. 79A shows the basket 2200 staffed with two operators 2600 and supporting a stokes basket 2650, according to an exemplary embodiment. The stokes basket 2650 is a piece of equipment used to transport an injured or otherwise disabled individual. In some embodiments, the upper rail 2420 of the basket 2200 is arranged such that the stokes basket 2650 or another piece of equipment can be supported on the upper rail 2420 at a minimum of two points. The upper rail 2420 may have a uniform height relative to the floor panel 2240 to facilitate holding the stokes basket 2650 or other equipment level across the upper rail 2420. In some embodiments, the working area 2320 is large enough that the stokes basket 2650 can be supported by the upper rail 2420 with two operators standing in the working area 2320. Without the stokes basket 2650, the working area 2320 is large enough for three operators. In some embodiments, the working area 2320 is approximately 14 square feet. In other embodiments, the working area 2320 is less than or greater than 14 square feet. In some embodiments, the dimensions of the basket 2200 fit within certain guidelines and/or requirements (e.g., the requirements set by the National Fire Protection Association (NFPA)).

Figure 80A:
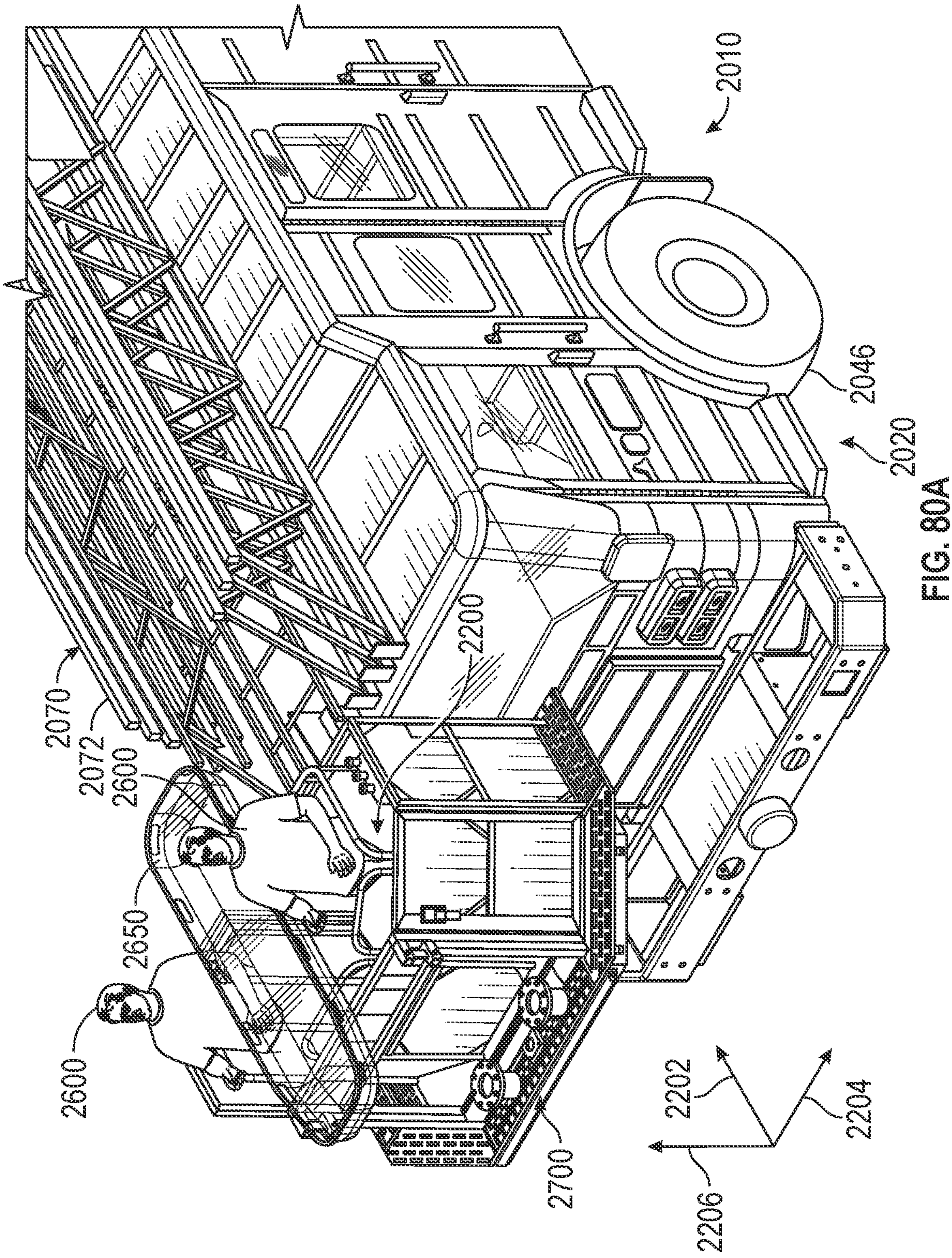
FIG. 80A is a perspective view of a fire apparatus, according to an exemplary embodiment.
Figure 80B:
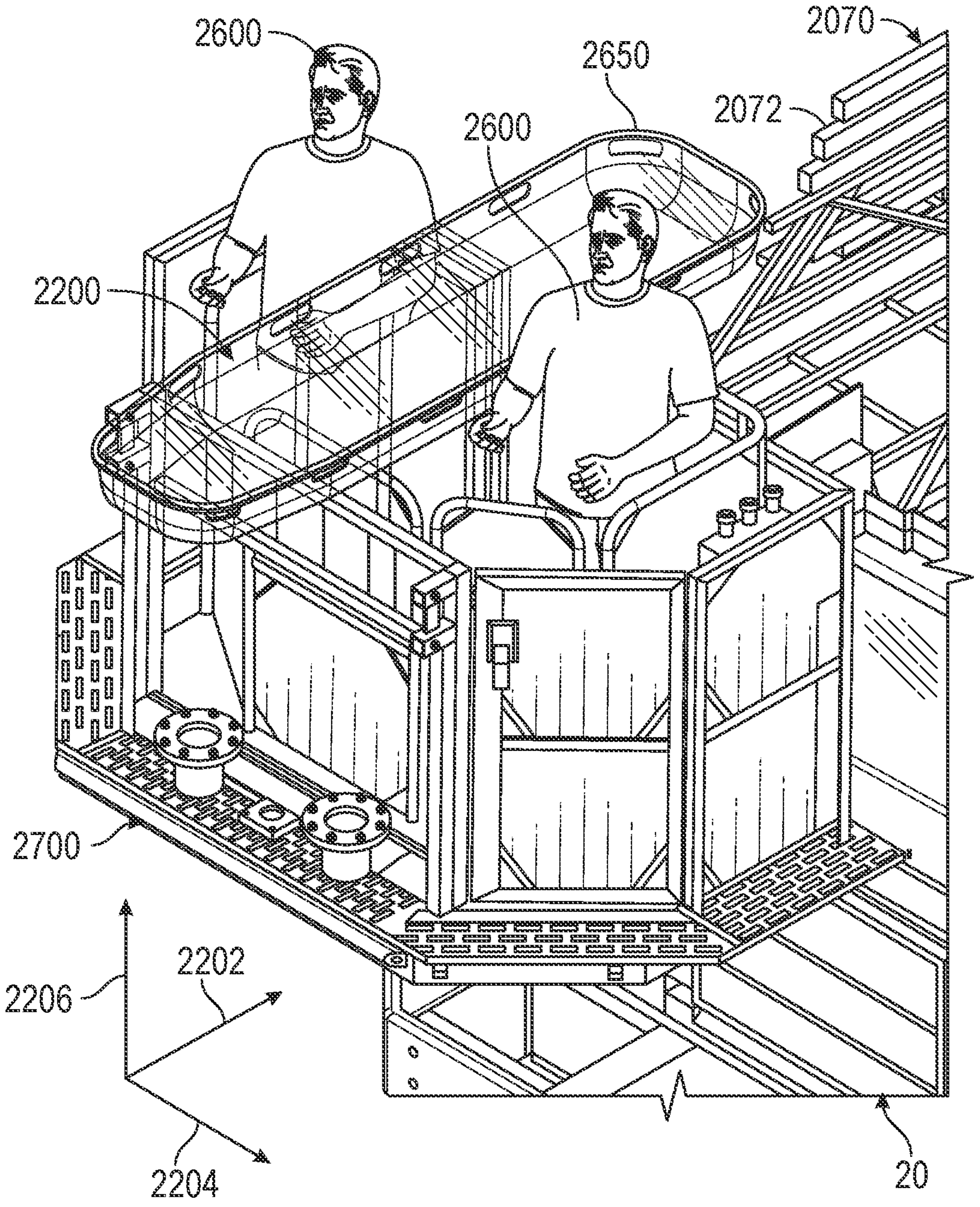
FIG. 80B is another view of the fire apparatus of FIG. 80A, according to an exemplary embodiment.
Figure 80C:
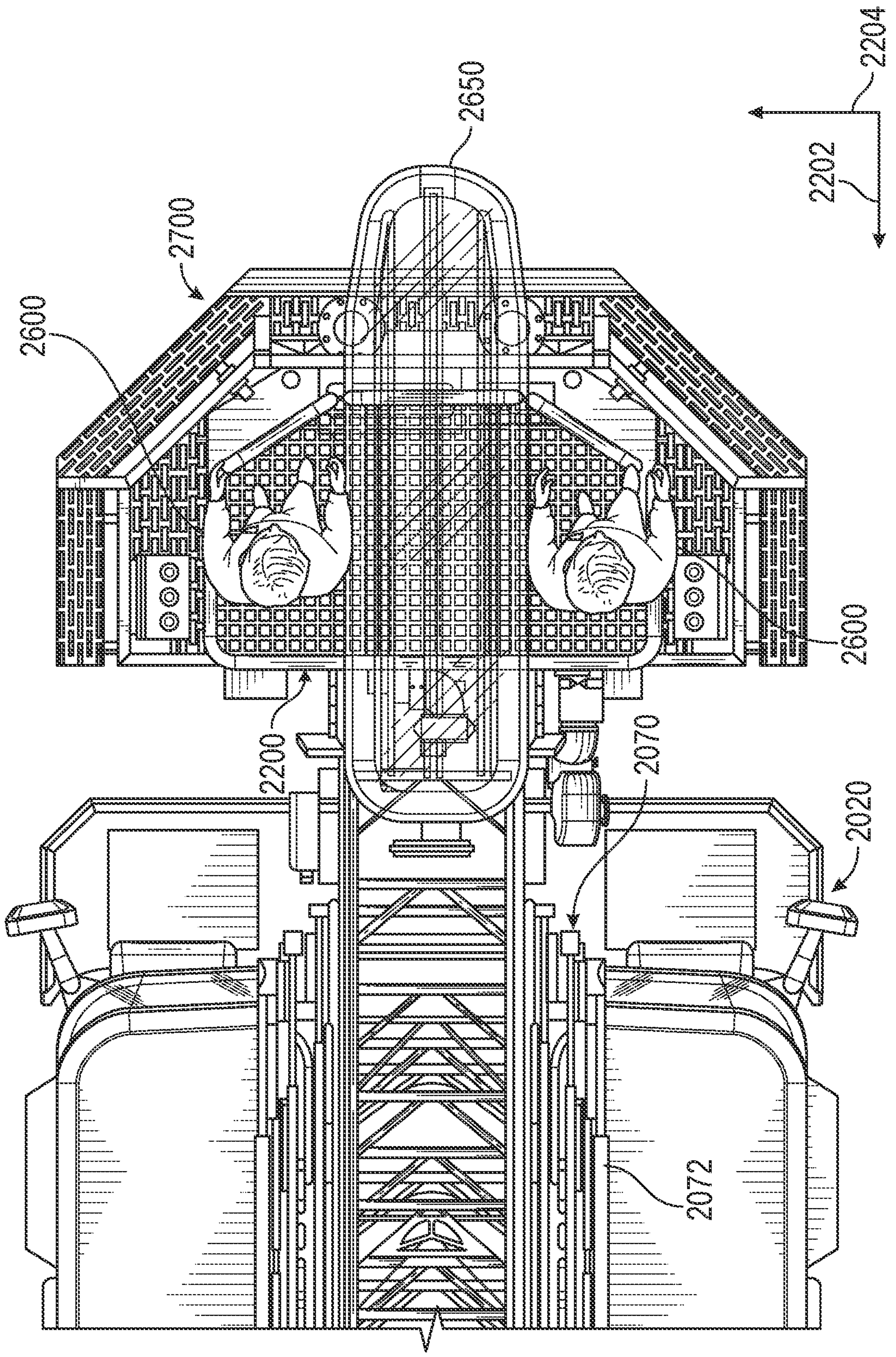
FIG. 80C is top view of the fire apparatus of FIG. 80A, according to an exemplary embodiment.

FIGS. 80A-80C show a comparison of the basket 2200 and another platform or basket 2700. In some embodiments, an overall width of the basket 2200 is smaller than an overall width of the other basket 2700. In some embodiments, an overall depth of the basket 2200 is smaller than an overall depth of the basket 2700. The specific arrangement of the basket 2200 outlined herein may facilitate the basket 2200 supporting a larger or similar load to the basket 2700 while remaining smaller and/or lighter than the basket 2700. This reduction in size and/or weight may increase the capability of the fire apparatus 2010 when compared to a fire apparatus incorporating the basket 2700. In some embodiments, the fire apparatus 2010 has a 110 foot vertical extension height and a 90 foot horizontal reach. In some embodiments, the vertical extension height of the fire apparatus 2010 greater than or less than 110 feet. In some embodiments, the horizontal reach of the fire apparatus 2010 is greater than or less than 90 feet. In some embodiments, the fire apparatus 2010 can achieve the vertical extension height and the horizontal reach under one or more of the following conditions: with a 750 pound load in the basket 2200; with a 500 pound load in the basket 2200 while spraying water from the nozzle 2150; while experiencing a 35 mile per hour wind; while coated in ¼" of ice. In some embodiments, the fire apparatus 2010 can achieve the vertical extension height and the horizontal reach under one or more of the following conditions: with a greater than or less than 750 pound load in the basket 2200; with a greater than or less than 500 pound load in the basket 2200 while spraying water from the nozzle 2150; while experiencing a greater than or less than 35 mile per hour wind; while coated in more or less than ¼" of ice. In some embodiments, the capacity of the fire apparatus 2010 fits within certain guidelines and/or requirements (e.g., the requirements set by the NFPA).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the parecise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A ladder assembly for a fire apparatus, the ladder assembly comprising:
- a ladder having a first end and an opposing second end configured to couple to the fire apparatus;
- a basket coupled to the first end of the ladder, the basket including:
  - a subfloor frame assembly;
  - a floor panel coupled to the subfloor frame assembly; and
  - an upper frame assembly extending upward from and around a periphery of the floor panel, the upper frame assembly including:
    - a front portion;
    - a rear portion;
    - opposing side portions coupled to the rear portion; and
    - a pair of doors extending between the front portion and the opposing side portions, the pair of doors positioned proximate front corners of the basket, each of the pair of doors including a panel that, when the pair of doors are closed, is (a) oriented at an angle relative to the front portion and the opposing side portions and (b) neither parallel with nor perpendicular to the front portion or the opposing side portions.

2. The ladder assembly of claim 1, wherein the basket includes a platform extension that extends forward of the floor panel in front of the front portion and the pair of doors.

3. The ladder assembly of claim 2, wherein side portions of the platform extension positioned in front of the pair of doors are oriented at an angle to correspond with the angle of the pair of doors.

4. The ladder assembly of claim 2, wherein the basket includes platform supports that extend between the front portion of the upper frame assembly and a central portion of the platform extension.

5. The ladder assembly of claim 2, wherein the basket includes side platform supports that extend longitudinally forward from each lateral side of the basket, the side platform supports positioned to support the platform extension along opposing lateral sides thereof.

6. The ladder assembly of claim 1, wherein the rear portion defines a rear opening in alignment with the first end of the ladder, and wherein the basket includes a rear door extending across the rear opening.

7. The ladder assembly of claim 1, wherein the basket includes a first rear support and a second rear support coupled to the subfloor frame assembly.

8. The ladder assembly of claim 7, wherein the first rear support defines a first pivot point and the second rear support defines a second pivot point, wherein the first end of the ladder includes a mount that engages with the first pivot point and the second pivot point such that the basket is pivotable relative to the mount about a pivot axis (i) positioned beneath the floor panel and (ii) extending through the first pivot point and the second pivot point.

9. The ladder assembly of claim 8, further comprising an actuator extending between the mount and the basket, the actuator positioned to facilitate pivoting the basket about the pivot axis.

10. The ladder assembly of claim 9, wherein the mount includes a first set of plates and a second set of plates positioned laterally outward of the first set of plates, wherein the first set of plates engage with an interior side of the first rear support and the second rear support, and wherein the second set of plates engage with an exterior side of the first rear support and the second rear support.

11. The ladder assembly of claim 10, wherein the actuator is positioned between (i) one of the first set of plates and (ii) one of the second set of plates that are adjacent each other.

12. The ladder assembly of claim 7, wherein the subfloor frame assembly includes a first central support and a second central support, wherein the first central support and the second central support extend (i) under a central portion of the floor panel and (ii) between the front portion and the rear portion of the upper frame assembly, and wherein the first rear support is aligned with the first central support and the second rear support is aligned with the second central support.

13. The ladder assembly of claim 7, wherein each of the first rear support and the second rear support has an upper end positioned above the floor panel and a lower end positioned beneath floor pane, wherein the lower end of the first rear support defines a first pivot point and the lower end of the second rear support defines a second pivot point, wherein the first end of the ladder includes a mount that engages with the first pivot point and the second pivot point such that the basket is pivotable relative to the mount about a pivot axis (i) positioned beneath the floor panel and extending through the first pivot point and the second pivot point.

14. The ladder assembly of claim 13, further comprising an actuator extending between the mount and the first rear support.

15. The ladder assembly of claim 1, wherein the rear portion defines a rear opening in alignment with the first end of the ladder, and wherein the basket includes a rear door extending across the rear opening.

16. The ladder assembly of claim 15, wherein the rear door includes:
- a first interface coupled to a first portion of the rear portion positioned at a first side of the rear opening;
- a second interface coupled to the first portion of the rear portion positioned at the first side of the rear opening;
- a first lateral member extending across the rear opening, the first lateral member having a first lateral end selectively received by the first interface and an opposing second lateral end pivotably coupled to a second portion of the rear portion positioned at an opposing second side of the rear opening;
- a second lateral member extending across the rear opening and vertically offset from the first lateral member, the second lateral member having a third lateral end selectively received by the second interface and an opposing fourth lateral end pivotably coupled to the second portion of the rear portion positioned at the opposing second side of the rear opening;
- a handle pivotably coupled to the first lateral member and the second lateral member to form a four bar mechanism that includes the handle, the first lateral member, the second lateral member, and the second portion of the rear portion at the opposing second side of the rear opening.

17. A basket for a ladder of a fire apparatus, the basket comprising:
- a floor assembly;
- a frame assembly extending upward from and around a periphery of the floor assembly, the frame assembly including:

a front portion;

a rear portion defining a rear opening;

opposing side portions; and a rear door extending across the rear opening, wherein the rear door includes:

a first interface coupled to a first portion of the rear portion positioned at a first side of the rear opening;

a second interface coupled to the first portion of the rear portion positioned at the first side of the rear opening;

a first lateral member extending across the rear opening, the first lateral member having a first lateral end selectively received by the first interface and an opposing second lateral end pivotably coupled to a second portion of the rear portion positioned at an opposing second side of the rear opening;

a second lateral member extending across the rear opening and vertically offset from the first lateral member, the second lateral member having a third lateral end selectively received by the second interface and an opposing fourth lateral end pivotably coupled to the second portion of the rear portion positioned at the opposing second side of the rear opening; and a handle pivotably coupled to the first lateral member and the second lateral member to form a four bar mechanism that includes the handle, the first lateral member, the second lateral member, and the second portion of the rear portion at the opposing second side of the rear opening.

18. A ladder assembly for a fire apparatus, the ladder assembly comprising:

a ladder having a basket mount positioned at an end thereof, the basket mount including a first arm and a second arm; and a basket coupled to the basket mount, the basket including:

a floor;

an upper frame assembly extending upward from and around a periphery of the floor, the upper frame assembly including a front portion, a rear portion, a first side portion coupled to a first end of the rear portion, a second side portion coupled to an opposing second end of the rear portion, a first door extending between the front portion and the first side portion, and a second door extending between the second side portion and the front portion, wherein the first door and the second door are positioned proximate front corners of the basket and oriented at first angles relative to the front portion, the first side portion, and the second side portion;

a subfloor frame assembly positioned beneath the floor, the subfloor frame assembly including a first mount support and a second mount support, wherein the first arm of the basket mount engages with the first mount support and the second arm of the basket mount engages with the second mount support; and a platform extension extending forward of the floor in front of the upper frame assembly, wherein side portions of the platform extension positioned in front of the first door and the second door are oriented at second angles that correspond with the first angles of the first door and the second door;

a first actuator extending between the first arm of the basket mount and the basket; and a second actuator extending between the second arm of the basket mount and the basket;

wherein extension and retraction of the first actuator and the second actuator causes the basket to pivot relative to the basket mount about a pivot axis positioned beneath the floor and the subfloor frame assembly.

19. The ladder assembly of claim 18, wherein the basket includes side platform supports that extend longitudinally forward from each lateral side of the basket, the side platform supports positioned to support the platform extension along opposing lateral sides thereof.

20. A basket for a ladder of a fire apparatus, the basket comprising:

a floor;

an upper frame assembly extending upward from and around a periphery of the floor, the upper frame assembly including:

a front portion;

a rear portion defining a rear opening;

a first side portion coupled to a first end of the rear portion;

a second side portion coupled to an opposing second end of the rear portion;

a first door extending between the front portion and the first side portion; and a second door extending between the second side portion and the front portion;

wherein the first door and the second door are positioned proximate front corners of the basket and oriented at first angles relative to the front portion, the first side portion, and the second side portion;

a subfloor frame assembly positioned beneath the floor, the subfloor frame assembly including a first mount support and a second mount support, the first mount support and the second mount support configured to pivotably couple to an end of the ladder such that the basket is pivotable relative to the end of the ladder about a pivot axis positioned beneath the floor;

a platform extension extending forward of the floor in front of the upper frame assembly, wherein side portions of the platform extension positioned in front of the first door and the second door are oriented at second angles that correspond with the first angles of the first door and the second door;

side platform supports extending longitudinally forward from each lateral side of the basket, the side platform supports positioned to support the platform extension along opposing lateral sides thereof; and a rear door extending across the rear opening, the rear door including:

a first interface coupled to a first portion of the rear portion positioned at a first side of the rear opening;

a second interface coupled to the first portion of the rear portion positioned at the first side of the rear opening;

a first lateral member extending across the rear opening, the first lateral member having a first lateral end selectively received by the first interface and an opposing second lateral end pivotably coupled to a second portion of the rear portion positioned at an opposing second side of the rear opening;

a second lateral member extending across the rear opening and vertically offset from the first lateral member, the second lateral member having a third lateral end selectively received by the second interface and an opposing fourth lateral end pivotably coupled to the second portion of the rear portion positioned at the opposing second side of the rear opening; and a handle pivotably coupled to the first lateral member and the second lateral member to form a four bar mechanism that includes the handle, the first lateral member, the second lateral member, and the second portion of the rear portion at the opposing second side of the rear opening.

* * * * *